(12) United States Patent
Hyde et al.

(10) Patent No.: US 11,205,523 B2
(45) Date of Patent: Dec. 21, 2021

(54) METHOD, SYSTEM, AND APPARATUS FOR THE THERMAL STORAGE OF NUCLEAR REACTOR GENERATED ENERGY

(71) Applicant: TerraPower, LLC, Bellevue, WA (US)

(72) Inventors: Roderick A Hyde, Redmond, WA (US); Muriel Y Ishikawa, Livermore, CA (US); Clarence T Tegreene, Bellevue, WA (US); Joshua C Walter, Kirkland, WA (US); Lowell L Wood, Jr., Bellevue, WA (US); Victoria Y. H. Wood, Livermore, CA (US)

(73) Assignee: TERRAPOWER, LLC, Bellevue, WA (US)

( * ) Notice: Subject to any disclaimer, the term of this patent is extended or adjusted under 35 U.S.C. 154(b) by 0 days.

(21) Appl. No.: 16/741,307

(22) Filed: Jan. 13, 2020

(65) Prior Publication Data
US 2020/0176140 A1    Jun. 4, 2020

Related U.S. Application Data

(63) Continuation of application No. 12/660,025, filed on Feb. 18, 2010, now Pat. No. 10,535,437.

(51) Int. Cl.
*F28D 20/00* (2006.01)
*G21D 3/00* (2006.01)
(Continued)

(52) U.S. Cl.
CPC .............. *G21D 3/001* (2013.01); *F01K 3/00* (2013.01); *F01K 3/181* (2013.01); *F01K 13/02* (2013.01);
(Continued)

(58) Field of Classification Search
CPC ...... F28D 20/00; F28D 20/0056; F28D 17/00; F28D 19/00; G21D 3/001; G21D 9/00;
(Continued)

(56) References Cited

U.S. PATENT DOCUMENTS 3,630,839 A * 12/1971 Podolsky ................ F01D 17/24
376/217
3,848,416 A    11/1974 Bundy
(Continued)

FOREIGN PATENT DOCUMENTS

CN    1252606 A    5/2000
DE    1040713 B    10/1958
(Continued)

OTHER PUBLICATIONS

Pike et al., "Nuclear Propulsion", FAS Military Analysis Network, Feb. 29, 2000, pp. 1-8, http://www.fas.org/man/dod-101/sys/ship/eng/reactor.html.
(Continued)

*Primary Examiner* — Lily C Garner
(74) *Attorney, Agent, or Firm* — FisherBroyles, LLP; Jeremy P. Sanders

(57) ABSTRACT

A method, system, and apparatus for the thermal storage of nuclear reactor generated energy including diverting a selected portion of energy from a portion of a nuclear reactor system to an auxiliary thermal reservoir and, responsive to a shutdown event, supplying a portion of the diverted selected portion of energy to an energy conversion system of the nuclear reactor system.

13 Claims, 82 Drawing Sheets

(51) Int. Cl.
*F01K 3/00* (2006.01)
*F01K 3/18* (2006.01)
*F01K 13/02* (2006.01)
*F02C 1/05* (2006.01)
*G21D 9/00* (2006.01)
F28D 19/00 (2006.01)
F28D 17/00 (2006.01)

(52) U.S. Cl.
CPC .............. *F02C 1/05* (2013.01); *G21D 9/00* (2013.01); *F28D 17/00* (2013.01); *F28D 19/00* (2013.01); *F28D 20/00* (2013.01); *F28D 20/0056* (2013.01); *Y02E 30/30* (2013.01)

(58) Field of Classification Search
CPC ........ F01K 13/00; F01K 13/02; F01K 13/181; F02C 1/05
See application file for complete search history.

(56) References Cited

U.S. PATENT DOCUMENTS

| | | | |
|---|---|---|---|
| 3,935,063 | A | 1/1976 | Dunckel |
| 3,974,029 | A | 8/1976 | George et al. |
| 3,998,695 | A | 12/1976 | Cahn et al. |
| 4,003,786 | A | 1/1977 | Cahn |
| 4,089,744 | A | 5/1978 | Cahn |
| 4,294,311 | A | 10/1981 | Denis et al. |
| 4,361,009 | A | 11/1982 | Schluderberg |
| 4,412,785 | A | 11/1983 | Roman |
| 4,582,121 | A | 4/1986 | Casey |
| 4,794,882 | A * | 1/1989 | Viken ............... F28D 20/0056 122/4 D |
| 4,851,183 | A | 7/1989 | Hampel |
| 5,013,519 | A | 5/1991 | Nakamura et al. |
| 5,120,494 | A | 6/1992 | Nazareno et al. |
| 5,132,076 | A | 7/1992 | Corpora et al. |
| 5,636,512 | A | 6/1997 | Culver |
| 6,026,349 | A | 2/2000 | Heneman |
| 6,163,740 | A | 12/2000 | Beltracchi |
| 6,327,323 | B1 | 12/2001 | Rohde et al. |
| 6,909,765 | B2 | 6/2005 | Lahoda |
| 8,416,908 | B2 * | 4/2013 | Mann ............... G21C 7/22 376/220 |
| 2006/0266043 | A1 | 11/2006 | Jerome |
| 2008/0123797 | A1 | 5/2008 | Hyde et al. |
| 2009/0178409 | A1 | 7/2009 | Shinnar |
| 2010/0124303 | A1* | 5/2010 | Young ............... G21C 1/322 376/282 |
| 2012/0056125 | A1 | 3/2012 | Raade et al. |
| 2013/0180520 | A1 | 7/2013 | Raade et al. |
| 2014/0166924 | A1 | 6/2014 | Raade et al. |
| 2015/0010875 | A1 | 1/2015 | Raade et al. |

FOREIGN PATENT DOCUMENTS

| | | | | |
|---|---|---|---|---|
| DE | 3404853 | A1 | 8/1985 | |
| EP | 0028512 | A1 * | 5/1981 | ............... F01K 3/06 |
| EP | 0028512 | B1 | 6/1985 | |
| JP | 04140699 | A | 5/1992 | |
| JP | 07011915 | A | 1/1995 | |
| JP | 09247872 | A | 9/1997 | |
| JP | 10260294 | A | 9/1998 | |
| JP | 2002071884 | A | 3/2002 | |
| JP | 2008005785 | A | 1/2008 | |
| JP | 2008023208 | A | 2/2008 | |
| WO | WO2001055577 | A2 * | 2/2001 | |
| WO | 2014074930 | A1 | 5/2014 | |
| WO | WO-2020210837 | A2 * | 10/2020 | ............. F01K 3/181 |

OTHER PUBLICATIONS

USNRC Technical Training Center, "Reactor Concepts Manual—Pressurized Water Reactor (PWR) Systems", 28 pages, Attachment—Sixteen to Jul. 18, 2014 10 C.F.R. 2.206 Enforcement Petition, Florida Power & Light Company, Turkey Point Nuclear Plant.
EP 11780897.2 Extended European Search Report dated Jul. 10, 2017.
EP 11780898.0 Extended European Search Report dated Jun. 28, 2013.
PCT/US2011/000297 International Search Report dated Nov. 25, 2011.
PCT/US2011/000302 International Search Report dated Jan. 17, 2012.
PCT/US2011/000302 International Written Opinion dated Jan. 17, 2012.
PCT/US2011/000303 International Search Report dated Nov. 22, 2011.
PCT/US2011/000304 International Search Report dated Nov. 25, 2011.

\* cited by examiner

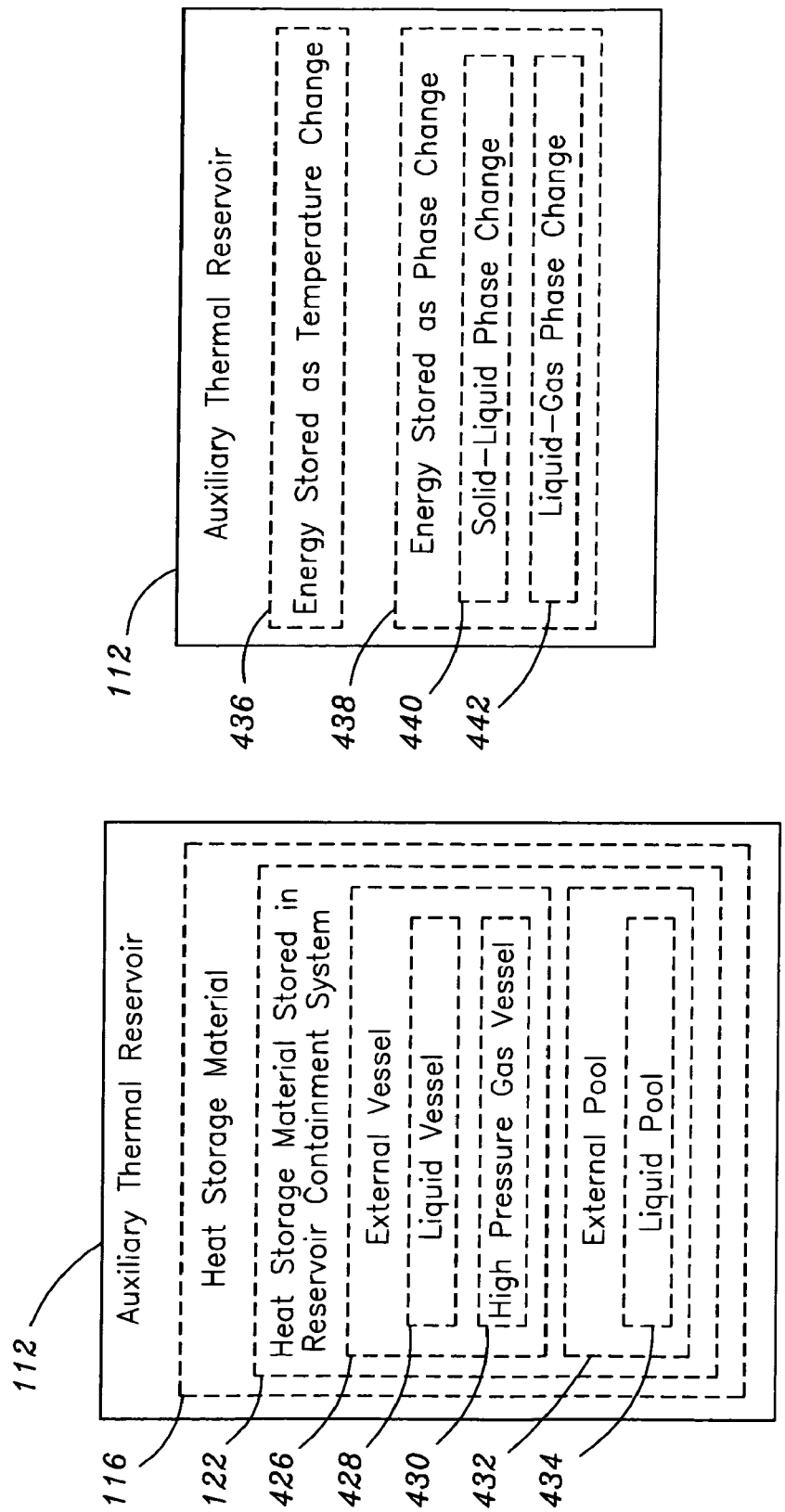

( A )

— 1000

1010
diverting a selected portion of energy from a portion of at least one nuclear reactor system to at least one auxiliary thermal reservoir 3802
diverting a selected portion of energy from a portion of at least one nuclear reactor system to a mass of at least one heat storage material of at least one auxiliary thermal reservoir 3902
diverting a selected portion of energy from a portion of at least one nuclear reactor system to a mass of at least one liquid heat storage material of at least one auxiliary thermal reservoir 3906
diverting a selected portion of energy from a portion of at least one nuclear reactor system to a mass of at least one liquid metal salt heat storage material of at least one auxiliary thermal reservoir 1020
responsive to a shutdown event, supplying at least a portion of the diverted selected portion of energy to at least one energy conversion system of the nuclear reactor system ( B )

*FIG. 39B*

METHOD, SYSTEM, AND APPARATUS FOR THE THERMAL STORAGE OF NUCLEAR REACTOR GENERATED ENERGY

This patent application is a continuation of and claims priority to U.S. patent application Ser. No. 12/660,025, filed Feb. 18, 2010, which is herein incorporated by reference in its entirety.

TECHNICAL FIELD

The present disclosure generally relates to the thermal storage and subsequent utilization of nuclear reactor generated energy.

SUMMARY

In one aspect, a method includes but is not limited to diverting a selected portion of energy from a portion of at least one nuclear reactor system to at least one auxiliary thermal reservoir and, responsive to a shutdown event, supplying at least a portion of the diverted selected portion of energy to at least one energy conversion system of the nuclear reactor system. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a means for diverting a selected portion of energy from a portion of at least one nuclear reactor system to at least one auxiliary thermal reservoir and a means for, responsive to a shutdown event, supplying at least a portion of the diverted selected portion of energy to at least one energy conversion system of the nuclear reactor system. In addition to the foregoing, other system aspects are described in the claims, drawings, and text forming a part of the present disclosure.

In one aspect, an apparatus includes but is not limited to an energy transfer system for diverting a selected portion of energy from a portion of at least one nuclear reactor system to at least one auxiliary thermal reservoir and a heat supply system, responsive to a shutdown event, for supplying at least a portion of the diverted selected portion of energy to at least one energy conversion system of the nuclear reactor system. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 4B is a flow diagram illustrating the types of reservoir containments systems suitable for containing the various heat storage materials of the auxiliary thermal reservoir;

FIG. 4C is a flow diagram illustrating thermodynamic changes to the heat storage material suitable for thermal energy storage;

DETAILED DESCRIPTION

Figure 1:
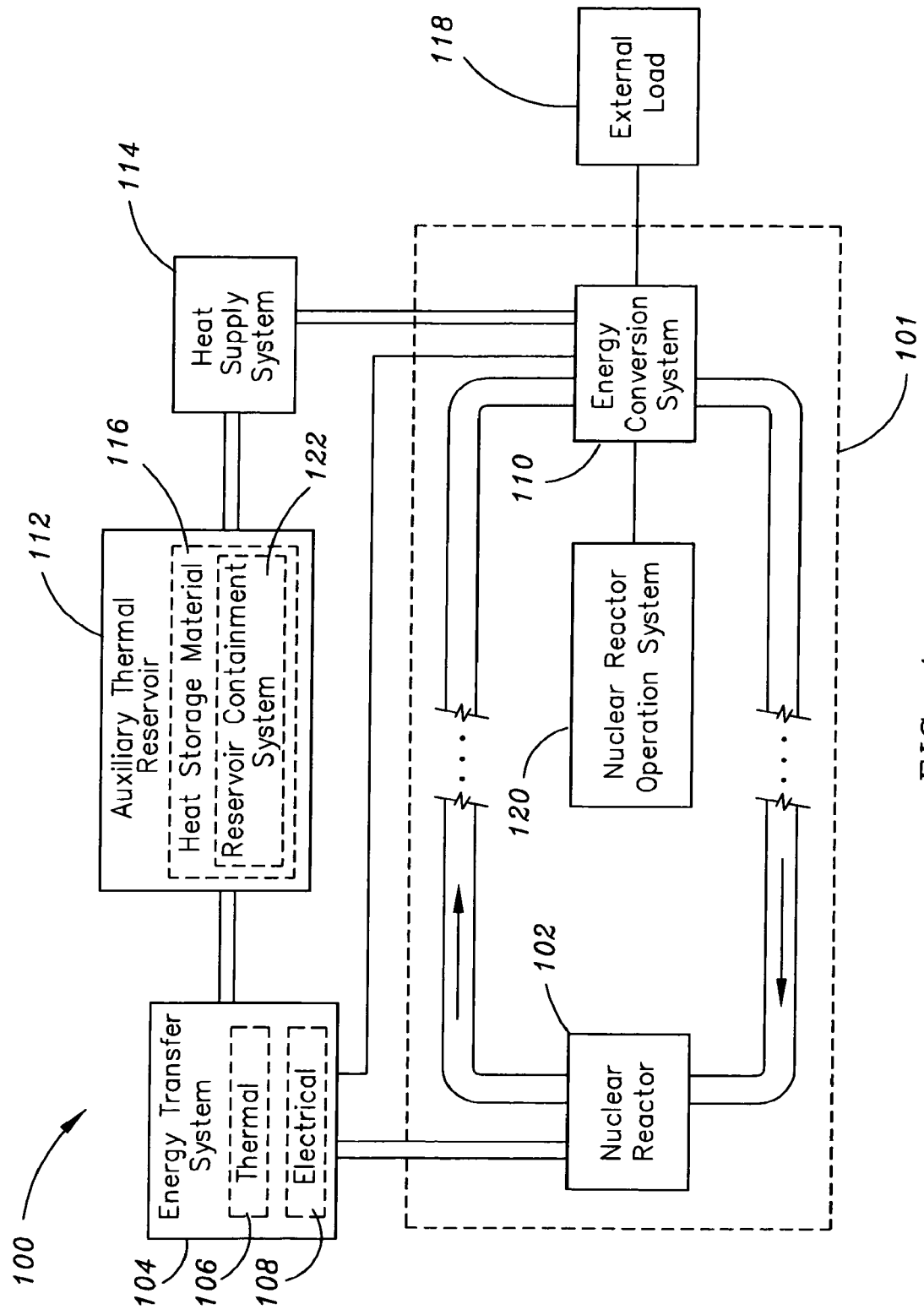
FIG. 1 is a schematic illustrating a system for the thermal storage of nuclear reactor generated energy.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1 through 9B, a system 100 for storing and utilizing a selected portion of nuclear reactor generated heat is described in accordance with the present disclosure. One or more energy transfer systems 104 may divert energy (e.g., thermal energy 106 or electrical energy 108) from a portion of a nuclear reactor system 101, such as a nuclear reactor 102 or an energy conversion system 110, to one or more heat storage materials 116 of an auxiliary thermal reservoir 112. Then, in response to a shutdown event (e.g., scheduled shutdown or emergency shutdown) of the nuclear reactor system 101, a heat supply system 114 may supply a portion of the thermal energy stored in the one or more auxiliary thermal reservoirs 112 to at least one energy conversion system 110 of the nuclear reactor system 101. The electrical energy produced by the energy conversion system 110 may then be supplied to an external load 118 (e.g., external power grid) or an internal load (e.g., an operation system of the nuclear reactor system 120).

Figures 2A, 2B:
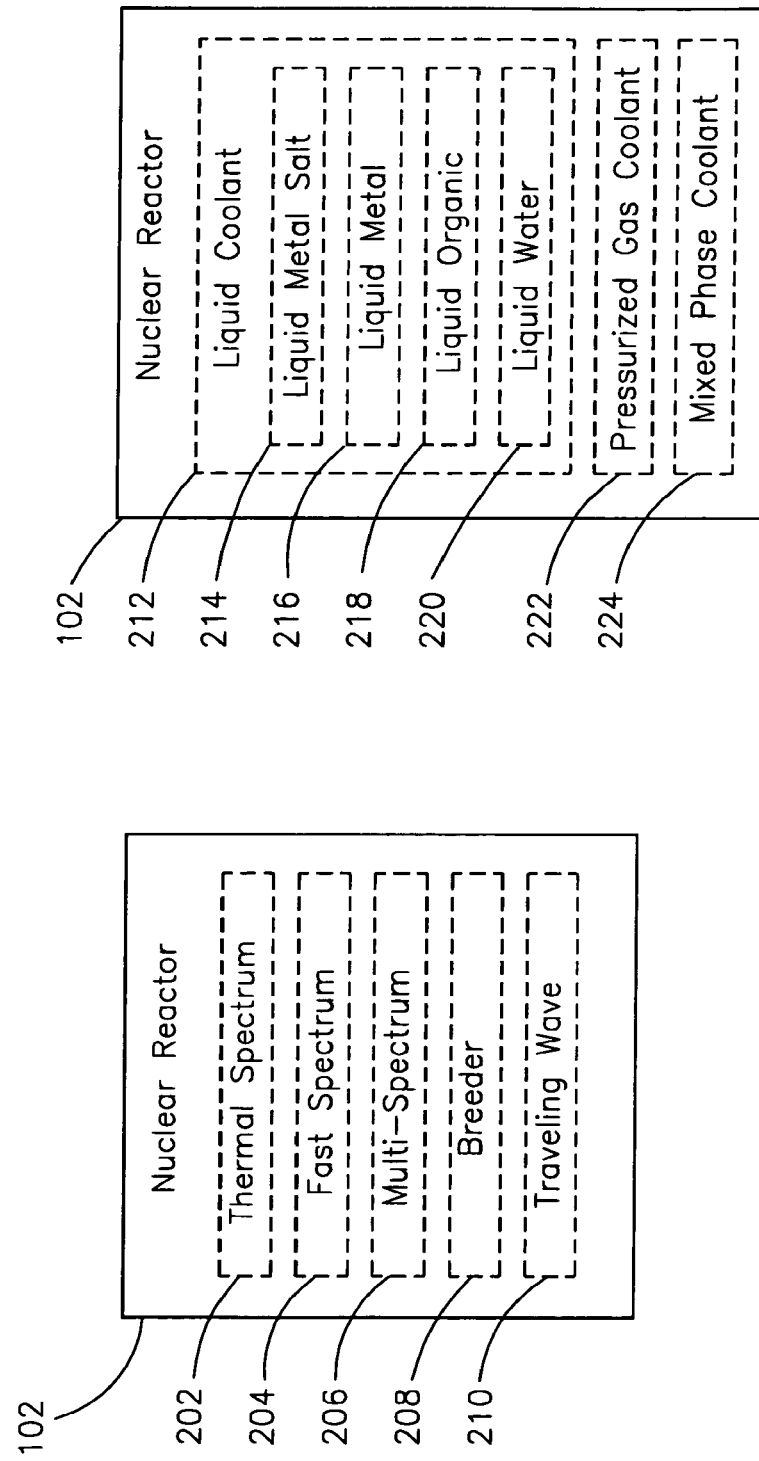
FIG. 2A is a flow diagram illustrating the types of nuclear reactors suitable for producing energy to be transferred to an auxiliary thermal reservoir.
FIG. 2B is a flow diagram illustrating the types of nuclear reactor coolants suitable for use when providing nuclear reactor generated energy to an auxiliary thermal reservoir.

In embodiments illustrated in FIG. 2A, the nuclear reactor 102 of the nuclear reactor system 101 may include, but is not limited to, a thermal spectrum nuclear reactor 202, a fast spectrum nuclear reactor 204, a multi-spectrum nuclear reactor 206, a breeder nuclear reactor 208, or a traveling wave reactor 210. For example, the energy produced by a thermal spectrum nuclear reactor 202 may be diverted from the thermal spectrum nuclear reactor 202 to an auxiliary thermal reservoir 112 using an energy transfer system 104. Then, in response to a shutdown event of the thermal spectrum nuclear reactor 202 of a nuclear reactor system 101, a heat supply system 114 may supply a portion of the thermal energy stored in the auxiliary reservoir 112 to at least one energy conversion system 110 of the thermal spectrum nuclear reactor system 101. By way of further example, the energy produced by a traveling wave nuclear reactor 210 may be diverted from the traveling wave nuclear reactor 210 to an auxiliary thermal reservoir 112 using an energy transfer system 104. Then, in response to a shutdown event of the traveling wave nuclear reactor 210 of the nuclear reactor system 101, a heat supply system 114 may supply a portion of the thermal energy stored in the auxiliary reservoir 112 to at least one energy conversion system 110 of the traveling wave nuclear reactor system 101.

In embodiments illustrated in FIG. 2B, the nuclear reactor 102 may include a nuclear reactor having a liquid coolant 212. For example, the liquid coolant 212 of the nuclear reactor 102 may include, but is not limited to, a liquid metal salt coolant 214 (e.g., lithium fluoride, beryllium fluoride or other fluoride salts), a liquid metal coolant 216 (e.g., sodium, lead, or lead bismuth), a liquid organic coolant 218 (e.g., diphenyl with diphenyl oxide), or a liquid water coolant 220. For instance, the energy transfer system 104 may divert energy from a portion of a liquid sodium cooled nuclear reactor of a nuclear reactor system 101 to an auxiliary thermal reservoir 112. In another instance, the energy transfer system 104 may divert energy from a portion of a liquid water cooled nuclear reactor 220 of a nuclear reactor system 101 to an auxiliary thermal reservoir 112. In an additional instance, the energy transfer system 104 may divert energy from a portion of a lithium fluoride cooled nuclear reactor of a nuclear reactor system 101 to an auxiliary thermal reservoir 112. Then, in response to a shutdown event of the nuclear reactor system 101 a heat supply system 114 may supply a portion of the thermal energy stored in the auxiliary thermal reservoir 112 to at least one energy conversion systems 110 of the nuclear reactor system 101.

In an additional embodiment, the nuclear reactor 102 may include a nuclear reactor having a pressurized gas coolant 222. For example, the pressurized gas coolant 222 may include, but is not limited to, pressurized helium gas or pressurized carbon dioxide gas. For instance, the energy transfer system 104 may divert energy from a portion of a pressurized helium cooled nuclear reactor 222 of a nuclear reactor system 101 to an auxiliary thermal reservoir 112. Then, in response to a shutdown event of the nuclear reactor system 101 a heat supply system 114 may supply a portion of the thermal energy stored in the auxiliary thermal reservoir 112 to at least one energy conversion systems 110 of the nuclear reactor system 101.

In another embodiment, the nuclear reactor 102 may include a nuclear reactor having a mixed phase coolant 224. For example, the mixed phase coolant 224 may include, but is not limited to, a gas-liquid mixed phase material (e.g., steam water-liquid water). For instance, the energy transfer system 104 may divert energy from a portion of a steam water-liquid water cooled nuclear reactor 224 of a nuclear reactor system 101 to an auxiliary thermal reservoir 112. Then, in response to a shutdown event of the nuclear reactor system 101 a heat supply system 114 may supply a portion of the thermal energy stored in the auxiliary thermal reservoir 112 to at least one energy conversion systems 110 of the nuclear reactor system 101.

Figure 3:
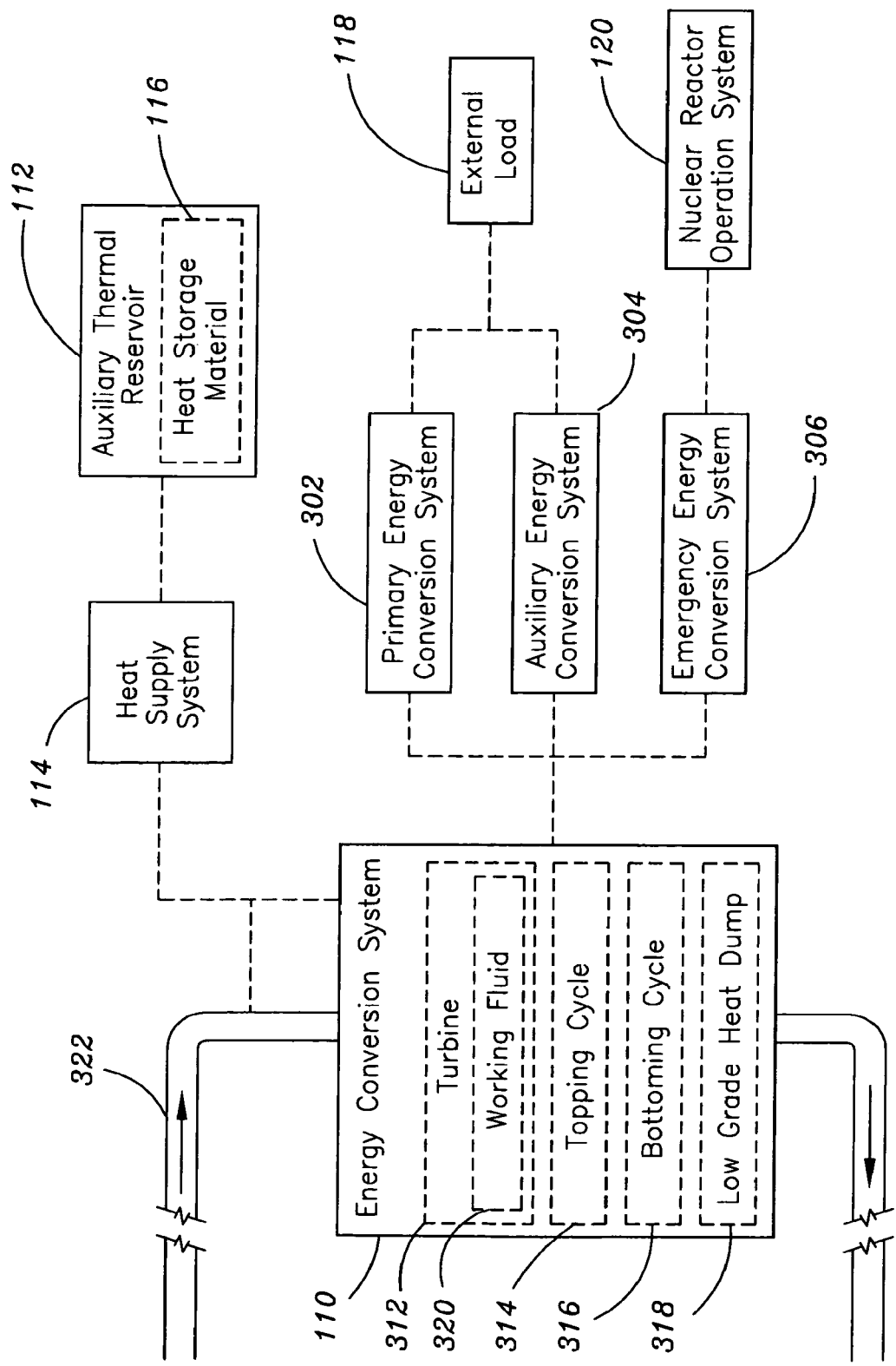
FIG. 3 is a schematic illustrating a system suitable for the transfer of thermal energy from the auxiliary thermal reservoir to the various energy conversion systems of the nuclear reactor system.

In additional embodiments illustrated in FIG. 3, the energy conversion system 110 may include, but is not limited to, a primary energy conversion system 302, an auxiliary energy conversion system 304, or an emergency energy conversion system 306. For example, in response to a shutdown event of the nuclear reactor system 101, a heat supply system 114 may supply a portion of the thermal energy stored in the heat storage material 116 of the auxiliary thermal reservoir 112 to at least one primary energy conversion system 302 of the nuclear reactor system 101. For instance, the primary energy conversion system 302 may include a turbine 312 coupled to an electric generator used to supply electrical power to the primary load 118 (e.g., electrical power grid) of the nuclear reactor system 101. By way of an additional example, in response to a shutdown event of the nuclear reactor system 101, a heat supply system 114 may supply a portion of the thermal energy stored in the heat storage material 116 of the auxiliary thermal reservoir 112 to at least one auxiliary energy conversion system 304 of the nuclear reactor system 101. For instance, the auxiliary energy conversion system 304 may include an energy conversion system that supplements or replaces the output of the primary energy conversion cycle 302. For example, the auxiliary energy conversion system 304 may include a turbine 312 coupled to an electric generator used to provide supplemental or backup electric power to the primary load 118 of the nuclear reactor system 101.

By way of a further example, in response to a shutdown event of the nuclear reactor system 101, a heat supply system 114 may supply a portion of the thermal energy stored in the heat storage material 116 of the auxiliary thermal reservoir 112 to at least one emergency energy conversion system 306 of the nuclear reactor system 101. For instance, the emergency energy conversion system may include a turbine 312 coupled to an electric generator used to supply electric power to an operation system 120 (e.g., monitoring system, safety system, control system, coolant system or security system) of the nuclear reactor system 101.

It will be appreciated by those skilled in the art that the emergency energy conversion system 306 may be configured to operate at temperatures lower than the operational temperature of the primary energy conversion system 302, allowing the emergency energy conversion system 306 to supply electrical energy to various operation systems 120 of the nuclear reactor system 101 in emergency situations where grid power is unavailable.

In a further embodiment, the energy conversion system 110 may include, but is not limited to, a turbine 312 of the nuclear reactor system 101. For example, in response to a shutdown event of the nuclear reactor system 101, a heat supply system 114 may supply a portion of the thermal energy stored in the heat storage material 116 of the auxiliary thermal reservoir 112 to at least one turbine 312 of the nuclear reactor system 101. By way of further example, in response to a shutdown event of the nuclear reactor system 101, a heat supply system 114 may supply a portion of the thermal energy stored in the heat storage material 116 of the auxiliary thermal reservoir 112 to a working fluid 320 of at least one turbine 312 of the nuclear reactor system 101. For instance, the heat supply system 114 may supply a portion of the thermal energy stored in the heat storage material 116 of the auxiliary thermal reservoir 112 to a pressurized steam working fluid 320 of at least one turbine 312 of the nuclear reactor system 101. It will be appreciated by those skilled in the art that the thermal energy supplied from the auxiliary thermal reservoir 112, via the heat supply system 114, to the working fluid 320 of the turbine 312 of the nuclear reactor system 101 may be used to augment the thermal energy supplied to the working fluid 320 of the turbine 312 from the nuclear reactor 102 of the nuclear reactor system.

In another embodiment, the energy conversion system 110 may include, but is not limited to, a topping cycle 314 of the nuclear reactor system 101, a bottoming cycle 316 of the nuclear reactor system 101 or a low grade heat dump 318 of the nuclear reactor system 101. For example, in response to a shutdown event of the nuclear reactor system 101, a heat supply system 114 may supply a portion of the thermal energy stored in the heat storage material 116 of the auxiliary thermal reservoir 112 to at least one topping cycle 314 of the nuclear reactor system 101. By way of another example, in response to a shutdown event of the nuclear reactor system 101, a heat supply system 114 may supply a portion of the thermal energy stored in the heat storage material 116 of the auxiliary thermal reservoir 112 to at least one bottoming cycle 316 of the nuclear reactor system 101. By way of further example, in response to a shutdown event of the nuclear reactor system 101, a heat supply system 114 may supply a portion of the thermal energy stored in the heat storage material 116 of the auxiliary thermal reservoir 112 to at least one low grade heat dump of the nuclear reactor system 101.

In a further embodiment, in response to a shutdown event of the nuclear reactor system 101, a heat supply system 114 may supply a portion of the thermal energy stored in the heat storage material 116 of the auxiliary reservoir 112 to a boiling loop 322 of the nuclear reactor system 110, wherein the boiling loop 322 of the nuclear reactor system is in thermal communication with an energy conversion system 110 of the nuclear reactor system 101. For example, in response to a shutdown event of the nuclear reactor system 101, a heat supply system 114 may supply a portion of the thermal energy stored in the heat storage material 116 of the auxiliary reservoir 112 to a boiling loop 322 in thermal communication with a turbine 312 of the nuclear reactor system. By way of further example, the boiling loop 322 may be in thermal communication with a topping cycle 314, a bottoming cycle 316 or a low grade heat dump 318 of the nuclear reactor system 101. It will be appreciated by those skilled in the art that the thermal energy supplied to the boiling loop 322 of the nuclear reactor system 101 from the auxiliary thermal reservoir 112 may be used to augment the thermal energy supplied to the boiling loop from the nuclear reactor 102 of the nuclear reactor system 101.

Figure 4A:
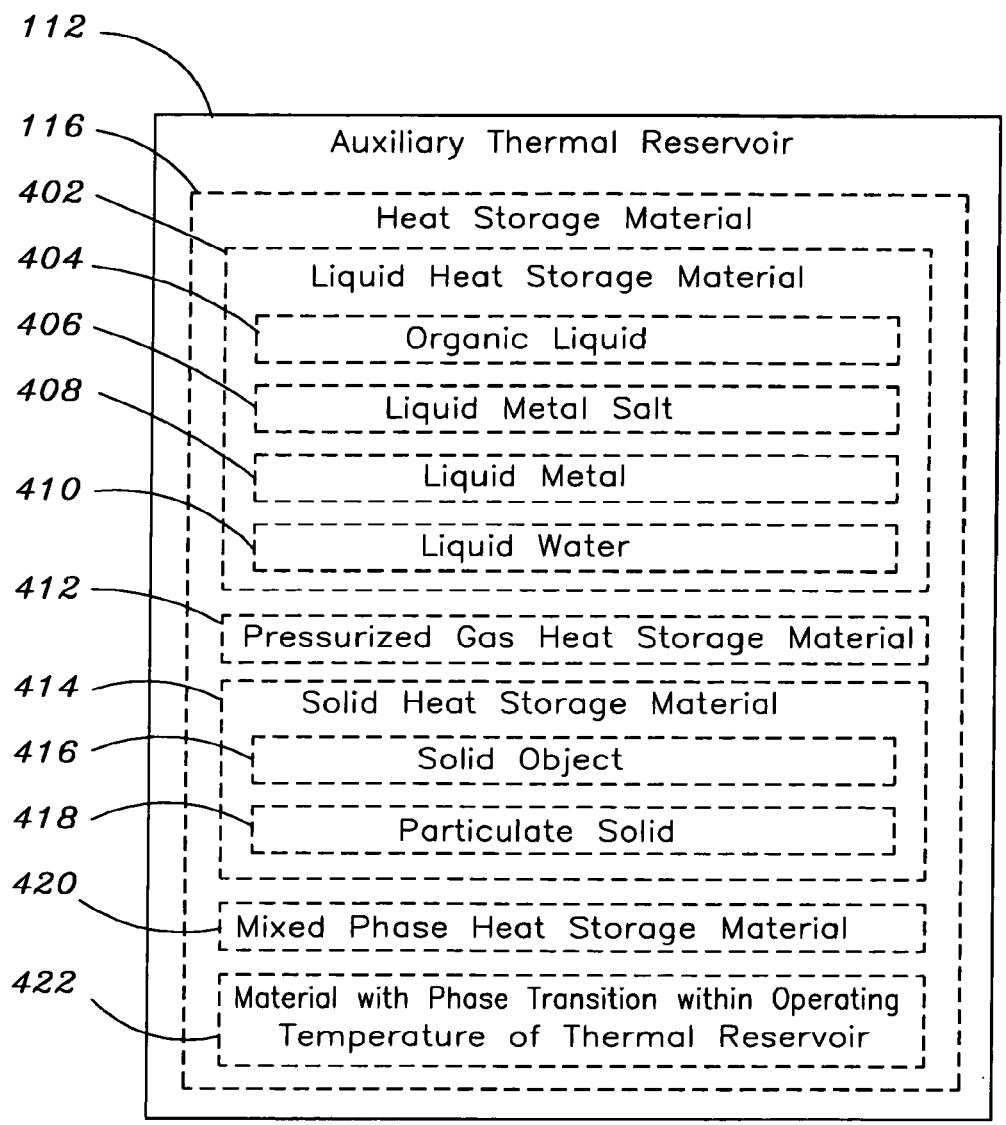
FIG. 4A is a flow diagram illustrating the types of heat storage materials suitable for thermal storage of energy in the auxiliary thermal reservoir.

In embodiments illustrated in FIG. 4A, the energy transfer system 104 may divert energy from a portion of the nuclear reactor system 101 to a liquid heat storage material 402 of an auxiliary thermal reservoir 112. For example, the liquid heat storage material 402 may include, but is not limited to, an organic liquid 404 (e.g., diphenyl with diphenyl oxide), a liquid metal salt 406 (e.g., lithium fluoride, beryllium fluoride or other fluoride salts), a liquid metal 408 (e.g., sodium, lead, or lead bismuth), or liquid water 410. For instance, the energy transfer system 104 may divert energy from a portion of the nuclear reactor system 101 to a mass of liquid sodium. In another instance, the energy transfer system 104 may divert energy from a portion of the nuclear reactor system 101 to a mass of liquid water 410. Then, in response to a shutdown event of the nuclear reactor system 101 a heat supply system 114 may supply a portion of the thermal energy stored in the liquid heat storage material 402 of the auxiliary thermal reservoir 112 to at least one energy conversion systems 110 of the nuclear reactor system 101.

In another embodiment, the energy transfer system 104 may divert energy from a portion of the nuclear reactor system 101 to a pressurized gas heat storage material 412 of an auxiliary thermal reservoir 112. For example, the pressurized gas material 412 suitable for heat storage may include, but is not limited to, pressurized helium gas or pressurized carbon dioxide gas. For instance, the energy transfer system 104 may divert energy from a portion of the nuclear reactor system 101 to a mass of pressurized helium. Then, in response to a shutdown event of the nuclear reactor system 101 a heat supply system 114 may supply a portion of the thermal energy stored in the pressurized gas material 412 of the auxiliary thermal reservoir 112 to at least one energy conversion systems 110 of the nuclear reactor system 101.

In additional embodiment, the energy transfer system 104 may divert energy from a portion of the nuclear reactor system 101 to a solid heat storage material 414 of an auxiliary thermal reservoir 112. In one aspect, the solid heat storage material 414 may include a continuous solid material forming a solid object 416. For example, the solid object 416 suitable for heat storage may include, but is not limited to, a three dimensional monolithic object (e.g., a brick), a three dimensional porous object (e.g., a brick containing pores suitable for fluid flow), a three dimensional channeled object (e.g. a brick containing channels suitable for fluid flow), or a three dimensional engineered object (e.g., an object containing an engineered honeycomb pattern for increased heat transfer). For instance, the energy transfer system 104 may divert energy from a portion of the nuclear reactor system 101 to one or more solid monolithic objects, such as a brick, a rod, or a sheet of material. In another instance, the energy transfer system 104 may divert energy from a portion of the nuclear reactor system 101 to a solid engineered object, such as an object constructed of a high heat capacity honeycomb structured material. Further, the solid object 416 may include, but is not limited to a ceramic solid object, such as a carbide ceramic (e.g., titanium carbide or silicon carbide) or a boride ceramic, a metal solid (e.g., iron or steel) object, or an environmentally present solid (e.g., rock or stone)

object. For example, the energy transfer system 104 may divert energy from a portion of the nuclear reactor system 101 to a ceramic solid object. By way of further example, the energy transfer system 104 may divert energy from a portion of the nuclear reactor system 101 to an environmentally preexisting rock or stone structure located in close proximity to the nuclear reactor system 101.

In another aspect, the solid heat storage material 414 may include a particulate solid material 418. For example, the particulate solid material 418 may include, but is not limited to, a granular material (e.g. sand) or a powder material. For example, the energy transfer system 104 may divert energy from a portion of the nuclear reactor system 101 to a mass of sand. Further, the energy transfer system 104 may divert energy from a portion of the nuclear reactor system 101 to a mass of sand via heat pipes, wherein one portion of the heat pipes is in thermal communication with a portion of the nuclear reactor 102 and a second portion of the heat pipes is embedded in the volume of the sand. It will be recognized by those skilled in the art that the volume of the sand, and like solid materials, need not be constrained by the volume of a reservoir containment system 122, in that uncontained sand, stone, and like heat trapping materials surrounding a nuclear reactor system 101 may serve as a suitable heat storage material 116. Then, in response to a shutdown event of the nuclear reactor system 101 a heat supply system 114 may supply a portion of the thermal energy stored in the solid heat storage material 414 of the auxiliary thermal reservoir 112 to at least one energy conversion systems 110 of the nuclear reactor system 101.

In a further embodiment, the energy transfer system 104 may divert energy from a portion of the nuclear reactor system 101 to a mixed phase heat storage material 420 of the auxiliary thermal reservoir 112. For example, the mixed phase material 420 suitable for heat storage may include, but is not limited to a gas-liquid mixed phase material (e.g., steam water-liquid water) or a liquid-solid mixed phase material (e.g. liquid sodium-solid sodium). For instance, the energy transfer system 104 may divert energy from a portion of the nuclear reactor system 101 to a mass of steam water-liquid water. Then, in response to a shutdown event of the nuclear reactor system 101, a heat supply system 114 may supply a portion of the thermal energy stored in the mixed phase heat storage material 420 of the auxiliary thermal reservoir 112 to an energy conversion system 110 of the nuclear reactor system 101.

In another embodiment, the energy transfer system 104 may divert energy from a portion of the nuclear reactor system 101 to a mass of a heat storage material having a phase transition within the operating temperature 422 of the auxiliary thermal reservoir 112. For example, an auxiliary thermal reservoir 112 having a heat storage material 116 with a phase transition at approximately 100° C. may continuously operate at temperatures above and below the phase transition at 100° C. Those skilled in the art will recognize that this allows the heat supply system 114 to supply thermal energy from the auxiliary reservoir 112 to the energy conversion system 110 of the nuclear reactor system 101 at reservoir temperatures above, below and at the phase transition temperature of the heat storage material 116. For instance, given that sodium has an approximate melting temperature of 97.7° C., a sodium based auxiliary reservoir 112 may operate in the liquid phase at temperatures above 97.7° C. and in the solid phase at temperatures below 97.7° C. Then, in response to a shutdown event of the nuclear reactor system 101, a heat supply system 114 may supply a portion of the thermal energy stored in the heat storage material 116 having a phase transition within the operating temperature 422 of the auxiliary reservoir 112 to an energy conversion system 110 of the nuclear reactor system 101.

In another embodiment, illustrated in FIG. 4B, the energy transfer system 104 may divert energy from a portion of the nuclear reactor system 101 to a mass of a heat storage material 116 contained in a reservoir containment system 424. For example, the reservoir containment system 424 may include, but is not limited to, an external vessel 426 or an external pool 432. By way of further example, the external vessel 426 may include, but is not limited to an external liquid vessel 428 or an external high pressure gas vessel 430. For instance, the energy transfer system 104 may divert energy from a portion of the nuclear reactor system 101 to a mass of liquid metal 408 (e.g. liquid sodium) contained in an external liquid vessel 428. In another instance, the energy transfer system 104 may divert energy from a portion of the nuclear reactor system 101 to a mass of pressurized gas 412 (e.g. pressurized helium) contained in an external high pressure vessel 430. By way of further example, the external pool 432 may include, but is not limited to, a liquid pool 434. For instance, the energy transfer system 104 may divert energy from a portion of the nuclear reactor system 101 to a mass of liquid metal 408 (e.g. liquid sodium) contained in an external liquid pool 434. Then, in response to a shutdown event of the nuclear reactor system 101, a heat supply system 114 may supply a portion of the thermal energy stored in the heat storage material 116 contained in the reservoir containment system 424 to an energy conversion system 110 of the nuclear reactor system 101.

In another embodiment illustrated in FIG. 4C, the auxiliary thermal reservoir 112 may store the energy diverted from a portion of the nuclear reactor system 101 in the form of a temperature change 436 in the heat storage material 116 of the auxiliary thermal reservoir 112. For example, the energy diverted from the nuclear reactor system 101 to the heat storage material 116 of the auxiliary thermal reservoir 112 may cause the temperature of the heat storage material 116 to increase. For instance, the energy diverted from the nuclear reactor system 101 to the heat storage material 116 of the auxiliary thermal reservoir 112 may cause the temperature of the heat storage material 116, such as a liquid metal 408 (e.g., liquid sodium), to increase from an initial temperature of approximately 100° C. to a temperature of approximately 500° C. Then, in response to a shutdown event of the nuclear reactor system 101, a heat supply system 114 may supply a portion of the thermal energy stored in the heat storage material 116 as a temperature increase to an energy conversion system 110 of the nuclear reactor system 101.

In another embodiment, the auxiliary thermal reservoir 112 may store the energy diverted from a portion of the nuclear reactor system 101 in the form of a phase change 438 in the heat storage material 116 of the auxiliary thermal reservoir 112. For example, the phase change 438 in the heat storage material 116 may comprise a solid-liquid phase change 440 or a liquid-gas phase change 442. In one aspect, the energy diverted from the nuclear reactor system 101 to a solid heat storage material 414 of the auxiliary thermal reservoir 112 may be stored in the heat storage material 116 by melting the heat storage material 116. For instance, the energy diverted from the nuclear reactor system 101 to a mass of solid sodium may liquefy the mass of sodium via a melting transition at approximately 97.7° C., thus storing a portion of the diverted energy in the liquid phase of the mass of sodium. It will be appreciated by those skilled in the art that the energy required to transform the heat storage material 116 from one phase (e.g. solid) to a new phase (e.g., liquid) is the heat of transformation (i.e., the "latent heat"). Then, in response to a shutdown event of the nuclear reactor system 101, a heat supply system 114 may supply a portion of the heat of transformation stored as thermal energy in the heat storage material 116 to an energy conversion system 110 of the nuclear reactor system 101.

Figure 4D:
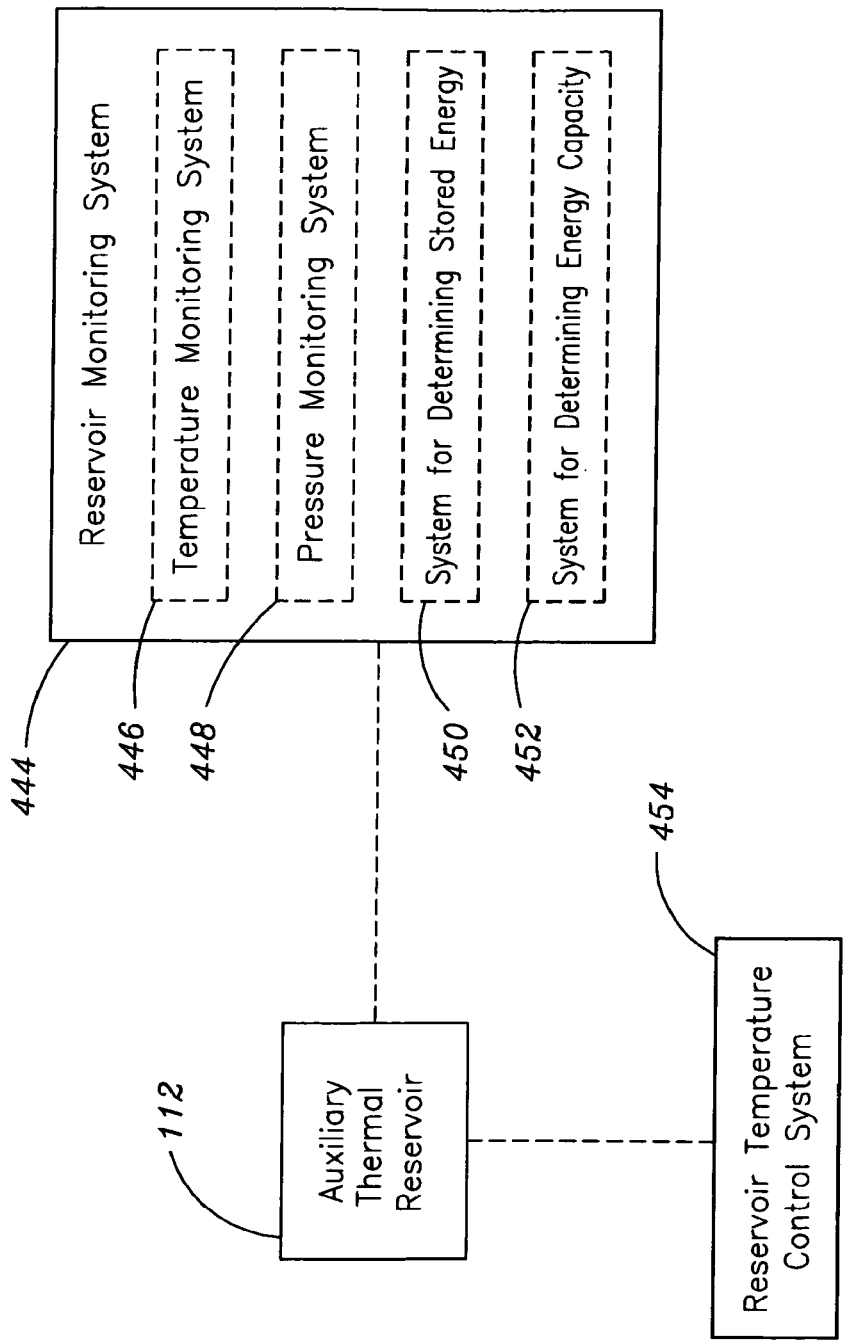
FIG. 4D is a flow diagram illustrating the types of reservoir monitoring systems suitable for monitoring the auxiliary thermal reservoir.

In a further embodiment, as illustrated in FIG. 4D, the operational status of the auxiliary thermal reservoir may be monitored using one or more reservoir monitoring systems 444. For example, the reservoir monitoring system 444 may include a temperature monitoring system 446, a pressure monitoring system 448, a system for determining the amount of energy stored in the thermal reservoir 450 or a system for determining the amount of available energy capacity of the thermal reservoir 452. For instance, a system for determining the amount of energy stored in the thermal reservoir 450 may include thermal and pressure monitoring devices combined with a computer system for applying an established algorithm (e.g., established equation-of-state for the storage material in question) relating temperature and pressure to the internal energy of the reservoir storage material (e.g., liquid metal or pressurized gas).

In another embodiment, the temperature of the auxiliary thermal reservoir 112 may be controlled using a reservoir temperature control system 454. For example, the reservoir temperature control system 454 may be used to increase or decrease the temperature of the auxiliary thermal reservoir 112. For instance, in situations where the internal temperature of the auxiliary thermal reservoir reaches levels outside the predefined operational limits, the reservoir temperature control system 454 may signal the heat supply system 114 to transfer a portion of the thermal energy stored in the auxiliary thermal reservoir 112 to an energy conversion system 110 of the nuclear reactor system 101.

Figure 5A:
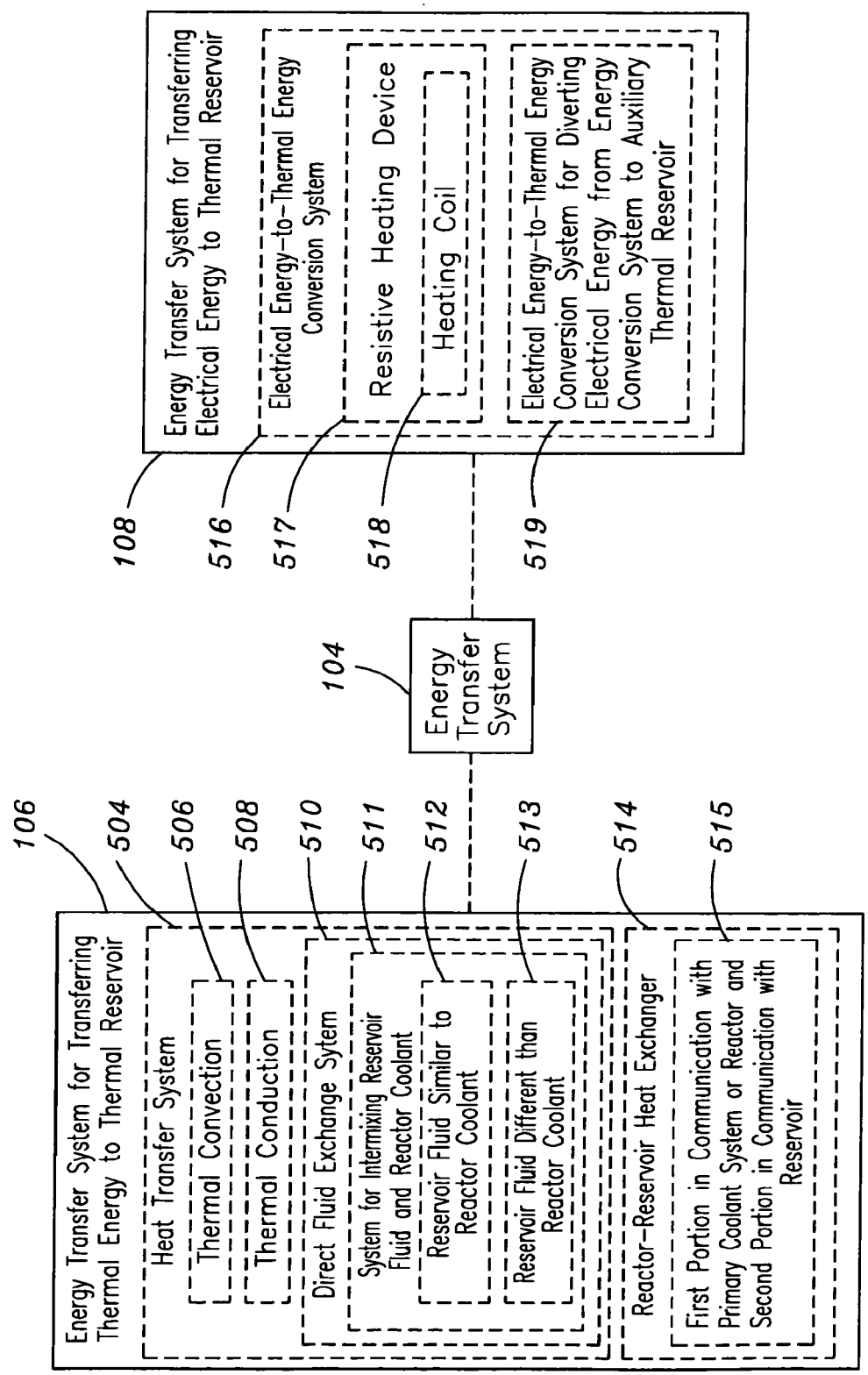
FIG. 5A is a flow diagram illustrating the types of energy transfer systems suitable for transferring energy from the nuclear reactor system to the auxiliary thermal reservoir.

In an additional embodiment, illustrated in FIG. 5A, the energy transfer system 104 may include, but is not limited to, an energy transfer system suitable for diverting thermal energy 106 from a portion of the nuclear reactor system 101 to the auxiliary thermal reservoir 112. For example, the energy transfer system suitable for diverting thermal energy 106 from a portion (e.g., primary coolant system) of the nuclear reactor system 101 to the auxiliary thermal reservoir 112 may transfer thermal energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In a further embodiment, the energy transfer system suitable for diverting thermal energy 106 from a portion of the nuclear reactor system 101 to the auxiliary thermal reservoir 112 may include, but is not limited to, a heat transfer system 504. For example, the heat transfer system 504 may transfer thermal energy from a portion of the nuclear reactor system 101 to the auxiliary thermal reservoir 112. For instance, the heat transfer system 504 may transfer thermal energy from a portion of the nuclear reactor system 101 to the auxiliary thermal reservoir 112 via thermal convection 506 (e.g., natural convection or forced convection via coolant pump(s)). In another instance, the heat transfer system 504 may transfer thermal energy from a portion of the nuclear reactor system 101 to the auxiliary thermal reservoir 112 via thermal conduction 508 (e.g., using a heat exchanger). Those having skill in the art will recognize that the heat transfer system 504 may be configured to transfer thermal energy from a portion of the nuclear reactor system 101 to the auxiliary thermal reservoir 112 using both thermal conduction 506 and thermal convection 508. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In a further embodiment, the heat transfer system 504 may include, but is not limited to, a direct fluid exchange heat transfer system 510. For example, the direct fluid exchange heat transfer system 510 may transfer thermal energy from a portion of the nuclear reactor system 101 to the auxiliary thermal reservoir 112. The direct fluid exchange heat transfer system 510 may comprise a system for intermixing the coolant of the nuclear reactor 102 with the fluidic heat storage material 116 contained in the reservoir containment system 122. For instance, a fluid carrying loop may couple the primary coolant system of the nuclear reactor system 101 and the reservoir fluid containment system 122, allowing for the intermixing of the two fluids. The rate of reactor coolant-reservoir fluid intermixing may be controlled by the direct fluid exchange transfer system 510. For instance, a valve system and/or fluid pumps (e.g., mechanical pumps or magnetohydrodynamic pumps) may be employed to volumetrically limit the exchange of material between the reactor coolant system and the reservoir fluid containment system 122. Further, the reservoir fluid and the reactor coolant may consist of identical or substantially similar materials. For example, both the reservoir fluid and the reactor coolant may consist of an identical liquid metal, such as liquid sodium. Additionally, the reservoir fluid and the reactor coolant may consist of different materials. For example, the reservoir fluid may consist of a liquid organic, such as diphenyl with diphenyl oxide, while the reactor coolant may consist of liquid sodium.

In a further embodiment, the heat transfer system 504 may include, but is not limited to, a reactor-reservoir heat exchanger 514. For example, the reactor-reservoir heat exchanger 514 may transfer thermal energy from a portion of the nuclear reactor system 101 to the auxiliary thermal reservoir 112. For instance, the reactor-to-reservoir heat exchanger 514 may comprise a heat exchanger 515 having a first portion in thermal communication with the primary coolant system of the nuclear reactor system 101 and a second portion in thermal communication with the auxiliary thermal reservoir 112. Further, the heat transfer system 504 may comprise more than one reactor-reservoir heat exchanger 514. For example, a first portion of a first heat exchanger may be in thermal communication with the primary coolant system of the nuclear reactor system 101, while a second portion of the first heat exchanger may be in thermal communication with a heat exchange loop. Further, a first portion of a second heat exchanger may be in thermal communication with the auxiliary thermal reservoir 112, while a second portion of the second heat exchanger may be in thermal communication with the heat exchange loop. Collectively, the first heat exchanger-heat exchange loop-second heat exchanger system acts to transfer thermal energy from the primary coolant system of the nuclear reactor system 101 to the auxiliary thermal reservoir 112.

In an additional embodiment, the energy transfer system 104 may include, but is not limited to, an energy transfer system suitable for transferring electrical energy 108 from a portion of the nuclear reactor system 101 to the auxiliary thermal reservoir 112. For example, the energy transfer system suitable for diverting electrical energy 108 from a portion of the nuclear reactor system 101 to the auxiliary thermal reservoir 112 may transfer electrical energy from a portion (e.g., energy conversion system 110) of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In a further embodiment, the energy transfer system 108 for transferring electrical energy from a portion of the nuclear reactor system 101 to the auxiliary thermal reservoir 112 may comprise an electrical energy-to-thermal energy conversion system 516. For example, the electrical energy-to-thermal energy conversion system 516, including, but not limited to a heating coil 518, may convert a portion of the electrical energy produced by the energy conversion system 110 to thermal energy. It will be recognized by those skilled in the art that the system for transferring electrical energy 108 from a portion of the nuclear reactor system 101 to the auxiliary thermal reservoir 112 may be utilized to convert excess electrical energy produced by an energy conversion system 110 of the nuclear reactor system 101 to thermal energy. Subsequently, a portion of that thermal energy may be transferred to and stored in the auxiliary thermal reservoir 112. Then, in response to a shutdown event of the nuclear reactor system 101, a heat supply system 114 may supply a portion of the thermal energy stored in the auxiliary thermal reservoir 112 to an energy conversion system 110 of the nuclear reactor system 101.

Figure 5B:
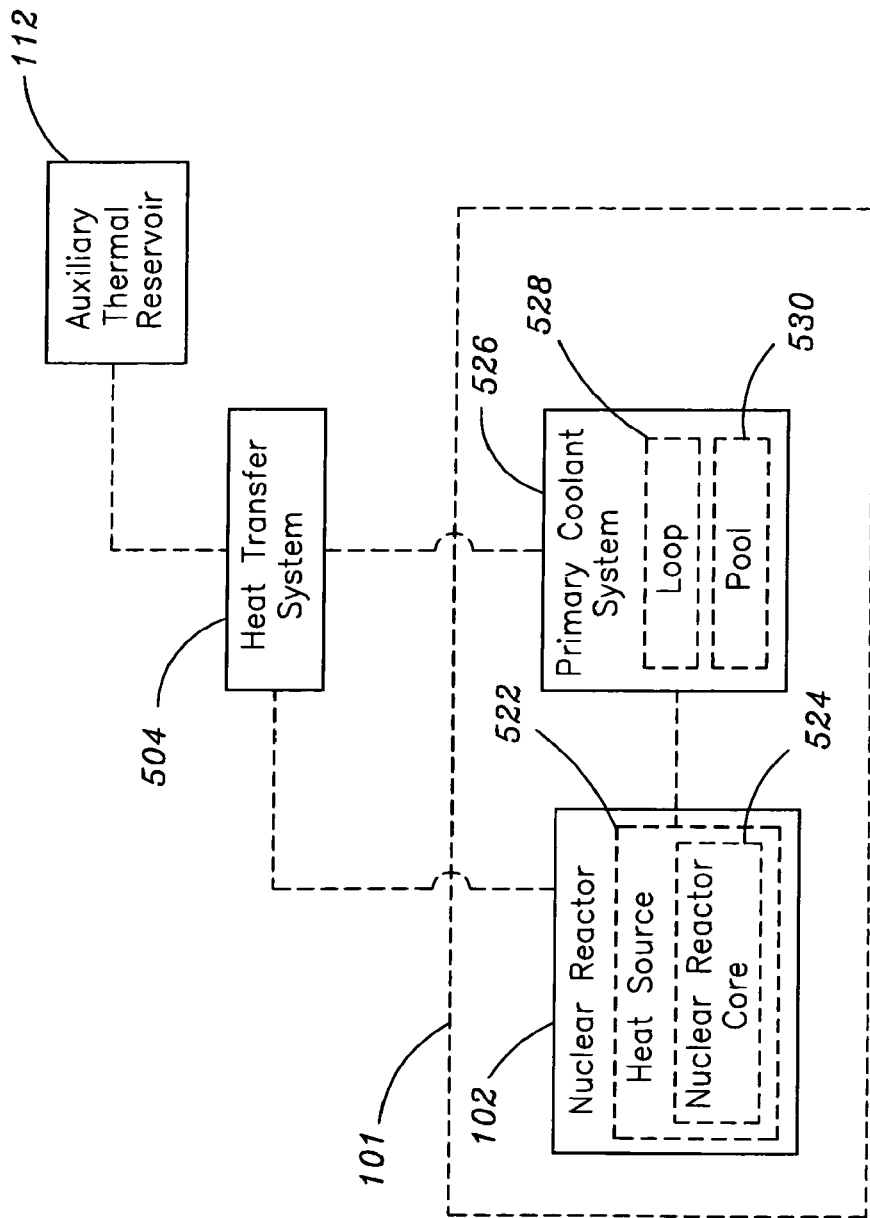
FIG. 5B is a schematic illustrating the thermal coupling of the auxiliary thermal reservoir to a heat source of the nuclear reactor system via the heat transfer system.

In a further embodiment, illustrated in FIG. 5B, the heat transfer system 504 may transfer thermal energy from a portion of the nuclear reactor system 101 in thermal communication with a heat source 522 of the nuclear reactor system 101 to the auxiliary thermal reservoir 112. For example, the heat transfer system 504 may transfer thermal energy from a portion of the nuclear reactor system 101 in thermal communication with the nuclear reactor core 524 to the auxiliary thermal reservoir 112. Further, the portion of the nuclear reactor system 101 in thermal communication with the nuclear reactor core 524 may include, but is not limited to, a portion of the primary coolant system 526 (e.g., portion of the primary coolant loop 528 or portion of the primary coolant pool 530). For example, the heat transfer system 504 may transfer thermal energy from a primary coolant system 526 of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

Figure 5C:
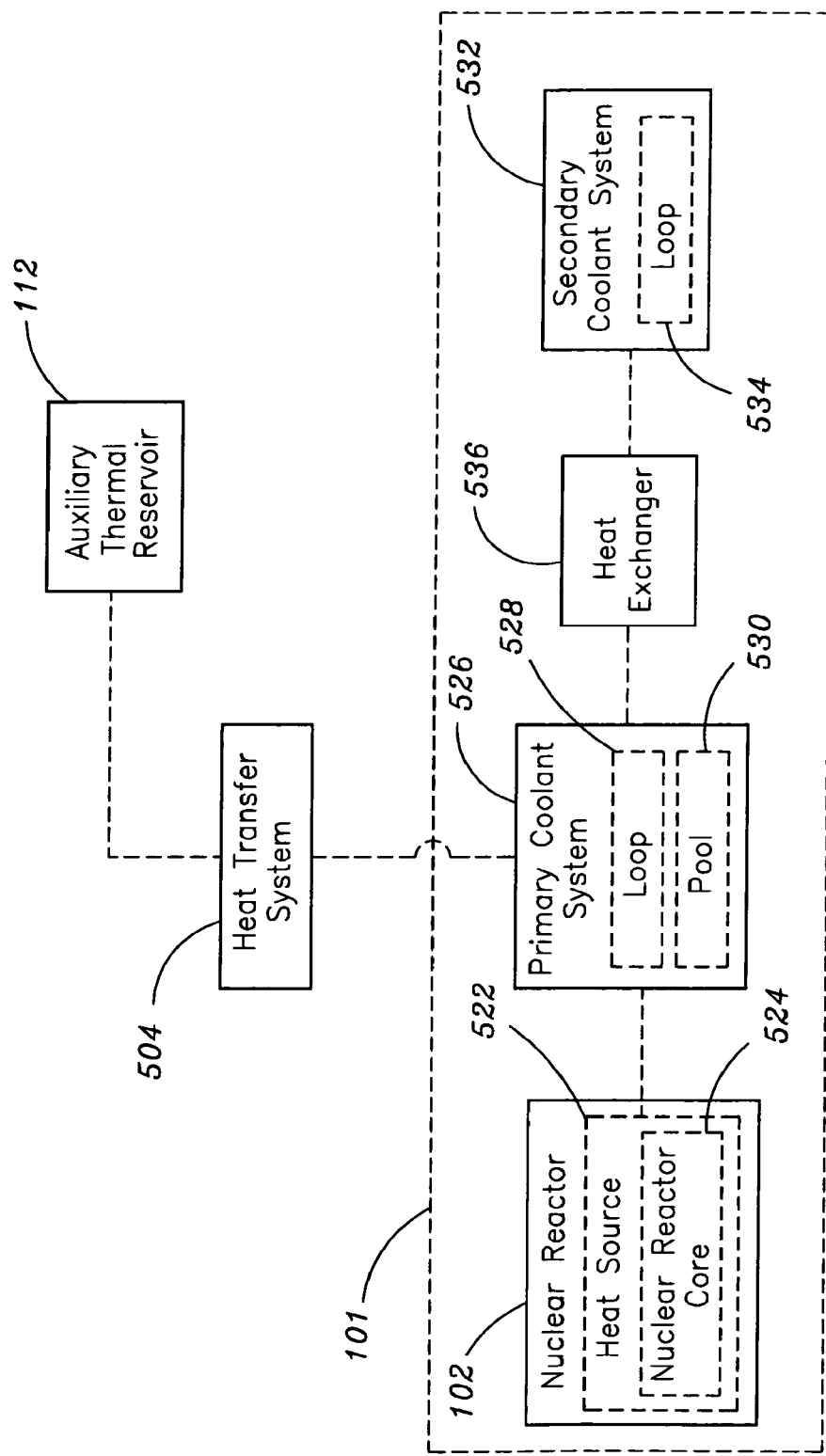
FIG. 5C is a schematic illustrating the thermal coupling of the auxiliary thermal reservoir system to the primary coolant system of the nuclear reactor system heat transfer.

In a further embodiment, illustrated in FIG. 5C, the heat transfer system 504 may transfer thermal energy from a primary coolant system 526 of the nuclear reactor system 101 to the auxiliary thermal reservoir 112, wherein the primary coolant system 526 is in thermal communication (e.g., thermally communicating via a primary coolant system—secondary coolant system heat exchanger 536) with a secondary coolant system not in thermal communication 532 with the auxiliary thermal reservoir 112. For example, the auxiliary thermal reservoir 112 may be thermally coupled via the heat transfer system 504 to a primary coolant loop 528 of the primary coolant system 526. Then, in response to a shutdown event of the nuclear reactor system 101 a heat supply system 114 may supply a portion of the thermal energy stored in the one or more auxiliary thermal reservoirs 112 to at least one energy conversion system 110 of the nuclear reactor system 101.

Figure 5D:
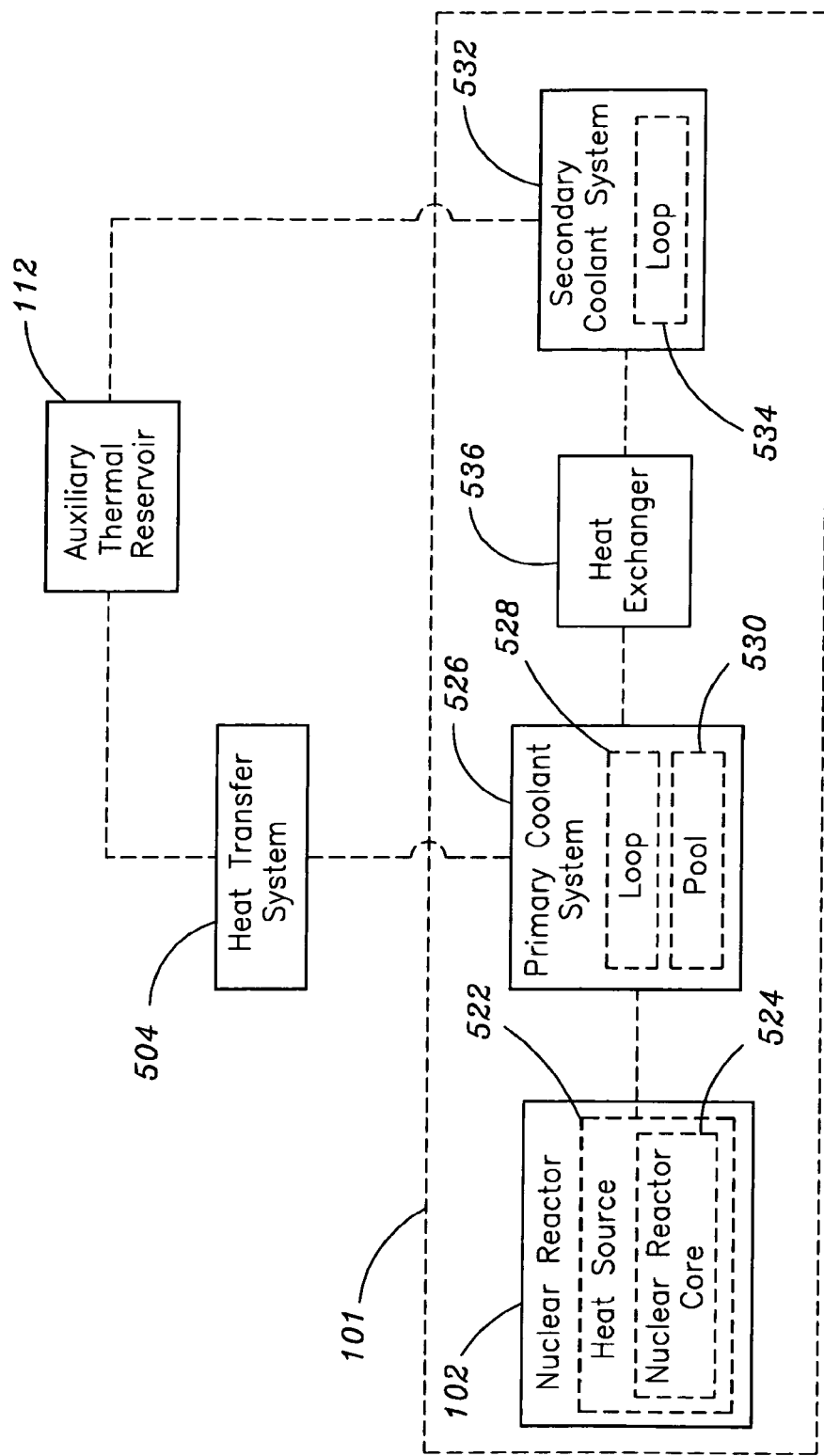
FIG. 5D is a schematic illustrating the thermal coupling of the auxiliary thermal reservoir to the primary coolant system and the secondary coolant system of the nuclear reactor system.

In a further embodiment, illustrated in FIG. 5D, the heat transfer system 504 may transfer thermal energy from a primary coolant system 526 of the nuclear reactor system 101 to the auxiliary thermal reservoir 112, wherein the primary coolant system 526 and a secondary coolant system 532 are both in thermal communication with the auxiliary thermal reservoir 112. For example, the auxiliary thermal reservoir 112 may be thermally coupled to both a primary coolant loop 528 of the primary coolant system 526 and a secondary coolant loop 534 of a secondary coolant system 532, such that the thermal path coupling the primary coolant loop 526, the auxiliary thermal reservoir 112, and the secondary coolant loop 532 is parallel to the thermal path coupling the primary coolant loop 526, the primary-secondary coolant system heat exchanger 536, and the secondary coolant loop 532. Then, in response to a shutdown event of the nuclear reactor system 101 a heat supply system 114 may supply a portion of the thermal energy stored in the one or more auxiliary thermal reservoirs 112 to at least one energy conversion system 110 of the nuclear reactor system 101.

Figure 6:
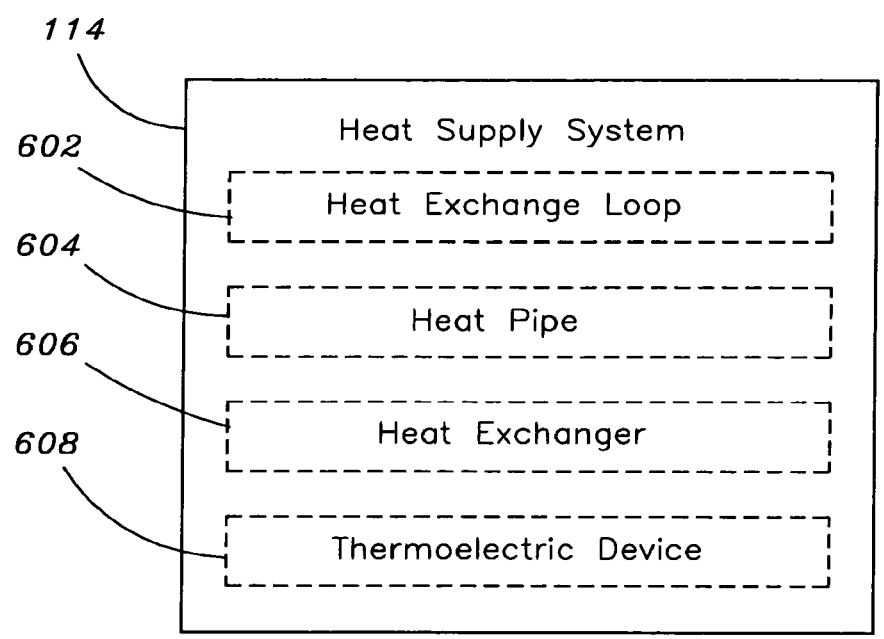
FIG. 6 is a flow diagram illustrating the types of thermal transfer components utilized in the heat supply system.

In another embodiment, illustrated in FIG. 6, the heat supply system 114 may comprise a heat exchange loop 602. For example, a first portion of a heat exchange loop 602 may be in thermal communication with a portion of the auxiliary thermal reservoir 112 and a second portion of the heat exchange loop 602 may be in thermal communication with an energy conversion system 110 of the nuclear reactor system 101. Then, in response to a shutdown event of the nuclear reactor system 101, the heat exchange loop 602 may supply a portion of the thermal energy stored in the one or more auxiliary thermal reservoirs 112 to at least one energy conversion system 110 of the nuclear reactor system 101.

Further, the heat supply system 114 may comprise one or more heat pipes 604. For example, a first portion of a heat pipe 604 may be in thermal communication with a portion of the auxiliary thermal reservoir 112 and a second portion of the heat pipe 604 may be in thermal communication with an energy conversion system 110 of the nuclear reactor system 101. Then, in response to a shutdown event of the nuclear reactor system 101, the heat pipe 604 may supply a portion of the thermal energy stored in the one or more auxiliary thermal reservoirs 112 to at least one energy conversion system 110 of the nuclear reactor system 101.

Further, the heat supply system 114 may comprise one or more heat exchangers 606. For example, a first portion of a first heat exchanger 608 may be in thermal communication with a portion of the auxiliary thermal reservoir 112 and a second portion of the first heat exchanger 606 may be in thermal communication with an energy conversion system 110 of the nuclear reactor system 101. For instance, Then, in response to a shutdown event of the nuclear reactor system 101, the heat pipe 604 may supply a portion of the thermal energy stored in the one or more auxiliary thermal reservoirs 112 to at least one energy conversion system 110 of the nuclear reactor system 101.

Further, the heat supply system 114 may comprise one or more heat pipes 604. For example, a first portion of a heat pipe 604 may be in thermal communication with a portion of the auxiliary thermal reservoir 112 and a second portion of the heat pipe 604 may be in thermal communication with an energy conversion system 110 of the nuclear reactor system 101. Then, in response to a shutdown event of the nuclear reactor system 101, the heat pipe 604 may supply a portion of the thermal energy stored in the one or more auxiliary thermal reservoirs 112 to at least one energy conversion system 110 of the nuclear reactor system 101.

It will be recognized by those skilled in the art that a combination of heat exchange loops 602, heat exchangers 606, and heat pipes 604 may be used in conjunction to supply heat from the auxiliary thermal reservoir 112 to an energy conversion system 110 of the nuclear reactor system 101. For example, a first heat exchanger 606, containing a number of heat pipes 604, may be used to thermally couple the auxiliary thermal reservoir 112 and a first portion of a heat exchange loop 602. Moreover, a second heat exchanger 606, also containing numerous heat pipes 604, may be used to thermally couple a portion of an energy conversion system 110 to the heat exchange loop 602. Then, in response to a shutdown event of the nuclear reactor system 101, thermal energy may be supplied from the auxiliary thermal 112 reservoir to the energy conversion system 110 via the heat loop-heat exchanger circuit.

In another embodiment illustrated in FIG. 6, the heat supply system 114 may comprise one or more thermoelectric devices 608. For example, a first portion of a thermoelectric device 608 (e.g., p-type/n-type semiconductor thermoelectric junction) may be placed in thermal communication with the auxiliary thermal reservoir 112, while a second portion of the thermoelectric device 608 may be placed in thermal communication with a cold reservoir (e.g., an environmental reservoir or any portion of the nuclear reactor system at a temperature lower than the auxiliary thermal reservoir) of the nuclear reactor system 101. Then, in response to a shutdown event of the nuclear reactor system 101, the electrical power produced by the thermoelectric conversion of the thermal energy stored in the auxiliary thermal reservoir may be used to supplement or replace the electrical output of an energy conversion system 110 of the nuclear reactor system.

Figure 7:
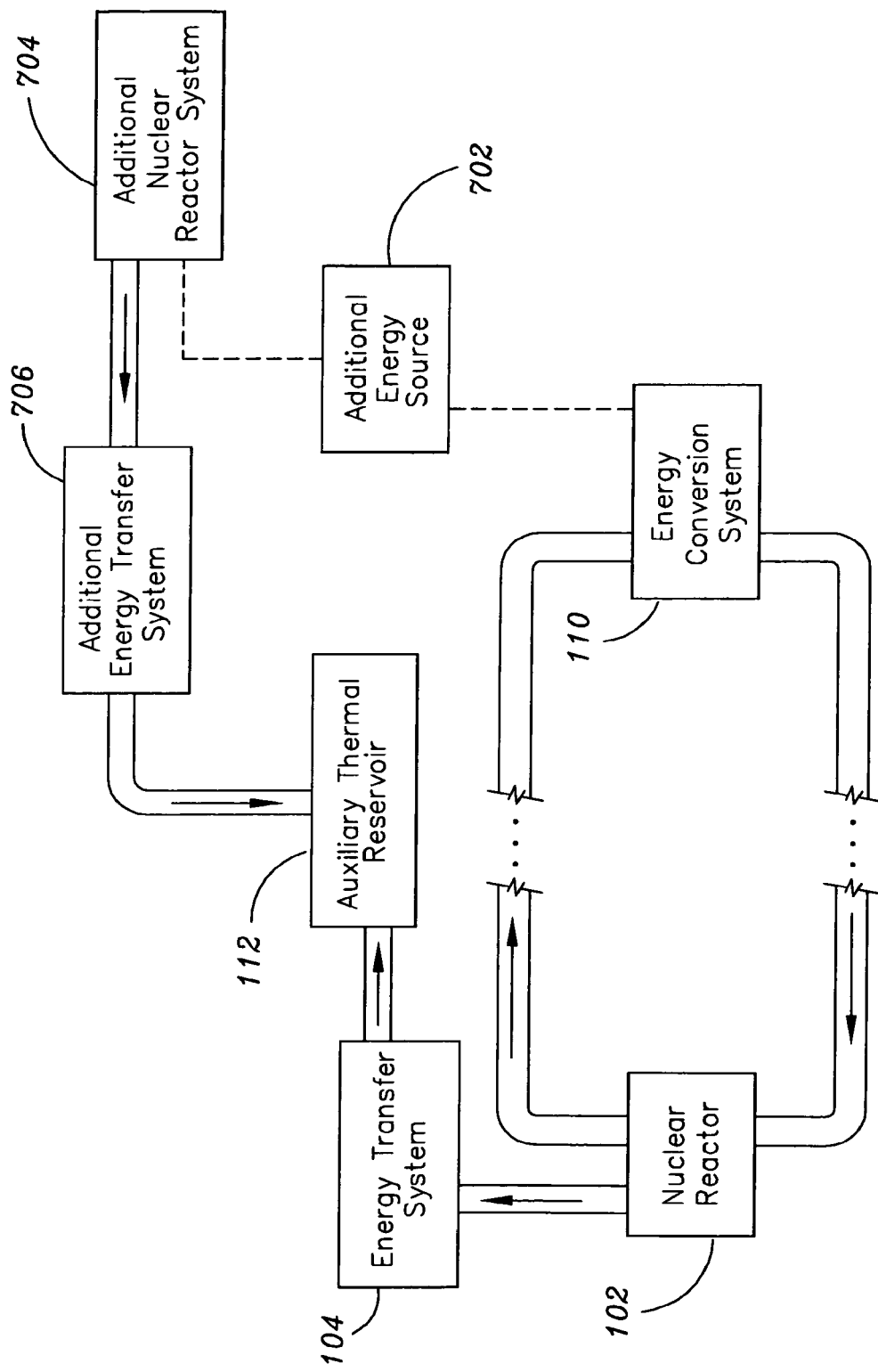
FIG. 7 is a schematic illustrating the supplementing of the auxiliary thermal reservoir with additional energy from an additional energy source.

In an additional embodiment, illustrated in FIG. 7, an additional energy source 702 may supplement the auxiliary thermal reservoir 112 with an additional portion of energy. For example, excess energy from an energy conversion system 110 may be used to provide supplemental energy to the auxiliary thermal reservoir 112. For instance, when grid requirements are such that the energy conversion system 110 is producing excess electrical power, the excess power may be converted to thermal energy via an electrical-to-thermal energy conversion process (e.g., heating coil) and transferred to the auxiliary thermal reservoir 112, thus supplementing the energy transferred to the auxiliary thermal reservoir 112 via the energy transfer system 104 during normal operation. By way of another example, energy from an additional nuclear reactor system 704 may used to provide supplemental energy to the auxiliary thermal reservoir 112. For instance, thermal energy produced by a second nuclear reactor system 704 may be transferred to the auxiliary thermal reservoir 112 via a second energy transfer system 706, thus supplementing the energy transferred to the auxiliary thermal reservoir 112 via the first energy transfer system 104 during normal operation. It will be recognized by those skilled in the art that the supplemental energy supplied to the auxiliary thermal reservoir 112 by an additional energy source may be used to superheat the reservoir material of the auxiliary thermal reservoir to temperatures beyond normal operational capability.

Figure 8A:
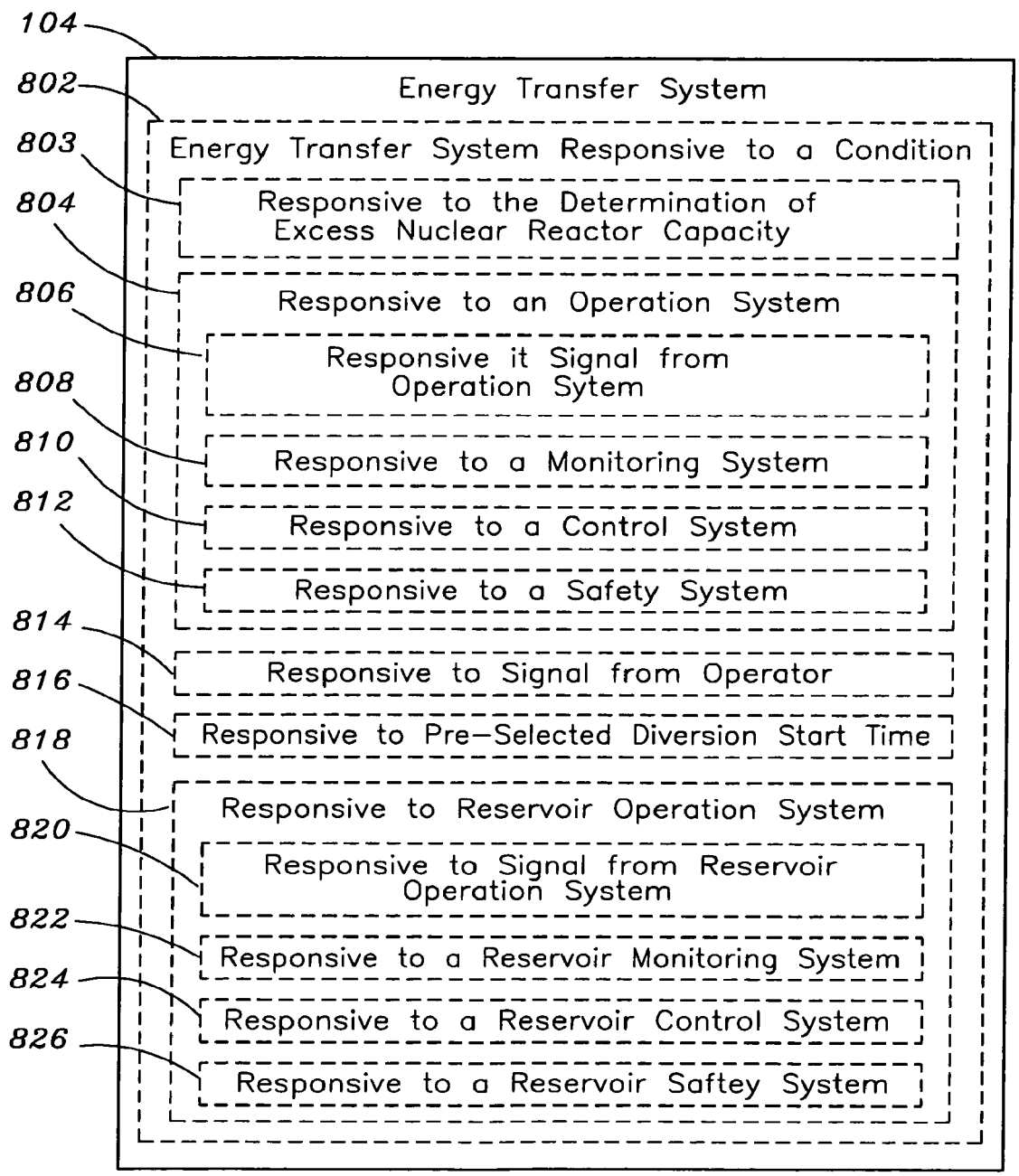
FIGS. 8A and 8B are flow diagrams illustrating the types of conditions the energy transfer system is responsive to when initiating diversion of energy from the nuclear reactor system to the auxiliary thermal reservoir.

In an additional embodiment, illustrated in FIG. 8A, the energy transfer system 104 may include, but is not limited to, an energy transfer system responsive to a condition 802. The conditions with which the energy transfer system is responsive 802 may include, but are not limited to, nuclear reactor operational conditions (e.g., temperature, rate of change of temperature, pressure or rate of change of pressure), nuclear reactor power requirements (e.g., electrical power requirements of the grid), or nuclear reactor safety conditions (e.g., heat sink status or coolant pump status). For example, in response to a coolant pump malfunction, the energy transfer system 104 may divert energy from a portion of the nuclear reactor system 101 to the auxiliary thermal reservoir 112. By way of further example, at or near a specified operating temperature of a portion of the nuclear reactor system 101 (e.g., nuclear reactor core or nuclear reactor coolant fluid), the energy transfer system 104 may initiate transfer of thermal energy from the nuclear reactor 102 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In an additional embodiment, the energy transfer system 104 may include, but is not limited to, an energy transfer system responsive to the determination of excess nuclear reactor capacity 803. For example, in the event the nuclear reactor system 101 is producing more energy than is required by the load (e.g., external electrical power grid) of the energy conversion system 110 of the nuclear reactor system 101, the energy transfer system 104 may initiate transfer of thermal or electrical energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In an additional embodiment, the energy transfer system 104 may include, but is not limited to, an energy transfer system responsive to an operation system 804 of the nuclear reactor system 101. For example, the energy transfer system responsive to an operation system 804 may include, but is not limited to, an energy transfer system responsive to a signal from an operation system 806. For example, in response to a signal, such as a remote wireless signal (e.g., radio frequency signal) or remote wireline signal (e.g., copper wire signal or fiber optic cable signal), from an operation system (e.g., shutdown system, warning system, or security system) of the nuclear reactor system 101, the energy transfer system responsive to a signal from an operation system 806 may initiate transfer of energy from a portion of the nuclear reactor system 101 to the auxiliary thermal reservoir 112. Further, the energy transfer system responsive to an operation system 804 may include, but is not limited to, an energy transfer system responsive to a monitoring system 808 (e.g., temperature monitoring system or pressure monitoring system), an energy transfer system responsive to a control system 810, or an energy transfer system responsive to safety system 812. For instance, in response to a signal from a monitoring system of the nuclear reactor system 101, the energy transfer system 104 may initiate transfer of energy from a portion of the nuclear reactor system 101 to the auxiliary thermal reservoir 112. In another instance, in response to a signal from a control system 810 of the nuclear reactor system 101, the energy transfer system 104 may initiate transfer of energy from a portion of the nuclear reactor system 101 to the auxiliary thermal reservoir 112. Further, in response to a signal from a safety system 812 of the nuclear reactor system 101, the energy transfer system 104 may initiate transfer of energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In an additional embodiment, the energy transfer system 104 may include, but is not limited to, an energy transfer system responsive to a signal from an operator 814 of the nuclear reactor system 101. For example, in response to a signal from an operator (e.g., human user or human controlled system, such as a programmed computer system), the energy transfer system responsive to a signal from an operator 814 may initiate transfer of energy from a portion of the nuclear reactor system 101 to the auxiliary thermal reservoir 112. For instance, the energy transfer system responsive to a signal from an operator 814, in response to a remote signal, such as wireline or wireless signal from a computer terminal controlled by an operator, may initiate transfer of thermal energy from the nuclear reactor 102 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In an additional embodiment, the energy transfer system 104 may include, but is not limited to, an energy transfer system responsive to a pre-selected diversion start time 816. For example, the pre-selected diversion start time may include a time of elapse relative to a specific event (e.g., shutdown event or satisfaction grid demand) or an absolute time. For instance, the energy transfer system responsive to a pre-selected diversion start time 816, at a pre-selected absolute time (e.g., 2:00 a.m. eastern standard time) may initiate transfer of energy from a portion of the nuclear reactor system 101 to the auxiliary thermal reservoir 112. It will be recognized by those skilled in the art that historical grid power demand data may be utilized to determine the appropriate time in which to begin diversion of nuclear reactor generated energy to the auxiliary thermal reservoir 112. In another instance, the energy transfer system responsive to a pre-selected diversion start time 816, upon elapse of a pre-selected amount of time from a specific event, such as a nuclear reactor shutdown or achievement of power production in excess of external demand, may initiate transfer of energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In an additional embodiment, the energy transfer system 104 may include, but is not limited to, an energy transfer system responsive to a reservoir operation system 818 of the auxiliary thermal reservoir 112. For example, the energy transfer system responsive to a reservoir operation system 818 may include, but is not limited to, an energy transfer system responsive to a signal from a reservoir operation system 820. For example, in response to a signal, such as a remote wireless signal (e.g., radio frequency signal) or remote wireline signal (e.g., copper wire signal or fiber optic cable signal), from a reservoir operation system of the auxiliary thermal reservoir 112, the energy transfer system responsive to a signal from a reservoir operation system 820 may initiate transfer of energy from a portion of the nuclear reactor system 101 to the auxiliary thermal reservoir 112. Further, the energy transfer system responsive to a reservoir operation system 818 may include, but is not limited to, an energy transfer system responsive to a reservoir monitoring system 822 (e.g., temperature monitoring system, pressure monitoring system, system for monitoring amount of stored energy, or system for monitoring the amount of available storage capacity), an energy transfer system responsive to a reservoir control system 824, or an energy transfer system responsive to a reservoir safety system 826. For instance, in response to a signal from a reservoir monitoring system, the energy transfer system responsive to a reservoir monitoring system 822 may initiate transfer of energy from a portion of the nuclear reactor system 101 to the auxiliary thermal reservoir 112. In another instance, in response to a signal from a reservoir control system 824, the energy transfer system responsive to a reservoir control system 824 may initiate transfer of energy from a portion of the nuclear reactor system 101 to the auxiliary thermal reservoir 112. Further, in response to a signal from a reservoir safety system, the energy transfer system responsive to a reservoir safety system 826 may initiate transfer of energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

Figure 8B:
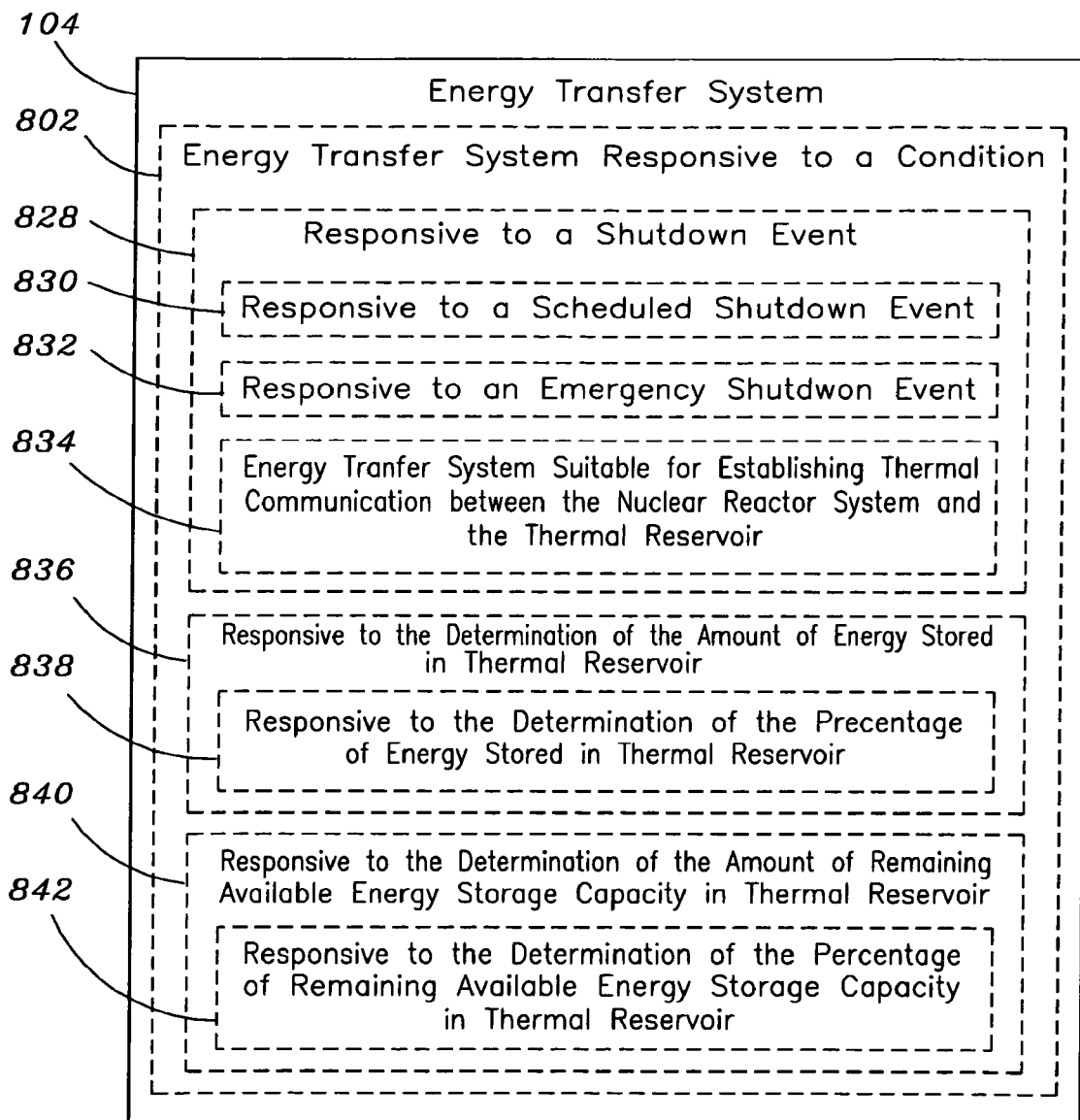

In an additional embodiment, illustrated in FIG. 8B, the energy transfer system 104 may include, but is not limited to, an energy transfer system responsive to a shutdown event 828 of the nuclear reactor system. For example, the energy transfer system responsive to a shutdown event 828 of the nuclear reactor system may include, but is not limited to, an energy transfer system responsive to a scheduled shutdown event 830 of the nuclear reactor system 101 or an energy transfer system responsive to an emergency shutdown event 832 of the nuclear reactor system. For instance, in response to a schedule shutdown event (e.g., routine maintenance), the energy transfer system responsive to a scheduled shutdown event 830 may initiate transfer of energy from a portion of the nuclear reactor system 101 to the auxiliary thermal reservoir 112. In another instance, in response to an emergency shutdown event (e.g., SCRAM), the energy transfer system responsive to an emergency shutdown event 832 may initiate transfer of energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101. It will be recognized by those skilled in the art that, in response to a shutdown event of the nuclear reactor system 101, energy may be diverted from a portion of the nuclear reactor system 101 to the auxiliary thermal reservoir 112 prior to and during the shutdown of the nuclear 102 as part of the preparatory steps required to facilitate the nuclear reactor system 101 shutdown.

In an additional embodiment, the energy transfer system 104 may include, but is not limited to, an energy transfer system suitable for establishing thermal communication between the nuclear reactor system and the auxiliary thermal reservoir 834. For example, in response to a condition, the energy transfer system suitable for establishing thermal communication between the nuclear reactor system and the auxiliary thermal reservoir 834 may establish a thermal pathway between a portion of the nuclear reactor 102 (e.g., primary coolant system) and the auxiliary thermal reservoir 112. For instance, in the case of a direct fluid exchange heat transfer system 510, a control valve may be used to initiate the intermixing of the reactor coolant and reservoir fluid. In another instance, in the case of the heat transfer system employing a reactor-reservoir heat exchanger 514, a control valve may be used to initiate reactor coolant flow through the heat exchanger.

In an additional embodiment, the energy transfer system 104 may include, but is not limited to, an energy transfer system responsive to the determination of the amount of energy stored in the auxiliary thermal reservoir 836. For example, in response to the determination of energy currently stored in the auxiliary thermal reservoir 112, the energy transfer system responsive to the determination of the amount of energy stored in the auxiliary thermal reservoir 836 may initiate transfer of energy from a portion of the nuclear reactor system 101 to the auxiliary thermal reservoir 112. Further, the energy transfer system responsive to the determination of the amount of energy stored in the auxiliary thermal reservoir 836 may include an energy transfer system responsive to the determination of the percentage of energy stored, relative to the overall storage capacity, in the auxiliary thermal reservoir 838. For example, in response to a determination of a set percentage level of stored energy (e.g., 25% of energy storage capacity is being utilized), the energy transfer system responsive to the determination of the percentage of stored energy 838 may initiate transfer of energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

In an additional embodiment, the energy transfer system 104 may include, but is not limited to, an energy transfer system responsive to the determination of the amount of available storage capacity in the auxiliary thermal reservoir 840. For example, in response to the determination of available energy storage capacity, the energy transfer system responsive to the determination of the amount of available storage capacity in the auxiliary thermal reservoir 840 may initiate transfer of energy from a portion of the nuclear reactor system 101 to the auxiliary thermal reservoir 112. Further, the energy transfer system responsive to the determination of the amount of available storage capacity in the auxiliary thermal reservoir 840 may include an energy transfer system responsive to the determination of the percentage of available energy storage capacity in the auxiliary thermal reservoir 842. For example, in response to a determination of a set level of available energy storage (e.g., 75% storage capacity remains), the energy transfer system responsive to the determination of the percentage of available energy storage capacity 842 may initiate transfer of energy from a portion of the nuclear reactor system 101 to the auxiliary thermal reservoir 112. Then, in response to a shutdown event of the nuclear reactor system 101, a heat supply system 114 may supply a portion of the thermal energy stored in the one or more auxiliary thermal reservoirs 112 to at least one energy conversion system 110 of the nuclear reactor system 101.

Figure 8C:
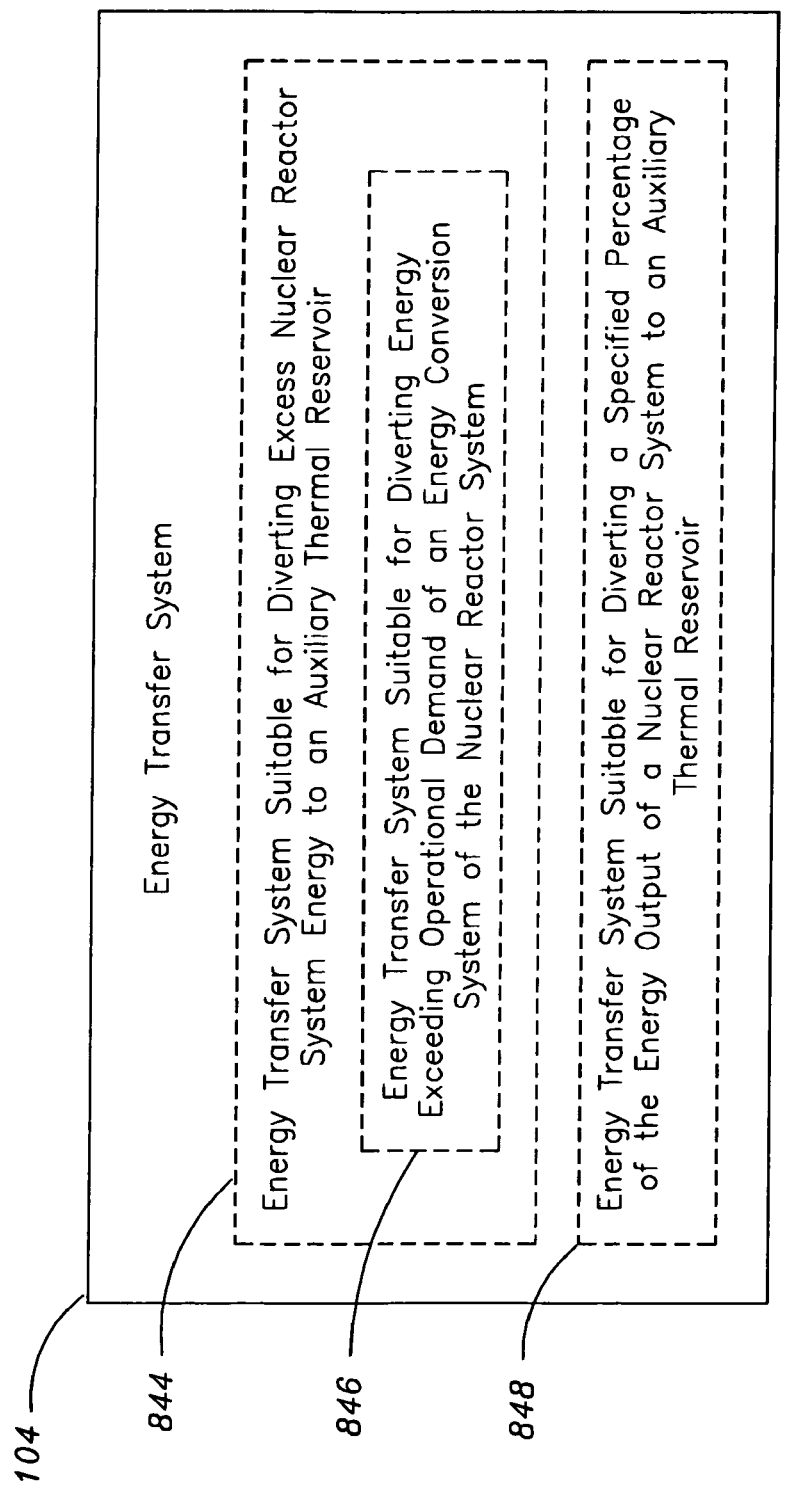
FIG. 8C is a flow diagram illustrating the diversion of excess nuclear reactor system energy from the nuclear reactor system to the auxiliary thermal reservoir.

In an additional embodiment, illustrated in FIG. 8C, the energy transfer system 104 may include, but is not limited to, an energy transfer system suitable for diverting excess nuclear reactor system energy to an auxiliary thermal reservoir 844. For example, the energy transfer system suitable for diverting excess nuclear reactor system energy to an auxiliary thermal reservoir 844 may transfer energy exceeding operational demand of an energy conversion system 846. For instance, in the event the turbine-generator system is producing electrical power in excess of grid demand, the energy transfer system 104 may transfer energy (e.g., thermal or electrical) energy from a portion of the nuclear reactor system to an auxiliary thermal reservoir 112. Further, the energy transfer system 104 may include an energy transfer system suitable for diverting a specified percentage of the energy output of a nuclear reactor system to an auxiliary thermal reservoir 848. For example, a control system or operator may choose to transfer a pre-selected percentage of the nuclear reactor system 101 output and transfer at least a portion of that energy to the auxiliary thermal reservoir 112. It will be recognized by those skilled in the art that the level of energy output pre-selected to be transferred to the auxiliary thermal reservoir may be a function of time and may be derived from historic external power demand curves. For example, in times of day or times of year historically displaying relatively low grid demand, the control system or operator may choose to divert a larger percentage of the overall nuclear reactor system 101 output to the auxiliary thermal reservoir than the percentage transferred during periods of higher demand.

Figure 9A:
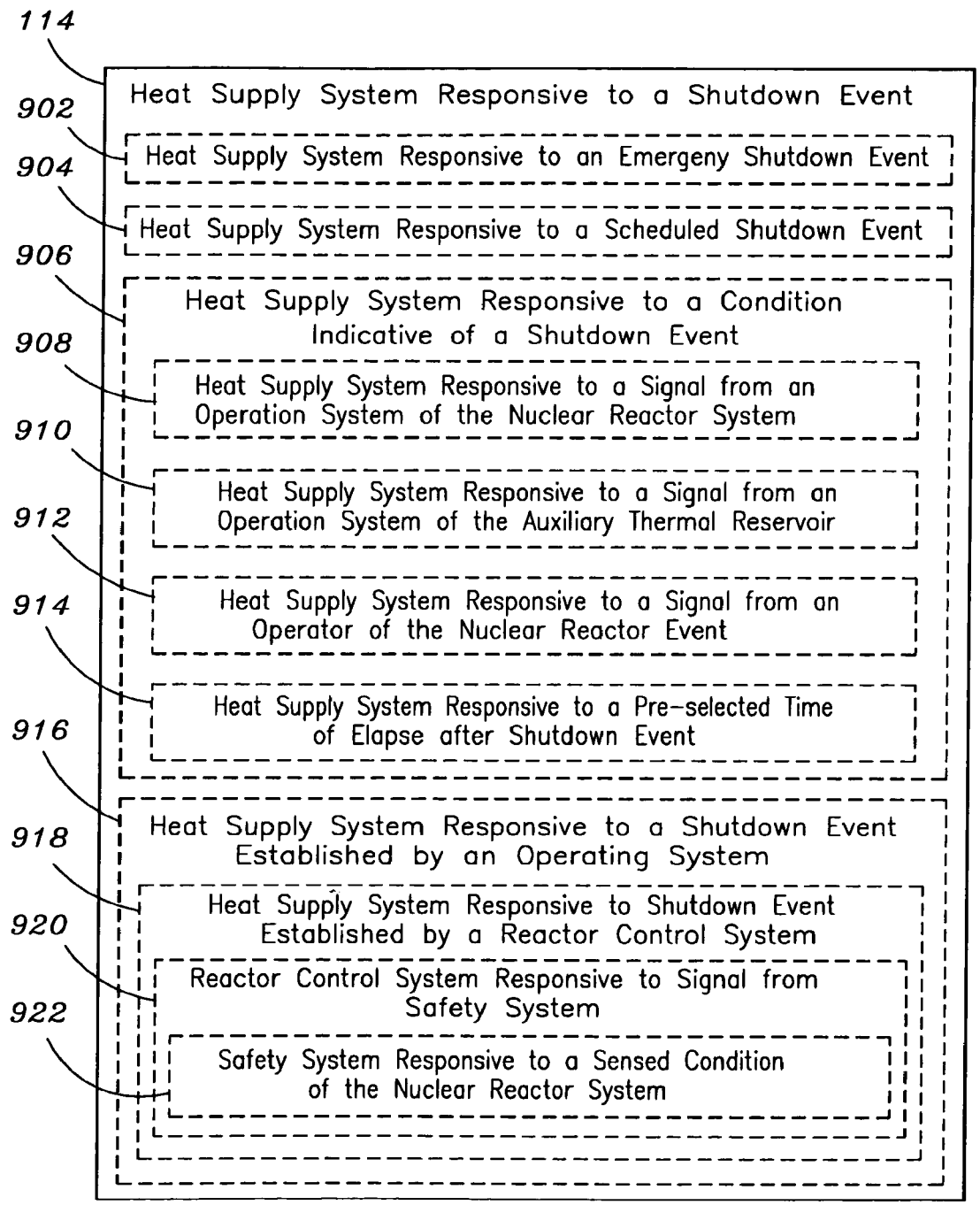
FIGS. 9A and 9B are flow diagrams illustrating the types of shutdown events and shutdown conditions the heat supply system is responsive to when initiating transfer of the thermal energy stored in the auxiliary thermal reservoir to the energy conversion system of the nuclear reactor system.

In an additional embodiment, illustrated in FIG. 9A, the heat supply system responsive to a shutdown event 114 may include, but is not limited to a heat supply system responsive to an emergency shutdown event 902 or a heat supply system responsive to a scheduled shutdown event 904. For example, in response to an emergency shutdown event (e.g., SCRAM), the heat supply system responsive to an emergency shutdown event 902 may supply a portion of the thermal energy stored in the one or more auxiliary thermal reservoirs 112 to at least one energy conversion system 110 of the nuclear reactor system 101. By way of another example, in response to a scheduled shutdown event (e.g., routine maintenance), the heat supply system responsive to a schedule shutdown event 904 may supply a portion of the thermal energy stored in the one or more auxiliary thermal reservoirs 112 to at least one energy conversion system 110 of the nuclear reactor system 101. It will be recognized by those skilled in the art that, in response to a shutdown event of the nuclear reactor system 101, the thermal energy stored in the auxiliary thermal reservoir 112 may be transferred from the auxiliary thermal reservoir 112 to an energy conversion system 110 of the nuclear reactor system 101 prior to, during, and following the shutdown of the nuclear 102 as part of the steps required to facilitate the nuclear reactor system 101 shutdown.

In an additional embodiment, the heat supply system responsive to a shutdown event 114 may include, but is not limited to a heat supply system responsive to a condition indicative of a shutdown event 906. For example, in response to a condition indicative of a shutdown event (e.g., signal for reactor operation systems indicating shutdown or signal from operator indicating shutdown), the heat supply system responsive to a condition indicative of a shutdown event 906 may initiate transfer of the thermal energy stored in one or more auxiliary thermal reservoirs 112 to at least one energy conversion system 110 of the nuclear reactor system 101.

In another embodiment, the heat supply system responsive to a condition indicative of a shutdown event 906 may include, but is not limited to, a heat supply system responsive to a signal from an operation system 908 of the nuclear reactor system 101. For example, in response to a signal, such as a remote wireless signal (e.g., radio frequency signal) or remote wireline signal (e.g., copper wire signal or fiber optic cable signal), from an operation system (e.g., control system, safety system, monitoring system, shutdown system, warning system, or security system) of the nuclear reactor system 101, the heat supply system responsive to a signal from an operation system 908 may initiate transfer of the thermal energy stored in the one or more auxiliary thermal reservoirs 112 to at least one energy conversion system 110 of the nuclear reactor system 101. For instance, upon receiving a signal from a monitoring system of the nuclear reactor indicating the shutdown of the nuclear reactor system 101, the heat supply system responsive to a signal from an operation system 908 of the nuclear reactor system 101 may initiate transfer of the thermal energy stored in the one or more auxiliary thermal reservoirs 112 to at least one energy conversion system 110 of the nuclear reactor system 101.

In another embodiment, the heat supply system responsive to a condition indicative of a shutdown event 906 may include, but is not limited to, a heat supply system responsive to a signal from a reservoir operation system 910 of the auxiliary thermal reservoir 112. For example, in response to a signal, such as a remote wireless signal (e.g., radio frequency signal) or remote wireline signal (e.g., copper wire signal or fiber optic cable signal), from a reservoir operation system (e.g., control system, safety system, monitoring system) of the auxiliary thermal reservoir, the heat supply system responsive to a signal from a reservoir operation system 910 may initiate transfer of the thermal energy stored in the one or more auxiliary thermal reservoirs 112 to at least one energy conversion system 110 of the nuclear reactor system 101. For instance, upon receiving a signal from a monitoring system of auxiliary thermal reservoir 112 indicating the shutdown of the nuclear reactor system 101 (e.g., energy no longer being diverted to thermal reservoir), the heat supply system responsive to a signal from a reservoir operation system 910 may initiate transfer of the thermal energy stored in the one or more auxiliary thermal reservoirs 112 to at least one energy conversion system 110 of the nuclear reactor system 101.

In an additional embodiment, the heat supply system responsive to a condition indicative of a shutdown event 906 may include, but is not limited to, a heat supply system responsive to a signal from an operator 912 of the nuclear reactor system 101. For example, in response to a signal from an operator (e.g., human user or human controlled system, such as a programmed computer system), the heat supply system responsive to a signal from an operator 912 may initiate transfer of the thermal energy stored in the one or more auxiliary thermal reservoirs 112 to at least one energy conversion system 110 of the nuclear reactor system 101. For instance, the heat supply system responsive to a signal from an operator 912, in response to a remote signal, such as wireline or wireless signal from a computer terminal controlled by an operator, may initiate transfer of the thermal energy stored in the one or more auxiliary thermal reservoirs 112 to at least one energy conversion system 110 of the nuclear reactor system 101.

In an additional embodiment, the heat supply system responsive to a condition indicative of a shutdown event 906 may include, but is not limited to, a heat supply system responsive to a pre-selected time of elapse after shutdown 914. For example, the pre-selected time of elapse may include the amount of elapsed time relative to a specific event (e.g., shutdown event) or an absolute time. For instance, the heat supply system responsive to a pre-selected time of elapse after shutdown 914, at a pre-selected absolute time (e.g., 5:00 p.m. eastern standard time), may initiate transfer of the thermal energy stored in the one or more auxiliary thermal reservoirs 112 to at least one energy conversion system 110 of the nuclear reactor system 101. It will be recognized by those skilled in the art that historical grid power demand data may be utilized to determine the appropriate time in which to begin transfer of the thermal energy stored in the one or more auxiliary thermal reservoirs 112 to at least one energy conversion system 110 of the nuclear reactor system 101. In another instance, the heat supply system responsive to a pre-selected time of elapse after shutdown 914, upon elapse of a pre-selected amount of time from a specific event, such as a nuclear reactor shutdown, the heat supply system responsive to a pre-selected time of elapse after shutdown 914 may initiate transfer of the thermal energy stored in the one or more auxiliary thermal reservoirs 112 to at least one energy conversion system 110 of the nuclear reactor system 101.

In another embodiment, the heat supply system responsive to a shutdown event 114 may include, but is not limited to, a heat supply system responsive to a shutdown event established by an operation system 916. For example, in response to a shutdown event established by an operation system (e.g., shutdown system) of the nuclear reactor system 101, the heat supply system responsive to a shutdown event established by an operation system 916 may initiate transfer of the thermal energy stored in the one or more auxiliary thermal reservoirs 112 to at least one energy conversion system 110 of the nuclear reactor system 101. By way of further example, a heat supply system responsive to a shutdown event established by a reactor control system 918 may initiate transfer of the thermal energy stored in the one or more auxiliary thermal reservoirs 112 to at least one energy conversion system 110 of the nuclear reactor system 101. Further, the reactor control system may include a reactor control system responsive to a signal from a reactor safety system 920. For example, a heat supply system responsive to a shutdown event established by a reactor control system responsive to a signal from a safety system 920 may initiate transfer of the thermal energy stored in the one or more auxiliary thermal reservoirs 112 to at least one energy conversion system 110 of the nuclear reactor system 101. Even further, the safety system may include a safety system responsive to one or more sensed conditions of the nuclear reactor system (e.g., external conditions or internal conditions) 922. For instance, the safety system of the nuclear reactor system 101, upon sensing a loss of heat sink, may send a signal to the reactor control system. In turn, the reactor control system may establish a nuclear reactor system shutdown and send a corresponding signal to the heat supply system responsive to a shutdown event established by a reactor control system 918. Then, the heat supply system responsive to a shutdown event established by a reactor control system 918 may initiate transfer of the thermal energy stored in the one or more auxiliary thermal reservoirs 112 to at least one energy conversion system 110 of the nuclear reactor system 101.

Figure 9B:
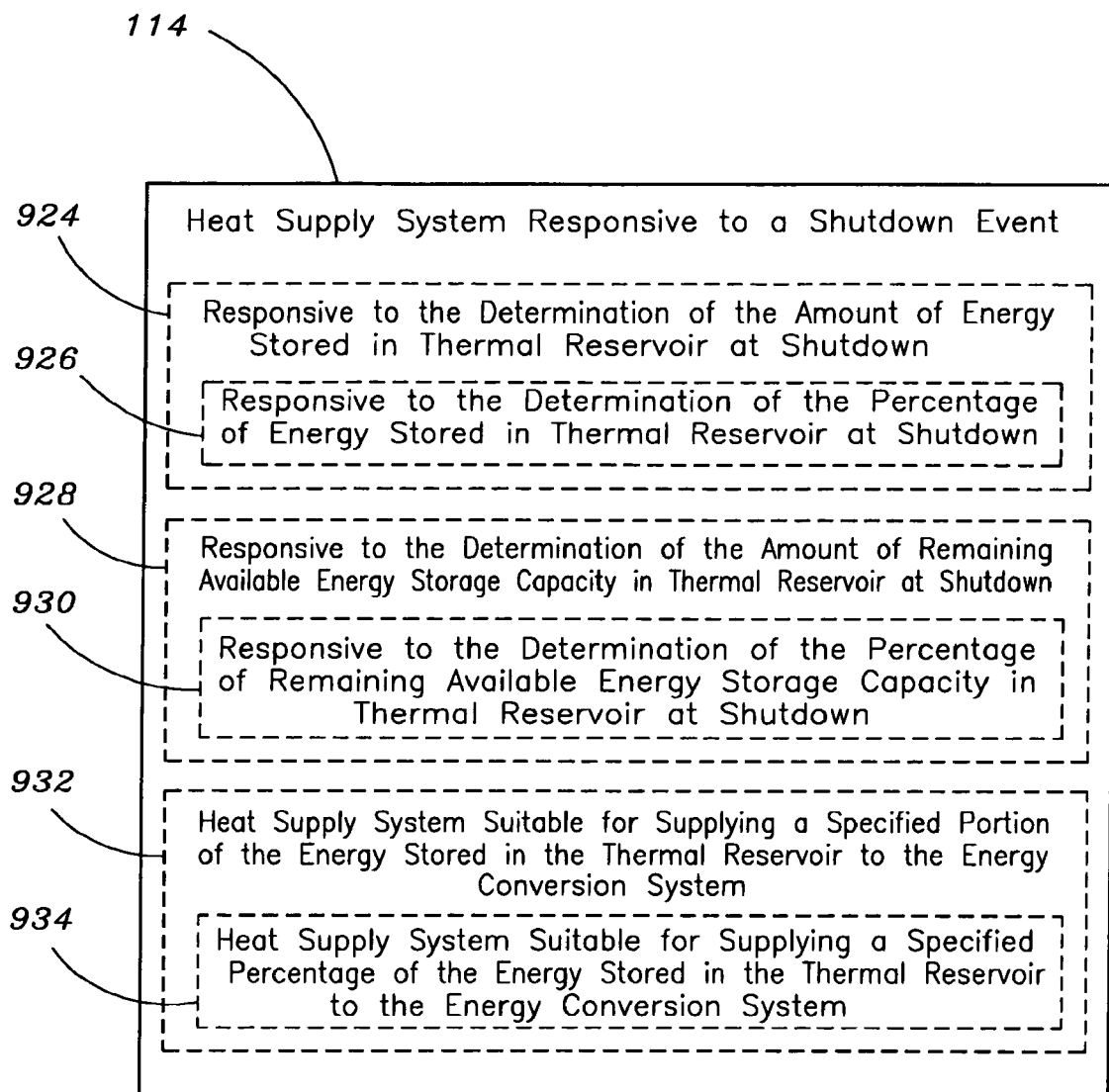

In another embodiment, illustrated in FIG. 9B, the heat supply system responsive to a shutdown event 114 may include, but is not limited to, a heat supply system responsive to the determination of the amount of energy stored in the auxiliary thermal reservoir 924. For example, in response to the determination of energy currently stored in the auxiliary thermal reservoir 112, the heat supply system responsive to the determination of the amount of energy stored in the auxiliary thermal reservoir 924 may initiate transfer of the thermal energy stored in the one or more auxiliary thermal reservoirs 112 to at least one energy conversion system 110 of the nuclear reactor system 101. Further, the heat supply system responsive to the determination of the amount of energy stored in the auxiliary thermal reservoir 924 may include a heat supply system responsive to the determination of the percentage of energy stored, relative to the overall storage capacity, in the auxiliary thermal reservoir 926. For example, in response to a determination of a set percentage level of stored energy (e.g., 80% of energy storage capacity is being utilized), the heat supply system responsive to the determination of the percentage of stored energy 926 may initiate transfer of the thermal energy stored in the one or more auxiliary thermal reservoirs 112 to at least one energy conversion system 110 of the nuclear reactor system 101.

In an additional embodiment, the heat supply system responsive to a shutdown event 114 may include, but is not limited to, a heat supply system responsive to the determination of the amount of available storage capacity in the auxiliary thermal reservoir 928. For example, in response to the determination of available energy storage capacity, the heat supply system responsive to the determination of the amount of available storage capacity in the auxiliary thermal reservoir 928 may initiate transfer of the thermal energy stored in the one or more auxiliary thermal reservoirs 112 to at least one energy conversion system 110 of the nuclear reactor system 101. Further, the heat supply system responsive to the determination of the amount of available storage capacity in the auxiliary thermal reservoir 928 may include a heat supply system responsive to the determination of the percentage of available energy storage capacity in the auxiliary thermal reservoir 930. For example, in response to a determination of a set percentage level of available energy storage (e.g., 20% storage capacity remains), the heat supply system responsive to the determination of the percentage of available energy storage capacity 930 may initiate transfer of the thermal energy stored in the one or more auxiliary thermal reservoirs 112 to at least one energy conversion system 110 of the nuclear reactor system 101.

In an additional embodiment, the heat supply system responsive to a shutdown event 114 may include, but is not limited to, a heat supply system suitable for supplying a specified portion of the energy stored in the auxiliary thermal reservoir to the energy conversion system 932. For example, a heat supply system suitable for supplying a specified portion of the energy stored in the auxiliary thermal reservoir 932 may be utilized to transfer a specified amount of the thermal energy stored in the one or more auxiliary thermal reservoirs 112 to at least one energy conversion system 110 of the nuclear reactor system 101. For instance, the amount of energy transferred from the auxiliary thermal reservoir 112 to the energy conversion system 110 may be based on current load demand (e.g., grid demand), where a control system or operator may choose the amount of energy to be transferred to the energy conversion system based on the level of demand that the energy conversion system is currently undergoing. Further, the heat supply system suitable for supplying a specified portion of the energy stored in the auxiliary thermal reservoir to the energy conversion system 932 may include a heat supply system suitable for supplying a specified percentage of the energy stored in the thermal reservoir to the energy conversion system 934. For example, the heat supply system suitable for supply a specified percentage of the energy stored in the thermal reservoir to the energy conversion system 934 may be utilized to by a control system or operator to transfer a chosen percentage (e.g., 50% of the stored energy) of the energy stored in the auxiliary thermal reservoir 112 to an energy conversion system 110 of the nuclear reactor system 101.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 10:
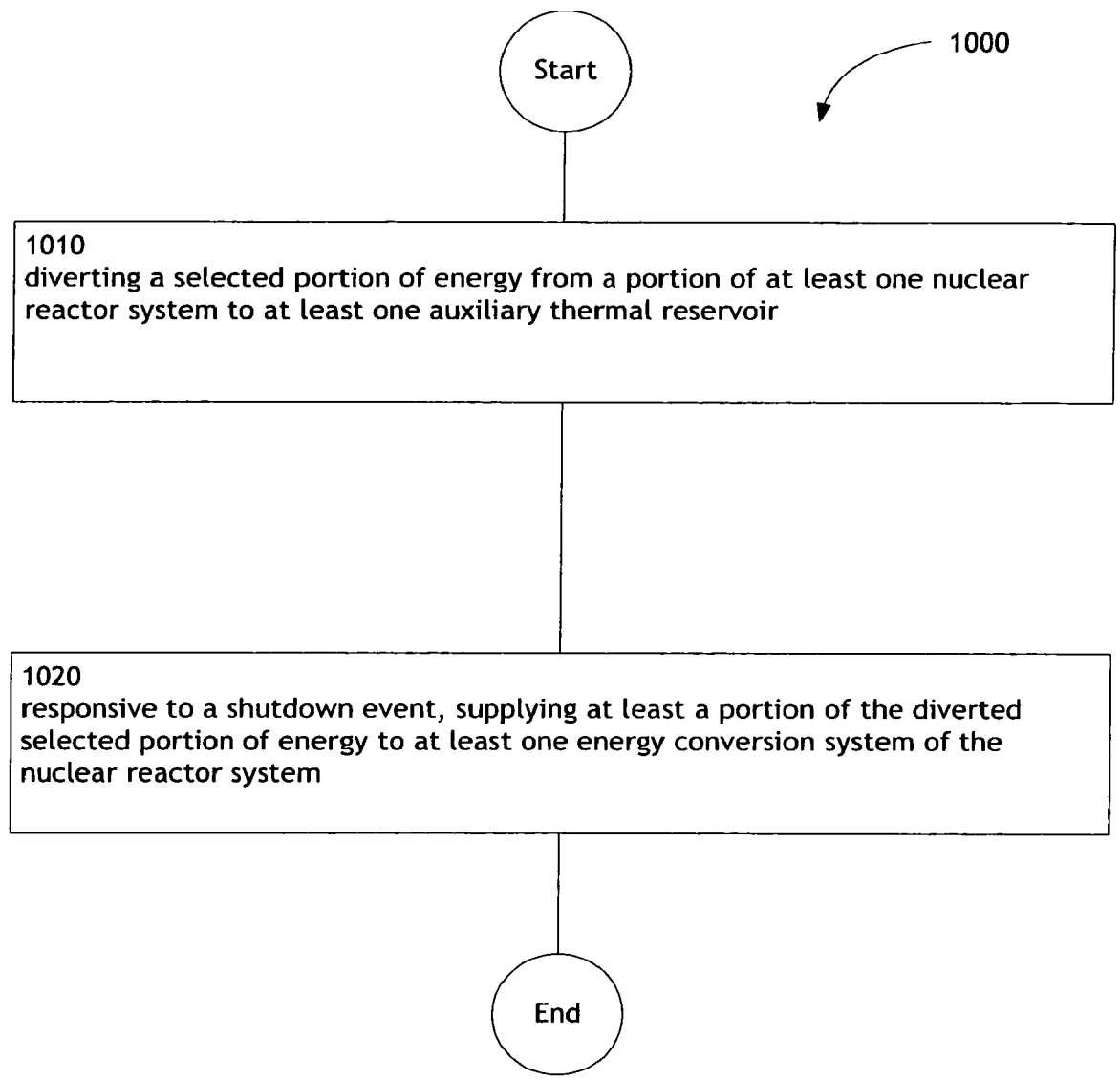
FIG. 10 is a high-level flowchart of a method for the thermal storage of nuclear reactor generated heat in an auxiliary thermal reservoir.

FIG. 10 illustrates an operational flow 1000 representing example operations related to the thermal storage and utilization of a selected portion of nuclear reactor generated energy. In FIG. 10 and in following figures that include various examples of operational flows, discussion and explanation may be provided with respect to the above-described examples of FIGS. 1 through 9, and/or with respect to other examples and contexts. However, it should be understood that the operational flows may be executed in a number of other environments and contexts, and/or in modified versions of FIGS. 1 through 9. Also, although the various operational flows are presented in the sequence(s) illustrated, it should be understood that the various operations may be performed in other orders than those which are illustrated, or may be performed concurrently.

After a start operation, the operational flow 1000 moves to a diverting operation 1010. The diverting operation 1010 depicts diverting a selected portion of energy from a portion of at least one nuclear reactor system to at least one auxiliary thermal reservoir. For example, as shown in FIGS. 1 through 9B, the energy transfer system 104 may transfer energy from a portion of the nuclear reactor system 101 to an auxiliary thermal reservoir 112.

Then, the supply operation 1020 depicts, in response to a shutdown event, supplying at least a portion of the diverted selected portion of energy to at least one energy conversion system of the nuclear reactor system. For example, as shown in FIGS. 1 through 9B, in response to a shutdown event, the heat supply system 114 may supply a portion of the thermal energy stored in the auxiliary thermal reservoir 112 to an energy conversion system 110 of the nuclear reactor system 101.

Figure 11:
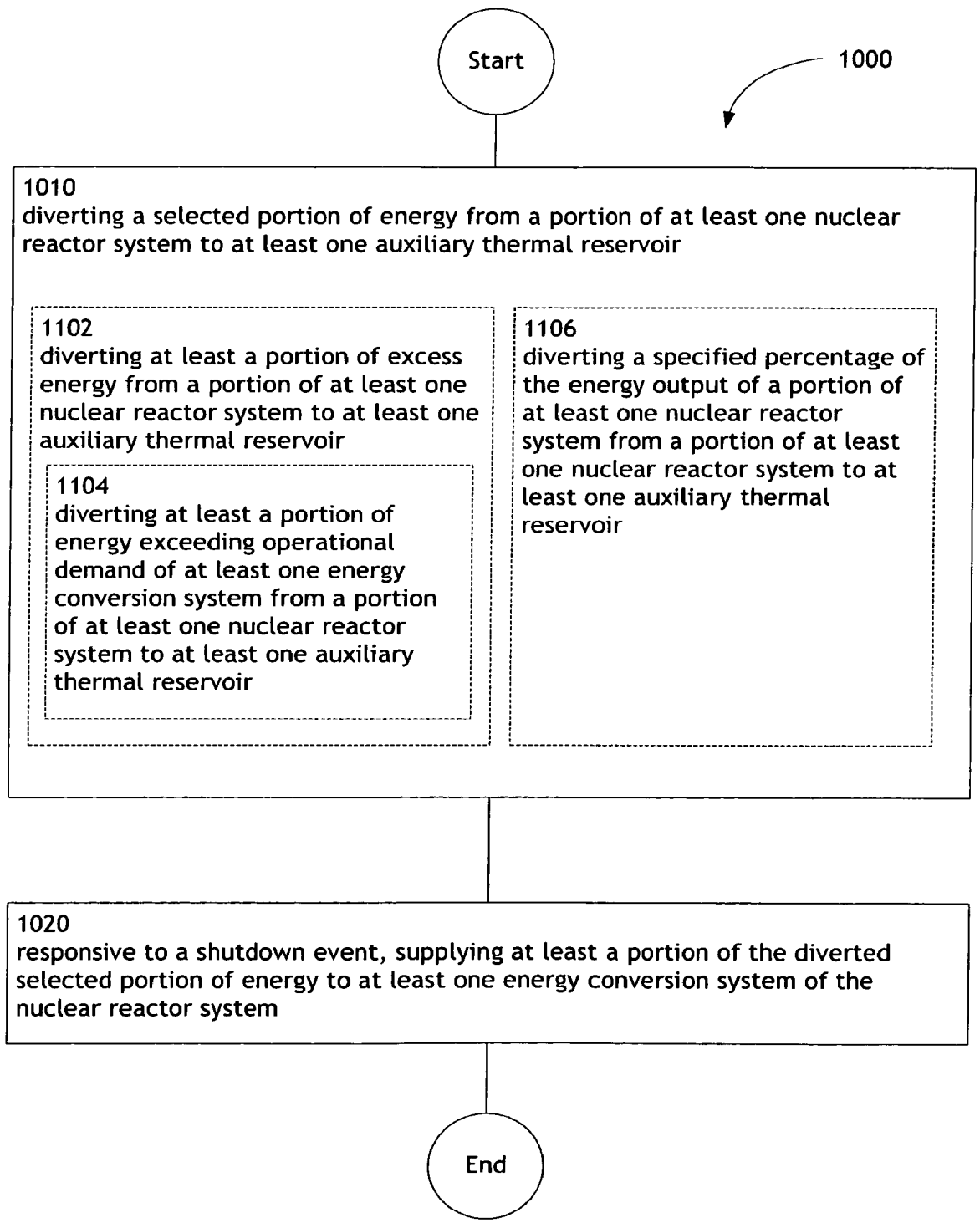
FIGS. 11 through 63 are high-level flowcharts depicting alternate implementations of FIG. 10.

FIG. 11 illustrates alternative embodiments of the example operational flow 1000 of FIG. 10. FIG. 11 illustrates example embodiments where the diverting operation 1010 may include at least one additional operation. Additional operations may include an operation 1102, an operation 1104, and/or an operation 1106.

Operation 1102 illustrates diverting at least a portion of excess energy from a portion of at least one nuclear reactor system to at least one auxiliary thermal reservoir. For example, as shown in FIGS. 1 through 9B, the energy transfer system 104 may transfer excess energy from a portion of the nuclear reactor system 101 to an auxiliary thermal reservoir 112.

Further, operation 1104 illustrates diverting at least a portion of energy exceeding the operational demand of at least one energy conversion system from a portion of a nuclear reactor system to at least one auxiliary thermal reservoir. For example, as shown in FIGS. 1 through 9B, the energy transfer system 104 may transfer energy exceeding operational demand of an energy conversion system (e.g., energy in excess of grid requirements) from a portion of the nuclear reactor system 101 to an auxiliary thermal reservoir 112.

The operation 1106 illustrates diverting a specified percentage of the energy output of a portion of at least one nuclear reactor system from a portion of at least one nuclear reactor system to at least one auxiliary thermal reservoir. For example, as shown in FIGS. 1 through 9B, the energy transfer system 104 may transfer a specified percentage of the energy output of a portion (e.g., nuclear reactor core or portion of nuclear reactor in thermal communication with the nuclear reactor core) of at least one nuclear reactor system 101 from a portion of the nuclear reactor system 101 to an auxiliary thermal reservoir 112.

Figure 12:
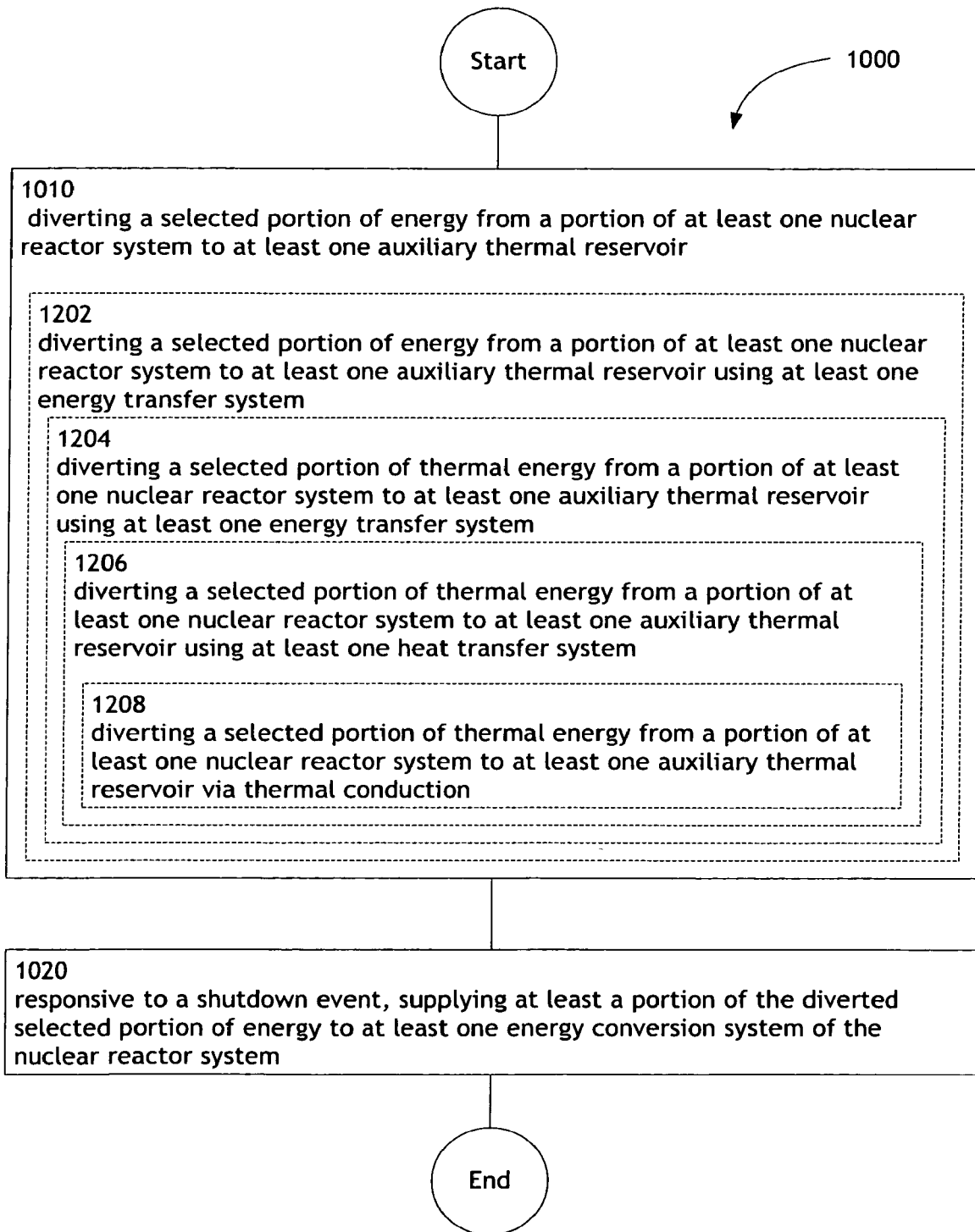

FIG. 12 illustrates alternative embodiments of the example operational flow 1000 of FIG. 10. FIG. 12 illustrates example embodiments where the diverting operation 1010 may include at least one additional operation. Additional operations may include an operation 1202, an operation 1204, an operation 1206, and/or an operation 1208.

The operation 1202 illustrates diverting a selected portion of energy from a portion of at least one nuclear reactor system to at least one auxiliary thermal reservoir using at least one energy transfer system. For example, as shown in FIGS. 1 through 9B, the energy transfer system 104 may transfer energy from a portion of the nuclear reactor system 101 to an auxiliary thermal reservoir 112.

Further, operation 1204 illustrates diverting a selected portion of thermal energy from a portion of at least one nuclear reactor system to at least one auxiliary thermal reservoir using at least one energy transfer system. For example, as shown in FIG. 5A, the energy transfer system 104 may be suitable for transferring thermal energy 106. For instance, as shown in FIG. 5A, the energy transfer system 104 may transfer thermal energy from a portion of the nuclear reactor system 101 to an auxiliary thermal reservoir 112.

Further, operation 1206 illustrates diverting a selected portion of thermal energy from a portion of at least one nuclear reactor system to at least one auxiliary thermal reservoir using at least one heat transfer system. For example, as shown in FIG. 5A, the energy transfer system 104 may comprise a heat transfer system 504. For instance, the heat transfer system 504 may transfer thermal energy from a portion of the nuclear reactor system 101 to an auxiliary thermal reservoir 112.

Further, operation 1208 illustrates diverting a selected portion of thermal energy from a portion of at least one nuclear reactor system to at least one auxiliary thermal reservoir via thermal conduction. For example, as shown in FIG. 5A, the heat transfer system 504 may transfer thermal energy from a portion of the nuclear reactor system 101 to an auxiliary thermal reservoir 112 via thermal conduction.

Figure 13:
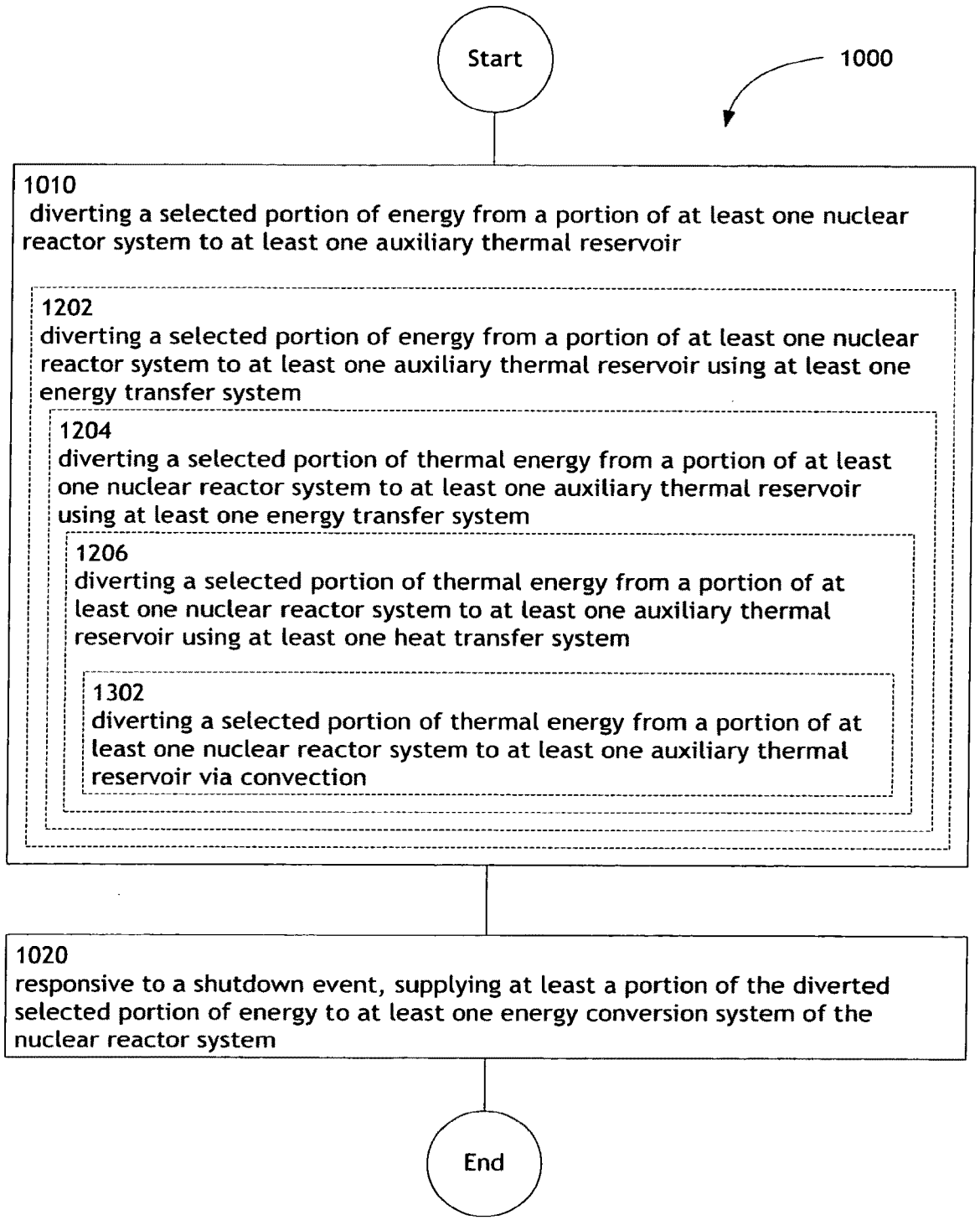

FIG. 13 illustrates alternative embodiments of the example operational flow 1000 of FIG. 10. FIG. 13 illustrates example embodiments where the diverting operation 1010 may include at least one additional operation. Additional operations may include an operation 1302.

Operation 1302 illustrates diverting a selected portion of thermal energy from a portion of at least one nuclear reactor system to at least one auxiliary thermal reservoir via convection. For example, as shown in FIG. 5A, the heat transfer system 504 may transfer thermal energy from a portion of the nuclear reactor system 101 to an auxiliary thermal reservoir 112 via thermal convection 506.

Figure 14A:
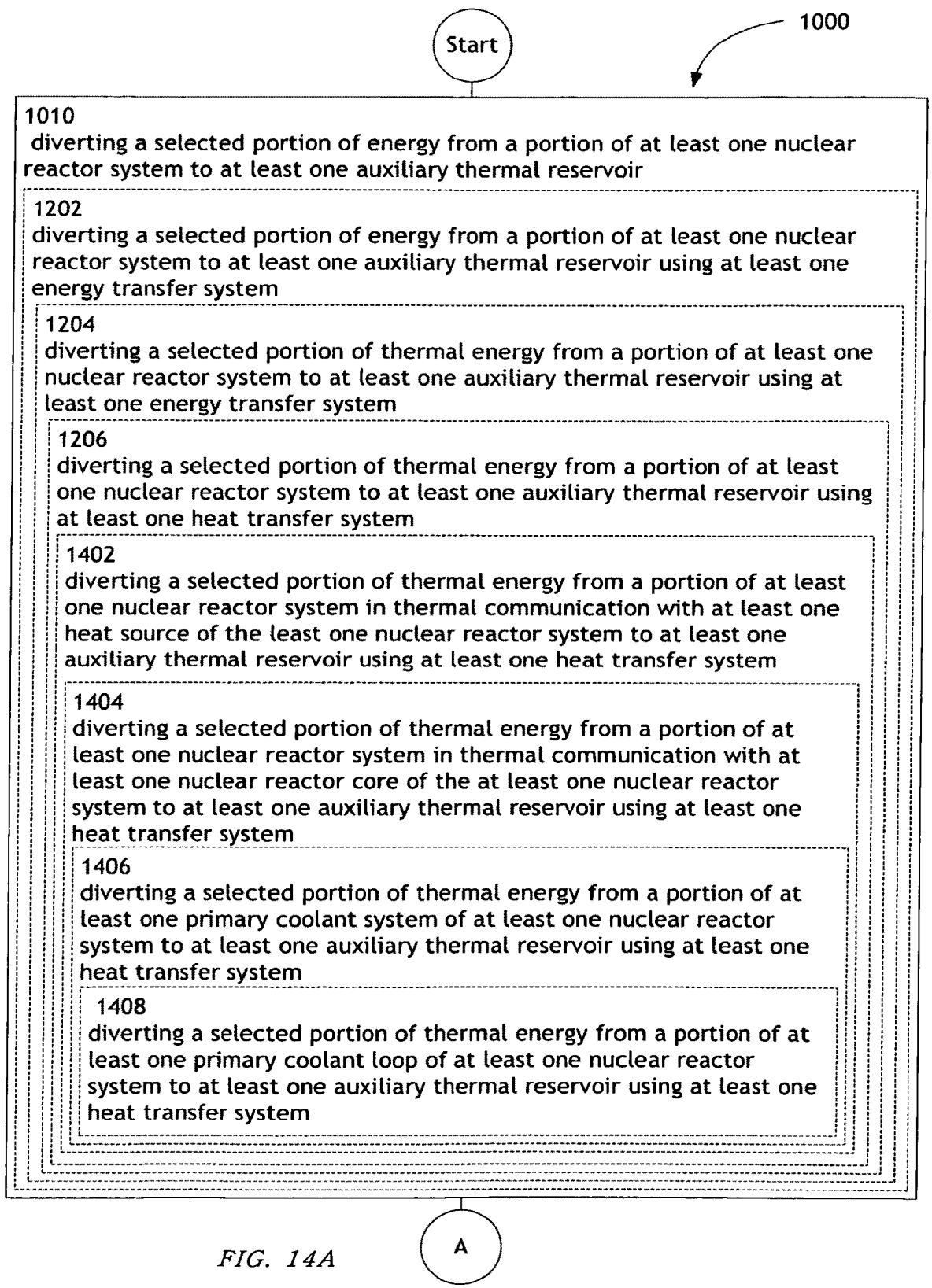
Figure 14B:
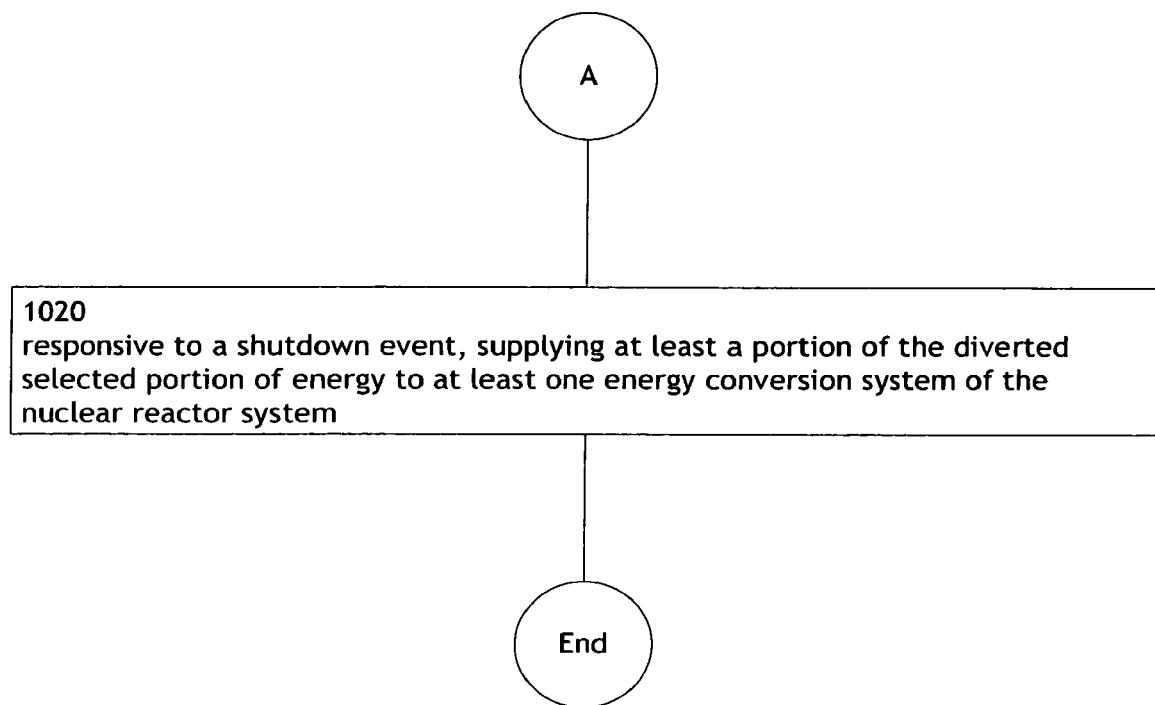

FIGS. 14A and 14B illustrate alternative embodiments of the example operational flow 1000 of FIG. 10. FIGS. 14A and 14B illustrate example embodiments where the diverting operation 1010 may include at least one additional operation. Additional operations may include an operation 1402, an operation 1404, an operation 1406, and/or an operation 1408.

The operation 1402 illustrates diverting a selected portion of thermal energy from a portion of at least one nuclear reactor system in thermal communication with at least one heat source of the least one nuclear reactor system to at least one auxiliary thermal reservoir using at least one heat transfer system. For example, as shown in FIG. 5B, heat may be transferred from a portion of the nuclear reactor 102 in thermal communication with at least one heat source 522 of the nuclear reactor system 101 to the auxiliary thermal reservoir 112. For instance, as shown in FIG. 5B, the heat transfer system 504 may transfer thermal energy from a portion of the nuclear reactor system 101 (e.g., coolant system of the nuclear reactor system) in thermal communication with a heat source 522 of the nuclear reactor system 101 to an auxiliary thermal reservoir 112.

Further, the operation 1404 illustrates diverting a selected portion of thermal energy from a portion of at least one nuclear reactor system in thermal communication with at least one nuclear reactor core of the at least one nuclear reactor system to at least one auxiliary thermal reservoir using at least one heat transfer system. For example, as shown in FIG. 5B, the heat source 522 may comprise the nuclear reactor core 524 of the nuclear reactor system 101. For instance, the heat transfer system 504 may transfer thermal energy from a portion of the nuclear reactor system 101 in thermal communication with the nuclear reactor core 524 of the nuclear reactor system 101 to an auxiliary thermal reservoir 112.

Further, the operation 1406 illustrates diverting a selected portion of thermal energy from a portion of at least one primary coolant system of at least one nuclear reactor system to at least one auxiliary thermal reservoir using at least one heat transfer system. For example, as shown in FIG. 5B, the portion of the nuclear reactor system 101 in thermal communication with the nuclear reactor core 524 may comprise a portion of primary coolant system 526 of the nuclear reactor system 101. For instance, as shown in FIG. 5B, the heat transfer system 504 may transfer thermal energy from a portion of a primary coolant system 526 of the nuclear reactor system 101 to an auxiliary thermal reservoir 112.

Further, the operation 1408 illustrates diverting a selected portion of thermal energy from a portion of at least one primary coolant loop of at least one nuclear reactor system to at least one auxiliary thermal reservoir using at least one heat transfer system. For example, as shown in FIG. 5B, the portion of the primary coolant system of the nuclear reactor system 101 may comprise a portion of a primary coolant loop 528 of the nuclear reactor system. For instance, the heat transfer system 504 may transfer thermal energy from a portion of a primary coolant loop 528 of the nuclear reactor system 101 to the auxiliary thermal reservoir 112.

Figure 15A:
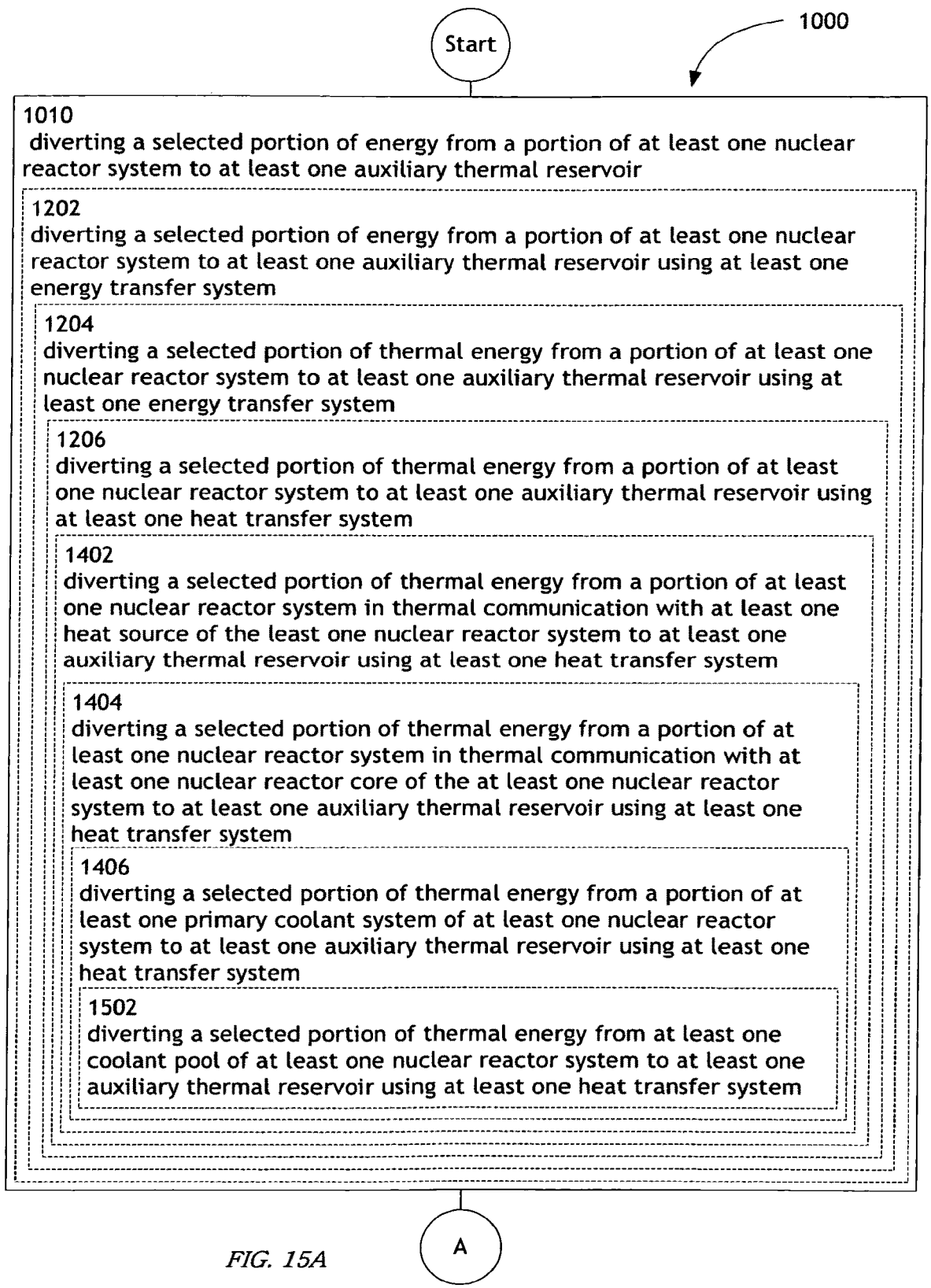
Figure 15B:
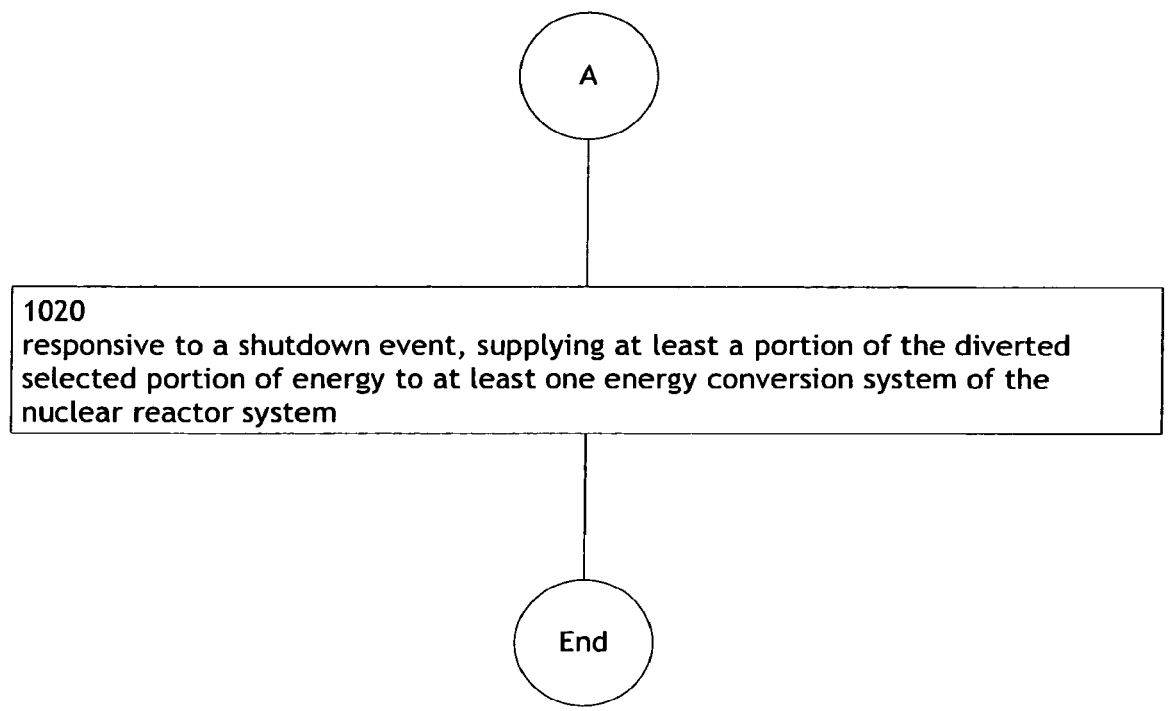

FIGS. 15A and 15B illustrate alternative embodiments of the example operational flow 1000 of FIG. 10. FIGS. 15A and 15B illustrate example embodiments where the diverting operation 1010 may include at least one additional operation. Additional operations may include an operation 1502.

Operation 1502 illustrates diverting a selected portion of thermal energy from at least one coolant pool of at least one nuclear reactor system to at least one auxiliary thermal reservoir using at least one heat transfer system. For example, as shown in FIG. 5B, the portion of the primary coolant system of the nuclear reactor system 101 may comprise a coolant pool 530 of the nuclear reactor system 101. For instance, as shown in FIG. 5B, the heat transfer system 504 may transfer thermal energy from a portion of a coolant pool 530 of the nuclear reactor system 101 to an auxiliary thermal reservoir 112.

Figure 16A:
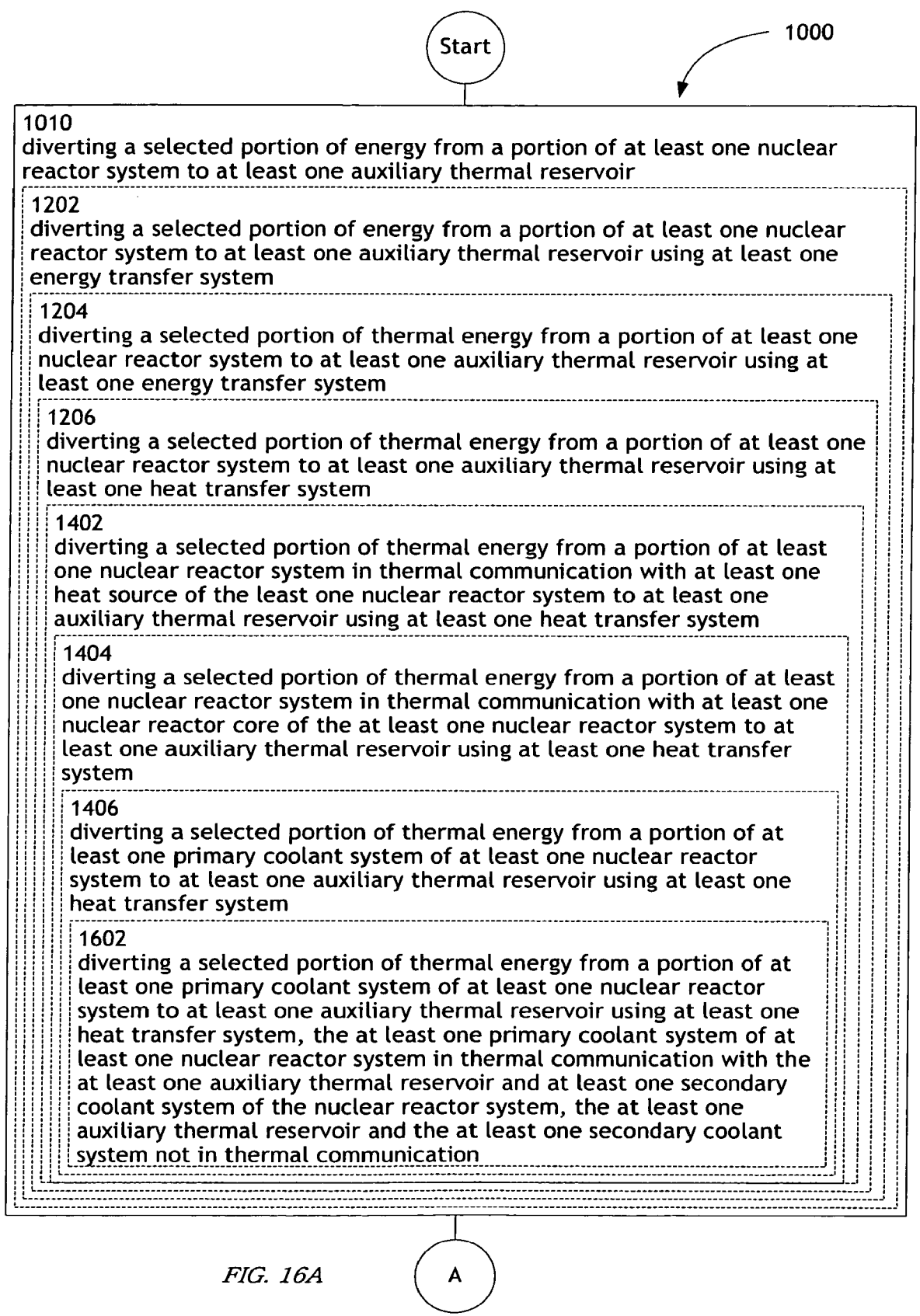
Figure 16B:
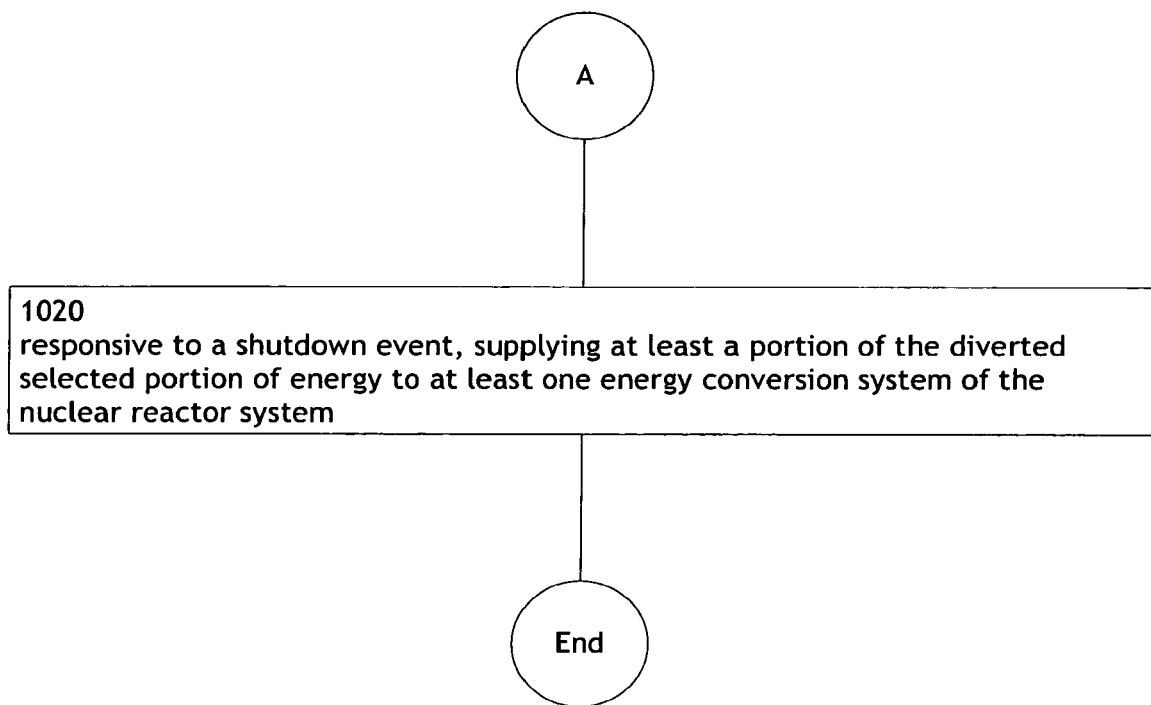

FIGS. 16A and 16B illustrate alternative embodiments of the example operational flow 1000 of FIG. 10. FIGS. 16A and 16B illustrate example embodiments where the diverting operation 1010 may include at least one additional operation. Additional operations may include an operation 1602.

Operation 1602 illustrates diverting a selected portion of thermal energy from a portion of at least one primary coolant system of at least one nuclear reactor system to at least one auxiliary thermal reservoir using at least one heat transfer system, the at least one primary coolant system in thermal communication with the at least one auxiliary thermal reservoir and at least one secondary coolant system of the nuclear reactor system, the at least one auxiliary thermal reservoir and the at least one secondary coolant system not in thermal communication. For example, as shown in FIG. 5C, the primary coolant system 526 may comprise a primary coolant system 526 in thermal communication with both the auxiliary thermal reservoir 112 and a secondary coolant system 532 of the nuclear reactor system 101, where the auxiliary thermal reservoir 112 and the at least one secondary coolant system 532 are not in thermal communication. For instance, the heat transfer system 504 may transfer thermal energy from a portion of a primary coolant system 526 of the nuclear reactor system 101 to an auxiliary thermal reservoir 112, where the primary coolant system 526 is in thermal communication with both the auxiliary thermal reservoir 112 and a secondary coolant system 532 of the nuclear reactor system 101, while the auxiliary thermal reservoir 112 and the at least one secondary coolant 532 system are not in thermal communication.

Figure 17A:
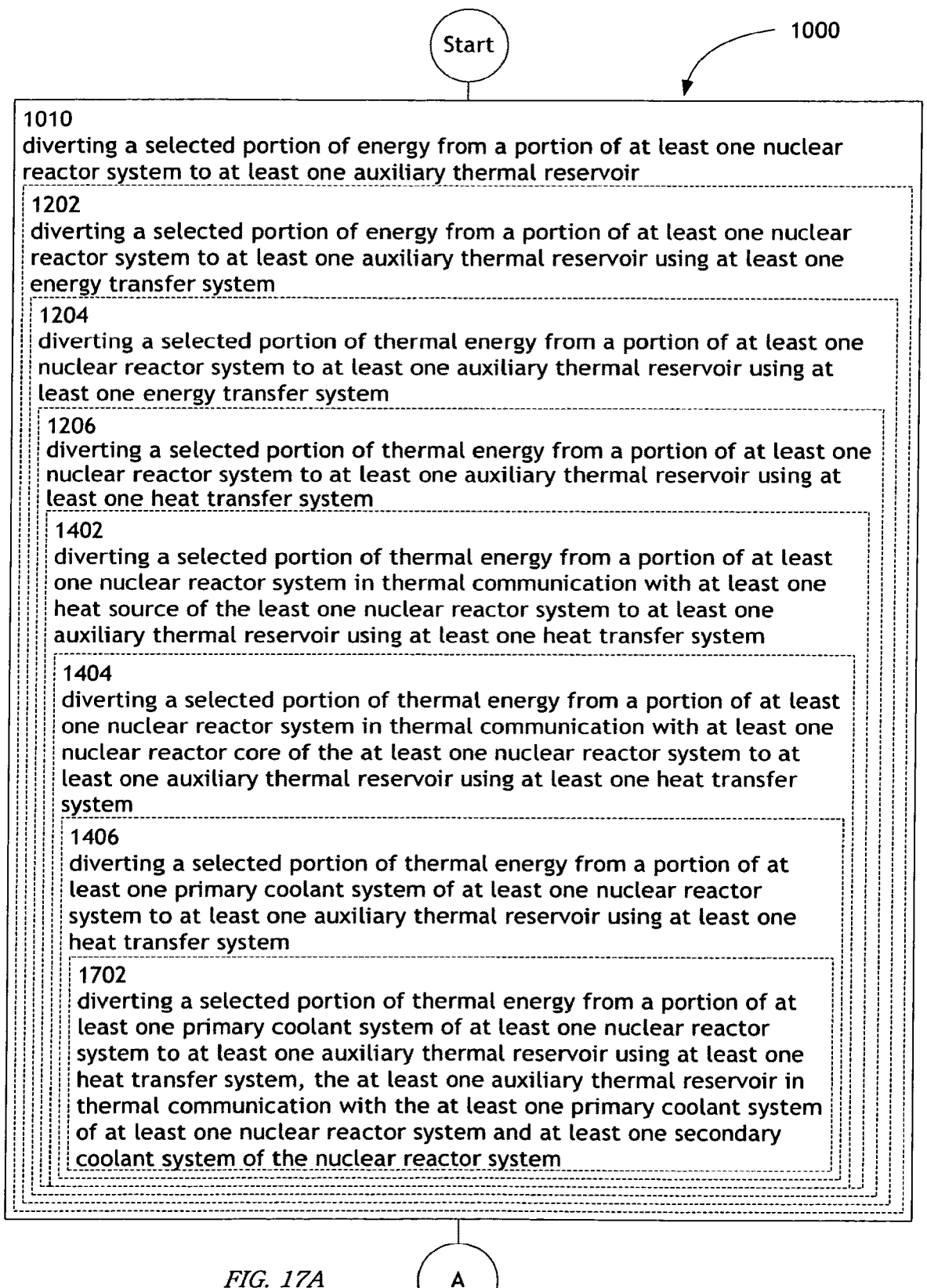
Figure 17B:
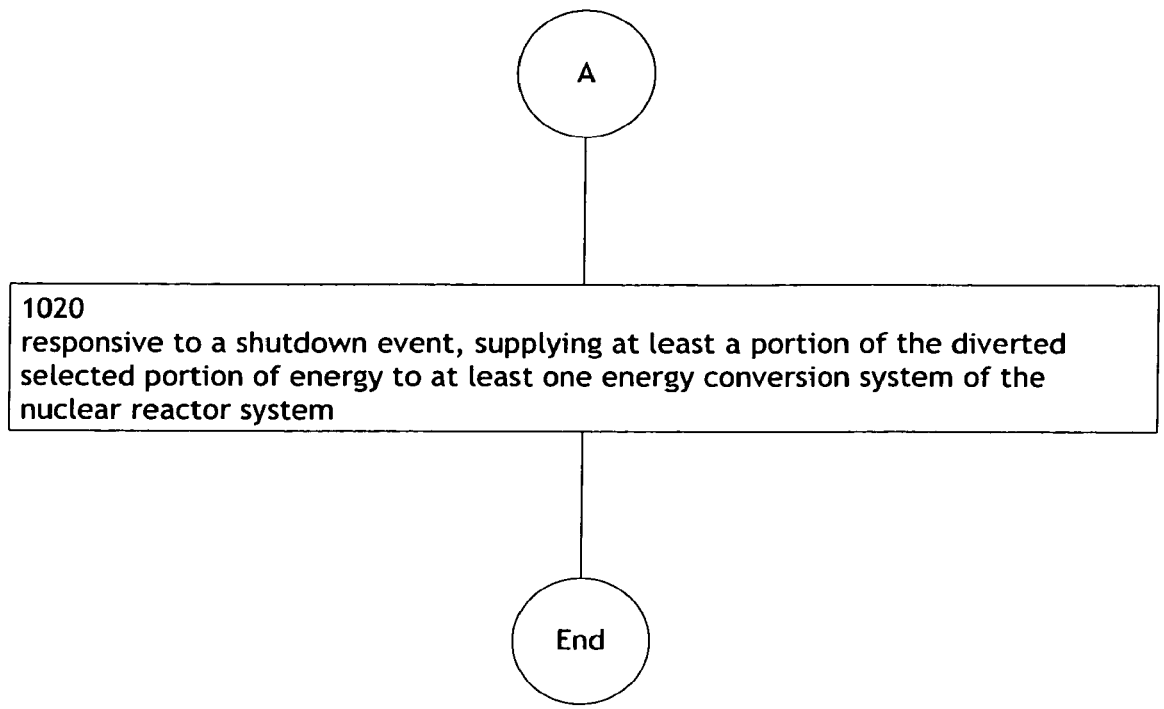

FIGS. 17A and 17B illustrate alternative embodiments of the example operational flow 1000 of FIG. 10. FIG. 17 illustrates example embodiments where the diverting operation 1010 may include at least one additional operation. Additional operations may include an operation 1702.

Further, the operation 1702 illustrates diverting a selected portion of thermal energy from a portion of at least one primary coolant system of at least one nuclear reactor system to at least one auxiliary thermal reservoir using at least one heat transfer system, the at least one auxiliary thermal reservoir in thermal communication with the at least one primary coolant system of at least one nuclear reactor system and at least one secondary coolant system of the nuclear reactor system. For example, as shown in FIG. 5D, the primary coolant system 526 may comprise a primary coolant system in thermal communication with both the auxiliary thermal reservoir 112 and a secondary coolant system 532 of the nuclear reactor system 101, where the auxiliary thermal reservoir 112 is in thermal communication with the primary coolant system 526 of the nuclear reactor system 101 and the secondary coolant system 532 of the nuclear reactor system 101. For instance, the heat transfer system 504 may transfer thermal energy from a portion of a primary coolant system 526 of the nuclear reactor system 101 to an auxiliary thermal reservoir 112, where the auxiliary thermal reservoir 112 is in thermal communication with both the primary coolant system 526 of the nuclear reactor system 101 and the secondary coolant system 532 of the nuclear reactor system 101.

Figure 18A:
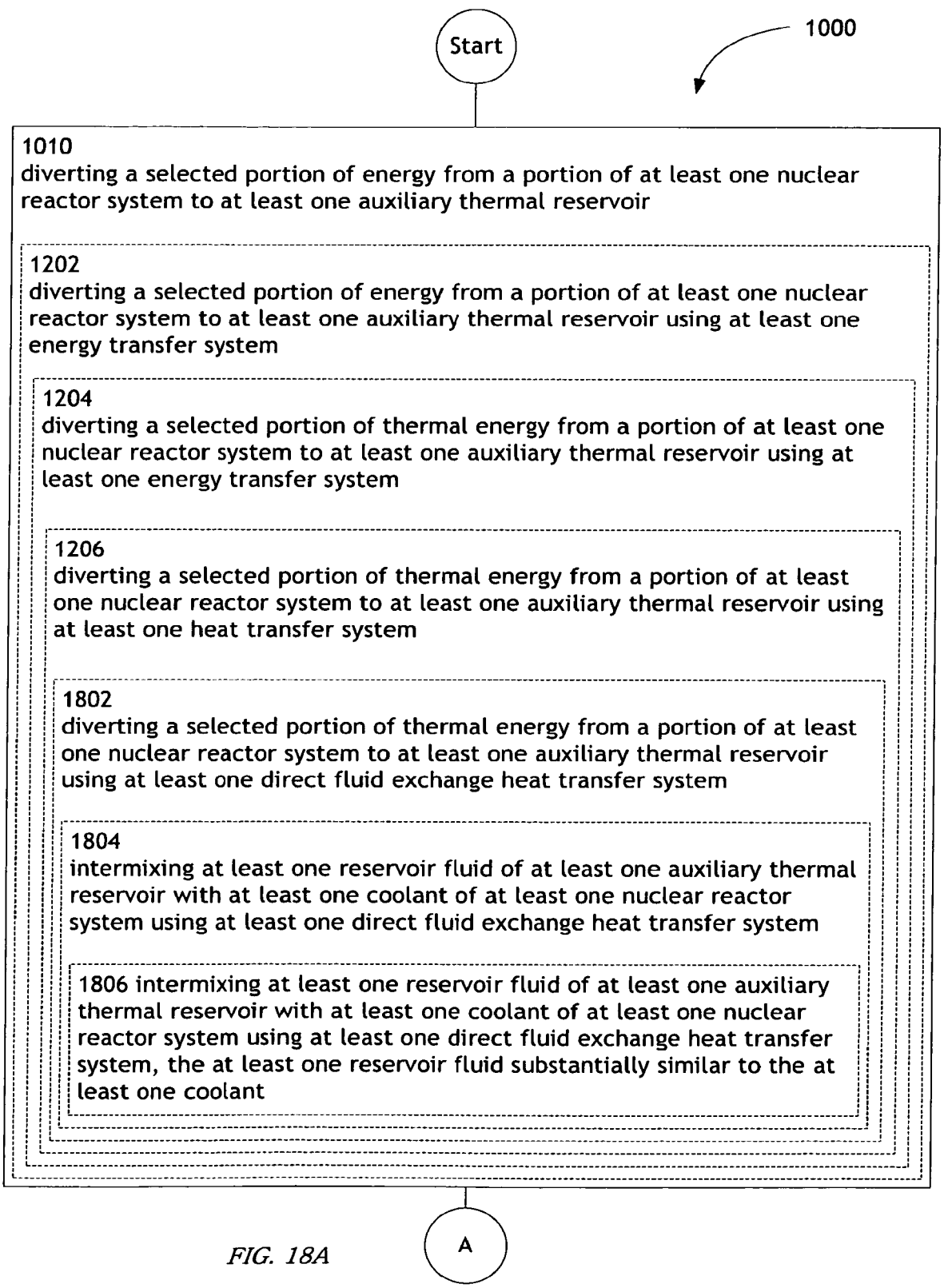
Figure 18B:
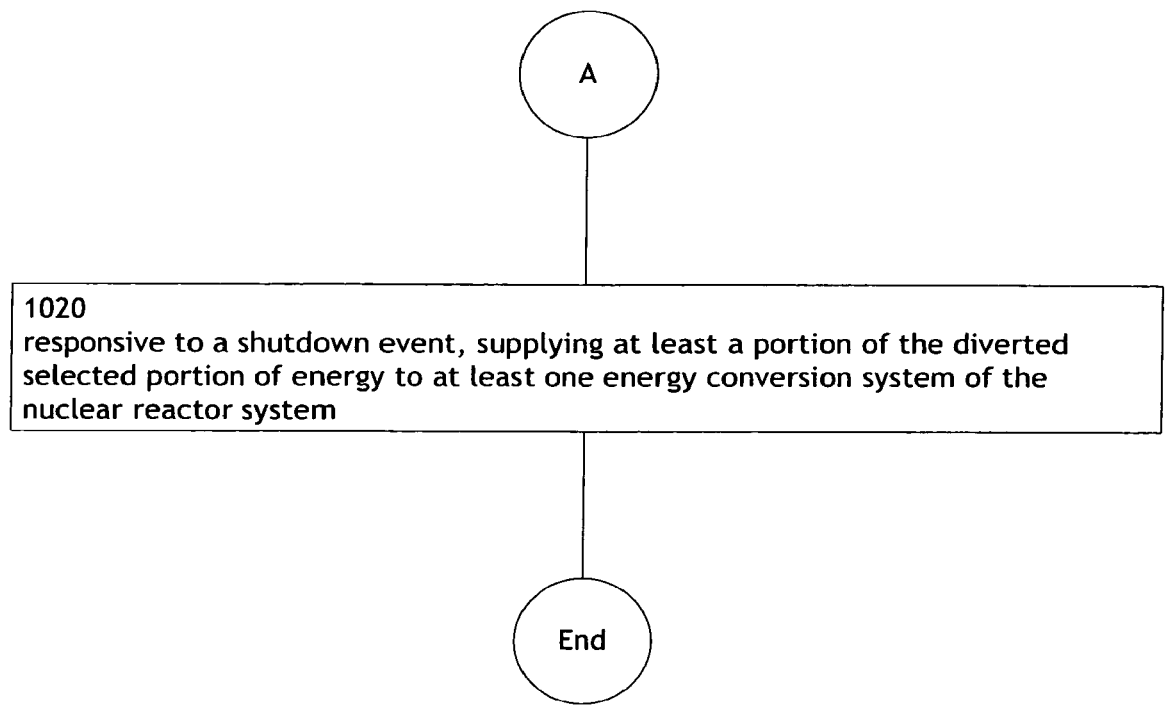

FIGS. 18A and 18B illustrate alternative embodiments of the example operational flow 1000 of FIG. 10. FIGS. 18A and 18B illustrate example embodiments where the diverting operation 1010 may include at least one additional operation. Additional operations may include an operation 1802, an operation 1804, and/or an operation 1806.

Operation 1802 illustrates diverting a selected portion of thermal energy from a portion of at least one nuclear reactor system to at least one auxiliary thermal reservoir using at least one direct fluid exchange heat transfer system. For example, as shown in FIG. 5A, the energy transfer system 104 may comprise a direct fluid exchange heat transfer system 510. For instance, a direct fluid exchange system 510 may transfer thermal energy from a portion of the nuclear reactor system 101 to the auxiliary thermal reservoir 112.

Further, operation 1804 illustrates intermixing at least one reservoir fluid of at least one auxiliary thermal reservoir with at least one coolant of at least one nuclear reactor system using at least one direct fluid exchange heat transfer system. For example, as shown in FIG. 5A, the direct fluid exchange system 510 may comprise a system for intermixing 511 the reservoir of the auxiliary thermal reservoir 112 and the coolant of the nuclear reactor 102. For instance, a system for intermixing 511 the reservoir fluid and the reactor coolant may transfer thermal energy from the nuclear reactor system 101 to the auxiliary thermal reservoir 112 by directly mixing the two fluids.

Further, operation 1806 illustrates intermixing at least one reservoir fluid of at least one auxiliary thermal reservoir with at least one coolant of at least one nuclear reactor system using at least one direct fluid exchange heat transfer system, the at least one reservoir fluid substantially similar to the at least one coolant. For example, as shown in FIG. 5A, the auxiliary thermal reservoir fluid and the coolant of the nuclear reactor may be substantially similar 512. For instance, the reservoir fluid and the nuclear reactor coolant may both comprise the same liquid metal, such as liquid sodium, liquid lead, or liquid lead bismuth. In another instance, the reservoir fluid and the nuclear reactor coolant may both comprise the same liquid organic, such as diphenyl with diphenyl oxide.

Figure 19A:
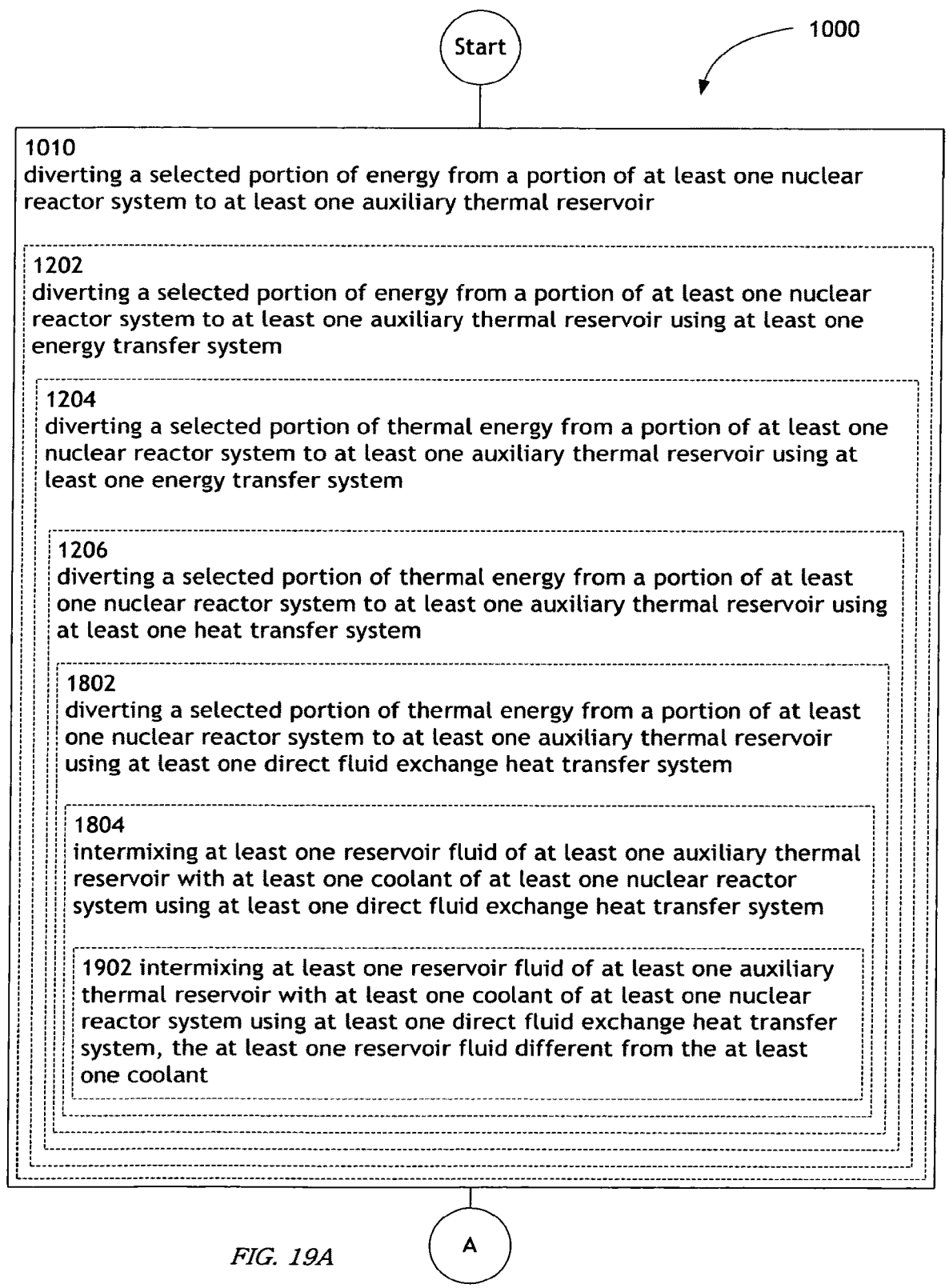
Figure 19B:
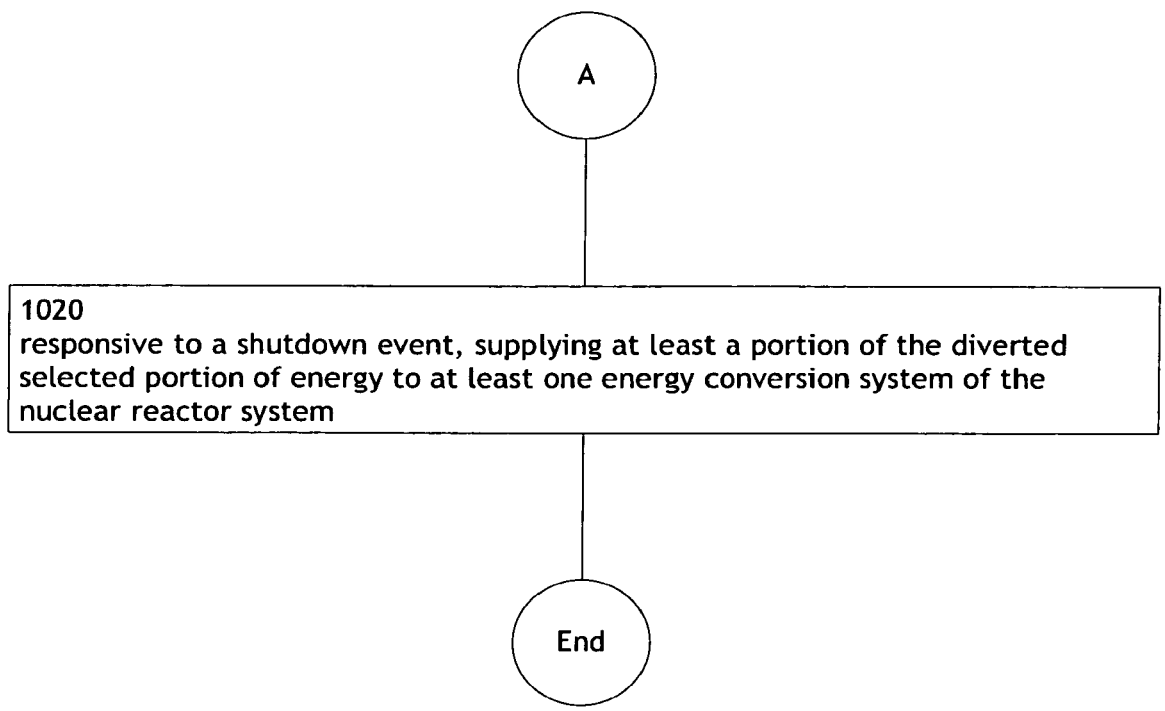

FIGS. 19A and 19B illustrate alternative embodiments of the example operational flow 1000 of FIG. 10. FIGS. 19A and 19B illustrate example embodiments where the diverting operation 1010 may include at least one additional operation. Additional operations may include an operation 1902.

Operation 1902 illustrates intermixing at least one reservoir fluid of at least one auxiliary thermal reservoir with at least one coolant of at least one nuclear reactor system using at least one direct fluid exchange heat transfer system, the at least one reservoir fluid different from the at least one coolant. For example, as shown in FIG. 5A, the auxiliary thermal reservoir fluid and the coolant of the nuclear reactor may be different 513. For instance, the reservoir fluid may comprise a liquid organic fluid (e.g., diphenyl with diphenyl oxide), while the nuclear reactor coolant comprises a liquid metal coolant (e.g., liquid sodium, lead, or lead bismuth). Similarly, the reservoir fluid may comprise a first liquid metal coolant, such as liquid sodium, while the nuclear reactor coolant may comprise a second liquid metal coolant, such as liquid lead.

Figure 20:
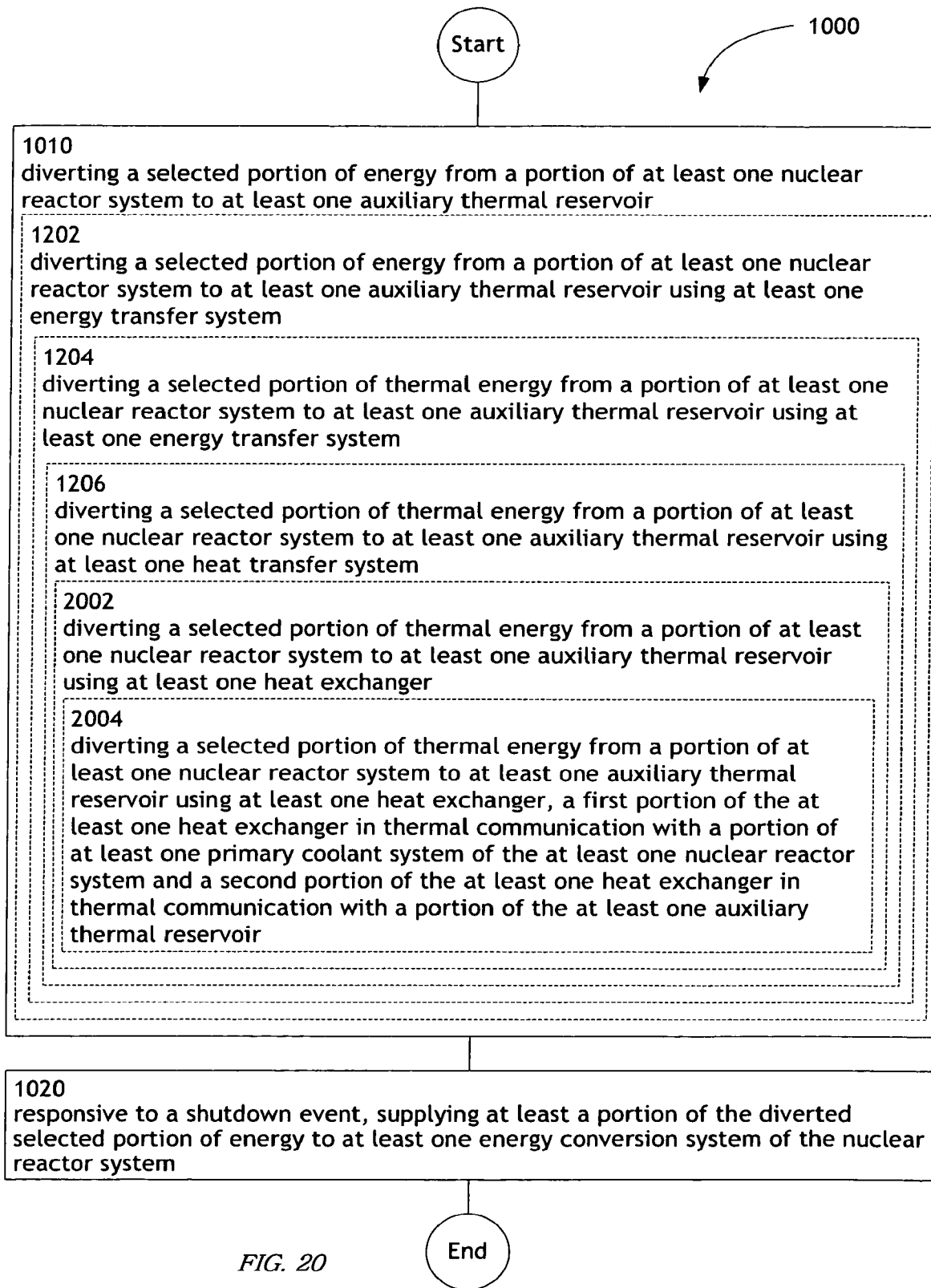

FIG. 20 illustrates alternative embodiments of the example operational flow 1000 of FIG. 10. FIG. 20 illustrates example embodiments where the diverting operation 1010 may include at least one additional operation. Additional operations may include an operation 2002, and/or an operation 2004.

Operation 2002 illustrates diverting a selected portion of thermal energy from a portion of at least one nuclear reactor system to at least one auxiliary thermal reservoir using at least one heat exchanger. For example, as shown in FIG. 5A, the energy transfer system suitable for transferring thermal energy 106 may transfer thermal energy from a portion of the nuclear reactor system 101 to the auxiliary thermal reservoir 112 using one or more reactor-to-reservoir heat exchangers 514.

Further, operation 2004 illustrates diverting a selected portion of thermal energy from a portion of at least one nuclear reactor system to at least one auxiliary thermal reservoir using at least one heat exchanger, a first portion of the at least one heat exchanger in thermal communication with a portion of at least one primary coolant system of the at least one nuclear reactor system and a second portion of the at least one heat exchanger in thermal communication with a portion of the at least one auxiliary thermal reservoir. For example, the reactor-to-reservoir heat exchanger 514 may comprise a heat exchanger 515 having a first portion in communication with the primary coolant system of the nuclear reactor system and a second portion in thermal communication with the auxiliary thermal reservoir 112. For instance, the energy transfer system suitable for transferring thermal energy 106 may transfer energy from the nuclear reactor system 101 to the auxiliary thermal reservoir 112 using a heat exchanger 515 having a first portion in communication with the primary coolant system of the nuclear reactor system and a second portion in thermal communication with the auxiliary thermal reservoir.

Figure 21:
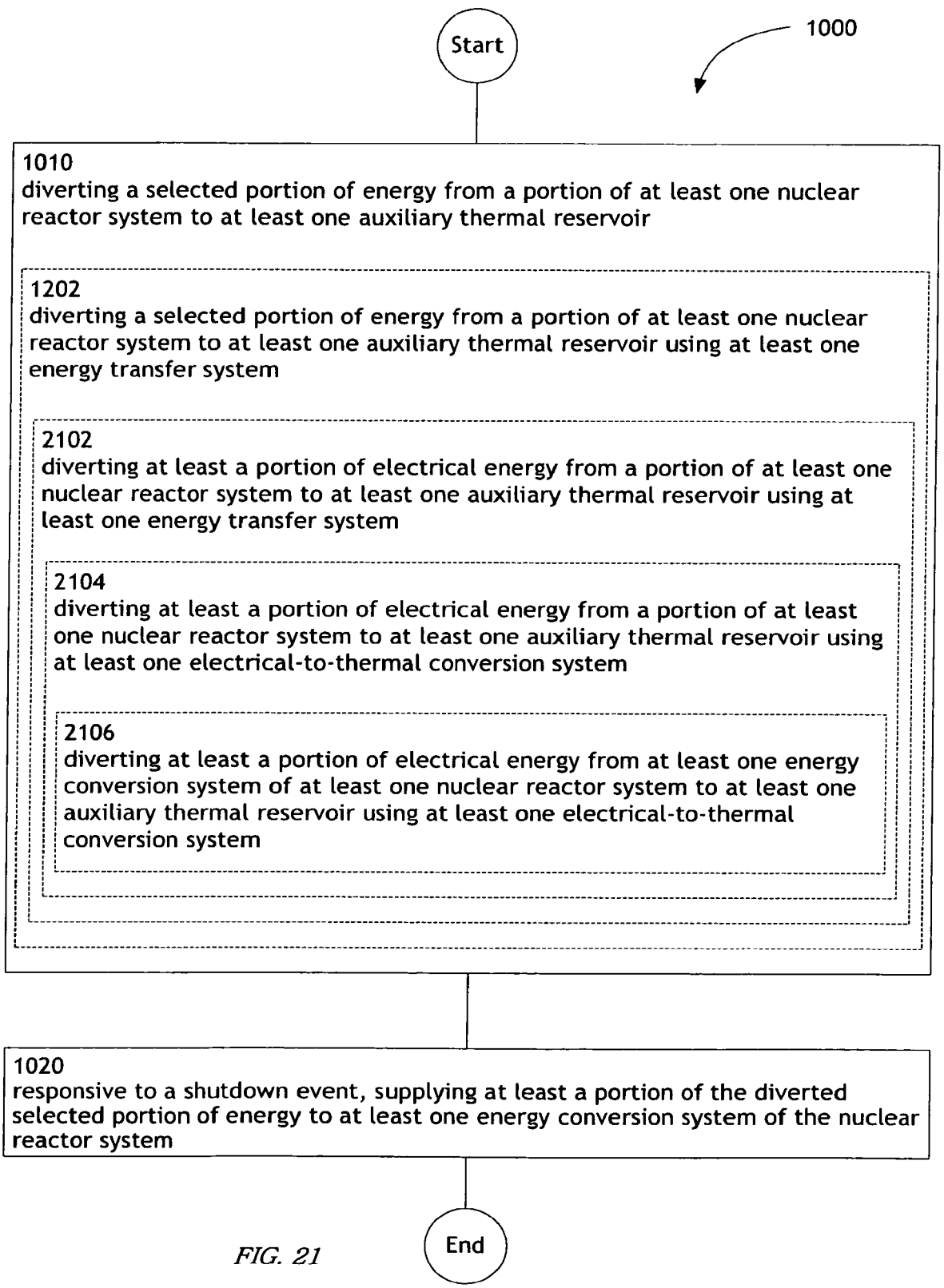

FIG. 21 illustrates alternative embodiments of the example operational flow 1000 of FIG. 10. FIG. 21 illustrates example embodiments where the diverting operation 1010 may include at least one additional operation. Additional operations may include an operation 2102, an operation 2104, and/or an operation 2106.

Operation 2102 illustrates diverting at least a portion of electrical energy from a portion of at least one nuclear reactor system to at least one auxiliary thermal reservoir using at least one energy transfer system. For example, as shown in FIG. 5A, the energy transfer system 104 may comprise an energy transfer system suitable for transferring electrical energy 108 from a portion of the nuclear reactor system 101 (e.g., an energy conversion system of the nuclear reactor system 110) to the auxiliary thermal reservoir 112. For instance, an energy transfer system suitable for transferring electrical energy 108 from the nuclear reactor system 101 to the auxiliary thermal reservoir 112 may be used to transfer electrical energy from a portion of the nuclear reactor system 101 to the auxiliary thermal reservoir 112. Those skilled in the art will recognize that in the transfer process the electrical energy originating from a portion of the nuclear reactor system 101 must be converted to thermal energy in order to be stored in the auxiliary thermal reservoir 112.

Further, operation 2104 illustrates diverting at least a portion of electrical energy from a portion of at least one nuclear reactor system to at least one auxiliary thermal reservoir using at least one electrical-to-thermal conversion system. For example, as shown in FIG. 5A, the energy transfer system suitable for transferring electrical energy 108 from the nuclear reactor system 101 to the auxiliary thermal reservoir 112 may comprise an electrical energy-to-thermal energy conversion device 516. For instance, an electrical energy-to-thermal energy conversion device 516 may be used to convert electrical energy produced by a portion of the nuclear reactor system 101 to thermal energy, wherein the thermal energy is then transferred to the auxiliary thermal reservoir 112.

Further, the operation 2106 illustrates diverting at least a portion of electrical energy from at least one energy conversion system of at least one nuclear reactor system to at least one auxiliary thermal reservoir using at least one electrical-to-thermal conversion system. For example, as shown in FIG. 5A, the energy transfer system suitable for transferring electrical energy 108 from the nuclear reactor system 101 to the auxiliary thermal reservoir 112 may comprise an electrical energy-to-thermal energy conversion device 519 for transferring electrical energy from an energy conversion device 110 of the nuclear reactor system 101 to the auxiliary thermal reservoir 112. For instance, an electrical energy-to-thermal energy conversion device 519 suitable for transferring electrical energy from an energy conversion device 110 to the auxiliary thermal reservoir 112 may be used to convert electrical energy from the electrical output of an energy conversion device (e.g., turbine-generator system) of the nuclear reactor system 101 to thermal energy. The thermal energy is then transferred to the auxiliary thermal reservoir 112.

Figure 22:
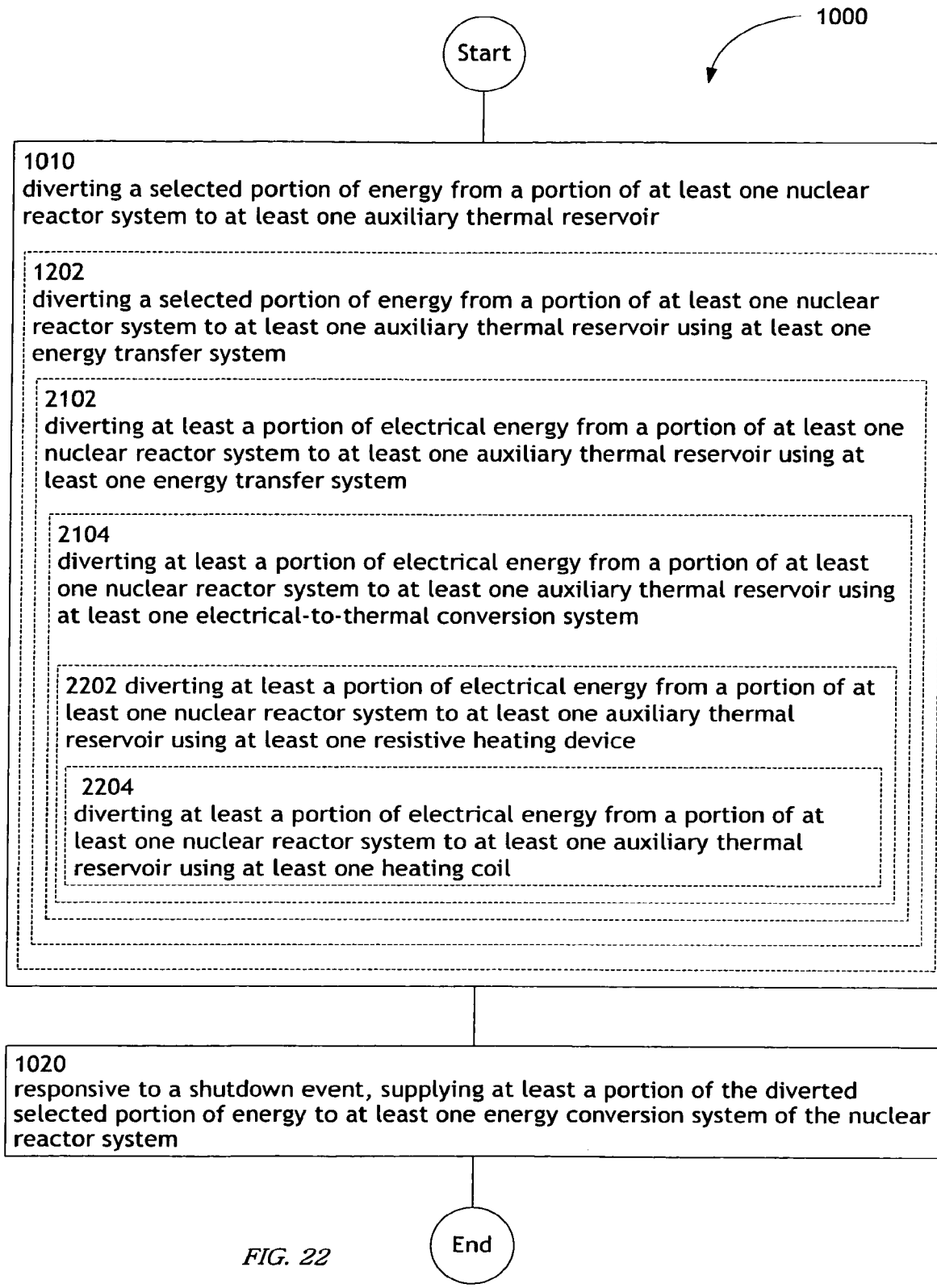

FIG. 22 illustrates alternative embodiments of the example operational flow 1000 of FIG. 10. FIG. 22 illustrates example embodiments where the diverting operation 1010 may include at least one additional operation. Additional operations may include an operation 2202, and/or an operation 2204.

Operation 2202 illustrates diverting at least a portion of electrical energy from a portion of at least one nuclear reactor system to at least one auxiliary thermal reservoir using at least one resistive heating device. For example, as shown in FIG. 5A, the electrical energy-to-thermal energy conversion device may comprise one or more than one resistive heating devices 517. For instance, a resistive heating device 517 may be utilized to convert electrical energy from a portion of the nuclear reactor system 101 to thermal energy. The thermal energy may then be transferred to the auxiliary thermal reservoir 112.

Further, operation 2204 illustrates diverting at least a portion of electrical energy from a portion of at least one nuclear reactor system to at least one auxiliary thermal reservoir using at least one heating coil. For example, as shown in FIG. 5A, the resistive heating device 517 may comprise one or more heating coils. For instance, a heating coil 518 may be used to convert electrical energy from a portion of the nuclear reactor system 101 to thermal energy. The thermal energy may then be transferred to the auxiliary thermal reservoir 112.

Figure 23:
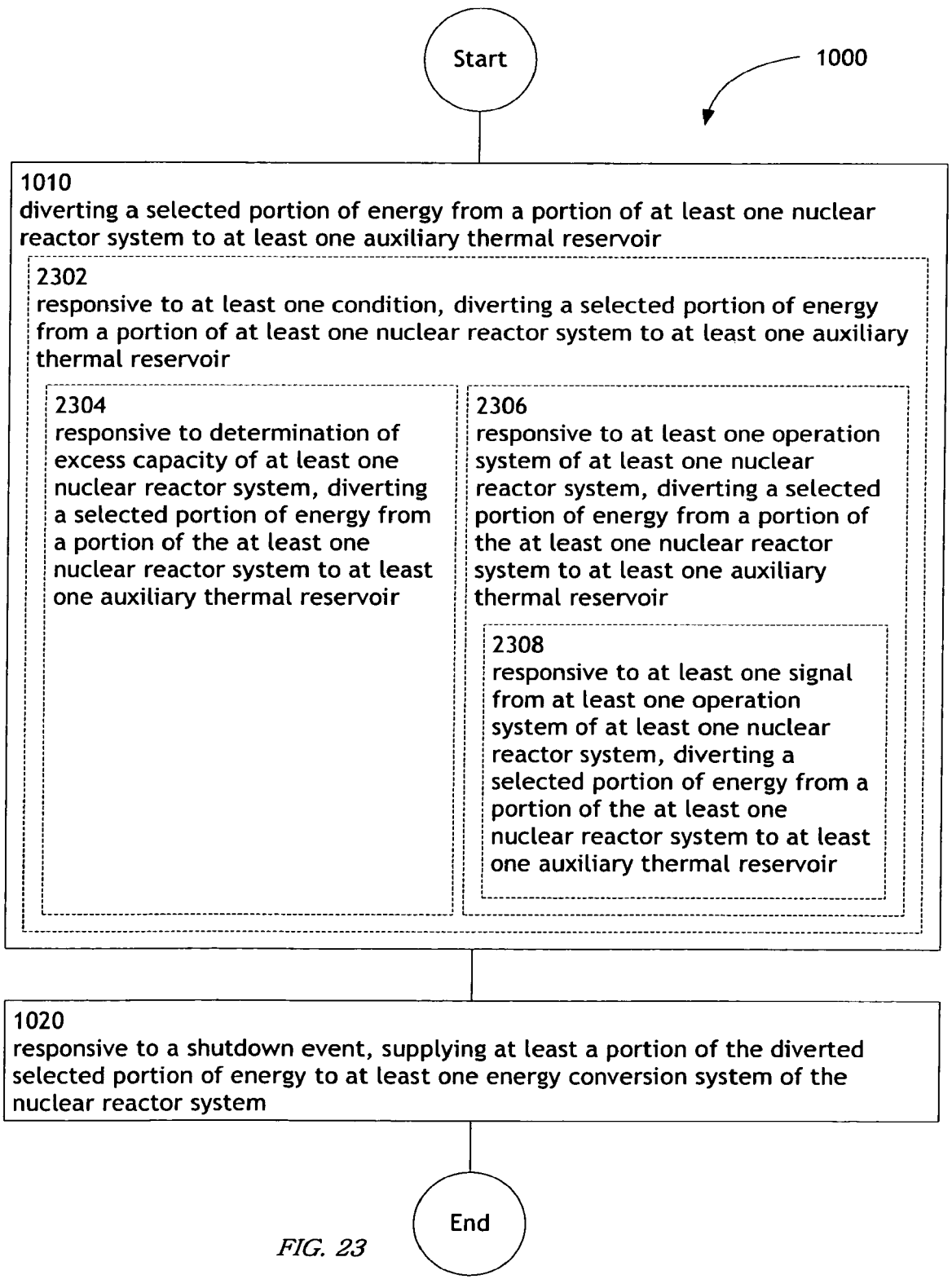

FIG. 23 illustrates alternative embodiments of the example operational flow 1000 of FIG. 10. FIG. 23 illustrates example embodiments where the diverting operation 1010 may include at least one additional operation. Additional operations may include an operation 2302, an operation 2304, an operation 2306, and/or an operation 2308.

Operation 2302 illustrates, responsive to at least one condition, diverting a selected portion of energy from a portion of at least one nuclear reactor system to at least one auxiliary thermal reservoir. For example, as shown in FIGS. 1 through 9B, in response to a condition 802 (e.g., power demands on nuclear reactor system, state of readiness of auxiliary reservoir, thermal properties of reactor or thermal properties of reservoir), the energy transfer system 104 may initiate transfer of energy from a portion of the nuclear reactor system 101 to the auxiliary thermal reservoir 112.

Further, operation 2304 illustrates, responsive to determination of excess capacity of at least one nuclear reactor system, diverting a selected portion of energy from a portion of the at least one nuclear reactor system to at least one auxiliary thermal reservoir. For example, as shown in FIGS. 1 through 9B, in response to the determination of excess capacity of at least one nuclear reactor system (e.g., determination that current nuclear reactor power production exceeds current grid demand), the energy transfer system 104 may initiate transfer of energy from a portion of the nuclear reactor system 101 to the auxiliary thermal reservoir 112.

Operation 2306 illustrates, responsive to at least one operation system of at least one nuclear reactor system, diverting a selected portion of energy from a portion of the at least one nuclear reactor system to at least one auxiliary thermal reservoir. For example, as shown in FIGS. 1 through 9B, in response to an operation system 804 (e.g., warning system, security system, or shutdown system) of the nuclear reactor system 101, the energy transfer system 104 may initiate transfer of energy from a portion of the nuclear reactor system 101 to the auxiliary thermal reservoir 112.

Further, the operation 2308 illustrates, responsive to at least one signal from at least one operation system of at least one nuclear reactor system, diverting a selected portion of energy from a portion of the at least one nuclear reactor system to at least one auxiliary thermal reservoir. For example, as shown in FIGS. 1 through 9B, in response to at least one signal 806 (e.g., a digital wireline signal, an analog wireline signal, a digital wireless signal, or an analog wireless signal) from an operation system of the nuclear reactor system 101, the energy transfer system responsive to a signal from an operation system 806 may initiate the transfer of energy from a portion of the nuclear reactor system 101 to the auxiliary thermal reservoir 112.

Figure 24:
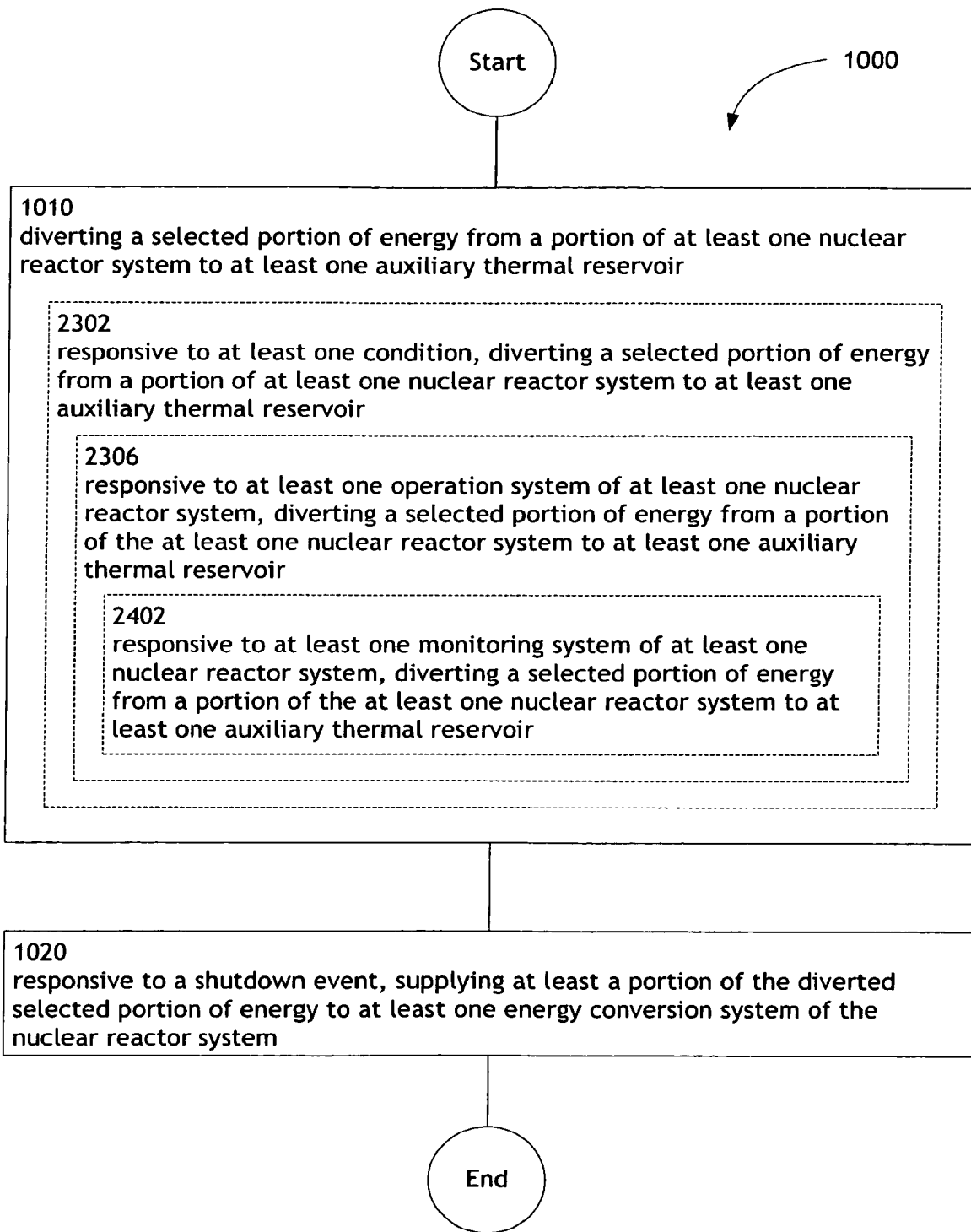

FIG. 24 illustrates alternative embodiments of the example operational flow 1000 of FIG. 10. FIG. 24 illustrates example embodiments where the diverting operation 1010 may include at least one additional operation. Additional operations may include an operation 2402.

Operation 2402 illustrates, responsive to at least one monitoring system of at least one nuclear reactor system, diverting a selected portion of energy from a portion of the at least one nuclear reactor system to at least one auxiliary thermal reservoir. For example, as shown in FIGS. 1 through 9B, in response to at least one signal from a monitoring system of the nuclear reactor system 101, the energy transfer system responsive to a monitoring system 808 may initiate the transfer of energy from a portion of the nuclear reactor system 101 to the auxiliary thermal reservoir 112.

Figure 25:
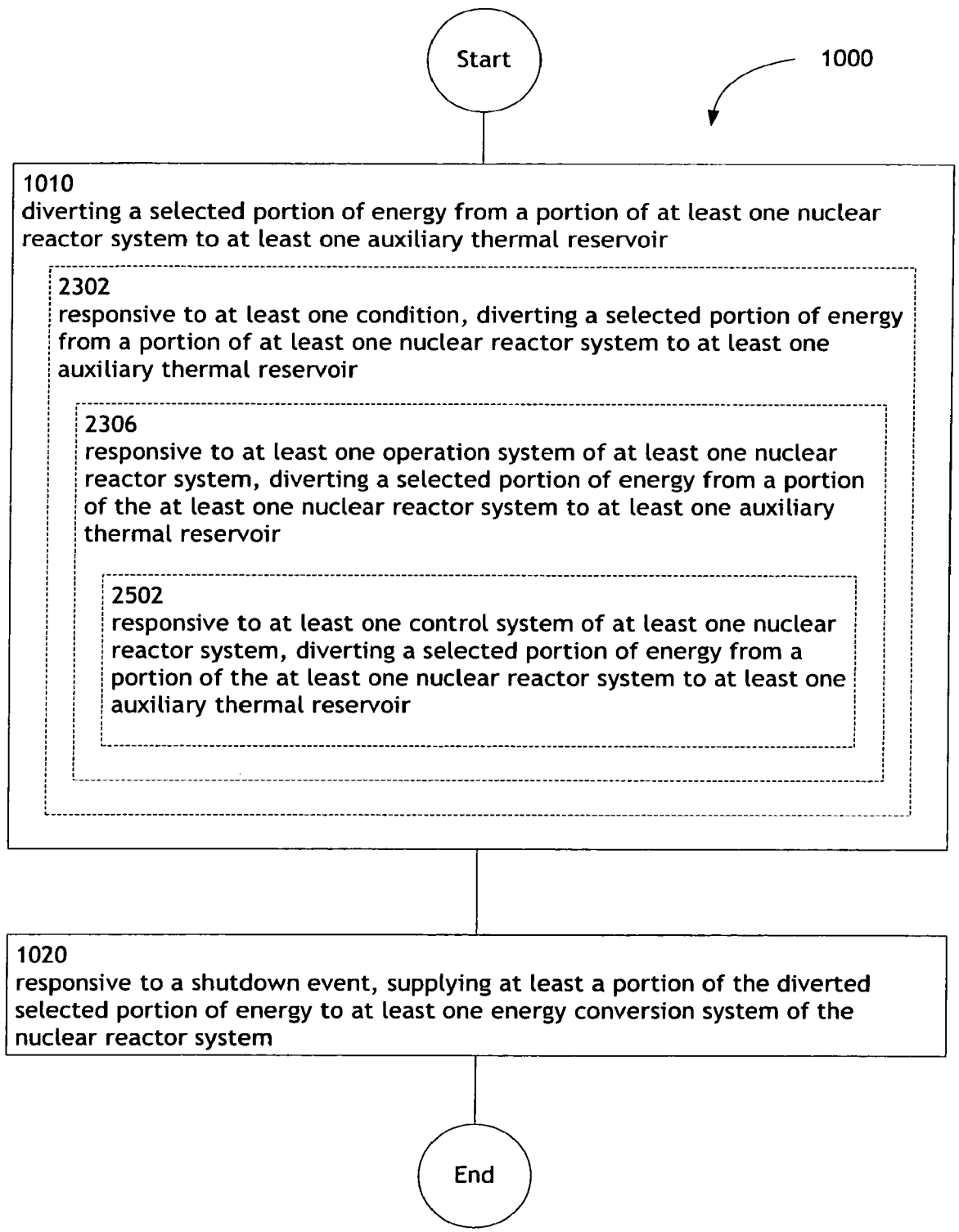

FIG. 25 illustrates alternative embodiments of the example operational flow 1000 of FIG. 10. FIG. 25 illustrates example embodiments where the diverting operation 1010 may include at least one additional operation. Additional operations may include an operation 2502.

Operation 2502 illustrates, responsive to at least one control system of at least one nuclear reactor system, diverting a selected portion of energy from a portion of the at least one nuclear reactor system to at least one auxiliary thermal reservoir. For example, as shown in FIGS. 1 through 9B, in response to at least one signal from a control system of the nuclear reactor system 101, the energy transfer system responsive to a control system 810 may initiate the transfer of energy from a portion of the nuclear reactor system 101 to the auxiliary thermal reservoir 112.

Figure 26:
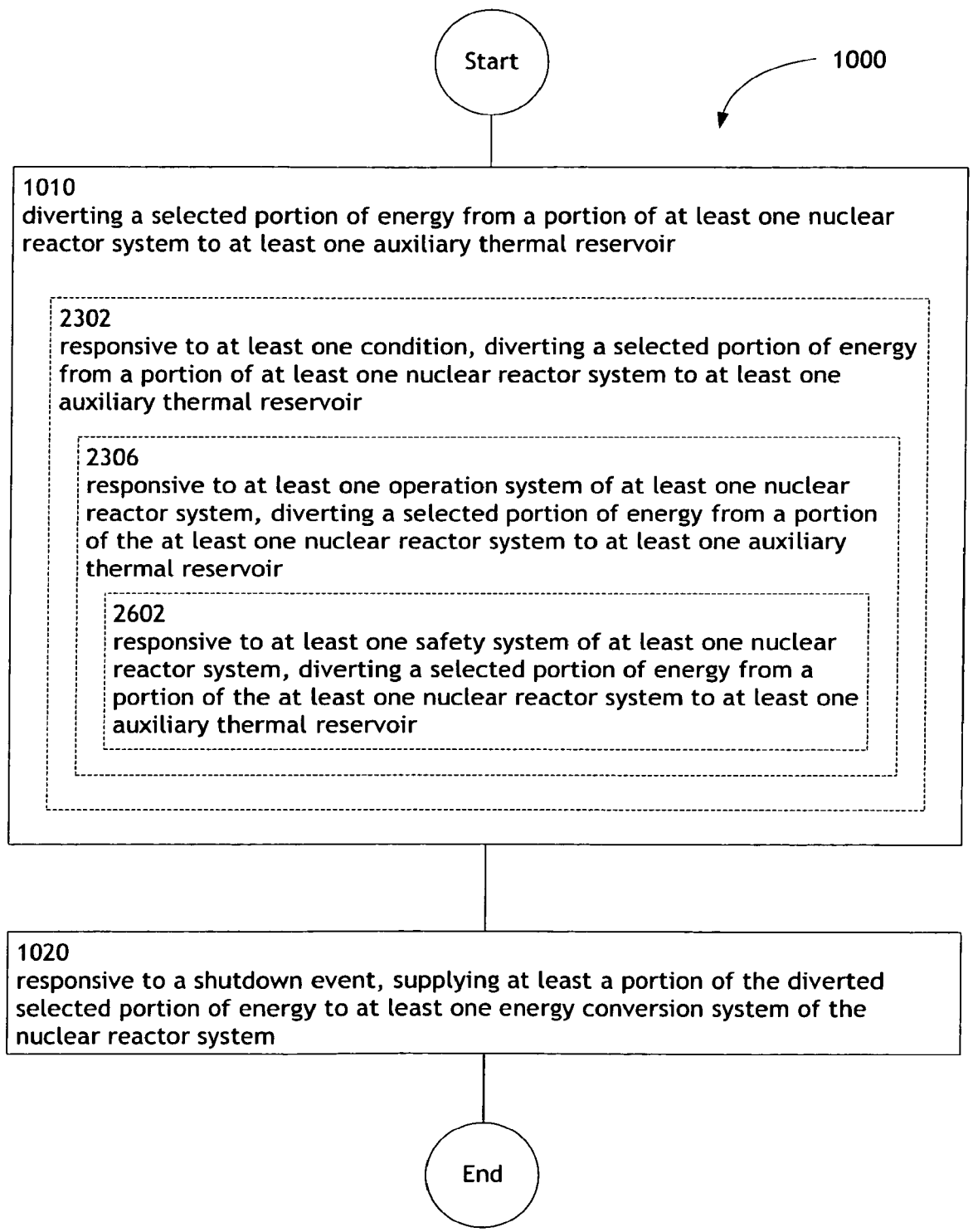

FIG. 26 illustrates alternative embodiments of the example operational flow 1000 of FIG. 10. FIG. 26 illustrates example embodiments where the diverting operation 1010 may include at least one additional operation. Additional operations may include an operation 2602.

Operation 2602 illustrates, responsive to at least one safety system of at least one nuclear reactor system, diverting a selected portion of energy from a portion of the at least one nuclear reactor system to at least one auxiliary thermal reservoir. For example, as shown in FIGS. 1 through 9B, in response to at least one signal from a control system of the nuclear reactor system 101, the energy transfer system responsive to a safety system of the nuclear reactor system 812 may initiate transfer of energy from a portion of the nuclear reactor system 101 to the auxiliary thermal reservoir 112.

Figure 27:
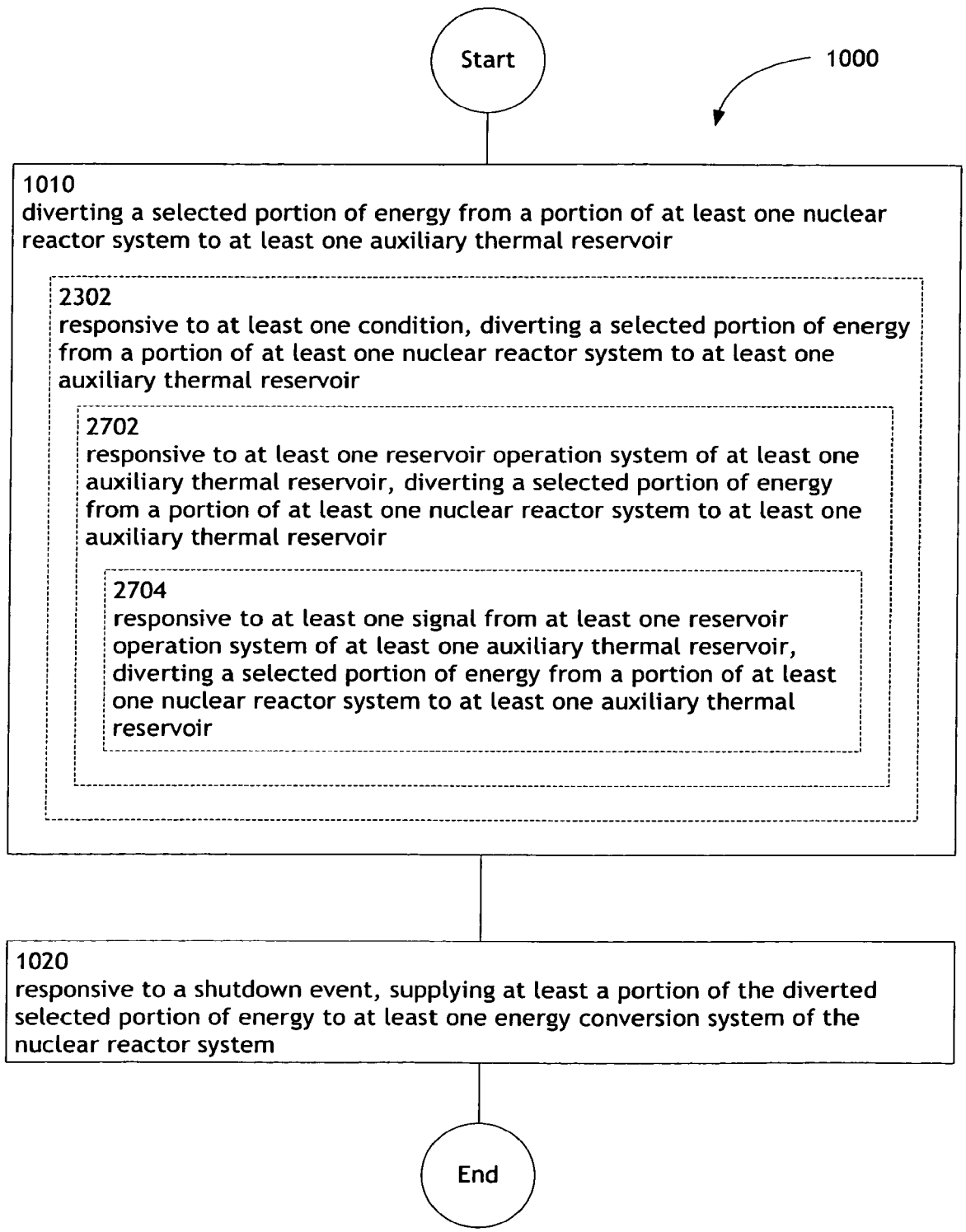

FIG. 27 illustrates alternative embodiments of the example operational flow 1000 of FIG. 10. FIG. 27 illustrates example embodiments where the diverting operation 1010 may include at least one additional operation. Additional operations may include an operation 2702, and/or an operation 2704.

Operation 2702 illustrates, responsive to at least one reservoir operation system of at least one auxiliary thermal reservoir, diverting a selected portion of energy from a portion of at least one nuclear reactor system to at least one auxiliary thermal reservoir. For example, as shown in FIGS. 1 through 9B, in response to at least one operation system (e.g., monitoring system, warning system, control system, or security system) of the auxiliary thermal reservoir 112, the energy transfer system responsive to a reservoir operation system 818 may initiate transfer of energy from a portion of the nuclear reactor system 101 to the auxiliary thermal reservoir 112.

Further, the operation 2704 illustrates, responsive to at least one signal from at least one reservoir operation system of at least one auxiliary thermal reservoir, diverting a selected portion of energy from a portion of at least one nuclear reactor system to at least one auxiliary thermal reservoir. For example, as shown in FIGS. 1 through 9B, in response to at least one signal (e.g., a digital wireline signal, an analog wireline signal, a digital wireless signal, or an analog wireless signal) from an operation system of the auxiliary thermal reservoir 112, the energy transfer system responsive to a signal from a reservoir operation system 820 may initiate transfer of energy from a portion of the nuclear reactor system 101 to the auxiliary thermal reservoir 112.

Figure 28:
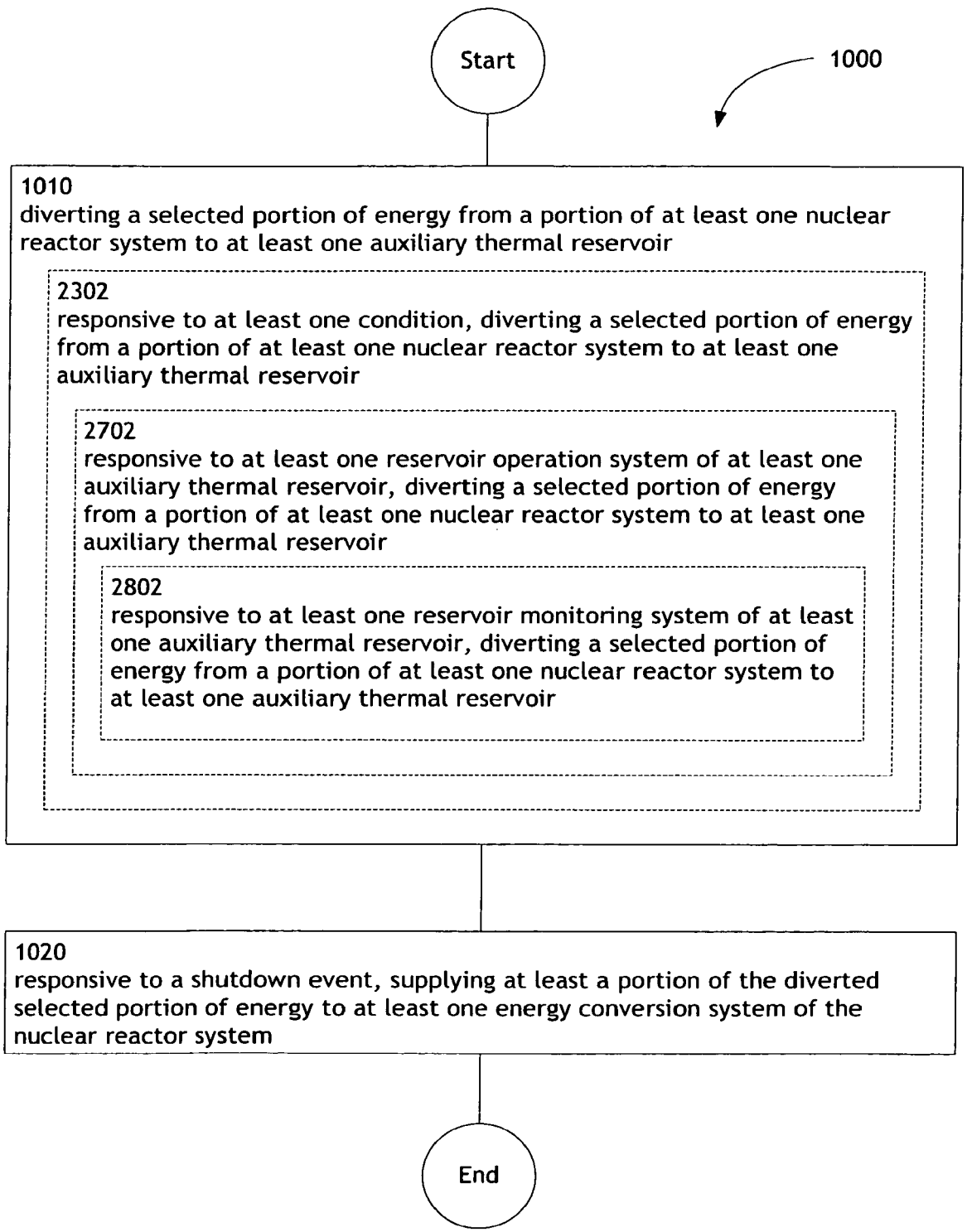

FIG. 28 illustrates alternative embodiments of the example operational flow 1000 of FIG. 10. FIG. 28 illustrates example embodiments where the diverting operation 1010 may include at least one additional operation. Additional operations may include an operation 2802.

Operation 2802 illustrates, responsive to at least one reservoir monitoring system of at least one auxiliary thermal reservoir, diverting a selected portion of energy from a portion of at least one nuclear reactor system to at least one auxiliary thermal reservoir. For example, as shown in FIGS. 1 through 9B, in response to at least one monitoring system (e.g., thermal monitoring system, pressure monitoring system, monitoring system for energy storage capacity) of the auxiliary thermal reservoir 112, the energy transfer system responsive to a reservoir monitoring system 822 may initiate transfer of energy from a portion of the nuclear reactor system 101 to the auxiliary thermal reservoir 112.

Figure 29:
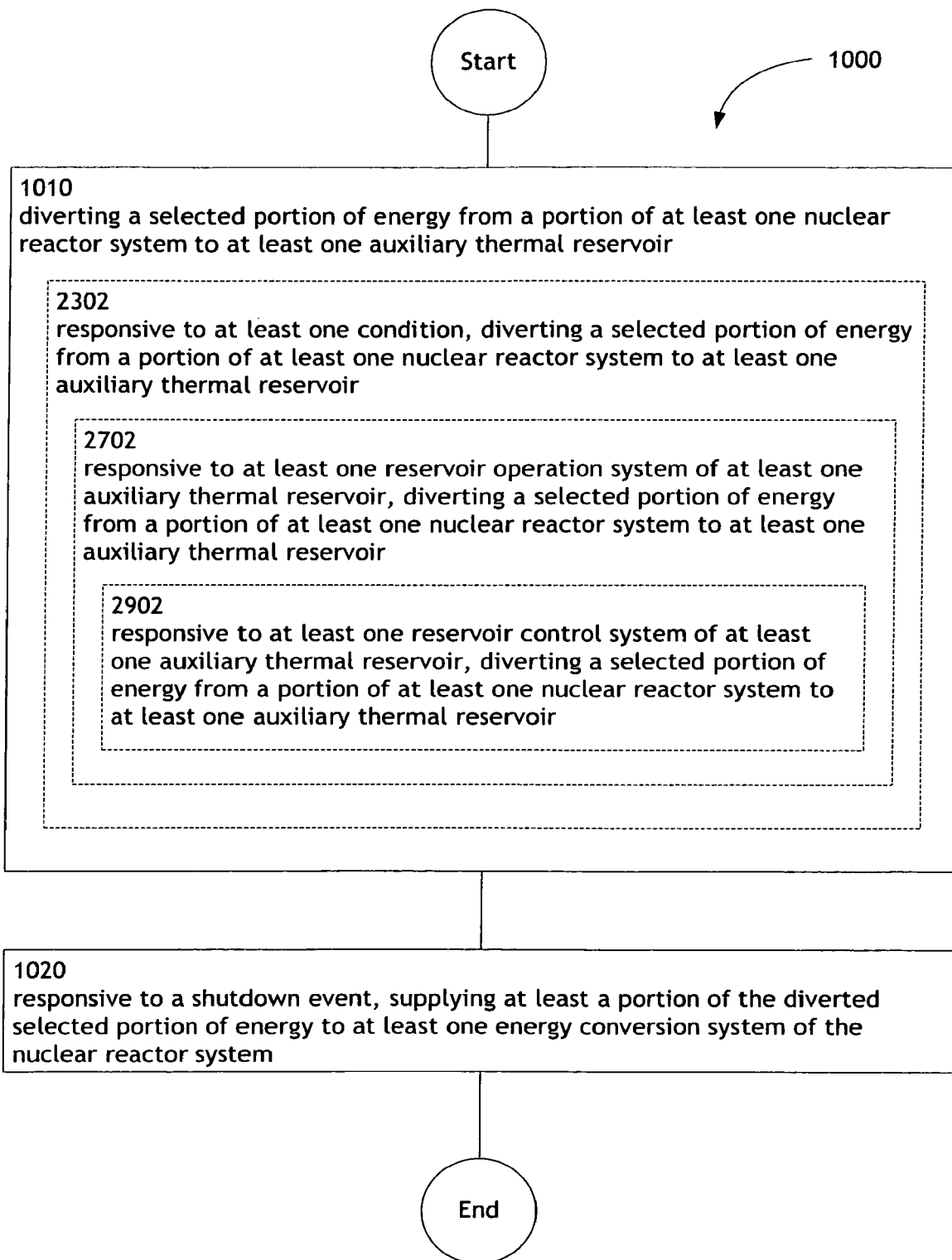

FIG. 29 illustrates alternative embodiments of the example operational flow 1000 of FIG. 10. FIG. 29 illustrates example embodiments where the diverting operation 1010 may include at least one additional operation. Additional operations may include an operation 2902.

Operation 2902 illustrates, responsive to at least one reservoir control system of at least one auxiliary thermal reservoir, diverting a selected portion of energy from a portion of at least one nuclear reactor system to at least one auxiliary thermal reservoir. For example, as shown in FIGS. 1 through 9B, in response to at least one control system (e.g., thermal control system) of the auxiliary thermal reservoir 112, the energy transfer system responsive to a reservoir control system 824 may initiate transfer of energy from a portion of the nuclear reactor system 101 to the auxiliary thermal reservoir 112.

Figure 30:
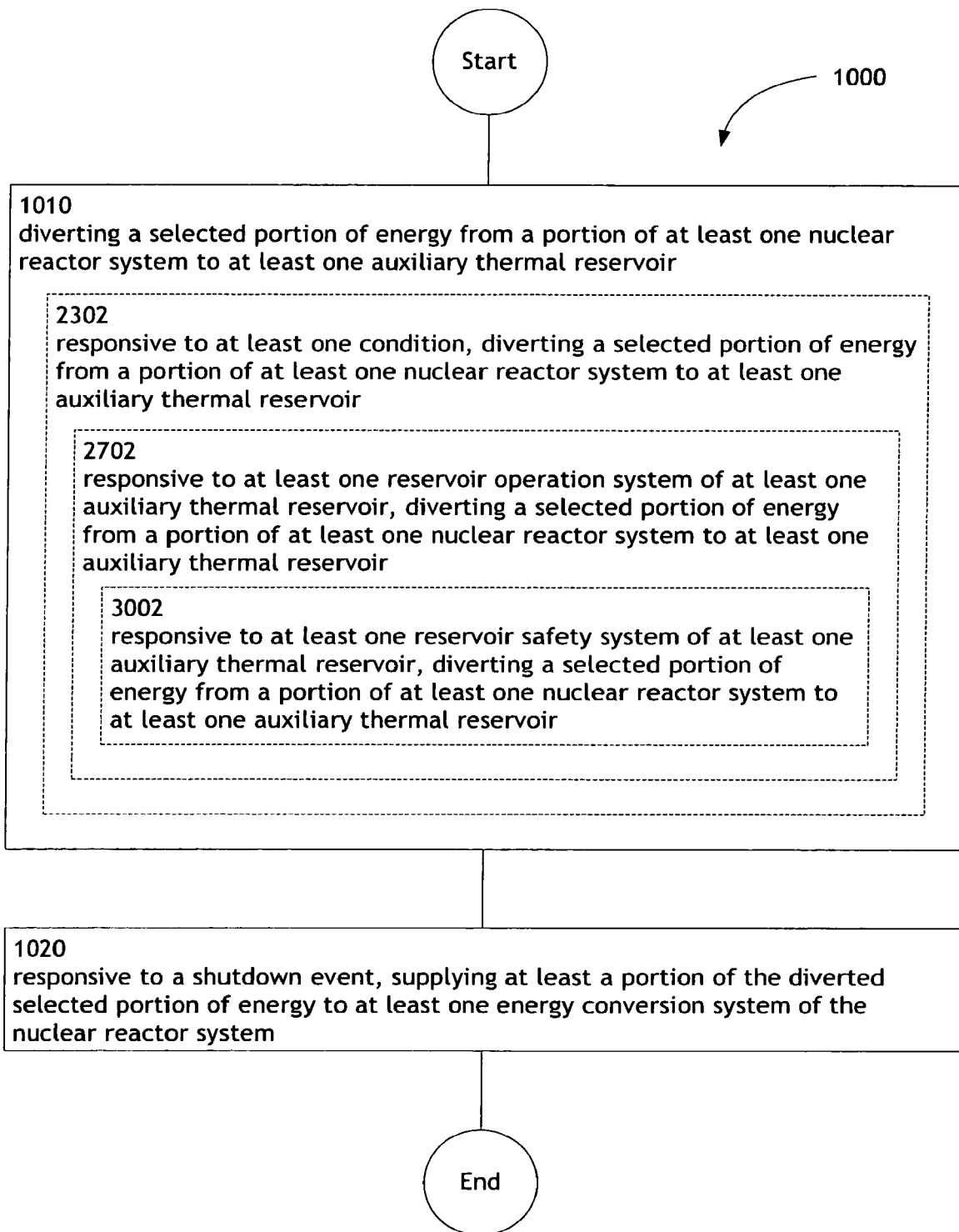

FIG. 30 illustrates alternative embodiments of the example operational flow 1000 of FIG. 10. FIG. 30 illustrates example embodiments where the diverting operation 1010 may include at least one additional operation. Additional operations may include an operation 3002.

Operation 3002 illustrates, responsive to at least one reservoir safety system of at least one auxiliary thermal reservoir, diverting a selected portion of energy from a portion of at least one nuclear reactor system to at least one auxiliary thermal reservoir. For example, as shown in FIGS. 1 through 9B, in response to at least one safety system of the auxiliary thermal reservoir 112, the energy transfer system responsive to a reservoir safety system 826 may initiate transfer of energy from a portion of the nuclear reactor system 101 to the auxiliary thermal reservoir 112.

Figure 31:
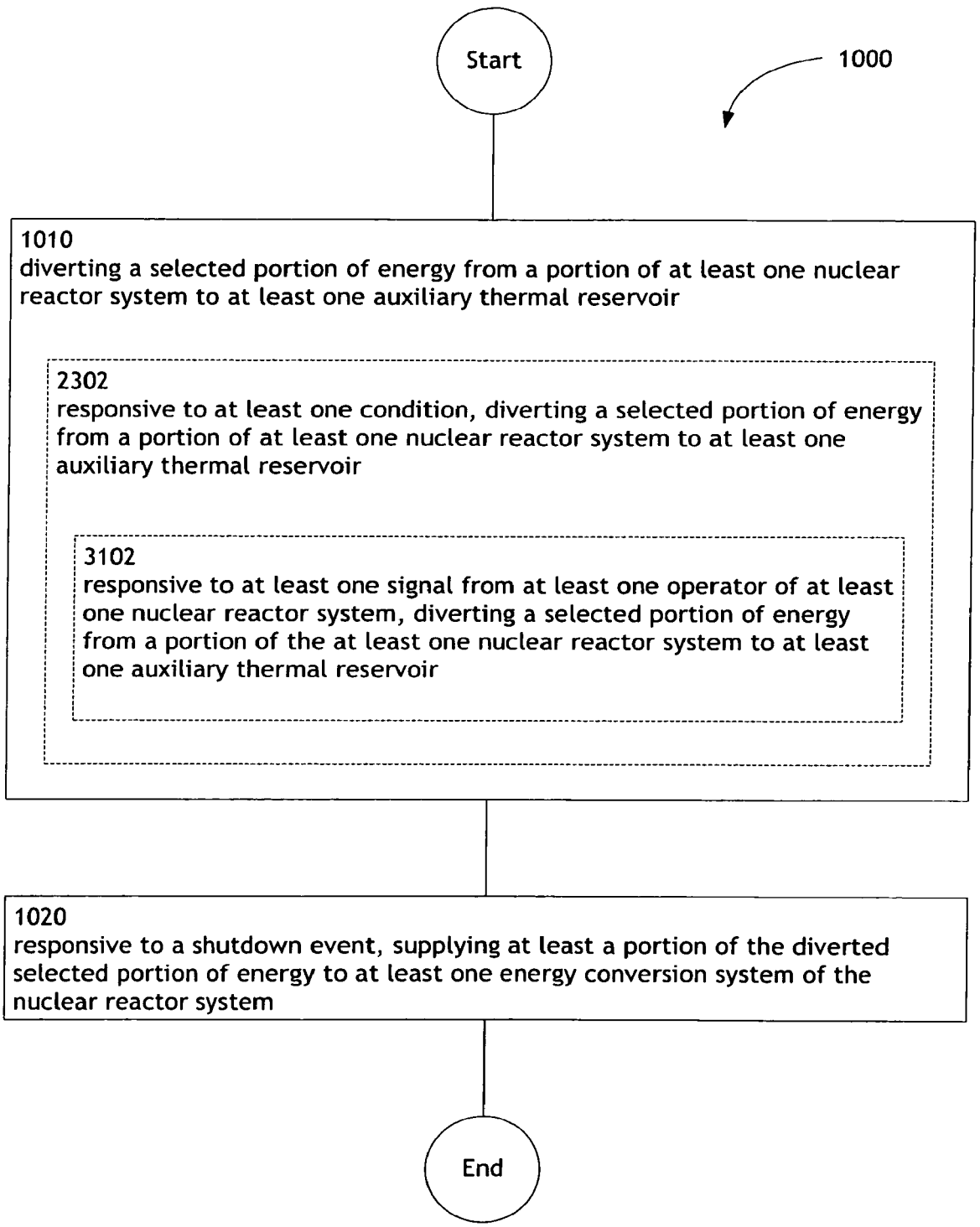

FIG. 31 illustrates alternative embodiments of the example operational flow 1000 of FIG. 10. FIG. 31 illustrates example embodiments where the diverting operation 1010 may include at least one additional operation. Additional operations may include an operation 3102.

Operation 3102 illustrates, responsive to at least one signal from at least one operator of at least one nuclear reactor system, diverting a selected portion of energy from a portion of the at least one nuclear reactor system to at least one auxiliary thermal reservoir. For example, as shown in FIGS. 1 through 9B, in response to at least one signal from an operator of the nuclear reactor system 101 and/or thermal reservoir system 112, the energy transfer system responsive to a signal (e.g., wireless or wireline signal) from an operator 814 (e.g., human user or human controlled programmable computer system) may initiate the transfer of energy from a portion of the nuclear reactor system 101 to the auxiliary thermal reservoir 112.

Figure 32:
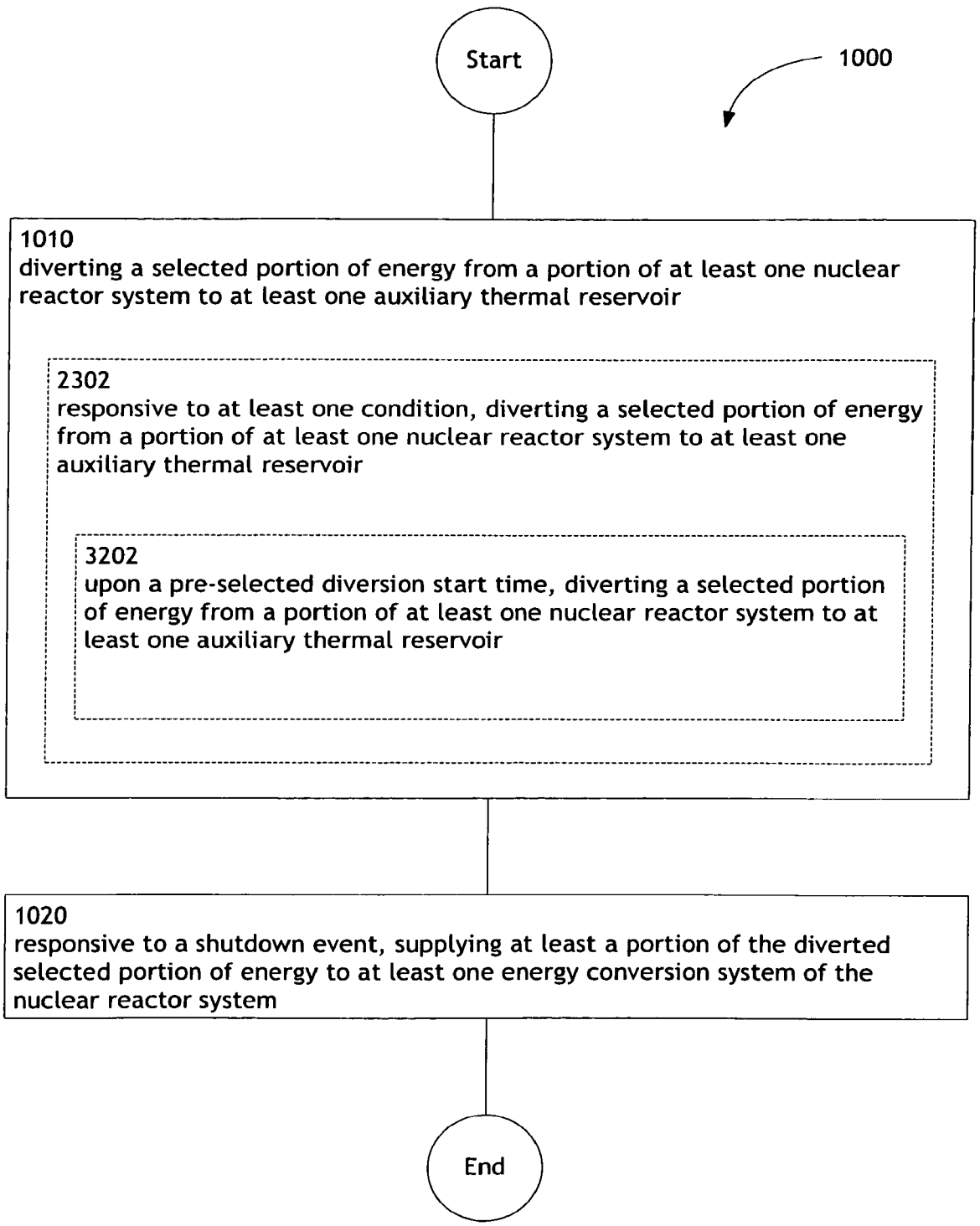

FIG. 32 illustrates alternative embodiments of the example operational flow 1000 of FIG. 10. FIG. 32 illustrates example embodiments where the diverting operation 1010 may include at least one additional operation. Additional operations may include an operation 3202.

Operation 3202 illustrates, upon a pre-selected diversion start time, diverting a selected portion of energy from a portion of at least one nuclear reactor system to at least one auxiliary thermal reservoir. For example, as shown in FIGS. 1 through 9B, upon a pre-selected diversion start time (e.g., absolute time or time of elapse relative to the occurrence of a pre-determined event), the energy transfer system responsive to a preselected diversion start time 816 may initiate the transfer of energy from a portion of the nuclear reactor system 101 to the auxiliary thermal reservoir 112.

Figure 33:
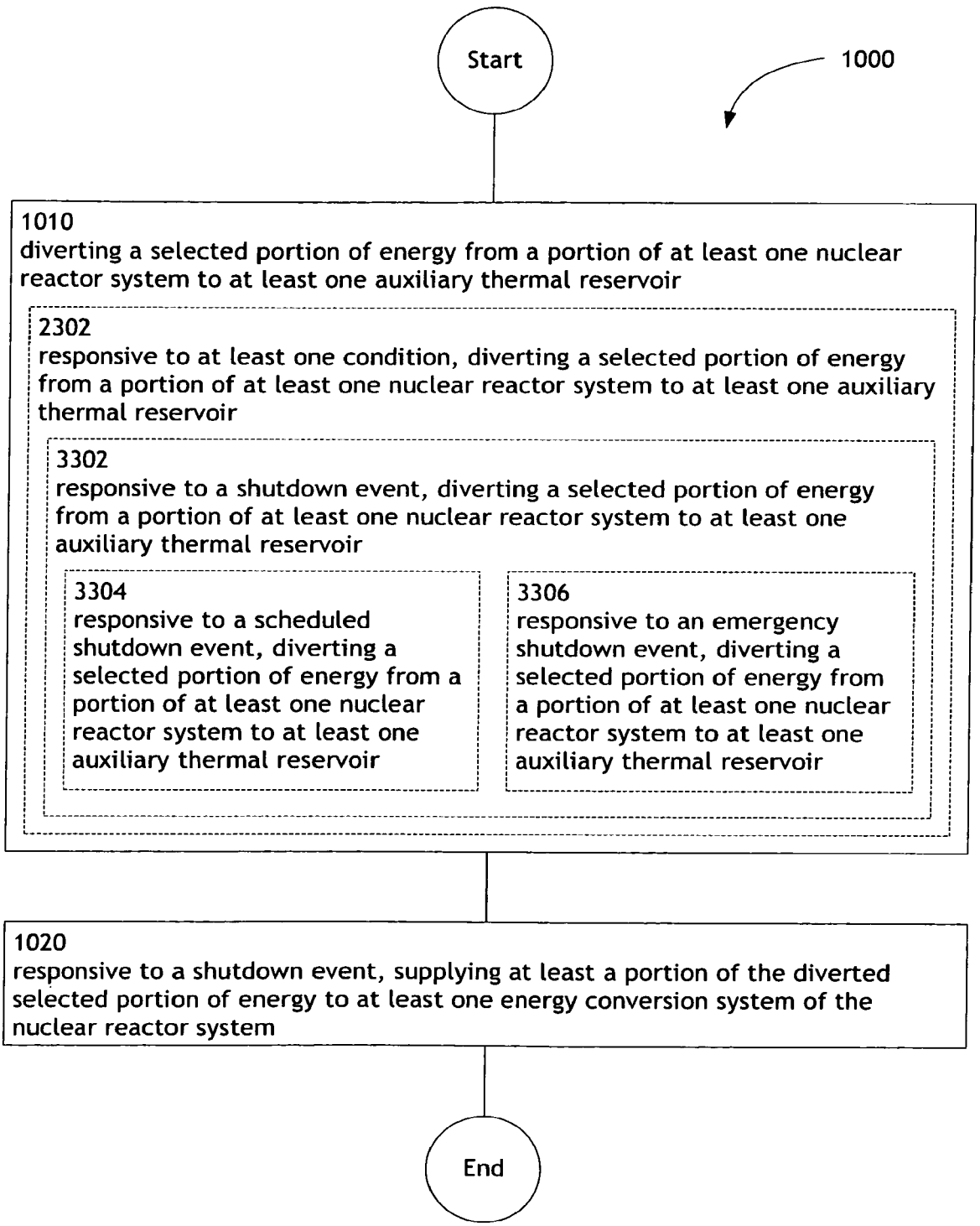

FIG. 33 illustrates alternative embodiments of the example operational flow 1000 of FIG. 10. FIG. 33 illustrates example embodiments where the diverting operation 1010 may include at least one additional operation. Additional operations may include an operation 3302, an operation 3304, and/or an operation 3306.

Operation 3302 illustrates, responsive to a shutdown event, diverting a selected portion of energy from a portion of at least one nuclear reactor system to at least one auxiliary thermal reservoir. For example, as shown in FIGS. 1 through 9B, in response to a shutdown event of the nuclear reactor system 101, the energy transfer system responsive to a shutdown event 828 may initiate the transfer of energy from a portion of the nuclear reactor system 101 to the auxiliary thermal reservoir 112.

Further, operation 3304 illustrates, responsive to a scheduled shutdown event, diverting a selected portion of energy from a portion of at least one nuclear reactor system to at least one auxiliary thermal reservoir. For example, as shown in FIGS. 1 through 9B, in response to a scheduled shutdown event (e.g., routine maintenance) of the nuclear reactor system 101, the energy transfer system responsive to a scheduled shutdown event 830 may initiate the transfer of energy from a portion of the nuclear reactor system 101 to the auxiliary thermal reservoir 112.

Further, operation 3306 illustrates, responsive to an emergency shutdown event, diverting a selected portion of energy from a portion of at least one nuclear reactor system to at least one auxiliary thermal reservoir. For example, as shown in FIGS. 1 through 9B, in response to an emergency shutdown event (e.g., SCRAM) of the nuclear reactor system 101, the energy transfer system responsive to an emergency shutdown event 832 may initiate the transfer of energy from a portion of the nuclear reactor system 101 to the auxiliary thermal reservoir 112.

Figure 34:
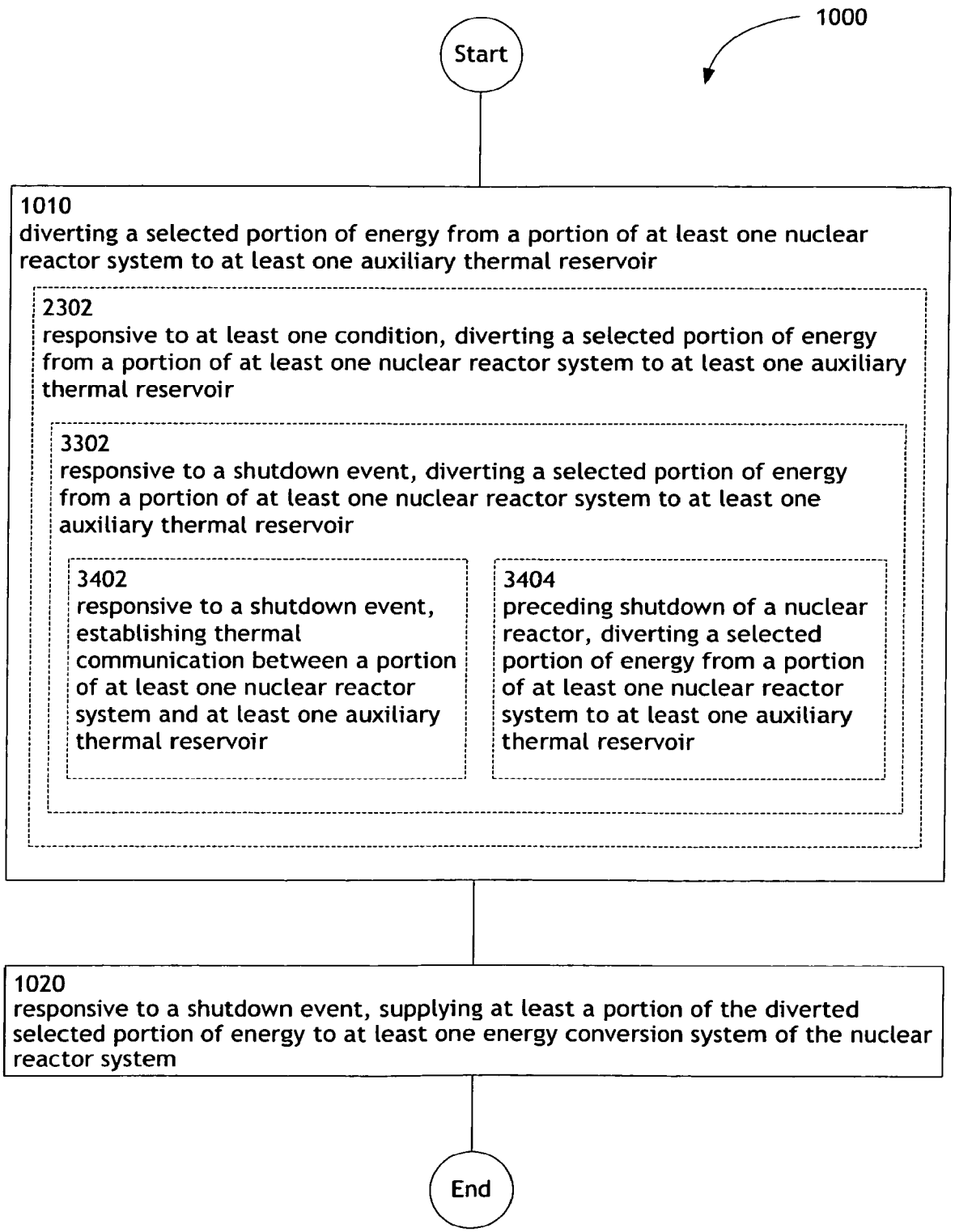

FIG. 34 illustrates alternative embodiments of the example operational flow 1000 of FIG. 10. FIG. 34 illustrates example embodiments where the diverting operation 1010 may include at least one additional operation. Additional operations may include an operation 3402, and/or an operation 3404.

Operation 3402 illustrates, responsive to a shutdown event, establishing thermal communication between a portion of at least one nuclear reactor system and at least one auxiliary thermal reservoir. For example, as shown in FIGS. 1 through 9B, in response to a shutdown event of the nuclear reactor system 101, the energy transfer system 104 may establish thermal communication between a portion of the nuclear reactor system (e.g., primary coolant system) and the auxiliary thermal reservoir 112.

Further, the operation 3404 illustrates, preceding shutdown of a nuclear reactor, diverting a selected portion of energy from a portion of at least one nuclear reactor system to at least one auxiliary thermal reservoir. For example, as shown in FIGS. 1 through 9B, prior to shutdown of the nuclear reactor 102, the energy transfer system responsive to a shutdown event 828 of the nuclear reactor system 101 may initiate the transfer of energy from a portion of the nuclear reactor system 101 to the auxiliary thermal reservoir 112.

Figure 35:
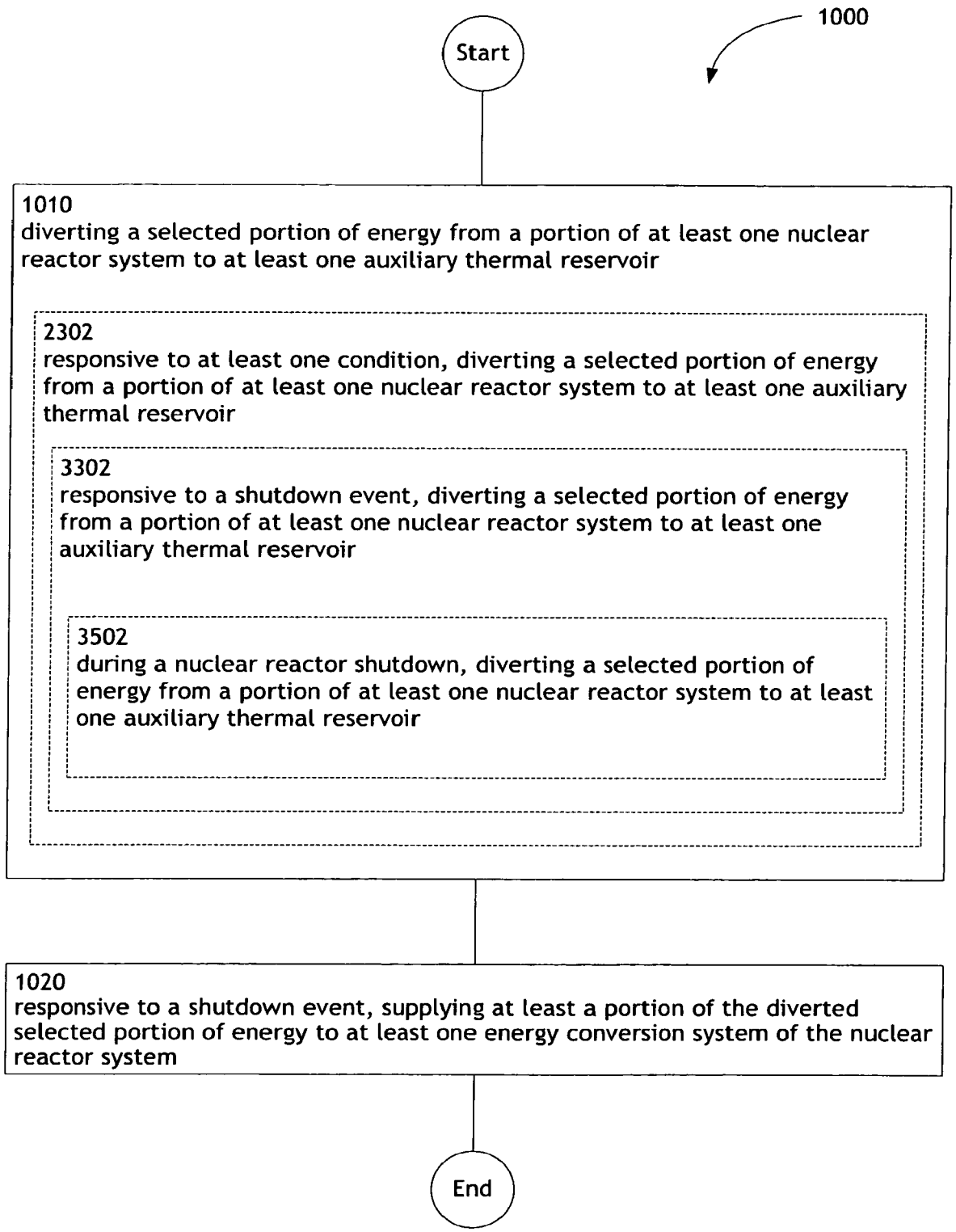

FIG. 35 illustrates alternative embodiments of the example operational flow 1000 of FIG. 10. FIG. 35 illustrates example embodiments where the diverting operation 1010 may include at least one additional operation. Additional operations may include an operation 3502.

Operation 3502 illustrates, during a nuclear reactor shutdown, diverting a selected portion of energy from a portion of at least one nuclear reactor system to at least one auxiliary thermal reservoir. For example, as shown in FIGS. 1 through 9B, during shutdown of the nuclear reactor 102, the energy transfer system responsive to a shutdown event 828 of the nuclear reactor system 101 may initiate the transfer of energy from a portion of the nuclear reactor system 101 to the auxiliary thermal reservoir 112.

Figure 36:
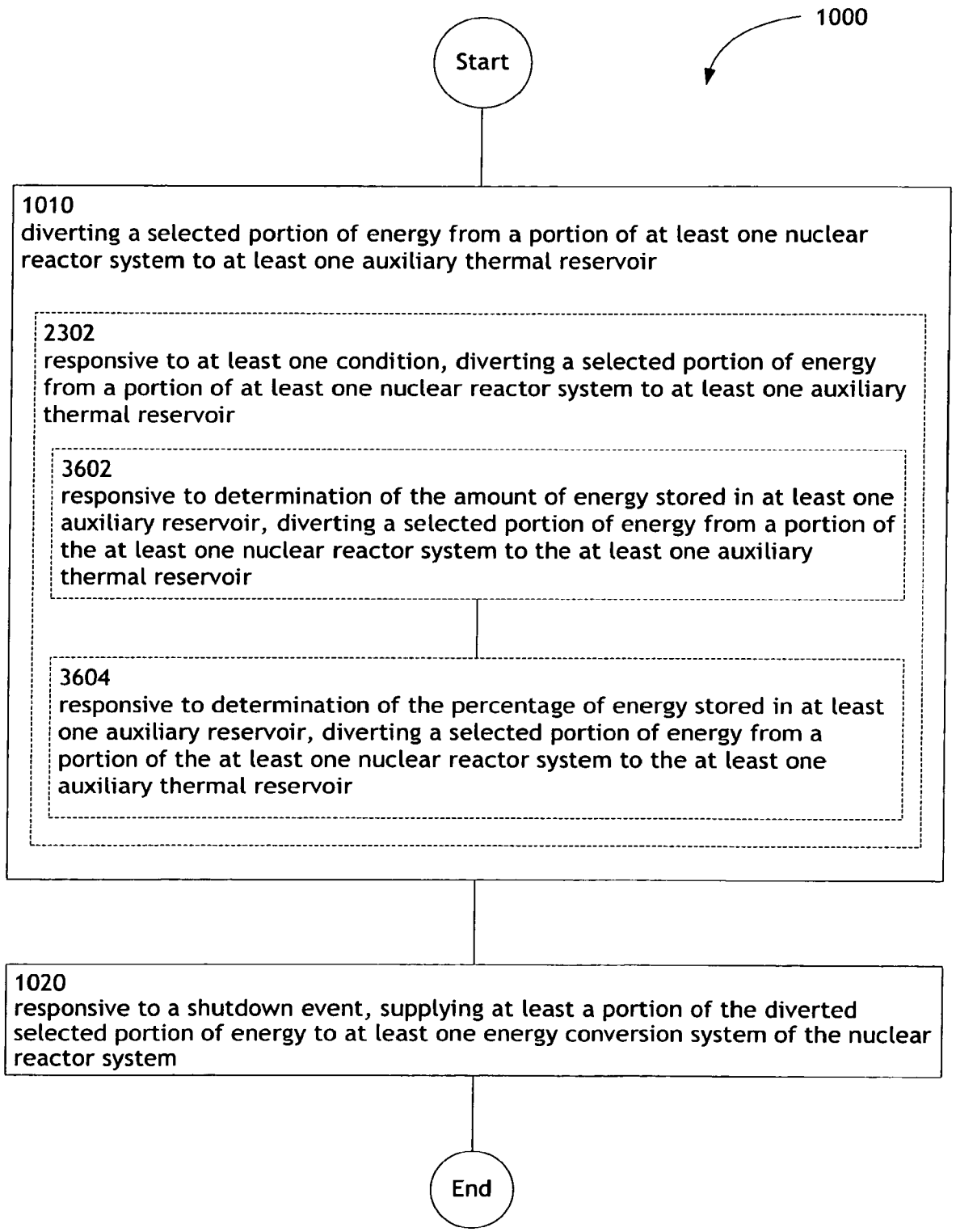

FIG. 36 illustrates alternative embodiments of the example operational flow 1000 of FIG. 10. FIG. 36 illustrates example embodiments where the diverting operation 1010 may include at least one additional operation. Additional operations may include an operation 3602, and/or an operation 3604.

Operation 3602 illustrates, responsive to determination of the amount of energy stored in at least one auxiliary reservoir, diverting a selected portion of energy from a portion of the at least one nuclear reactor system to the at least one auxiliary thermal reservoir. For example, as shown in FIGS. 1 through 9B, the energy transfer system responsive to determination of the amount of energy stored in the auxiliary thermal reservoir 836 may initiate the transfer of energy from a portion of the nuclear reactor system 101 to the auxiliary thermal reservoir 112.

Further, operation 3604 illustrates, responsive to determination of the percentage of energy stored in at least one auxiliary reservoir, diverting a selected portion of energy from a portion of the at least one nuclear reactor system to the at least one auxiliary thermal reservoir. For example, as shown in FIGS. 1 through 9B, the energy transfer system responsive to determination of the percentage of energy capacity used in the auxiliary thermal reservoir 838 may initiate the transfer of energy from a portion of the nuclear reactor system 101 to the auxiliary thermal reservoir 112.

Figure 37:
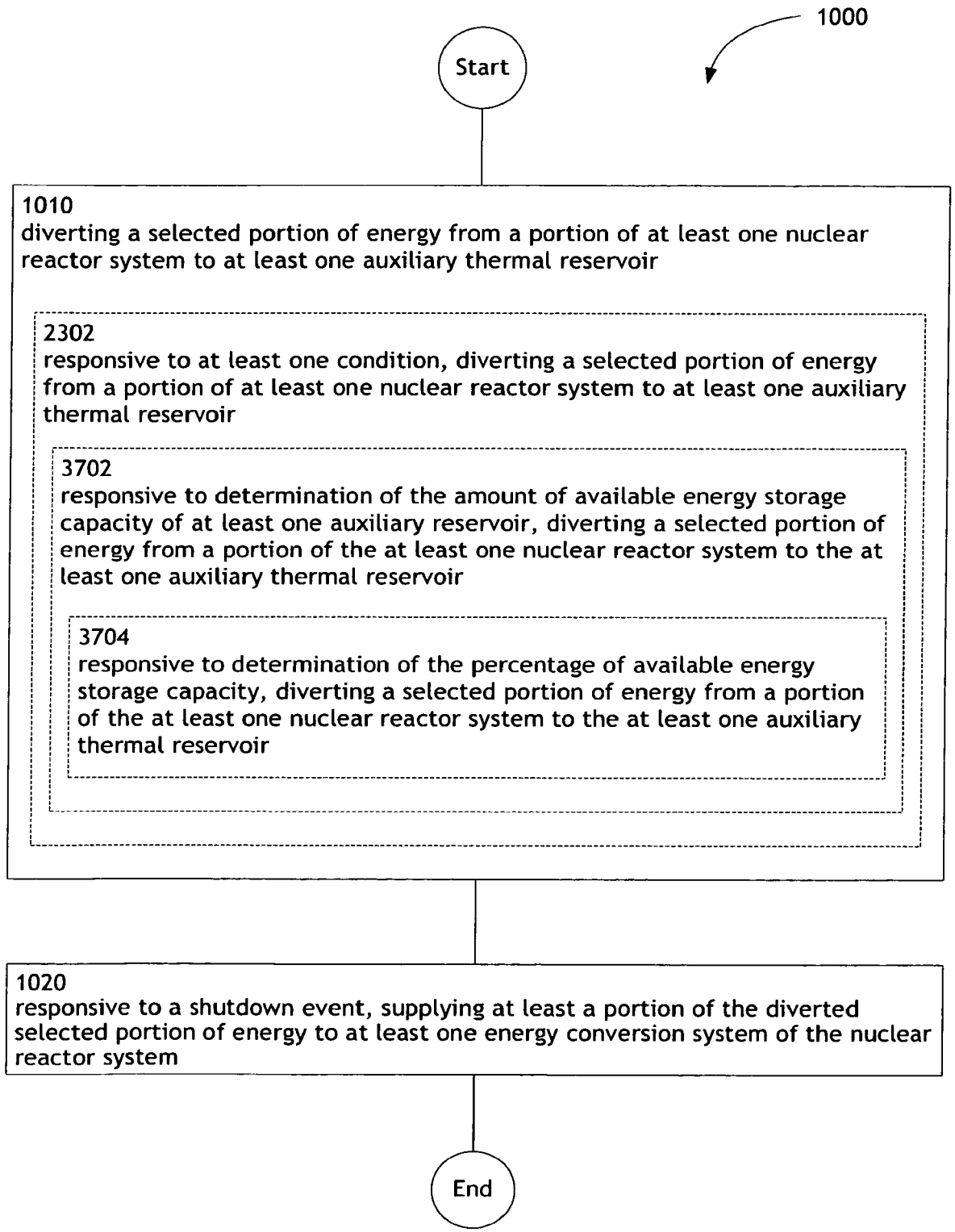

FIG. 37 illustrates alternative embodiments of the example operational flow 1000 of FIG. 10. FIG. 37 illustrates example embodiments where the diverting operation 1010 may include at least one additional operation. Additional operations may include an operation 3702, and/or an operation 3704.

Operation 3702 illustrates, responsive to determination of the amount of available energy storage capacity of at least one auxiliary reservoir, diverting a selected portion of energy from a portion of the at least one nuclear reactor system to the at least one auxiliary thermal reservoir. For example, as shown in FIGS. 1 through 9B, the energy transfer system responsive to determination of the amount of remaining energy capacity of the auxiliary thermal reservoir 840 may initiate the transfer of energy from a portion of the nuclear reactor system 101 to the auxiliary thermal reservoir 112.

Further, operation 3704 illustrates, responsive to determination of the percentage of available energy storage capacity, diverting a selected portion of energy from a portion of the at least one nuclear reactor system to the at least one auxiliary thermal reservoir. For example, as shown in FIGS. 1 through 9B, the energy transfer system responsive to determination of the percentage of remaining energy capacity of the auxiliary thermal reservoir 842 may initiate the transfer of energy from a portion of the nuclear reactor system 101 to the auxiliary thermal reservoir 112.

Figure 38:
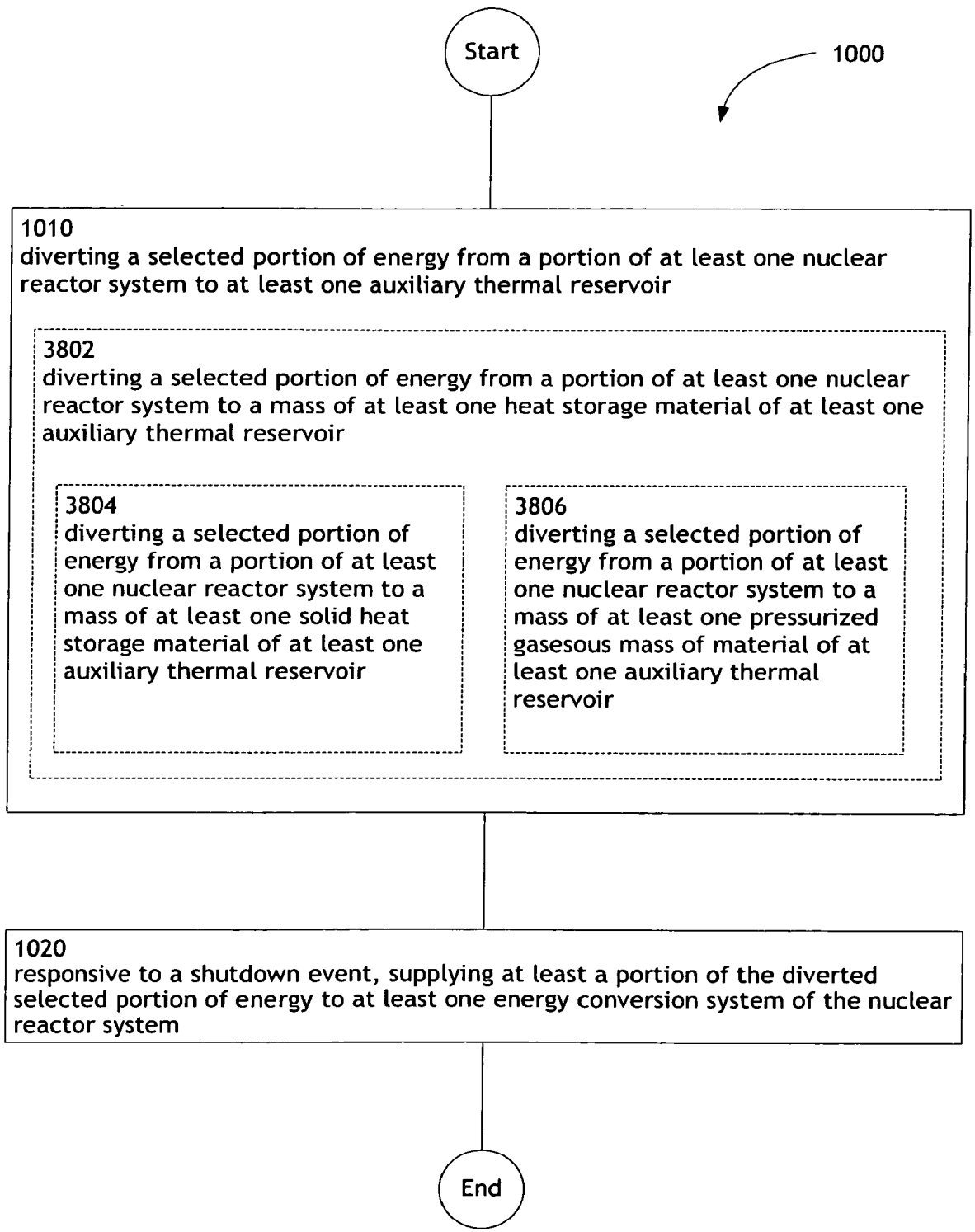
Figure 39A:
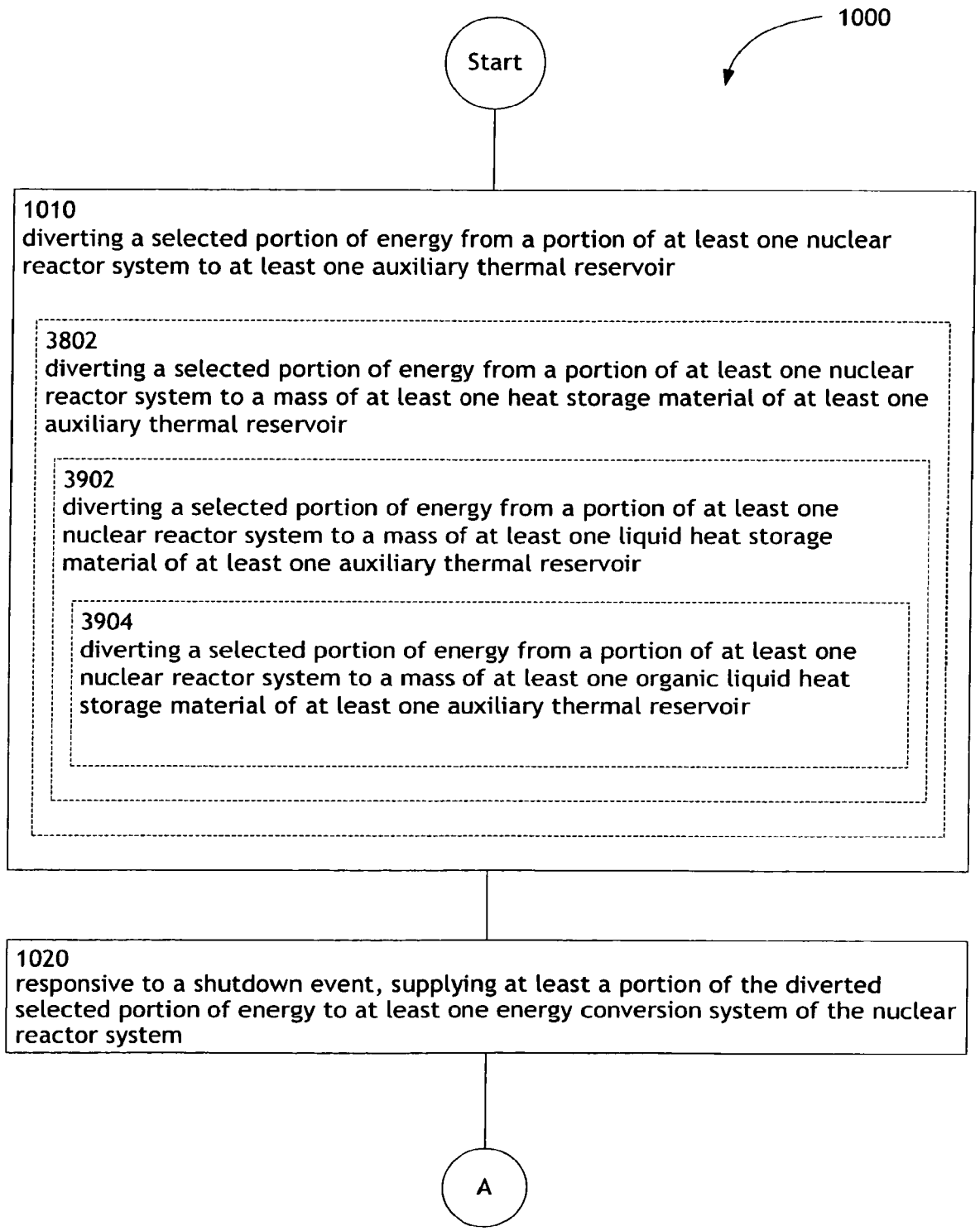
Figure 39C:
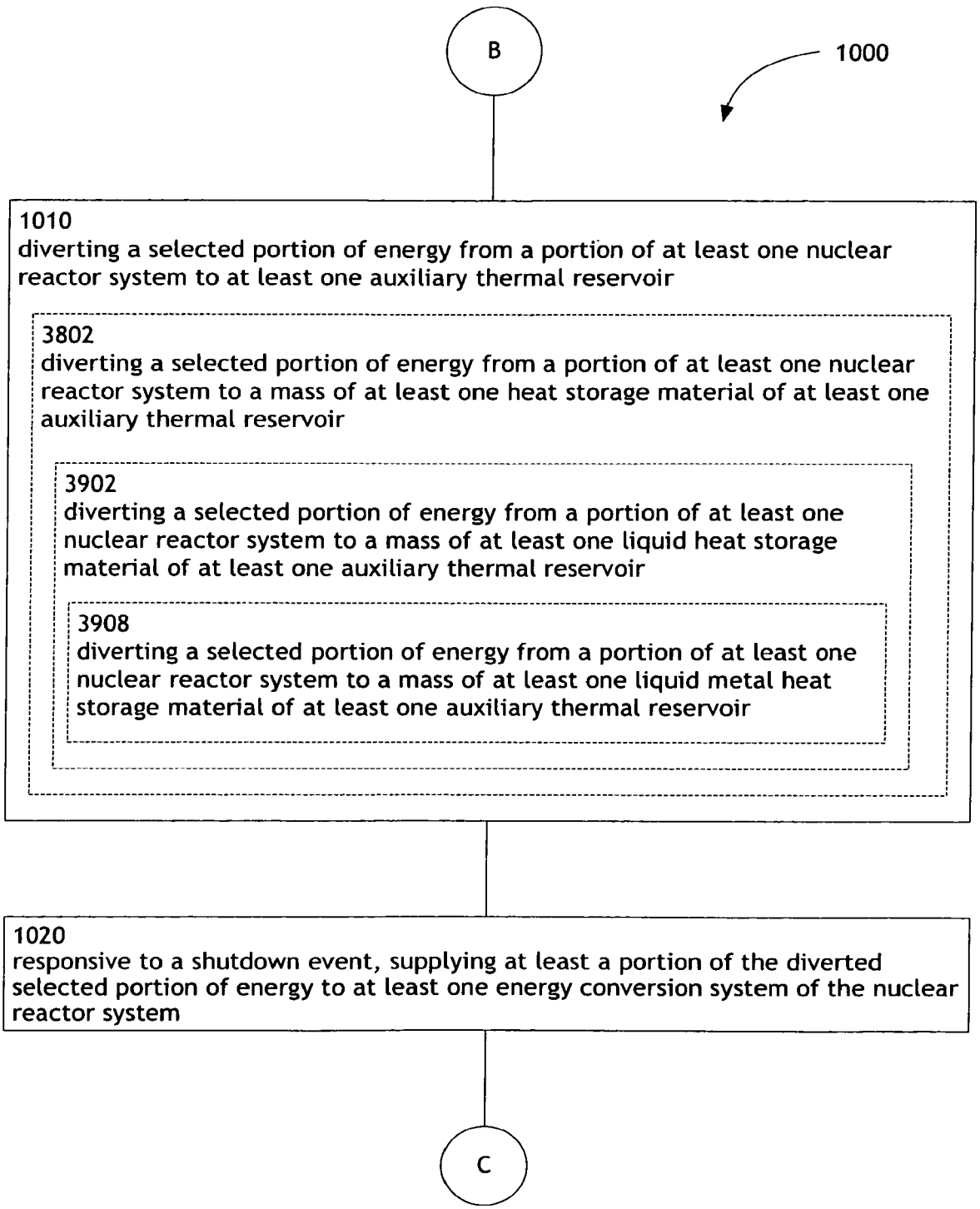
Figure 39D:
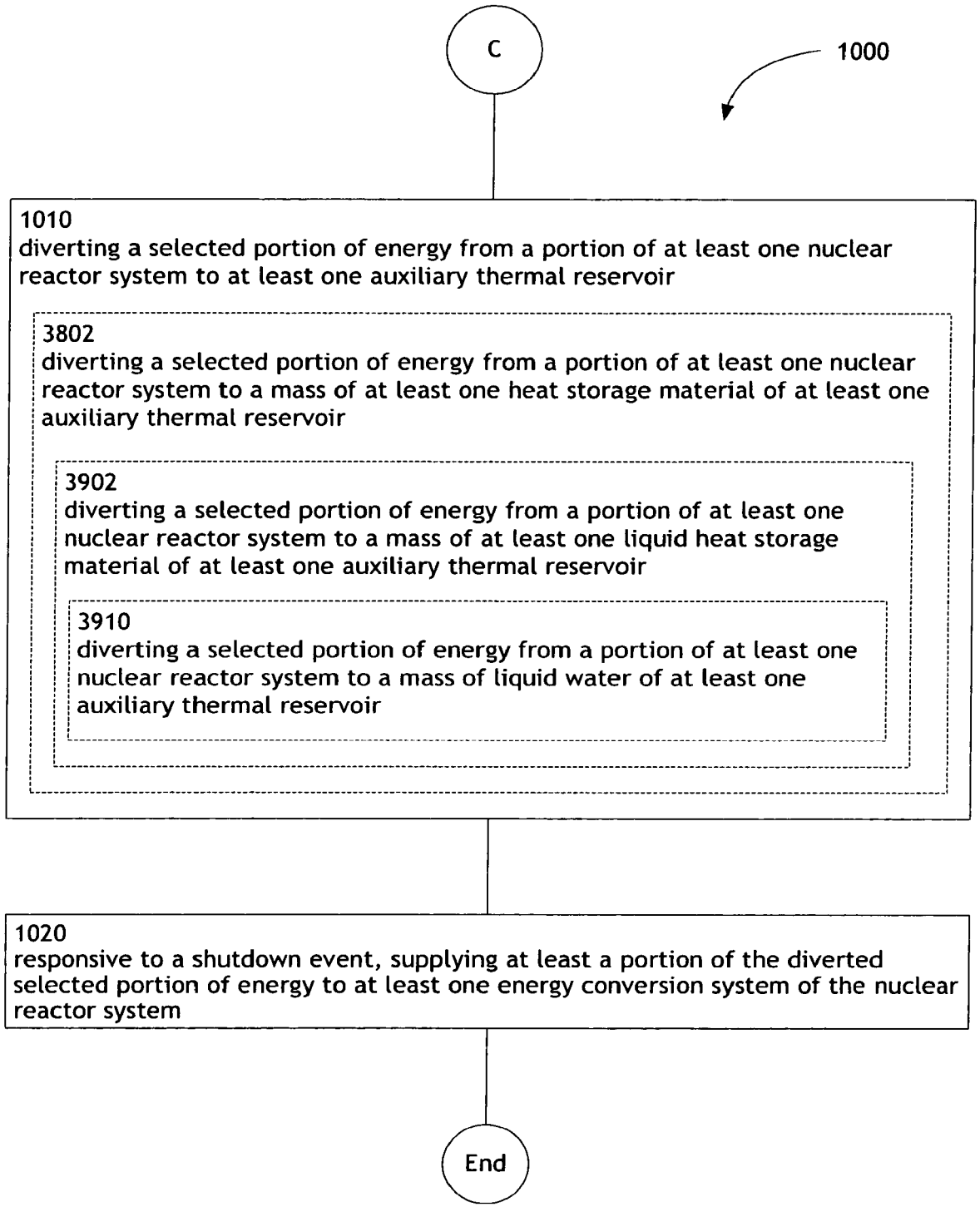

FIG. 38 illustrates alternative embodiments of the example operational flow 1000 of FIG. 10. FIG. 38 illustrates example embodiments where the diverting operation 1010 may include at least one additional operation. Additional operations may include an operation 3802, an operation 3804, and/or an operation 3806.

The operation 3802 illustrates diverting a selected portion of energy from a portion of at least one nuclear reactor system to a mass of at least one heat storage material of at least one auxiliary thermal reservoir. For example, as shown in FIGS. 1 through 9B, the energy transfer system 104 may transfer a selected portion of energy from a portion of the nuclear reactor system 101 to a mass of heat storage material 116 of the auxiliary thermal reservoir 112.

Further, operation 3804 illustrates diverting a selected portion of energy from a portion of at least one nuclear reactor system to a mass of at least one solid heat storage material of at least one auxiliary thermal reservoir. For example, as shown in FIGS. 1 through 9B, the energy transfer system 104 may transfer a selected portion of energy from a portion of the nuclear reactor system 101 to a mass of a solid heat storage material 414, such a solid object (e.g., solid ceramic object, solid metal object, or solid stone object) or a particulate solid (e.g., sand), of the auxiliary thermal reservoir 112.

Further, operation 3806 illustrates diverting a selected portion of energy from a portion of at least one nuclear reactor system to a mass of at least one pressurized gaseous mass of material of at least one auxiliary thermal reservoir. For example, as shown in FIGS. 1 through 9B, the energy transfer system 104 may transfer a selected portion of energy from a portion of the nuclear reactor system 101 to a mass of pressurized gaseous material 412 (e.g., pressurized helium or pressurized carbon dioxide) of the auxiliary thermal reservoir 112.

FIGS. 39A through 39D illustrate alternative embodiments of the example operational flow 1000 of FIG. 10. FIG. 39A through 39D illustrate example embodiments where the diverting operation 1010 may include at least one additional operation. Additional operations may include an operation 3902, an operation 3904, an operation 3906, and operation 3908 and/or an operation 3910.

Operation 3902 illustrates diverting a selected portion of energy from a portion of at least one nuclear reactor system to a mass of at least one liquid heat storage material of at least one auxiliary thermal reservoir. For example, as shown in FIGS. 1 through 9B, the energy transfer system 104 may transfer a selected portion of energy from a portion of the nuclear reactor system 101 to a mass of liquid material 402 (e.g., liquid metal, liquid metal salt, liquid organic, or liquid water) of the auxiliary thermal reservoir 112.

Further, operation 3904 illustrates diverting a selected portion of energy from a portion of at least one nuclear reactor system to a mass of at least one organic liquid heat storage material of at least one auxiliary thermal reservoir. For example, as shown in FIGS. 1 through 9B, the energy transfer system 104 may transfer a selected portion of energy from a portion of the nuclear reactor system 101 to a mass of liquid organic material 404 (e.g., diphenyl with diphenyl oxide) of the auxiliary thermal reservoir 112.

Further, operation 3906 illustrates diverting a selected portion of energy from a portion of at least one nuclear reactor system to a mass of at least one liquid metal salt heat storage material of at least one auxiliary thermal reservoir. For example, as shown in FIGS. 1 through 9B, the energy transfer system 104 may transfer a selected portion of energy from a portion of the nuclear reactor system 101 to a mass of liquid metal salt 406 (e.g., lithium fluoride) of the auxiliary thermal reservoir 112.

Further, operation 3908 illustrates diverting a selected portion of energy from a portion of at least one nuclear reactor system to a mass of at least one liquid metal heat storage material of at least one auxiliary thermal reservoir. For example, as shown in FIGS. 1 through 9B, the energy transfer system 104 may transfer a selected portion of energy from a portion of the nuclear reactor system 101 to a mass of liquid metal 408 (e.g., sodium) of the auxiliary thermal reservoir 112.

Further, operation 3910 illustrates diverting a selected portion of energy from a portion of at least one nuclear reactor system to a mass of liquid water of at least one auxiliary thermal reservoir. For example, as shown in FIGS. 1 through 9B, the energy transfer system 104 may transfer a selected portion of energy from a portion of the nuclear reactor system 101 to a mass of liquid water 410 of the auxiliary thermal reservoir 112.

Figure 40:
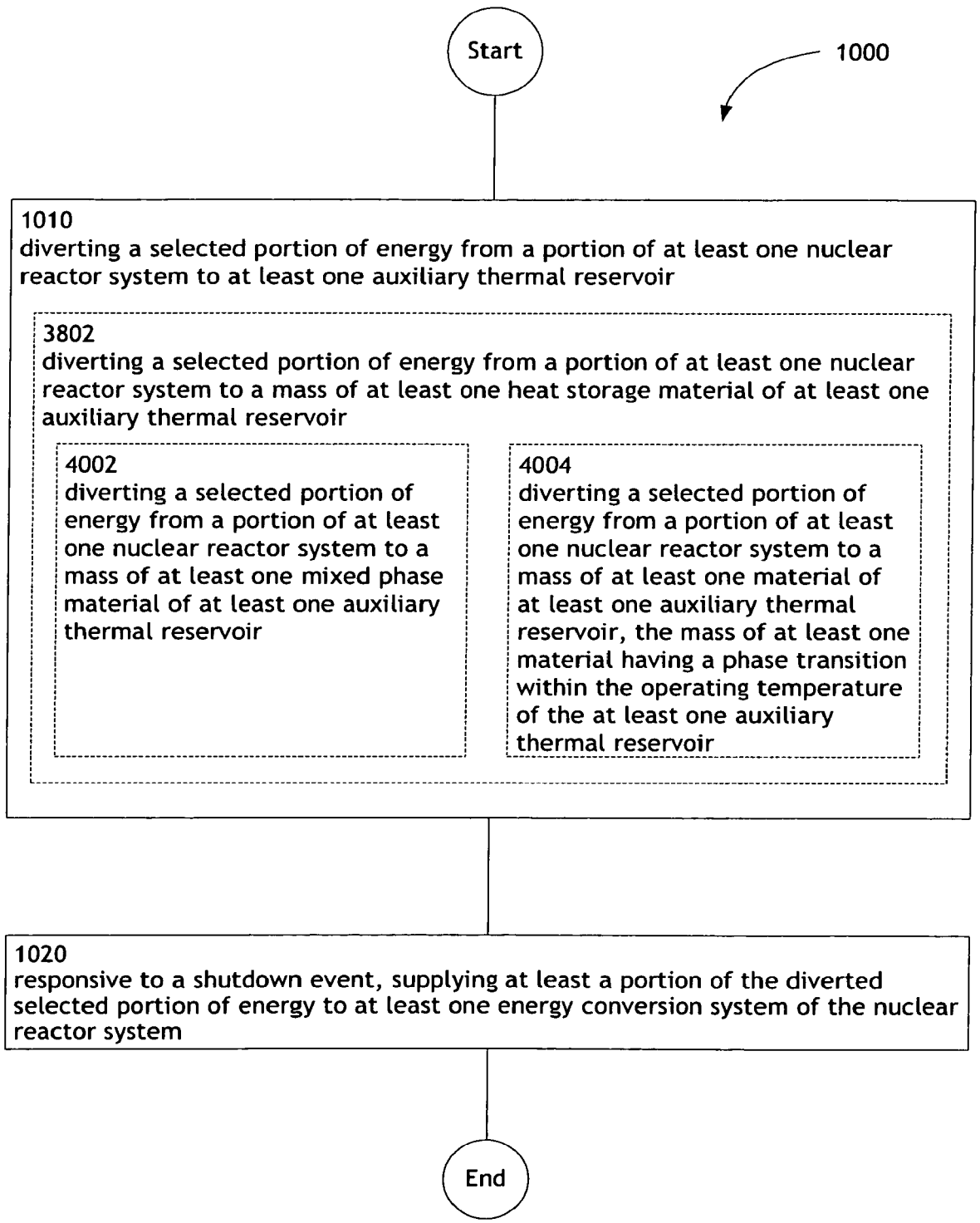

FIG. 40 illustrates alternative embodiments of the example operational flow 1000 of FIG. 10. FIG. 40 illustrates example embodiments where the diverting operation 1010 may include at least one additional operation. Additional operations may include an operation 4002, and/or an operation 4004.

Further, the operation 4002 illustrates diverting a selected portion of energy from a portion of at least one nuclear reactor system to a mass of at least one mixed phase material of at least one auxiliary thermal reservoir. For example, as shown in FIGS. 1 through 9B, the energy transfer system 104 may transfer a selected portion of energy from a portion of the nuclear reactor system 101 to a mass of a mixed phase material 420 (e.g., steam water-liquid water) of the auxiliary thermal reservoir 112.

Further, the operation 4004 illustrates diverting a selected portion of energy from a portion of at least one nuclear reactor system to a mass of at least one material of at least one auxiliary thermal reservoir, the mass of at least one material having a phase transition within the operating temperature of the at least one auxiliary thermal reservoir. For example, as shown in FIGS. 1 through 9B, the energy transfer system 104 may transfer a selected portion of energy from a portion of the nuclear reactor system 101 to a mass of a material having a phase transition within the operating temperature 422 of the auxiliary thermal reservoir 112.

Figure 41A:
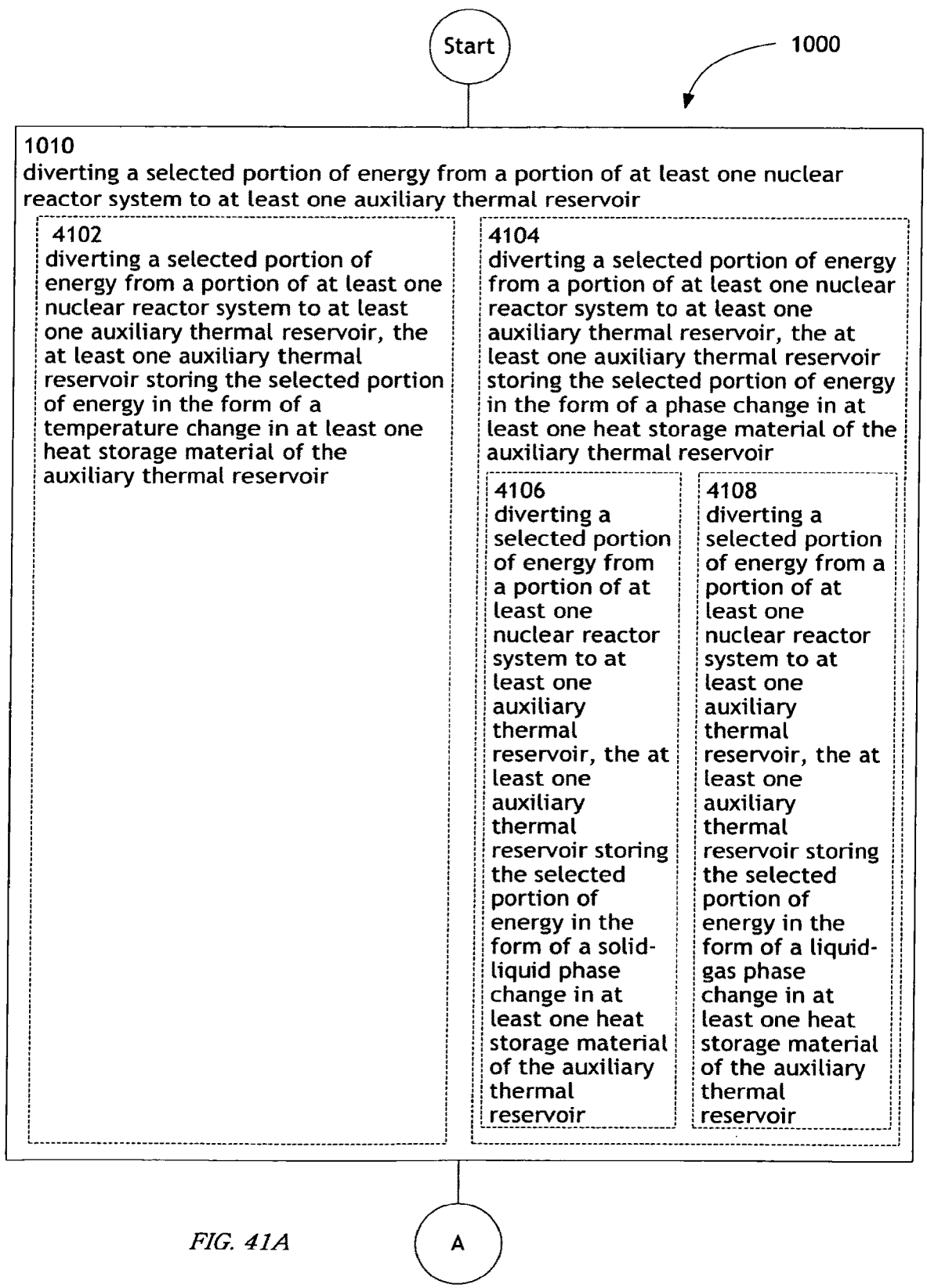
Figure 41B:
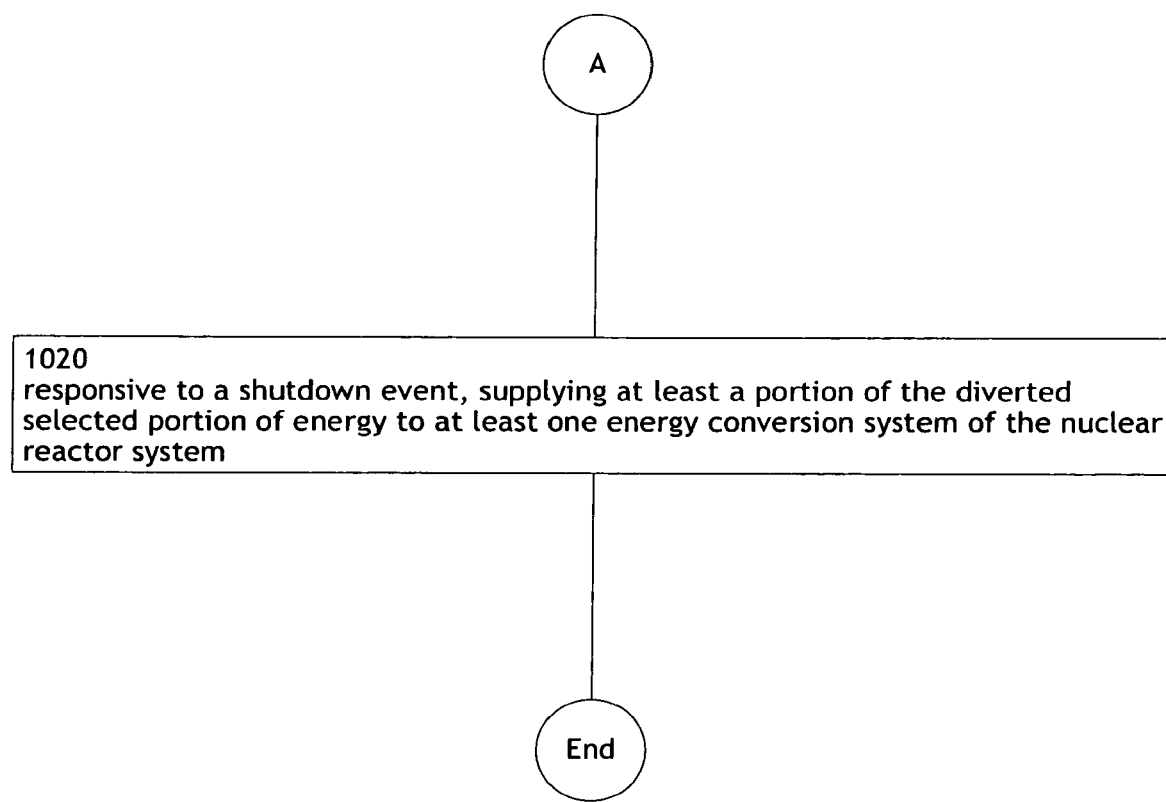

FIGS. 41A and 41B illustrate alternative embodiments of the example operational flow 1000 of FIG. 10. FIG. 41 illustrates example embodiments where the diverting operation 1010 may include at least one additional operation. Additional operations may include an operation 4102, an operation 4104, an operation 4106, and/or an operation 4108.

The operation 4102 illustrates diverting a selected portion of energy from a portion of at least one nuclear reactor system to at least one auxiliary thermal reservoir, the at least one auxiliary thermal reservoir storing the selected portion of energy in the form of a temperature change in at least one heat storage material of the auxiliary thermal reservoir. For example, as shown in FIGS. 1 through 9B, the energy transfer system 104 may transfer a selected portion of energy from a portion of the nuclear reactor system 101 to the auxiliary thermal reservoir 112, where the auxiliary thermal reservoir stores the energy in the form of an increase in temperature of the heat storage material 438. For instance, the energy transferred to the auxiliary thermal reservoir 112 may cause a liquid heat storage material 402 to increase in temperature from 100° C. to 200° C.

The operation 4104 illustrates diverting a selected portion of energy from a portion of at least one nuclear reactor system to at least one auxiliary thermal reservoir, the at least one auxiliary thermal reservoir storing the selected portion of energy in the form of a phase change in at least one heat storage material of the auxiliary thermal reservoir. For example, as shown in FIGS. 1 through 9B, the energy transfer system 104 may transfer a selected portion of energy from a portion of the nuclear reactor system 101 to the auxiliary thermal reservoir 112, where the auxiliary thermal reservoir stores the energy in the form of a phase change in the heat storage material 438. For instance, the energy transferred to the auxiliary thermal reservoir 112 may cause a solid reservoir material to phase change into a liquid reservoir material, where the energy is stored in the reservoir material as a latent heat of transformation.

Further, operation 4106 illustrates diverting a selected portion of energy from a portion of at least one nuclear reactor system to at least one auxiliary thermal reservoir, the at least one auxiliary thermal reservoir storing the selected portion of energy in the form of a solid-liquid phase change in at least one heat storage material of the auxiliary thermal reservoir. For example, as shown in FIGS. 1 through 9B, the energy transfer system 104 may transfer a selected portion of energy from a portion of the nuclear reactor system 101 to the auxiliary thermal reservoir 112, where the auxiliary thermal reservoir 112 stores the energy in the form of a solid-liquid phase change 440 (e.g., solid sodium-liquid sodium phase change).

Further, operation 4108 illustrates diverting a selected portion of energy from a portion of at least one nuclear reactor system to at least one auxiliary thermal reservoir, the at least one auxiliary thermal reservoir storing the selected portion of energy in the form of a liquid-gas phase change in at least one heat storage material of the auxiliary thermal reservoir. For example, as shown in FIGS. 1 through 9B, the energy transfer system 104 may transfer a selected portion of energy from a portion of the nuclear reactor system 101 to the auxiliary thermal reservoir 112, where the auxiliary thermal reservoir 112 stores the energy in the form of a liquid-gas phase change 442 (e.g., liquid water-steam water phase change).

Figure 42A:
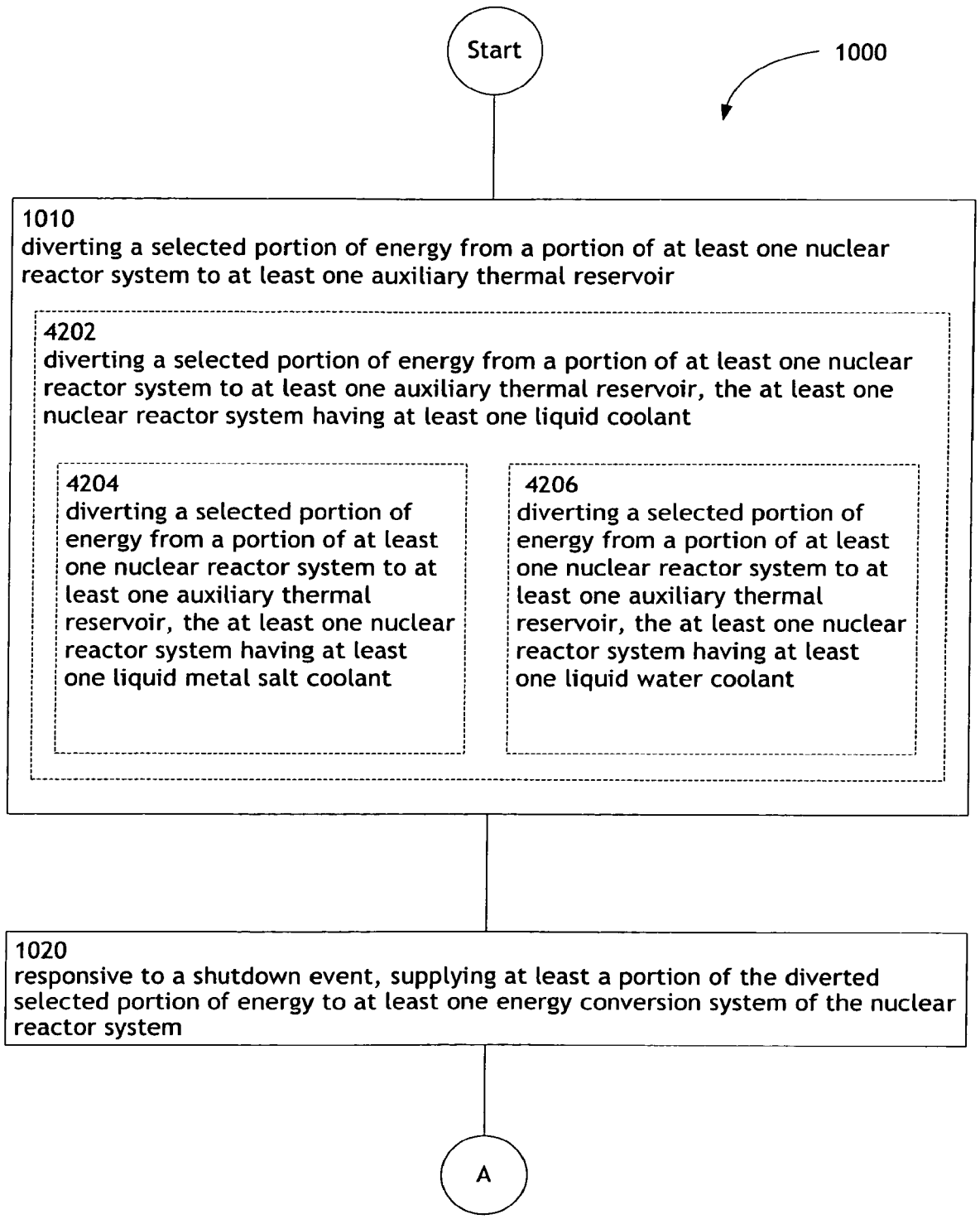
Figure 42B:
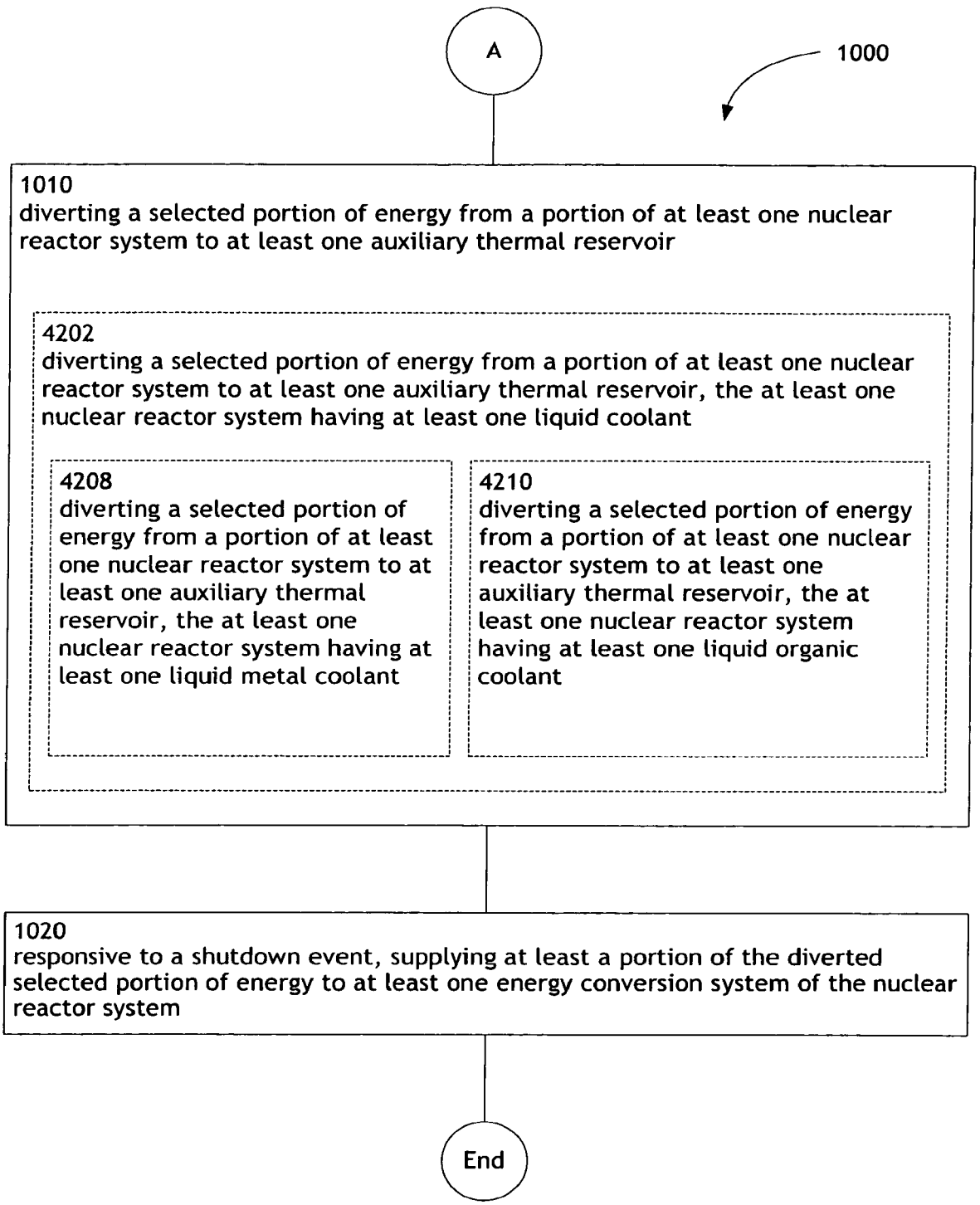

FIGS. 42A and 42B illustrate alternative embodiments of the example operational flow 1000 of FIG. 10. FIGS. 42A and 42B illustrate example embodiments where the diverting operation 1010 may include at least one additional operation. Additional operations may include an operation 4202, an operation 4204, an operation 4206, and operation 4208 and/or an operation 4210.

Operation 4202 illustrates diverting a selected portion of energy from a portion of at least one nuclear reactor system to at least one auxiliary thermal reservoir, the at least one nuclear reactor system having at least one liquid coolant. For example, as shown in FIGS. 1 through 9B, the energy transfer system 104 may transfer a selected portion of energy from a portion of a liquid cooled 212 nuclear reactor system 101 to the auxiliary thermal reservoir 112.

Further, operation 4204 illustrates diverting a selected portion of energy from a portion of at least one nuclear reactor system to at least one auxiliary thermal reservoir, the at least one nuclear reactor system having at least one liquid metal salt coolant. For example, as shown in FIGS. 1 through 9B, the energy transfer system 104 may transfer a selected portion of energy from a portion of a liquid metal salt (e.g., lithium fluoride or other fluoride salts) cooled 214 nuclear reactor system 101 to the auxiliary thermal reservoir 112.

Further, the operation 4206 illustrates diverting a selected portion of energy from a portion of at least one nuclear reactor system to at least one auxiliary thermal reservoir, the at least one nuclear reactor system having at least one liquid water coolant. For example, as shown in FIGS. 1 through 9B, the energy transfer system 104 may transfer a selected portion of energy from a portion of a liquid water cooled 220 nuclear reactor system 101 to the auxiliary thermal reservoir 112.

Further, the operation 4208 illustrates diverting a selected portion of energy from a portion of at least one nuclear reactor system to at least one auxiliary thermal reservoir, the at least one nuclear reactor system having at least one liquid metal coolant. For example, as shown in FIGS. 1 through 9B, the energy transfer system 104 may transfer a selected portion of energy from a portion of a liquid metal (e.g., liquid sodium or liquid lead) cooled 216 nuclear reactor system 101 to the auxiliary thermal reservoir 112.

Further, the operation 4210 illustrates diverting a selected portion of energy from a portion of at least one nuclear reactor system to at least one auxiliary thermal reservoir, the at least one nuclear reactor system having at least one liquid organic coolant. For example, as shown in FIGS. 1 through 9B, the energy transfer system 104 may transfer a selected portion of energy from a portion of a liquid organic (e.g., diphenyl with diphenyl oxide) cooled 218 nuclear reactor system 101 to the auxiliary thermal reservoir 112.

Figure 43:
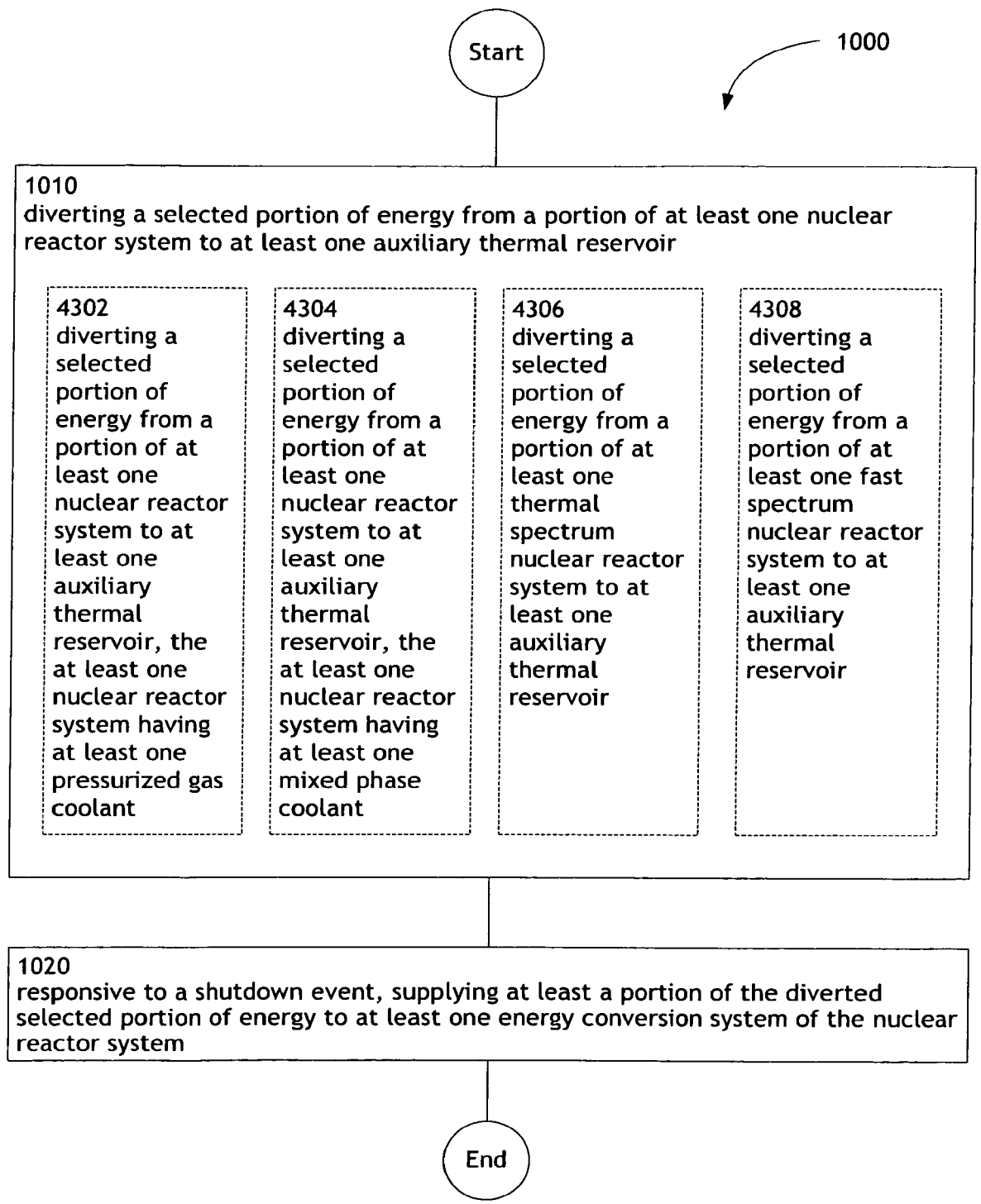

FIG. 43 illustrates alternative embodiments of the example operational flow 1000 of FIG. 10. FIG. 43 illustrates example embodiments where the diverting operation 1010 may include at least one additional operation. Additional operations may include an operation 4302, an operation 4304, an operation 4306, and/or an operation 4308.

Operation 4302 illustrates diverting a selected portion of energy from a portion of at least one nuclear reactor system to at least one auxiliary thermal reservoir, the at least one nuclear reactor system having at least one pressurized gas coolant. For example, as shown in FIGS. 1 through 9B, the energy transfer system 104 may transfer a selected portion of energy from a portion of a pressurized gas (e.g., pressurized helium or carbon dioxide) cooled 222 nuclear reactor system 101 to the auxiliary thermal reservoir 112.

The operation 4304 illustrates diverting a selected portion of energy from a portion of at least one nuclear reactor system to at least one auxiliary thermal reservoir, the at least one nuclear reactor system having at least one mixed phase coolant. For example, as shown in FIGS. 1 through 9B, the energy transfer system 104 may transfer a selected portion of energy from a portion of a mixed phase (e.g., liquid water-steam water) cooled 224 nuclear reactor system 101 to the auxiliary thermal reservoir 112.

The operation 4306 illustrates diverting a selected portion of energy from a portion of at least one thermal spectrum nuclear reactor system to at least one auxiliary thermal reservoir. For example, as shown in FIGS. 1 through 9B, the energy transfer system 104 may transfer a selected portion of energy produced by a thermal spectrum nuclear reactor 202 from the nuclear reactor system 101 to the auxiliary thermal reservoir 112.

Operation 4308 illustrates diverting a selected portion of energy from a portion of at least one fast spectrum nuclear reactor system to at least one auxiliary thermal reservoir. For example, as shown in FIGS. 1 through 9B, the energy transfer system 104 may transfer a selected portion of energy produced by a fast spectrum nuclear reactor 204 from the nuclear reactor system 101 to the auxiliary thermal reservoir 112.

Figure 44:
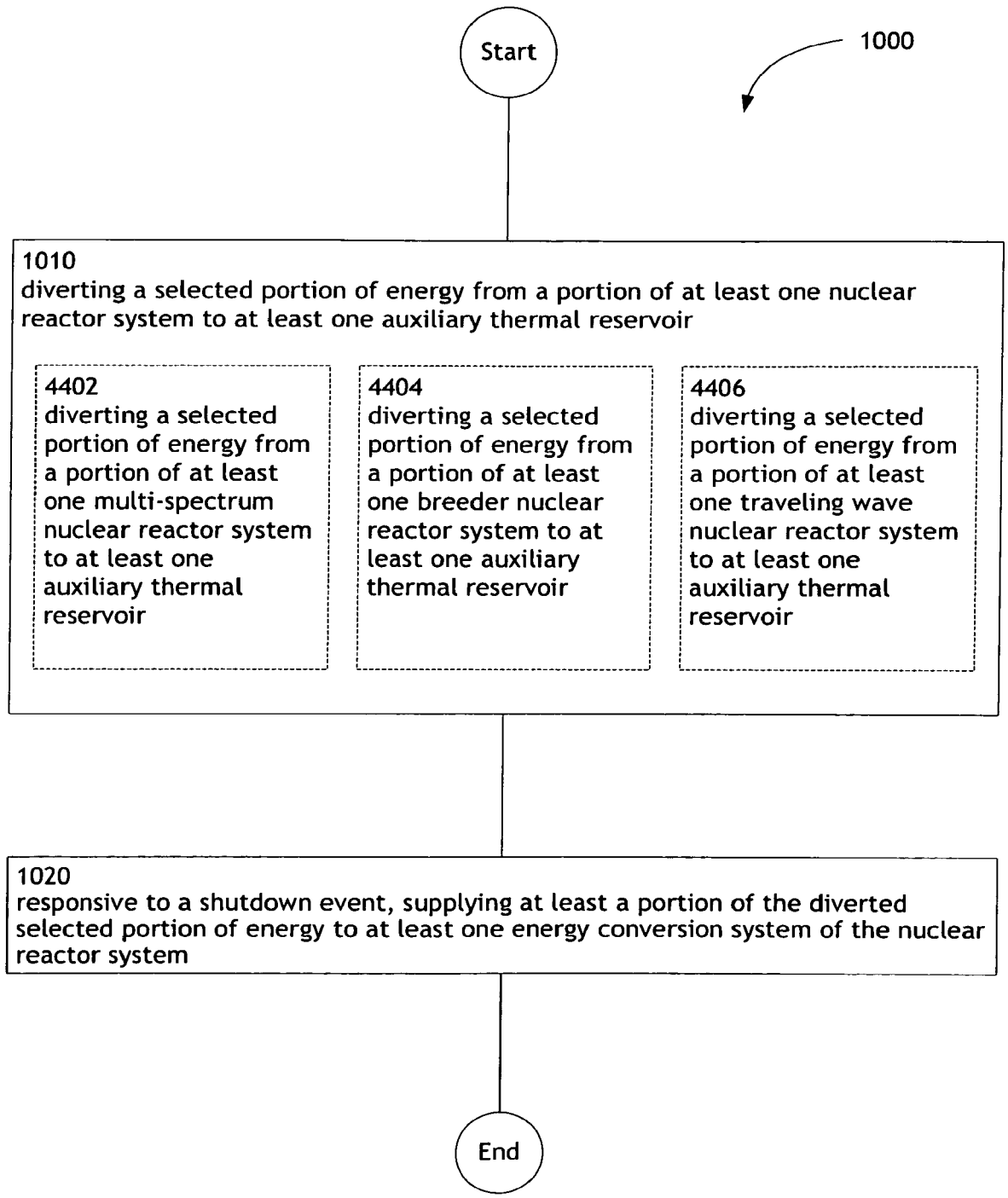

FIG. 44 illustrates alternative embodiments of the example operational flow 1000 of FIG. 10. FIG. 44 illustrates example embodiments where the diverting operation 1010 may include at least one additional operation. Additional operations may include an operation 4402, an operation 4404, and/or an operation 4406.

The operation 4402 illustrates diverting a selected portion of energy from a portion of at least one multi-spectrum nuclear reactor system to at least one auxiliary thermal reservoir. For example, as shown in FIGS. 1 through 9B, the energy transfer system 104 may transfer a selected portion of energy produced by a multi-spectrum nuclear reactor 206 from the nuclear reactor system 101 to the auxiliary thermal reservoir 112.

The operation 4404 illustrates diverting a selected portion of energy from a portion of at least one breeder nuclear reactor system to at least one auxiliary thermal reservoir. For example, as shown in FIGS. 1 through 9B, the energy transfer system 104 may transfer a selected portion of energy produced by a breeder nuclear reactor 208 from the nuclear reactor system 101 to the auxiliary thermal reservoir 112.

The operation 4406 illustrates diverting a selected portion of energy from a portion of at least one traveling wave nuclear reactor system to at least one auxiliary thermal reservoir. For example, as shown in FIGS. 1 through 9B, the energy transfer system 104 may transfer a selected portion of energy produced by a traveling wave nuclear reactor 210 from the nuclear reactor system 101 to the auxiliary thermal reservoir 112.

Figure 45:
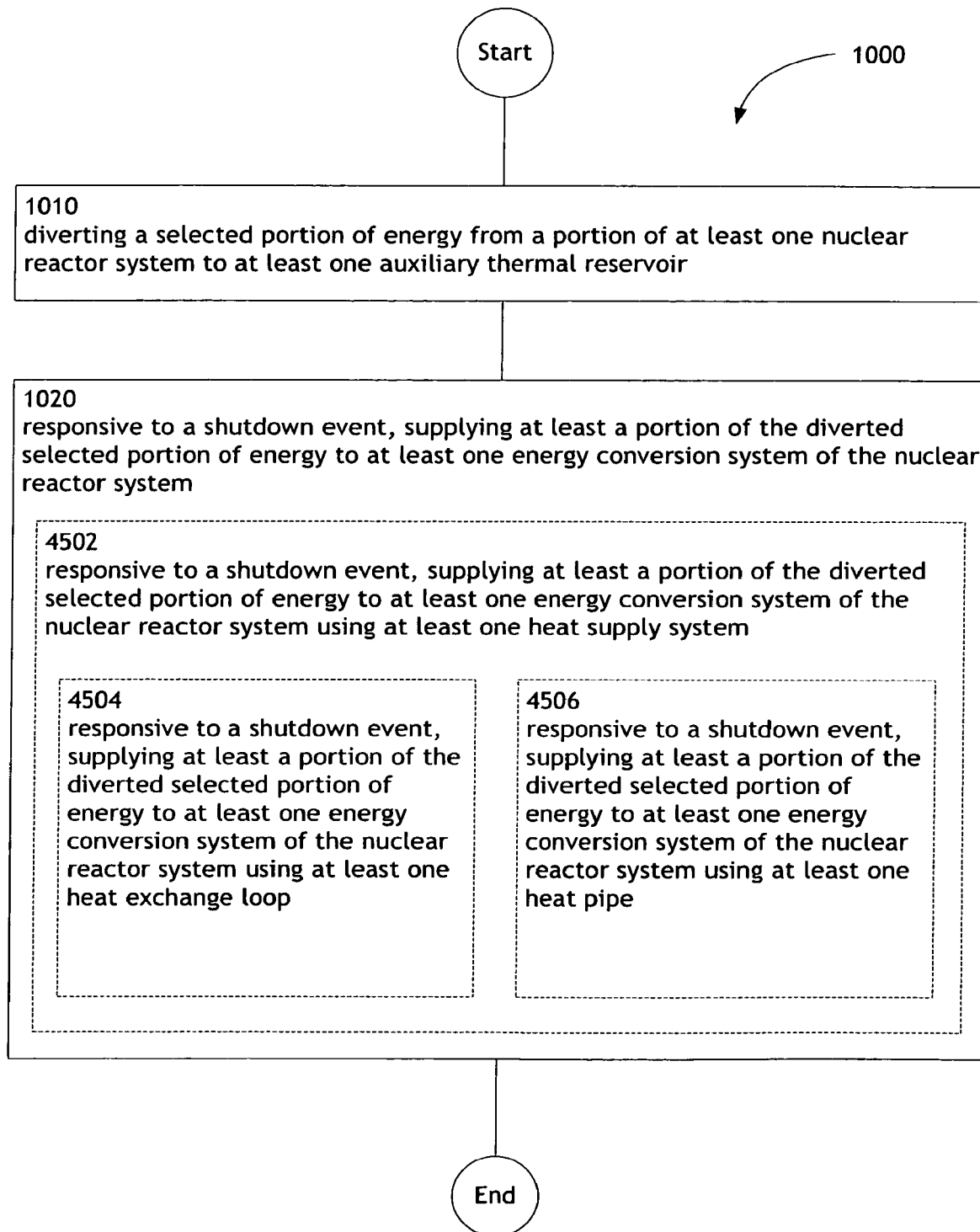

FIG. 45 illustrates alternative embodiments of the example operational flow 1000 of FIG. 10. FIG. 45 illustrates example embodiments where the supplying operation 1020 may include at least one additional operation. Additional operations may include an operation 4502, an operation 4504, and/or an operation 4506.

The operation 4502 illustrates, responsive to a shutdown event, supplying at least a portion of the diverted selected portion of energy to at least one energy conversion system of the nuclear reactor system using at least one heat supply system. For example, as shown in FIGS. 1 through 9B, a heat supply system responsive to a shutdown event 114 of the nuclear reactor system may supply a portion of the thermal energy stored in the auxiliary thermal reservoir 112 to an energy conversion system 110 of the nuclear reactor system 101.

Further, operation 4504 illustrates, responsive to a shutdown event, supplying at least a portion of the diverted selected portion of energy to at least one energy conversion system of the nuclear reactor system using at least one heat exchange loop. For example, as shown in FIGS. 1 through 9B, a heat supply system responsive to a shutdown event 114 of the nuclear reactor system may supply a portion of the thermal energy stored in the auxiliary thermal reservoir 112 to an energy conversion system 110 of the nuclear reactor system 101 via a heat exchange loop 602.

Further, operation 4506 illustrates, responsive to a shutdown event, supplying at least a portion of the diverted selected portion of energy to at least one energy conversion system of the nuclear reactor system using at least one heat pipe. For example, as shown in FIGS. 1 through 9B, a heat supply system responsive to a shutdown event 114 of the nuclear reactor system may supply a portion of the thermal energy stored in the auxiliary thermal reservoir 112 to an energy conversion system 110 of the nuclear reactor system 101 via a heat pipe 604.

Figure 46:
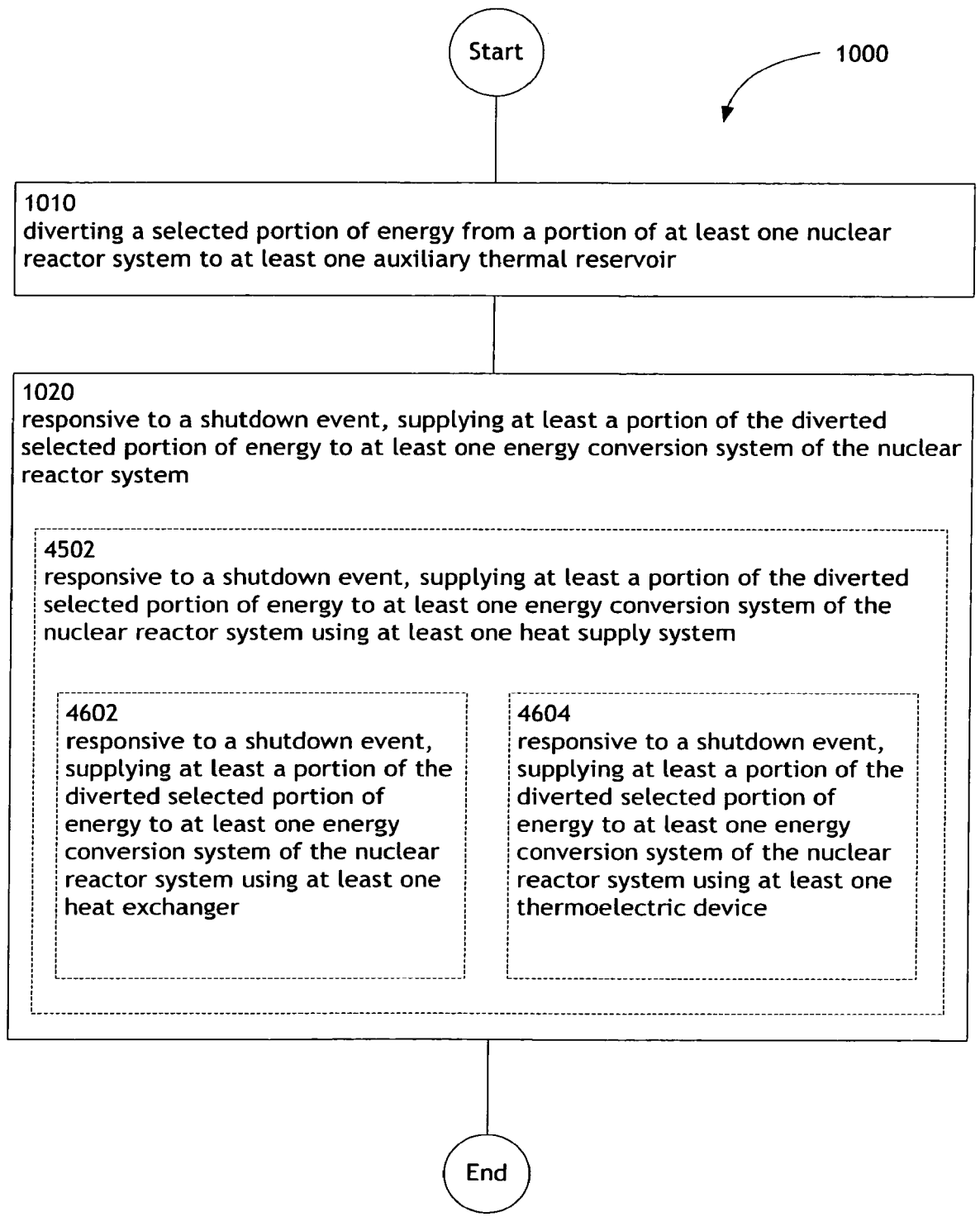

FIG. 46 illustrates alternative embodiments of the example operational flow 1000 of FIG. 10. FIG. 46 illustrates example embodiments where the supplying operation 1020 may include at least one additional operation. Additional operations may include an operation 4602, and/or an operation 4604.

Further, the operation 4602 illustrates, responsive to a shutdown event, supplying at least a portion of the diverted selected portion of energy to at least one energy conversion system of the nuclear reactor system using at least one heat exchanger. For example, as shown in FIGS. 1 through 9B, a heat supply system responsive to a shutdown event 114 of the nuclear reactor system may supply a portion of the thermal energy stored in the auxiliary thermal reservoir 112 to an energy conversion system 110 of the nuclear reactor system 101 via a heat exchanger 606. For instance, a first portion of the heat exchanger may be in thermal communication with the auxiliary thermal reservoir 112, which the second portion of the heat exchanger may be in thermal communication with an energy conversion system 110 of the nuclear reactor system 101.

Further, operation 4604 illustrates, responsive to a shutdown event, supplying at least a portion of the diverted selected portion of energy to at least one energy conversion system of the nuclear reactor system using at least one thermoelectric device. For example, as shown in FIGS. 1 through 9B, a heat supply system responsive to a shutdown event 114 of the nuclear reactor system may supply a portion of the thermal energy stored in the auxiliary thermal reservoir 112 to an energy conversion system 110 of the nuclear reactor system 101 via a thermoelectric device 608 (e.g., semiconductor-semiconductor thermoelectric junction). For instance, a first portion of the thermoelectric device may be in thermal communication with the auxiliary thermal reservoir 112 and the second portion of the thermoelectric device may be in thermal communication with a heat sink (e.g., environmental heat sink) of the nuclear reactor system 101.

Figure 47:
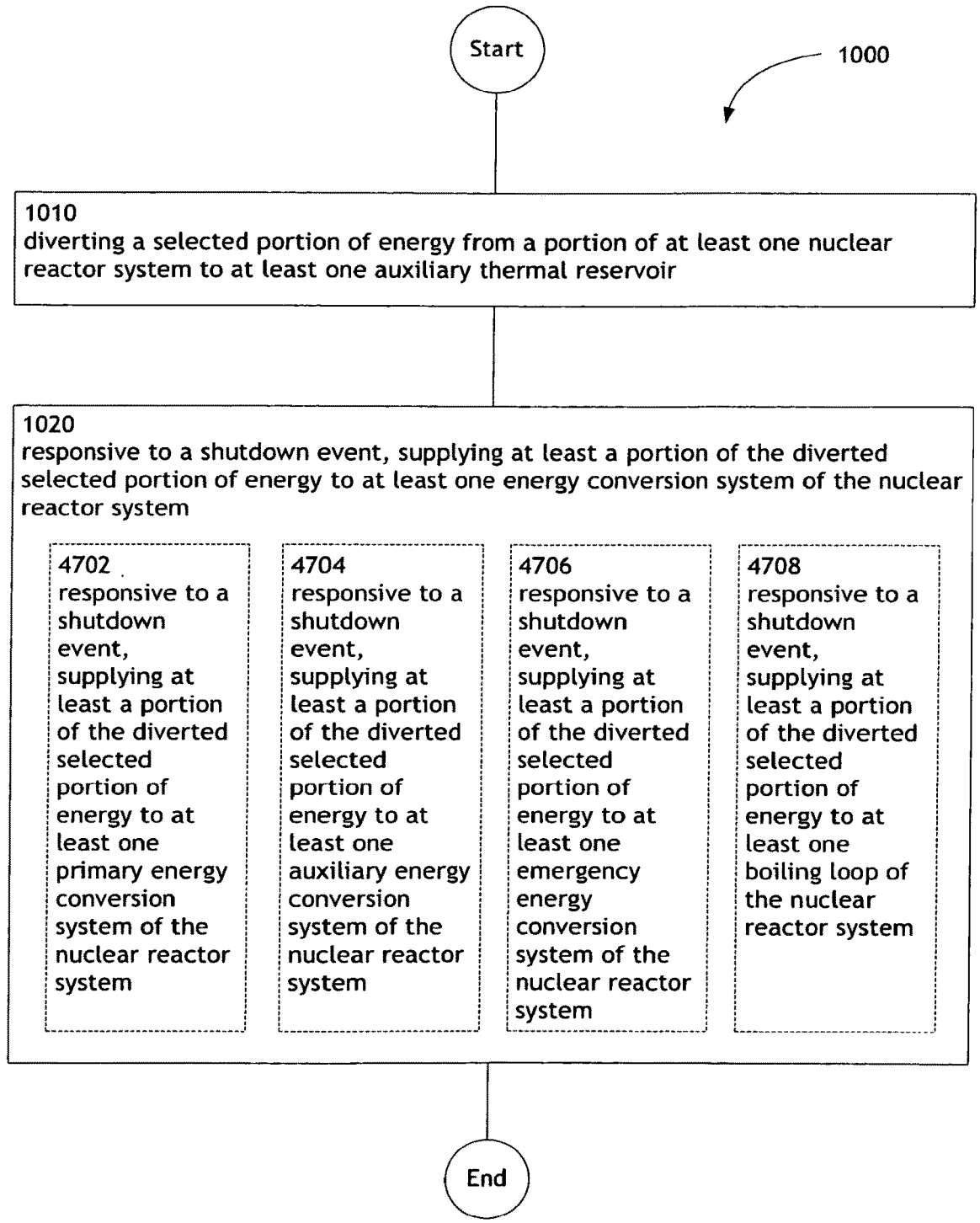

FIG. 47 illustrates alternative embodiments of the example operational flow 1000 of FIG. 10. FIG. 47 illustrates example embodiments where the supplying operation 1020 may include at least one additional operation. Additional operations may include an operation 4702, an operation 4704, an operation 4706, and/or an operation 4708.

The operation 4702 illustrates, responsive to a shutdown event, supplying at least a portion of the diverted selected portion of energy to at least one primary energy conversion system of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to a primary energy conversion system 302 (e.g., energy conversion system coupled to the primary boiling loop) of the nuclear reactor system 101.

The operation 4704 illustrates, responsive to a shutdown event, supplying at least a portion of the diverted selected portion of energy to at least one auxiliary energy conversion system of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to an auxiliary energy conversion system 304 (e.g., energy conversion system coupled to a non-primary boiling) of the nuclear reactor system 101.

The operation 4706 illustrates, responsive to a shutdown event, supplying at least a portion of the diverted selected portion of energy to at least one emergency energy conversion system of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to an emergency energy conversion system 306 (e.g., energy conversion system supplying electric power to various operation systems of the nuclear reactor system) of the nuclear reactor system 101.

The operation 4708 illustrates, responsive to a shutdown event, supplying at least a portion of the diverted selected portion of energy to at least one boiling loop of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to a boiling loop 322 of the nuclear reactor system 101.

Figure 48:
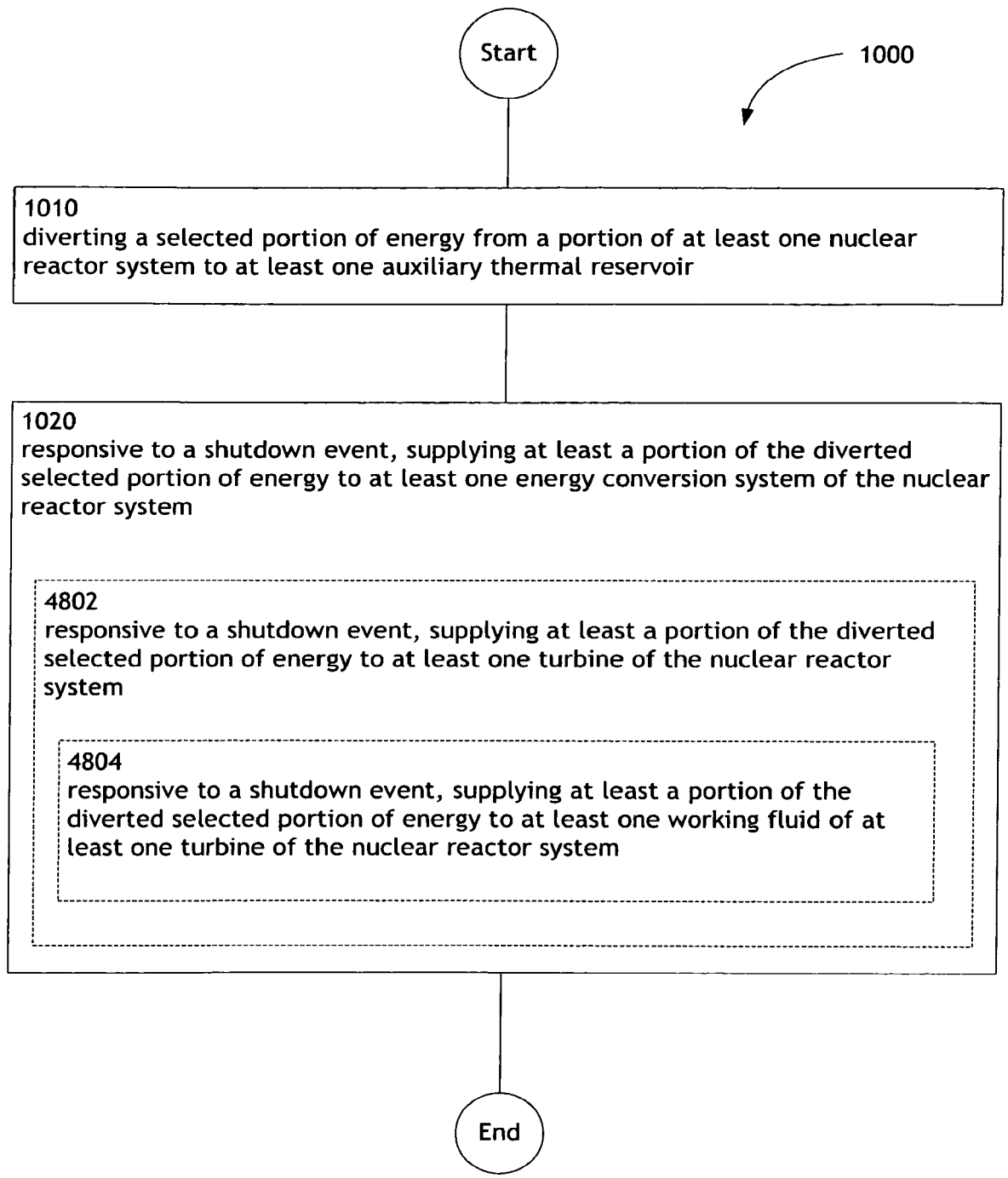

FIG. 48 illustrates alternative embodiments of the example operational flow 1000 of FIG. 10. FIG. 48 illustrates example embodiments where the supplying operation 1020 may include at least one additional operation. Additional operations may include an operation 4802, and/or an operation 4804.

Operation 4802 illustrates, responsive to a shutdown event, supplying at least a portion of the diverted selected portion of energy to at least one turbine of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to a turbine 312 of the nuclear reactor system 101.

Further, the operation 4804 illustrates, responsive to a shutdown event, supplying at least a portion of the diverted selected portion of energy to at least one working fluid of at least one turbine of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to the working fluid 320 of a turbine 312 of the nuclear reactor system 101.

Figure 49:
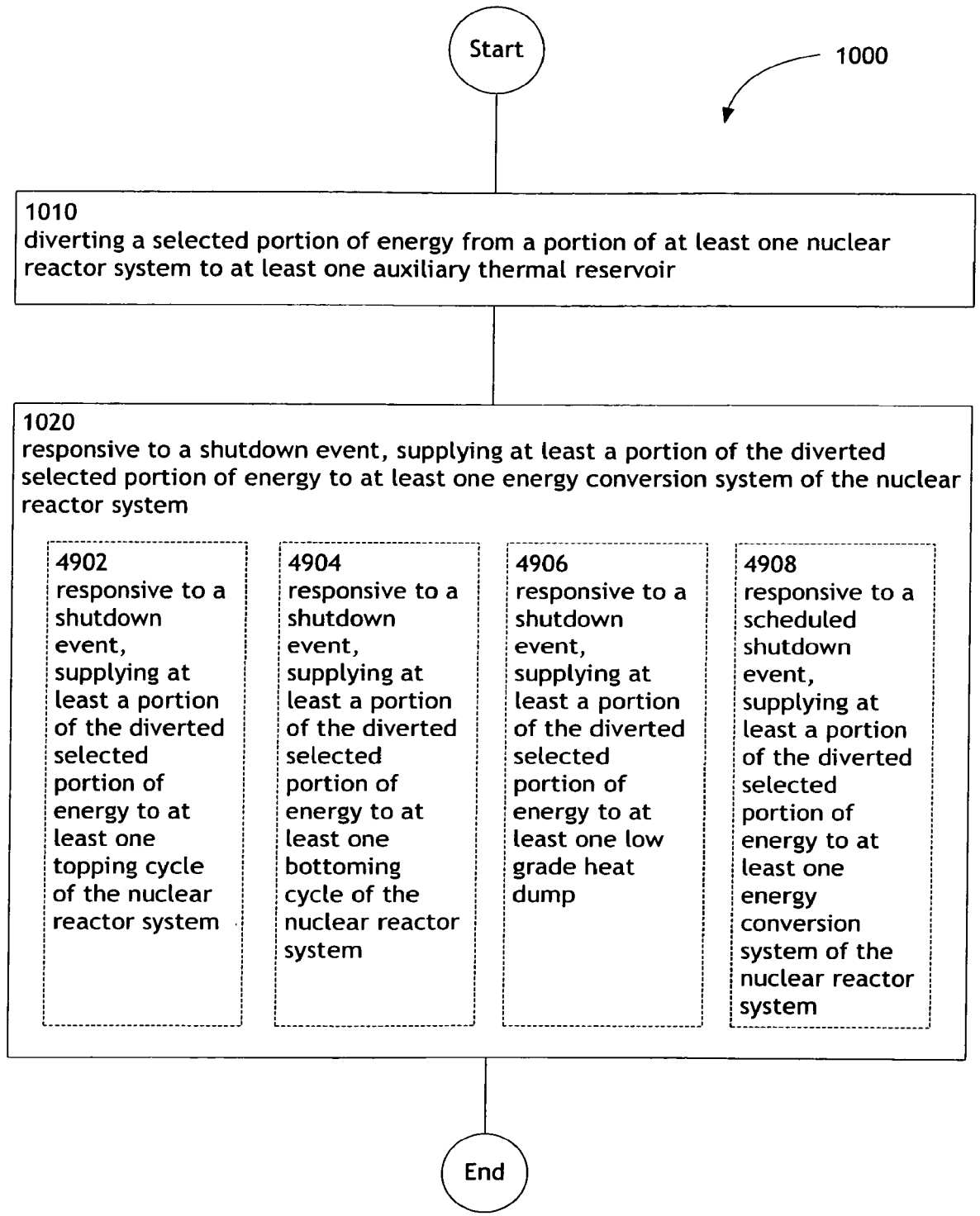

FIG. 49 illustrates alternative embodiments of the example operational flow 1000 of FIG. 10. FIG. 49 illustrates example embodiments where the supplying operation 1020 may include at least one additional operation. Additional operations may include an operation 4902, an operation 4904, an operation 4906, and/or an operation 4908.

Operation 4902 illustrates, responsive to a shutdown event, supplying at least a portion of the diverted selected portion of energy to at least one topping cycle of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to a topping cycle 314 of the nuclear reactor system 101.

Operation 4904 illustrates, responsive to a shutdown event, supplying at least a portion of the diverted selected portion of energy to at least one bottoming cycle of the nuclear reactor system. For example, as shown in FIGS. 1 through 9B, a heat supply system responsive to a shutdown event 114 of the nuclear reactor system may supply a portion of the thermal energy stored in the auxiliary thermal reservoir 112 to a bottoming cycle 316 of the nuclear reactor system 101.

Operation 4906 illustrates, responsive to a shutdown event, supplying at least a portion of the diverted selected portion of energy to at least one low grade heat dump. For example, as shown in FIGS. 1 through 9B, a heat supply system responsive to a shutdown event 114 of the nuclear reactor system may supply a portion of the thermal energy stored in the auxiliary thermal reservoir 112 to a low grade heat dump 318 of the nuclear reactor system 101.

Operation 4908 illustrates, responsive to a scheduled shutdown event, supplying at least a portion of the diverted selected portion of energy to at least one energy conversion system of the nuclear reactor system. For example, as shown in FIGS. 1 through 9B, in response to a schedule shutdown (e.g., routine maintenance) of the nuclear reactor system 101, a heat supply system responsive to a scheduled shutdown event 904 of the nuclear reactor system 101 may initiate the transfer of a portion of the thermal energy stored in the auxiliary thermal reservoir 112 to an energy conversion system 110 of the nuclear reactor system 101.

Figure 50:
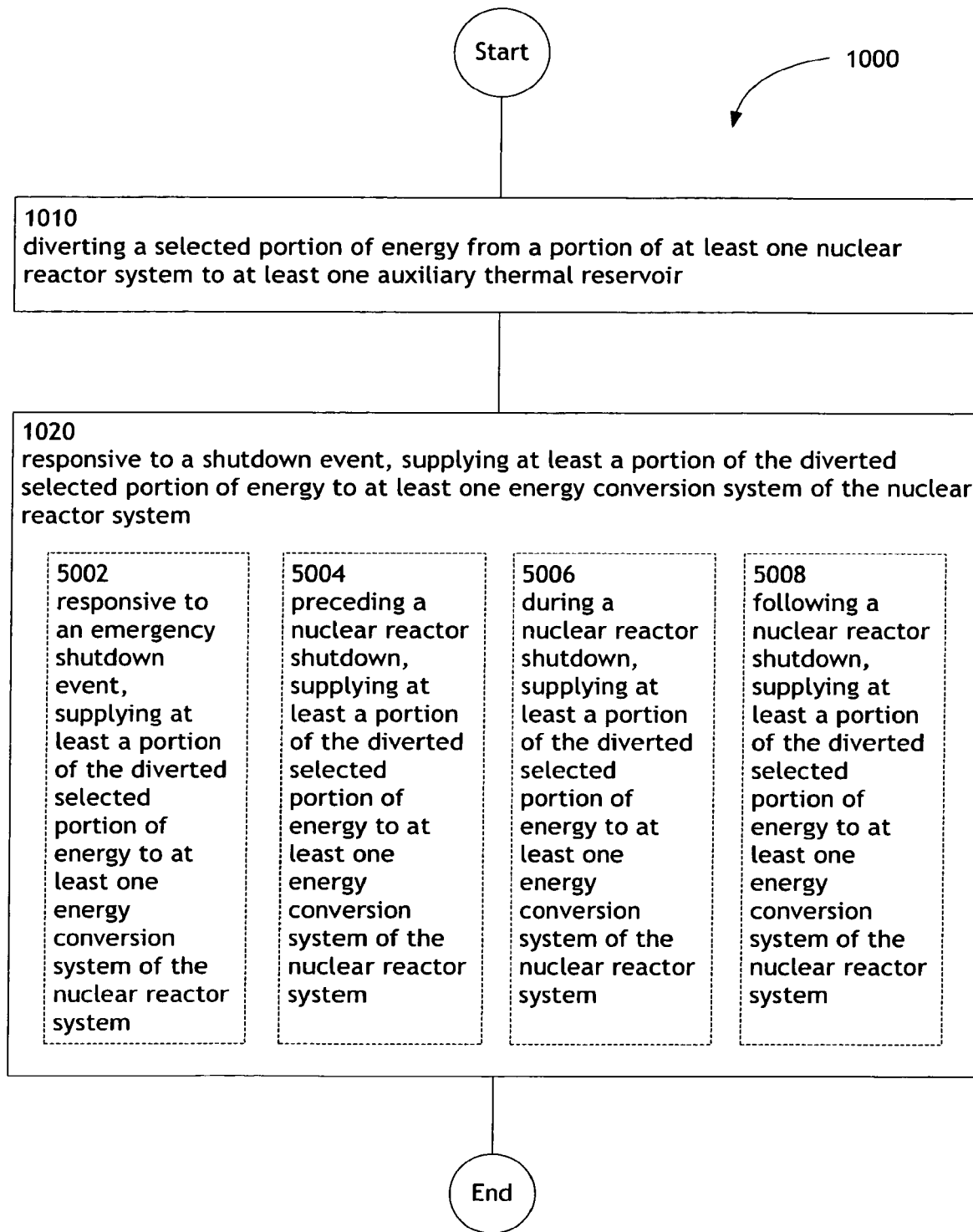

FIG. 50 illustrates alternative embodiments of the example operational flow 1000 of FIG. 10. FIG. 50 illustrates example embodiments where the supply operation 1020 may include at least one additional operation. Additional operations may include an operation 5002, an operation 5004, an operation 5006, and/or an operation 5008.

The operation 5002 illustrates, responsive to an emergency shutdown event, supplying at least a portion of the diverted selected portion of energy to at least one energy conversion system of the nuclear reactor system. For example, as shown in FIGS. 1 through 9B, in response to an emergency shutdown (e.g., SCRAM) of the nuclear reactor system 101, a heat supply system responsive to an emergency shutdown event 902 of the nuclear reactor system 101 may initiate the transfer of a portion of the thermal energy stored in the auxiliary thermal reservoir 112 to an energy conversion system 110 of the nuclear reactor system 101.

The operation 5004 illustrates, preceding a nuclear reactor shutdown, supplying at least a portion of the diverted selected portion of energy to at least one energy conversion system of the nuclear reactor system. For example, as shown in FIGS. 1 through 9B, preceding the shutdown of the nuclear reactor 102 of a nuclear reactor system 101, a heat supply system responsive to a shutdown event 114 may initiate the transfer of a portion of the thermal energy stored in the auxiliary thermal reservoir 112 to an energy conversion system 110 of the nuclear reactor system 101.

Operation 5006 illustrates, during a nuclear reactor shutdown, supplying at least a portion of the diverted selected portion of energy to at least one energy conversion system of the nuclear reactor system. For example, as shown in FIGS. 1 through 9B, during the shutdown of the nuclear reactor 102 of a nuclear reactor system 101, a heat supply system responsive to a shutdown event 114 may initiate the transfer of a portion of the thermal energy stored in the auxiliary thermal reservoir 112 to an energy conversion system 110 of the nuclear reactor system 101.

Operation 5008 illustrates, following a nuclear reactor shutdown, supplying at least a portion of the diverted selected portion of energy to at least one energy conversion system of the nuclear reactor system. For example, as shown in FIGS. 1 through 9B, following the shutdown of the nuclear reactor 102 of a nuclear reactor system 101, a heat supply system responsive to a shutdown event 114 may initiate the transfer of a portion of the thermal energy stored in the auxiliary thermal reservoir 112 to an energy conversion system 110 of the nuclear reactor system 101.

Figure 51:
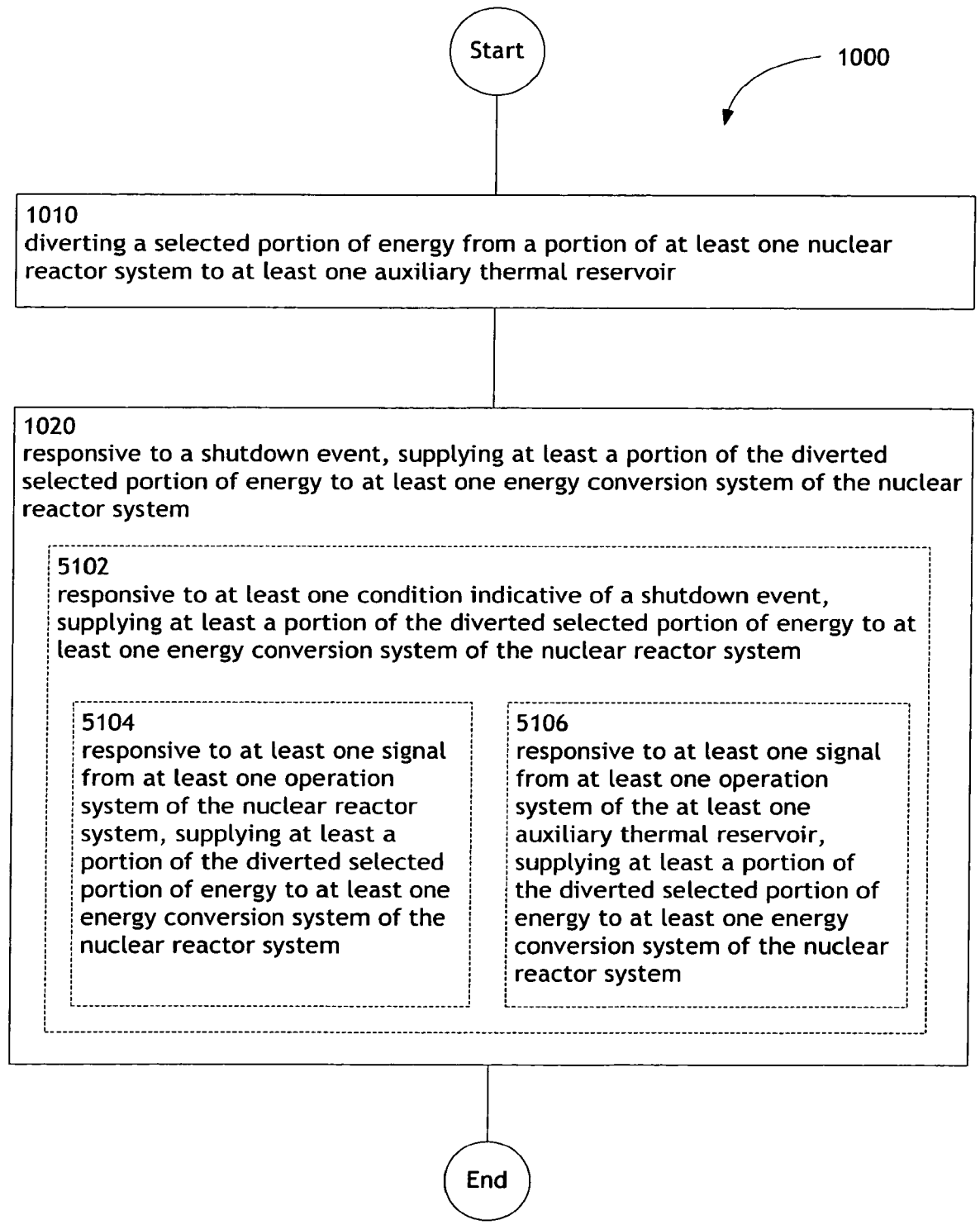

FIG. 51 illustrates alternative embodiments of the example operational flow 1000 of FIG. 10. FIG. 51 illustrates example embodiments where the supply operation 1020 may include at least one additional operation. Additional operations may include an operation 5102, an operation 5104, and/or an operation 5106.

The operation 5102 illustrates, responsive to at least one condition indicative of a shutdown event, supplying at least a portion of the diverted selected portion of energy to at least one energy conversion system of the nuclear reactor system. For example, as shown in FIGS. 1 through 9B, in response to a condition indicative of a shutdown of the nuclear reactor system 101, a heat supply system responsive to a condition indicative of a shutdown of the nuclear reactor system 101 may initiate the transfer of a portion of the thermal energy stored in the auxiliary thermal reservoir 112 to an energy conversion system 110 of the nuclear reactor system 101.

Further, the operation 5104 illustrates, responsive to at least one signal from at least one operation system of the nuclear reactor system, supplying at least a portion of the diverted selected portion of energy to at least one energy conversion system of the nuclear reactor system. For example, as shown in FIGS. 1 through 9B, in response to a signal from an operation system of nuclear reactor system 101, a heat supply system responsive to a signal from an operation system of the nuclear reactor system 908 may initiate the transfer of a portion of the thermal energy stored in the auxiliary thermal reservoir 112 to an energy conversion system 110 of the nuclear reactor system 101.

Further, the operation 5106 illustrates, responsive to at least one signal from at least one operation system of the at least one auxiliary thermal reservoir, supplying at least a portion of the diverted selected portion of energy to at least one energy conversion system of the nuclear reactor system. For example, as shown in FIGS. 1 through 9B, in response to a signal from an operation system of the auxiliary thermal reservoir 112, a heat supply system responsive to a signal from an operation system of auxiliary thermal reservoir 910 may initiate the transfer of a portion of the thermal energy stored in the auxiliary thermal reservoir 112 to an energy conversion system 110 of the nuclear reactor system 101.

Figure 52:
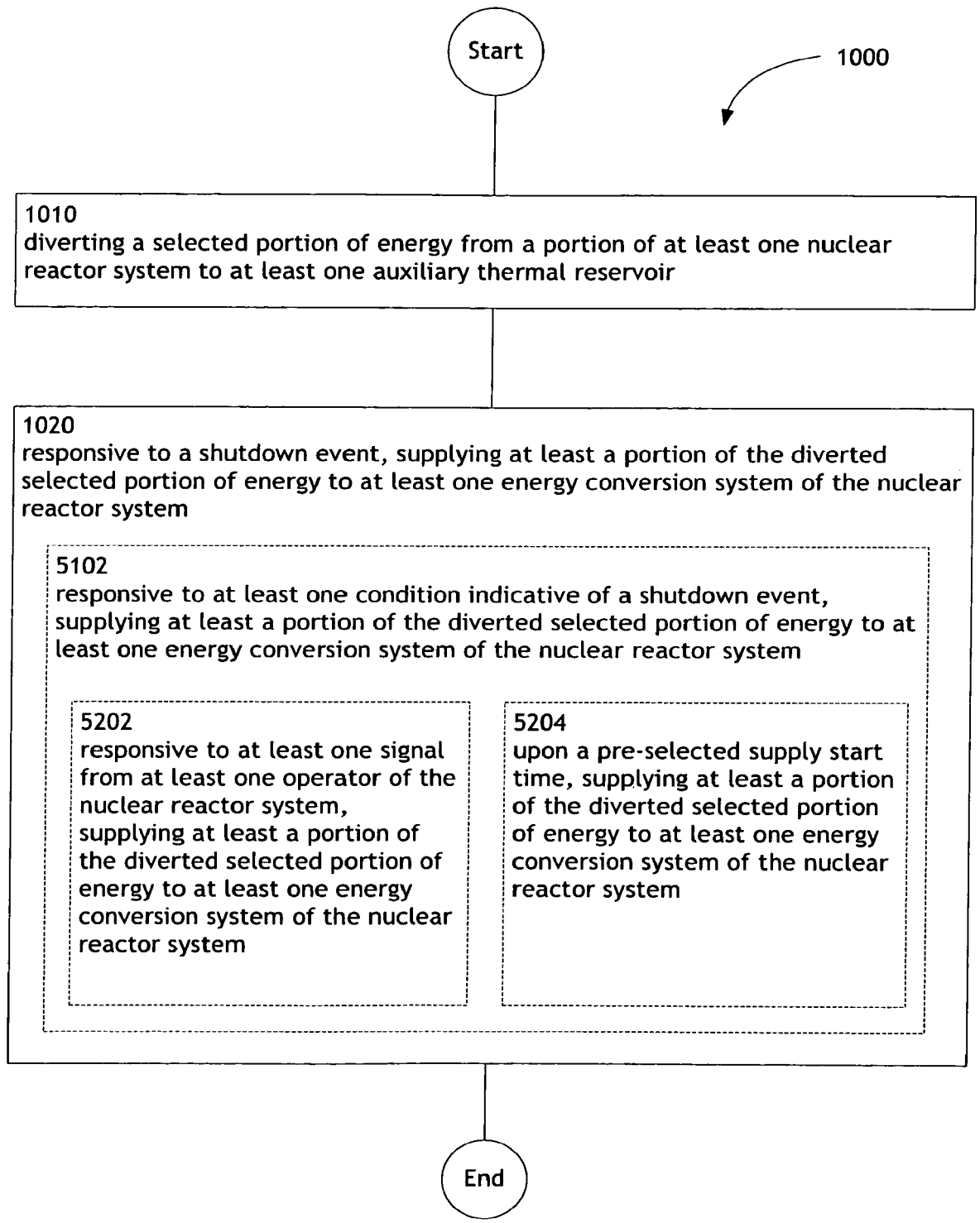

FIG. 52 illustrates alternative embodiments of the example operational flow 1000 of FIG. 10. FIG. 52 illustrates example embodiments where the supplying operation 1020 may include at least one additional operation. Additional operations may include an operation 5202, and/or an operation 5204.

Further, the operation 5202 illustrates, responsive to at least one signal from at least one operator of the nuclear reactor system, supplying at least a portion of the diverted selected portion of energy to at least one energy conversion system of the nuclear reactor system. For example, as shown in FIGS. 1 through 9B, in response to a signal from an operator (e.g., human user or human controlled programmed computer system) of the nuclear reactor system 101, a heat supply system responsive to a signal from an operator of the nuclear reactor system 912 may initiate the transfer of a portion of the thermal energy stored in the auxiliary thermal reservoir 112 to an energy conversion system 110 of the nuclear reactor system 101.

Further, the operation 5204 illustrates, upon a pre-selected supply start time, supplying at least a portion of the diverted selected portion of energy to at least one energy conversion system of the nuclear reactor system. For example, as shown in FIGS. 1 through 9B, upon a preselected time of elapse after a shutdown event, a heat supply system responsive to a preselected time of elapse 914 (e.g., time of elapse may be measured relative to the initiation of a nuclear reactor shutdown event) may initiate the transfer of a portion of the thermal energy stored in the auxiliary thermal reservoir 112 to an energy conversion system 110 of the nuclear reactor system 101.

Figure 53:
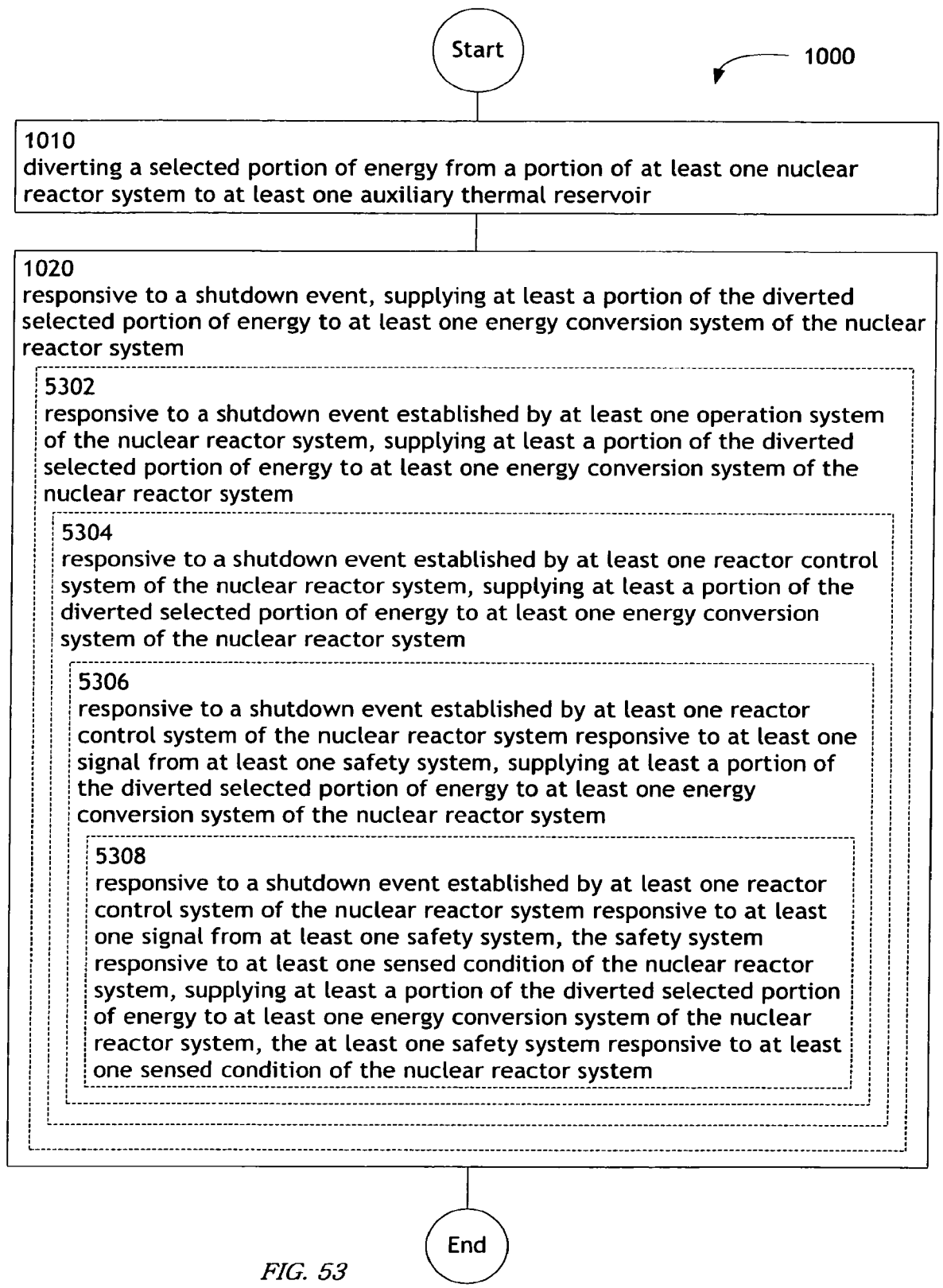

FIG. 53 illustrates alternative embodiments of the example operational flow 1000 of FIG. 10. FIG. 53 illustrates example embodiments where the supplying operation 1020 may include at least one additional operation. Additional operations may include an operation 5302, an operation 5304, an operation 5306, and/or an operation 5308.

Operation 5302 illustrates, responsive to a shutdown event established by at least one operation system of the nuclear reactor system, supplying at least a portion of the diverted selected portion of energy to at least one energy conversion system of the nuclear reactor system. For example, as shown in FIGS. 1 through 9B, in response to a shutdown event established by an operation system 120 of the nuclear reactor system 101, a heat supply system responsive to a shutdown event established by an operation system of the nuclear reactor system 916 may initiate the transfer of a portion of the thermal energy stored in the auxiliary thermal reservoir 112 to an energy conversion system 110 of the nuclear reactor system 101.

Further, operation 5304 illustrates, responsive to a shutdown event established by at least one reactor control system of the nuclear reactor system, supplying at least a portion of the diverted selected portion of energy to at least one energy conversion system of the nuclear reactor system. For example, as shown in FIGS. 1 through 9B, in response to a shutdown event established by a reactor control system of the nuclear reactor system 101, a heat supply system responsive to a shutdown event established by a control system of the nuclear reactor system 918 may initiate the transfer of a portion of the thermal energy stored in the auxiliary thermal reservoir 112 to an energy conversion system 110 of the nuclear reactor system 101.

Further, operation 5306 illustrates, responsive to a shutdown event established by at least one reactor control system of the nuclear reactor system responsive to at least one signal from at least one safety system, supplying at least a portion of the diverted selected portion of energy to at least one energy conversion system of the nuclear reactor system. For example, as shown in FIGS. 1 through 9B, in response to a shutdown event established by a reactor control system of the nuclear reactor system 101, where the reactor control system is responsive to a signal from a safety system of the nuclear reactor system 101, a heat supply system responsive to a shutdown event established by a reactor control system 920, where the reactor control system is responsive to a safety system of the nuclear reactor system 101, may initiate the transfer of a portion of the thermal energy stored in the auxiliary thermal reservoir 112 to an energy conversion system 110 of the nuclear reactor system 101.

Further, the operation 5308 illustrates, responsive to a shutdown event established by at least one reactor control system of the nuclear reactor system responsive to at least one signal from at least one safety system, the safety system responsive to at least one sensed condition of the nuclear reactor system, supplying at least a portion of the diverted selected portion of energy to at least one energy conversion system of the nuclear reactor system, the at least one safety system responsive to at least one sensed condition of the nuclear reactor system. For example, as shown in FIGS. 1 through 9B, in response to a shutdown event established by a reactor control system of the nuclear reactor system 101, where the reactor control system is responsive to a signal from a safety system of the nuclear reactor system 101, and the safety system is responsive to a sensed reactor condition (e.g., external condition or internal condition), a heat supply system responsive to a shutdown event established by a reactor control system 922, where the reactor control system is responsive to a safety system of the nuclear reactor system 101 and the safety system is responsive to a sensed reactor condition, may initiate the transfer of a portion of the thermal energy stored in the auxiliary thermal reservoir 112 to an energy conversion system 110 of the nuclear reactor system 101.

Figure 54:
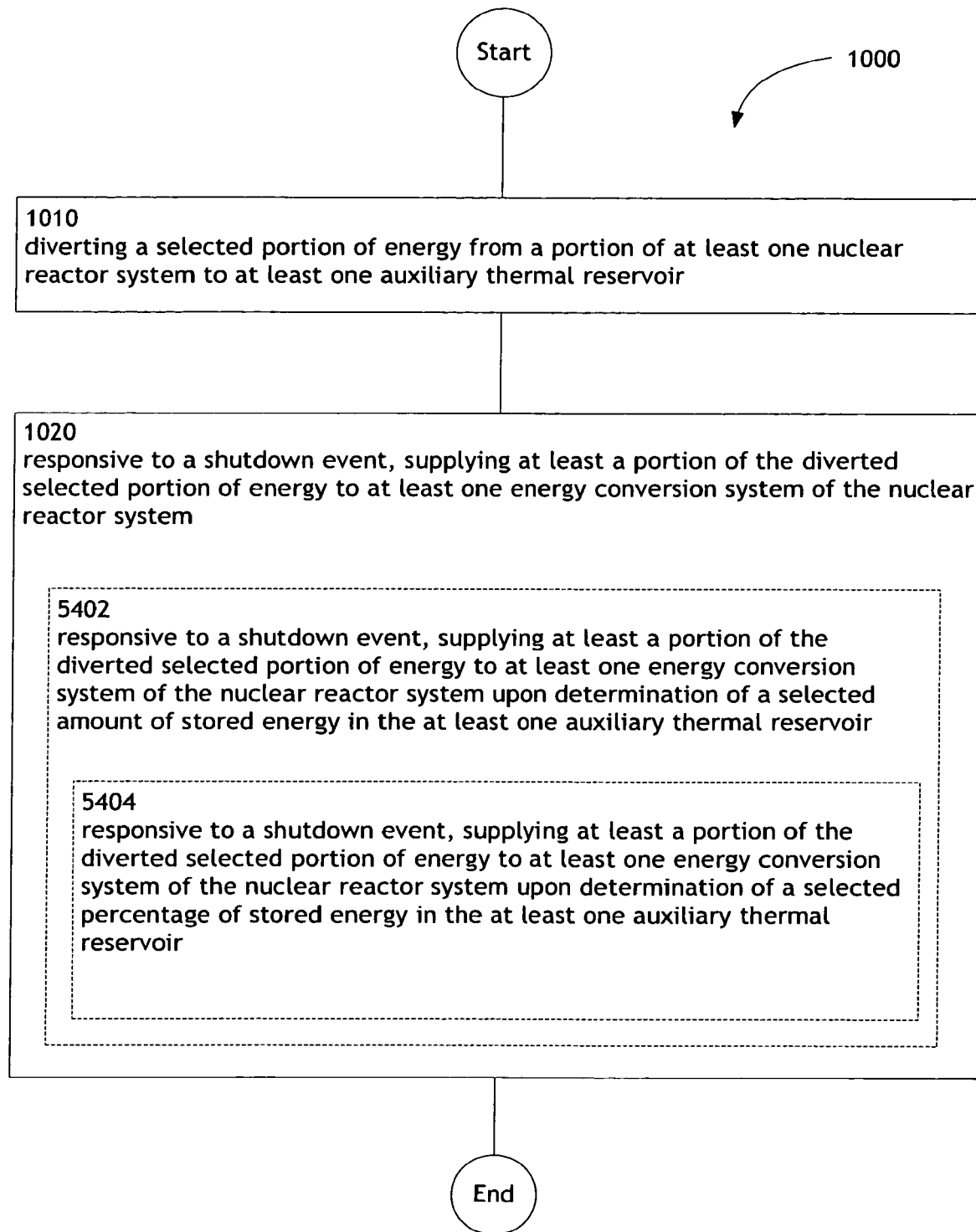

FIG. 54 illustrates alternative embodiments of the example operational flow 1000 of FIG. 10. FIG. 54 illustrates example embodiments where the supplying operation 1020 may include at least one additional operation. Additional operations may include an operation 5402, and/or an operation 5404.

Operation 5402 illustrates, responsive to a shutdown event, supplying at least a portion of the diverted selected portion of energy to at least one energy conversion system of the nuclear reactor system upon determination of a selected amount of stored energy in the at least one auxiliary thermal reservoir. For example, as shown in FIGS. 1 through 9B, in response to the determination of the amount of energy stored in the auxiliary thermal reservoir 112 at shutdown of the nuclear reactor system 101, a heat supply system responsive to the determination of the amount of energy stored in the auxiliary thermal reservoir at shutdown of the nuclear reactor system 924 may initiate the transfer of a portion of the thermal energy stored in the auxiliary thermal reservoir 112 to an energy conversion system 110 of the nuclear reactor system 101.

Further, operation 5404 illustrates, responsive to a shutdown event, supplying at least a portion of the diverted selected portion of energy to at least one energy conversion system of the nuclear reactor system upon determination of a selected percentage of stored energy in the at least one auxiliary thermal reservoir. For example, as shown in FIGS. 1 through 9B, in response to the determination of the percentage of utilized energy storage capacity in the auxiliary thermal reservoir 112 at shutdown of the nuclear reactor system 101, a heat supply system responsive to the determination of the percentage of utilized energy storage capacity in the auxiliary thermal reservoir at shutdown of the nuclear reactor system 926 may initiate the transfer of a portion of the thermal energy stored in the auxiliary thermal reservoir 112 to an energy conversion system 110 of the nuclear reactor system 101.

Figure 55:
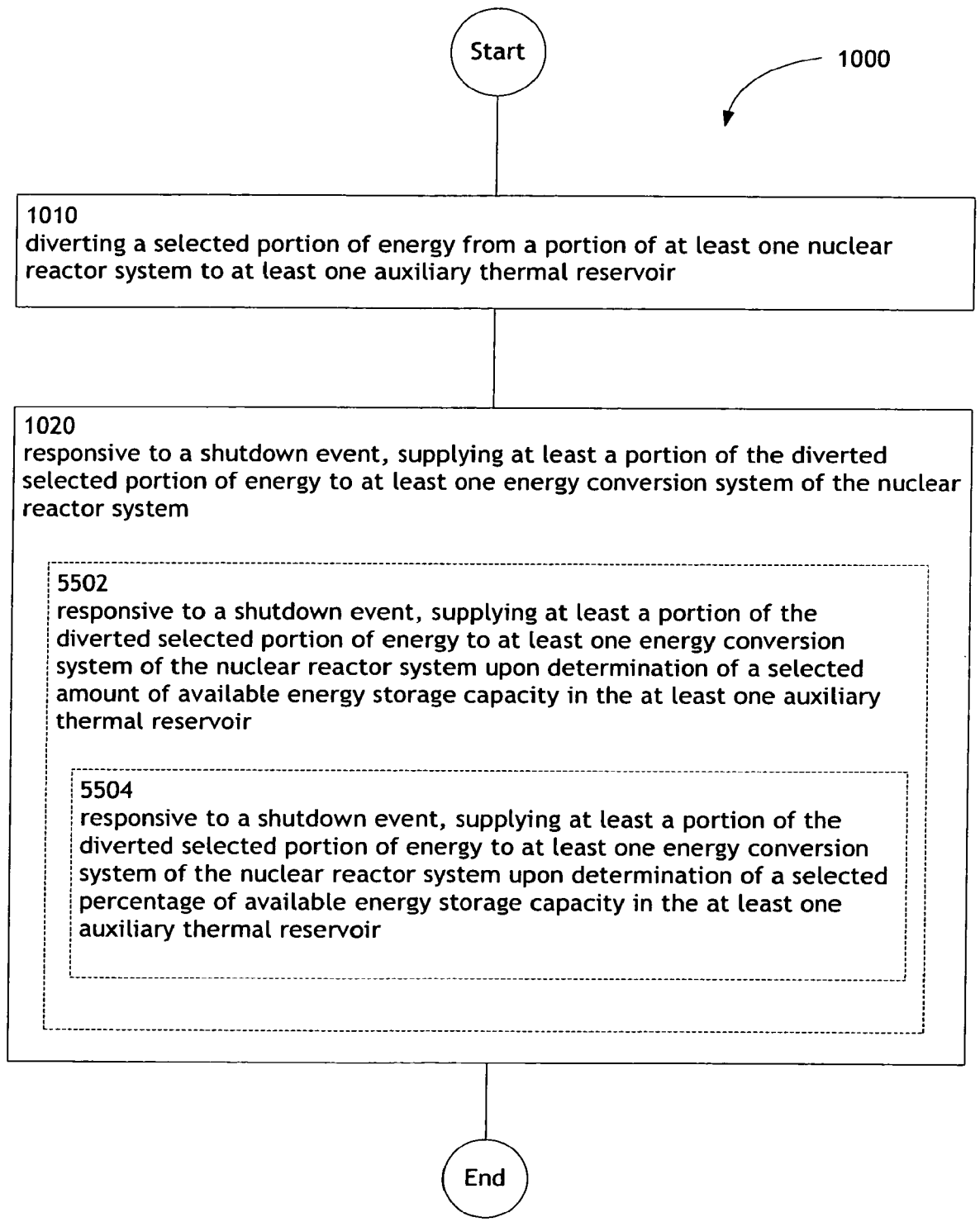

FIG. 55 illustrates alternative embodiments of the example operational flow 1000 of FIG. 10. FIG. 55 illustrates example embodiments where the supplying operation 1020 may include at least one additional operation. Additional operations may include an operation 5502, and/or an operation 5504.

The operation 5502 illustrates, responsive to a shutdown event, supplying at least a portion of the diverted selected portion of energy to at least one energy conversion system of the nuclear reactor system upon determination of a selected amount of available energy storage capacity in the at least one auxiliary thermal reservoir. For example, as shown in FIGS. 1 through 9B, in response to the determination of the available energy storage capacity of the auxiliary thermal reservoir 112 at shutdown of the nuclear reactor system 101, a heat supply system responsive to the determination of the available energy storage capacity of the auxiliary thermal reservoir at shutdown of the nuclear reactor system 928 may initiate the transfer of a portion of the thermal energy stored in the auxiliary thermal reservoir 112 to an energy conversion system 110 of the nuclear reactor system 101.

Further, the operation 5504 illustrates, responsive to a shutdown event, supplying at least a portion of the diverted selected portion of energy to at least one energy conversion system of the nuclear reactor system upon determination of a selected percentage of available energy storage capacity in the at least one auxiliary thermal reservoir. For example, as shown in FIGS. 1 through 9B, in response to the determination of the percentage of available energy storage capacity in the auxiliary thermal reservoir 112 at shutdown of the nuclear reactor system 101, a heat supply system responsive to the determination of the percentage of available energy storage capacity in the auxiliary thermal reservoir at shutdown of the nuclear reactor system 930 may initiate the transfer of a portion of the thermal energy stored in the auxiliary thermal reservoir 112 to an energy conversion system 110 of the nuclear reactor system 101.

Figure 56:
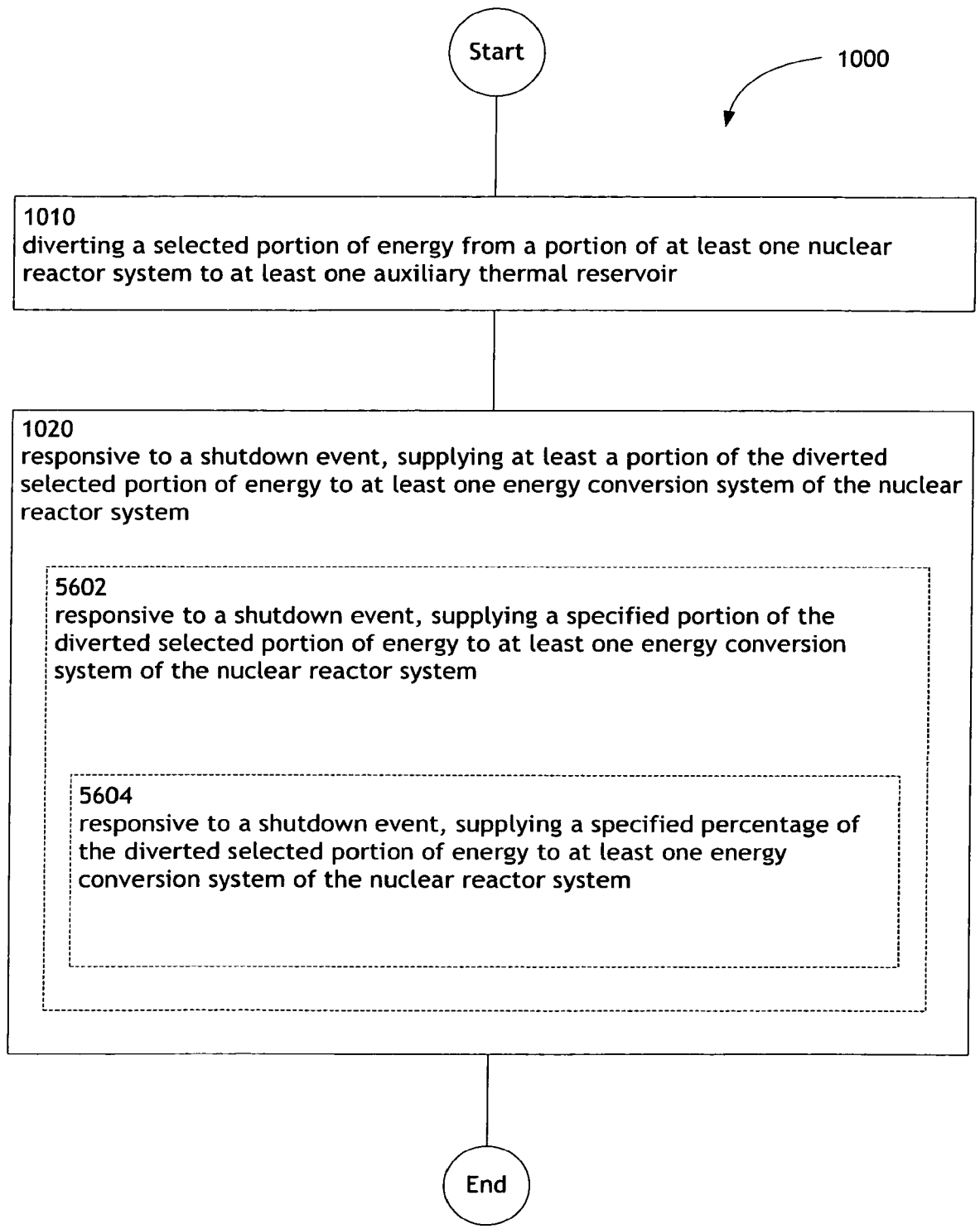

FIG. 56 illustrates alternative embodiments of the example operational flow 1000 of FIG. 10. FIG. 56 illustrates example embodiments where the supplying operation 1020 may include at least one additional operation. Additional operations may include an operation 5602, and/or an operation 5604.

The operation 5602 illustrates, responsive to a shutdown event, supplying a specified portion of the diverted selected portion of energy to at least one energy conversion system of the nuclear reactor system. For example, as shown in FIGS. 1 through 9B, in response to a shutdown event of the nuclear reactor system 101, a heat supply system suitable for supplying a specified portion of the energy stored in the auxiliary thermal reservoir to the energy conversion system 932 may initiate the transfer of a portion of the thermal energy stored in the auxiliary thermal reservoir 112 to an energy conversion system 110 of the nuclear reactor system 101.

Further, operation 5604 illustrates, responsive to a shutdown event, supplying a specified percentage of the diverted selected portion of energy to at least one energy conversion system of the nuclear reactor system. For example, as shown in FIGS. 1 through 9B, in response to a shutdown event of the nuclear reactor system 101, a heat supply system suitable for supplying a specified percentage of the energy stored in the auxiliary thermal reservoir to the energy conversion system 934 may initiate the transfer of a portion of the thermal energy stored in the auxiliary thermal reservoir 112 to an energy conversion system 110 of the nuclear reactor system 101.

Figure 57:
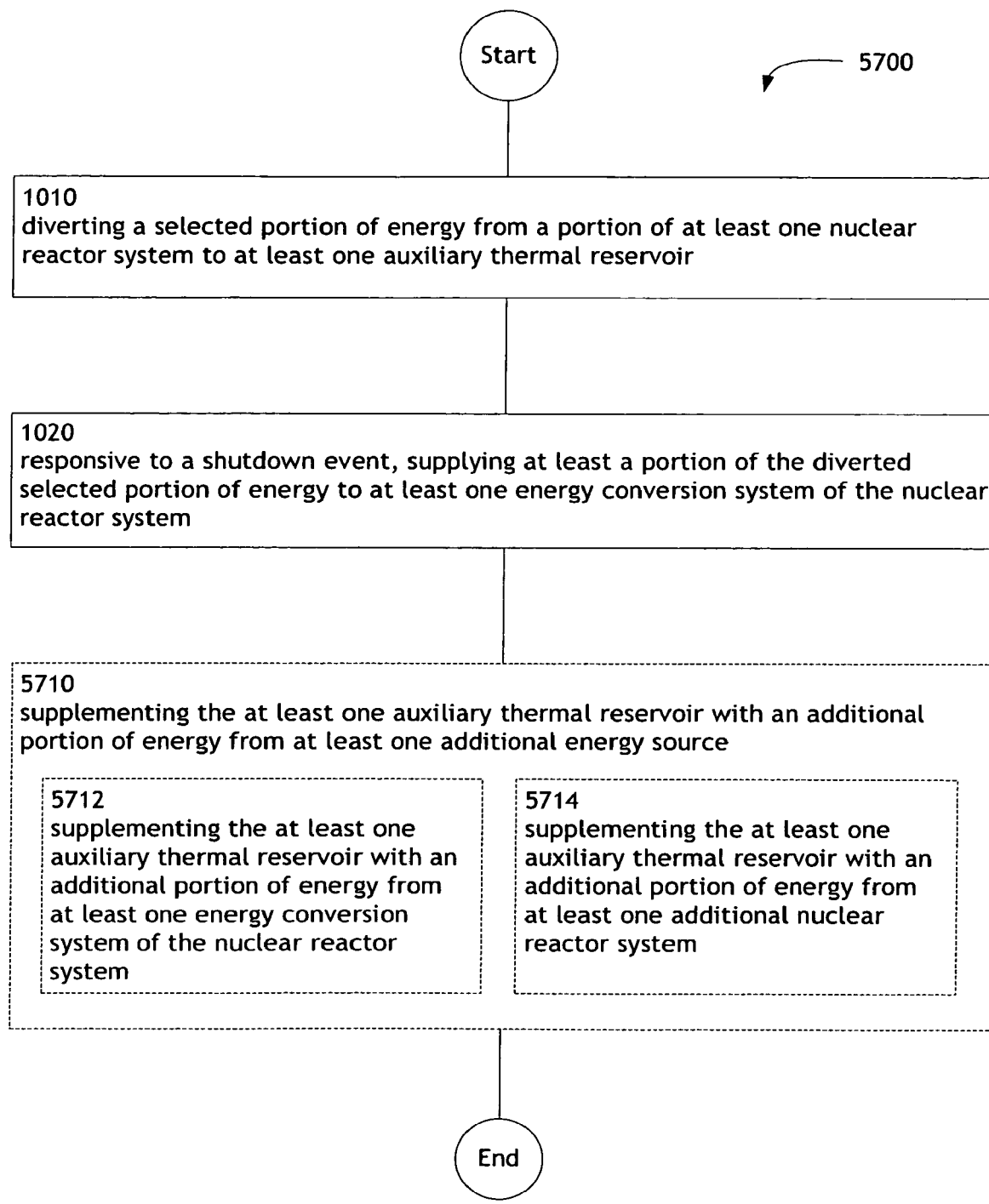

FIG. 57 illustrates an operational flow 5700 representing example operations related to the thermal storage and utilization of a selected portion of nuclear reactor generated energy. FIG. 57 illustrates an example embodiment where the example operational flow 1000 of FIG. 10 may include at least one additional operation. Additional operations may include an operation 5710, an operation 5712, and/or an operation 5714.

After a start operation, a diverting operation 1010, and a supplying operation 1020, the operational flow 5700 moves to a supplementing operation 5710. Operation 5710 illustrates supplementing the at least one auxiliary thermal reservoir with an additional portion of energy from at least one additional energy source. For example, as shown in FIG. 7, the thermal energy stored in the auxiliary thermal reservoir 112 may be supplemented with an additional portion of energy supplied from an additional energy source 702.

The operation 5712 illustrates supplementing the at least one auxiliary thermal reservoir with an additional portion of energy from at least one energy conversion system of the nuclear reactor system. For example, as shown in FIG. 7, the thermal energy stored in the auxiliary thermal reservoir 112 may be supplemented with an additional portion of energy from an energy conversion device 110 of the nuclear reactor system 101.

The operation 5714 illustrates supplementing the at least one auxiliary thermal reservoir with an additional portion of energy from at least one additional nuclear reactor system. For example, as shown in FIG. 7, the thermal energy stored in the auxiliary thermal reservoir 112 may be supplemented with an additional portion of energy (e.g., thermal energy or electrical energy) from an additional nuclear reactor system 704.

Figure 58:
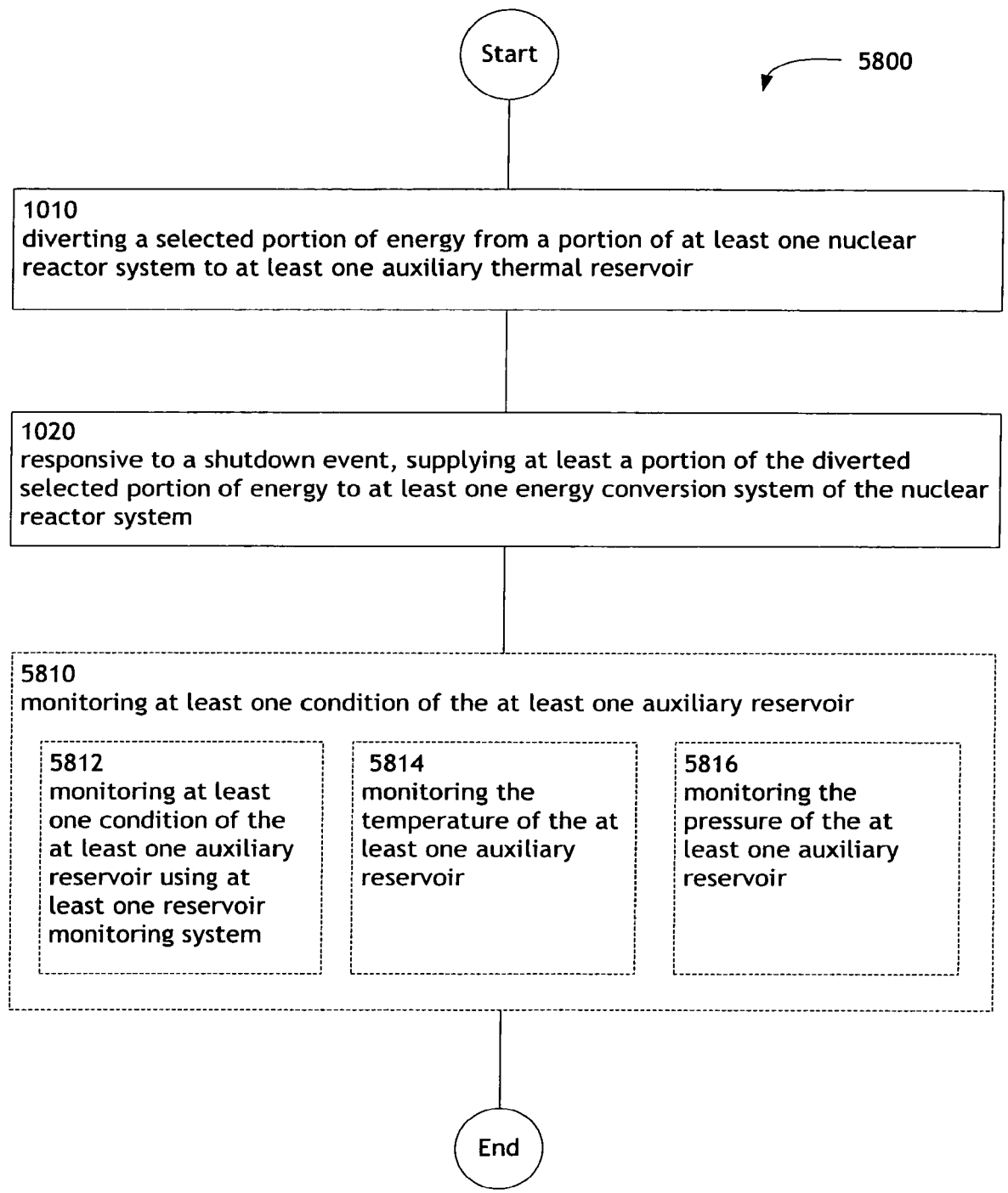

FIG. 58 illustrates an operational flow 5800 representing example operations related to the thermal storage and utilization of a selected portion of nuclear reactor generated energy. FIG. 58 illustrates an example embodiment where the example operational flow 1000 of FIG. 10 may include at least one additional operation. Additional operations may include an operation 5810, an operation 5812, an operation 5814, and/or an operation 5816.

After a start operation, a diverting operation 1010, and a supplying operation 1020, the operational flow 5800 moves to a monitoring operation 5810. Operation 5810 illustrates monitoring at least one condition of the at least one auxiliary reservoir. For example, as shown in FIG. 4D, at least one condition, such as the operational status (e.g., state of readiness, temperature pressure, or storage capacity), of the auxiliary thermal reservoir 112 may be monitored.

Further, operation 5812 illustrates monitoring at least one condition of the at least one auxiliary reservoir using at least one reservoir monitoring system. For example, as shown in FIG. 4D, a reservoir monitoring system 444 may be utilized to monitor a condition of the auxiliary thermal reservoir 112.

Further, operation 5814 illustrates monitoring the temperature of the at least one auxiliary reservoir. For example, as shown in FIG. 4D, a reservoir temperature monitoring system 446 may be utilized to monitor the internal temperature of the auxiliary thermal reservoir 112.

Further, operation 5816 illustrates monitoring the pressure of the at least one auxiliary reservoir. For example, as shown in FIG. 4D, a reservoir pressure monitoring system 448 may be utilized to monitor the pressure in the auxiliary thermal reservoir 112.

Figure 59:
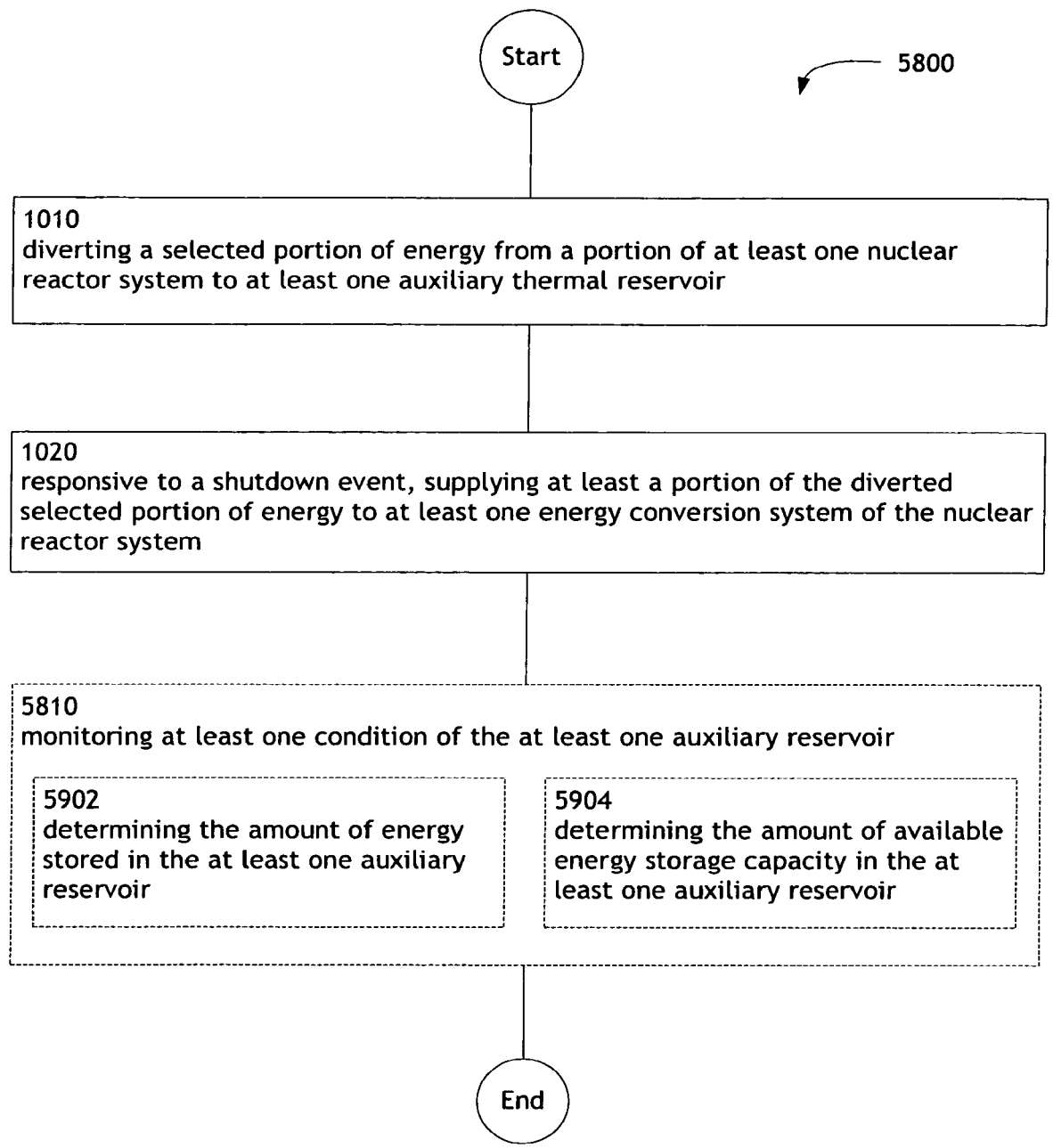

FIG. 59 illustrates alternative embodiments of the example operational flow 5800 of FIG. 58. FIG. 59 illustrates example embodiments where the operation 5810 may include at least one additional operation. Additional operations may include an operation 5902, and/or an operation 5904.

Operation 5902 illustrates determining the amount of energy stored in the at least one auxiliary reservoir. For example, as shown in FIG. 4D, a system for determining the amount of stored energy 450 in the auxiliary thermal reservoir 112 may be utilized to monitor the energy storage level in the auxiliary thermal reservoir 112.

Operation 5904 illustrates determining the amount of available energy storage capacity in the at least one auxiliary reservoir. For example, as shown in FIG. 4D, a system for determining the amount of available energy storage capacity 452 in the auxiliary thermal reservoir 112 may be utilized to monitor the available energy storage capacity of the auxiliary thermal reservoir 112.

Figure 60:
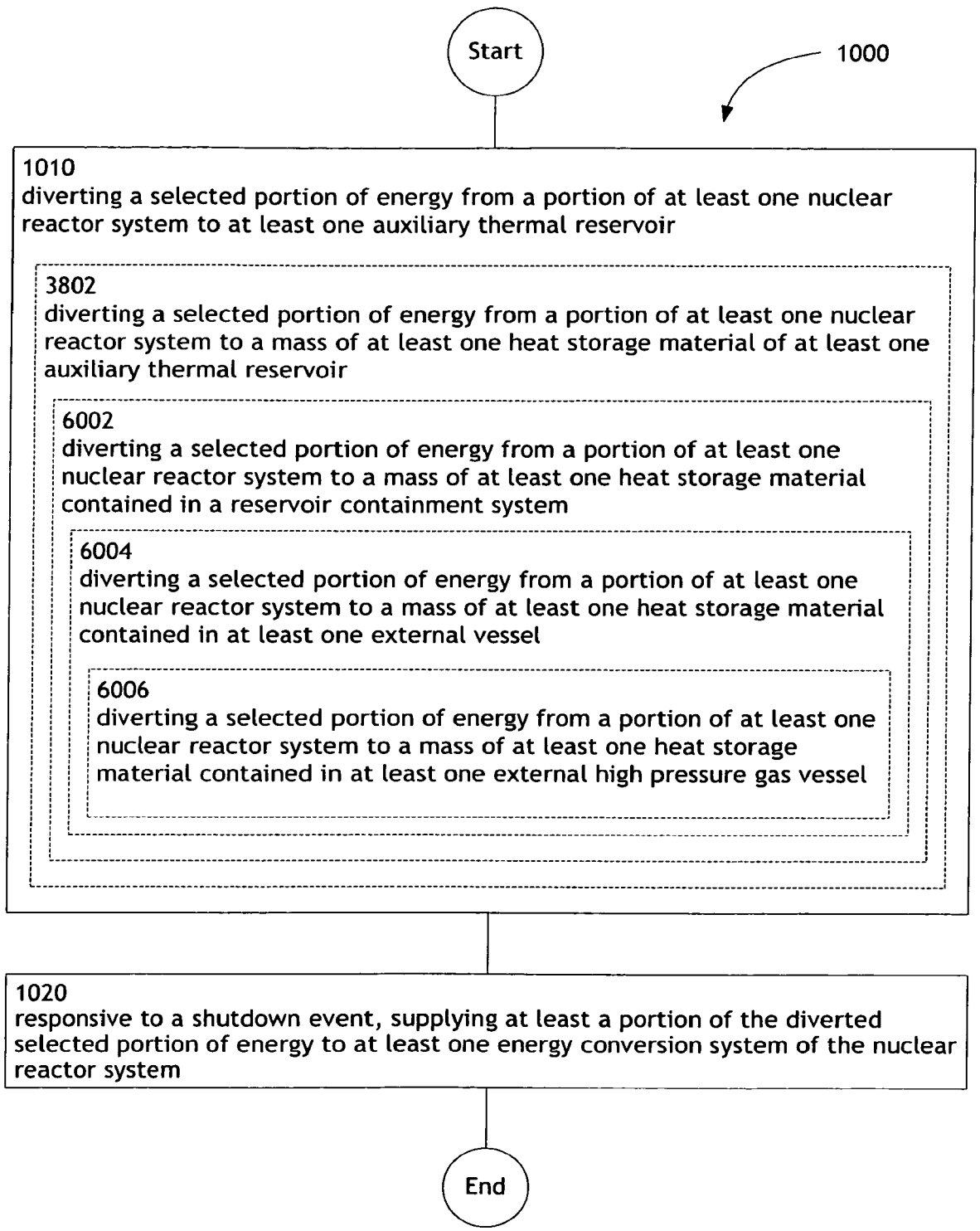

FIG. 60 illustrates alternative embodiments of the example operational flow 1000 of FIG. 10. FIG. 60 illustrates example embodiments where the diverting operation 1010 may include at least one additional operation. Additional operations may include an operation 6002, an operation 6004, and/or an operation 6006.

Operation 6002 illustrates diverting a selected portion of energy from a portion of at least one nuclear reactor system to a mass of at least one heat storage material contained in a reservoir containment system. For example, as shown in FIGS. 1 through 9B, the energy transfer system 104 may transfer a selected portion of energy from a portion of the nuclear reactor system 101 to a mass of heat storage material 116 of the auxiliary thermal reservoir 112 contained in a reservoir containment system 122 (e.g., vessel).

Further, operation 6004 illustrates diverting a selected portion of energy from a portion of at least one nuclear reactor system to a mass of at least one heat storage material contained in at least one external vessel. For example, as shown in FIGS. 1 through 9B, the energy transfer system 104 may transfer a selected portion of energy from a portion of the nuclear reactor system 101 to a mass of heat storage material 116 of the auxiliary thermal reservoir 112 contained in an external vessel 426.

Further, operation 6006 illustrates diverting a selected portion of energy from a portion of at least one nuclear reactor system to a mass of at least one heat storage material contained in at least one external high pressure gas vessel. For example, as shown in FIGS. 1 through 9B, the energy transfer system 104 may transfer a selected portion of energy from a portion of the nuclear reactor system 101 to a mass of heat storage material 116 of the auxiliary thermal reservoir 112 contained in a high pressure gas vessel 430. For instance, the energy transfer system 104 may transfer a selected portion of energy from a portion of the nuclear reactor system 101 to a mass of high pressurized gaseous helium contained in an external high pressure helium vessel.

Figure 61:
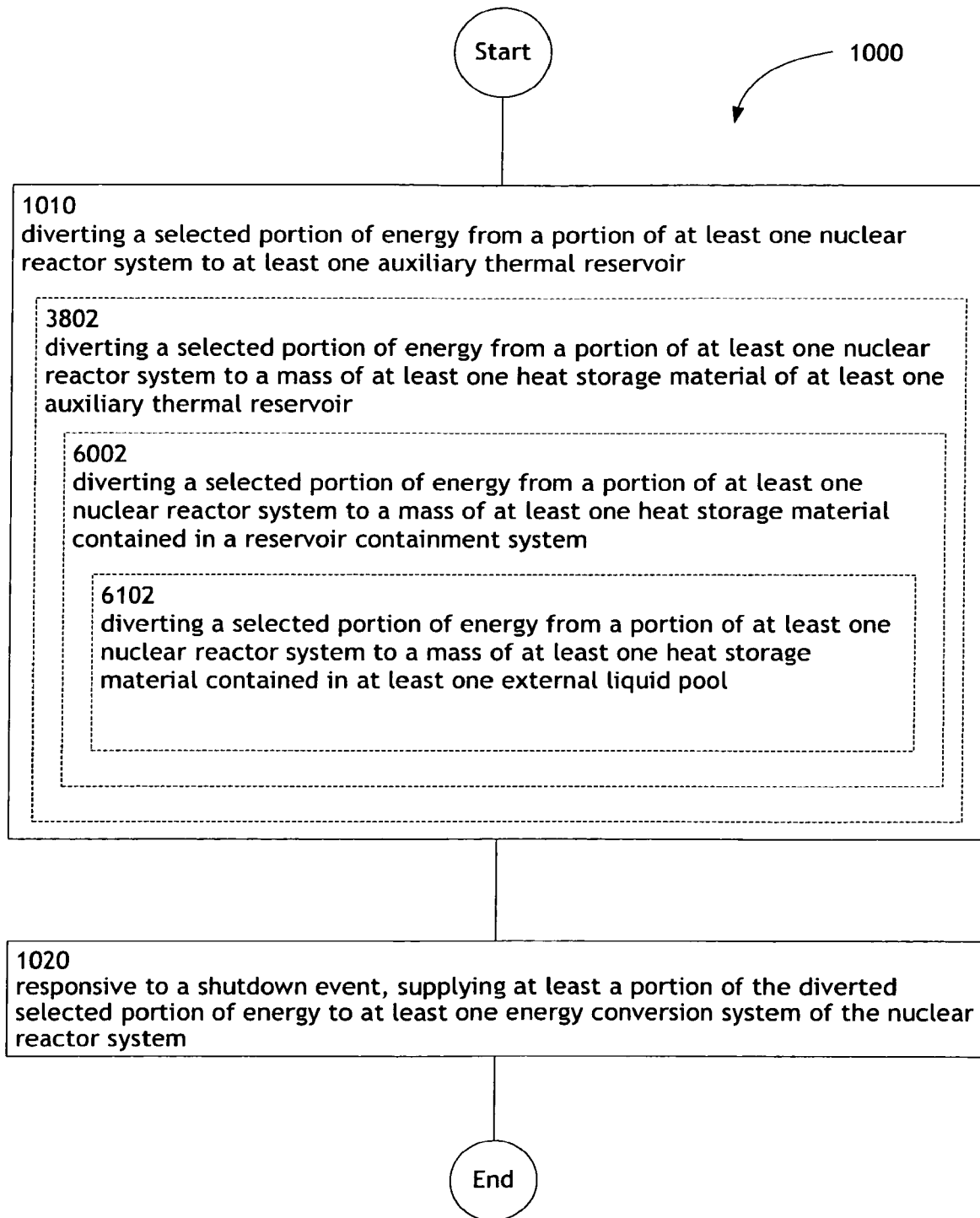

FIG. 61 illustrates alternative embodiments of the example operational flow 1000 of FIG. 10. FIG. 61 illustrates example embodiments where the diverting operation 1010 may include at least one additional operation. Additional operations may include an operation 6102.

Operation 6102 illustrates diverting a selected portion of energy from a portion of at least one nuclear reactor system to a mass of at least one heat storage material contained in at least one external liquid pool. For example, as shown in FIGS. 1 through 9B, the energy transfer system 104 may transfer a selected portion of energy from a portion of the nuclear reactor system 101 to a mass of liquid heat storage material 402 of the auxiliary thermal reservoir 112 contained in an external liquid pool 434. For instance, the energy transfer system 104 may transfer a selected portion of energy from a portion of the nuclear reactor system 101 to a mass of liquid sodium contained in an external liquid sodium pool.

Figure 62:
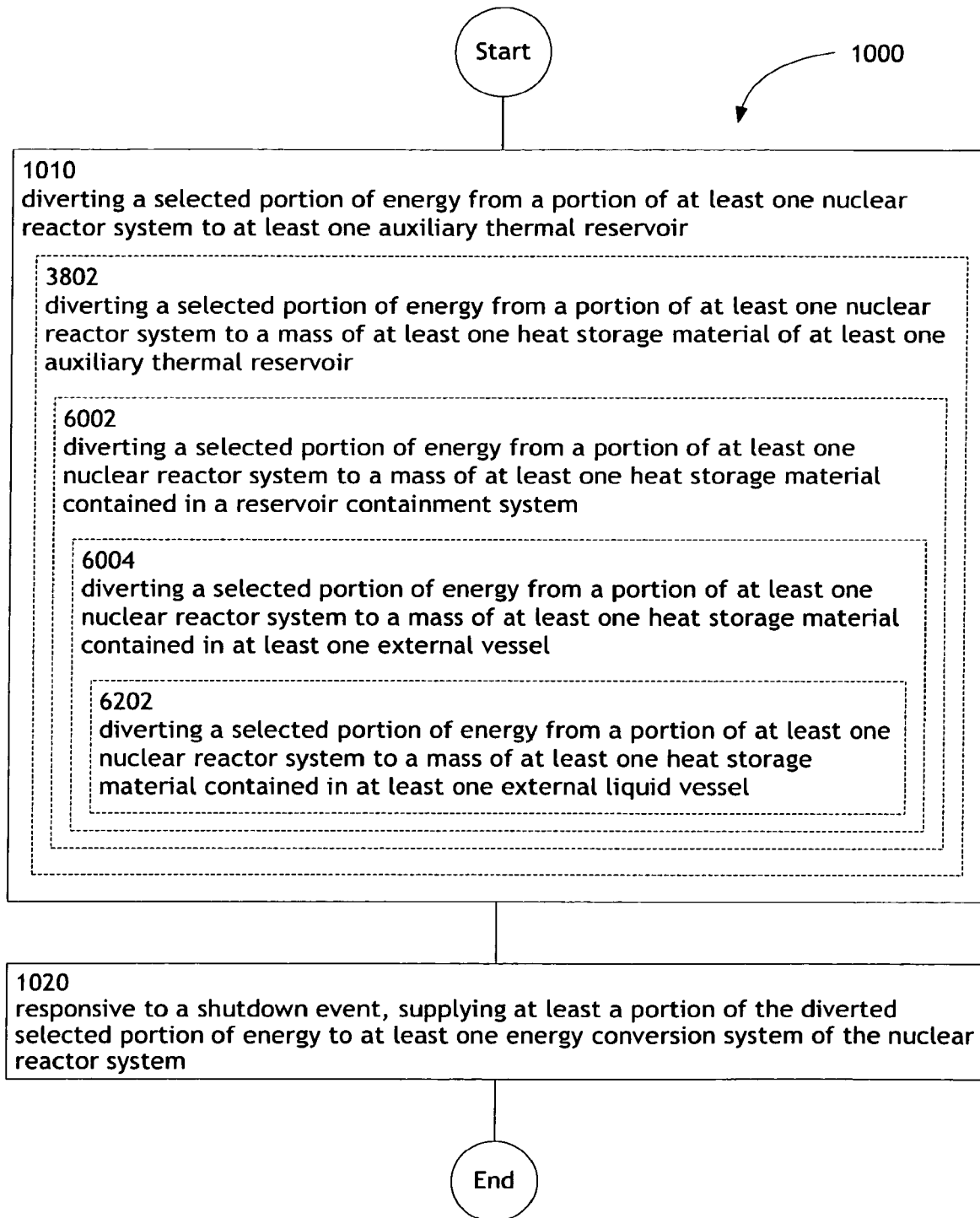

FIG. 62 illustrates alternative embodiments of the example operational flow 1000 of FIG. 10. FIG. 62 illustrates example embodiments where the diverting operation 1010 may include at least one additional operation. Additional operations may include an operation 6202.

Operation 6202 illustrates diverting a selected portion of energy from a portion of at least one nuclear reactor system to a mass of at least one heat storage material contained in at least one external liquid vessel. For example, as shown in FIGS. 1 through 9B, the energy transfer system 104 may transfer a selected portion of energy from a portion of the nuclear reactor system 101 to a mass of heat storage material 116 of the auxiliary thermal reservoir 112 contained in an external liquid vessel 428. For instance, the energy transfer system 104 may transfer a selected portion of energy from a portion of the nuclear reactor system 101 to a mass of liquid water contained in an external water vessel.

Figure 63:
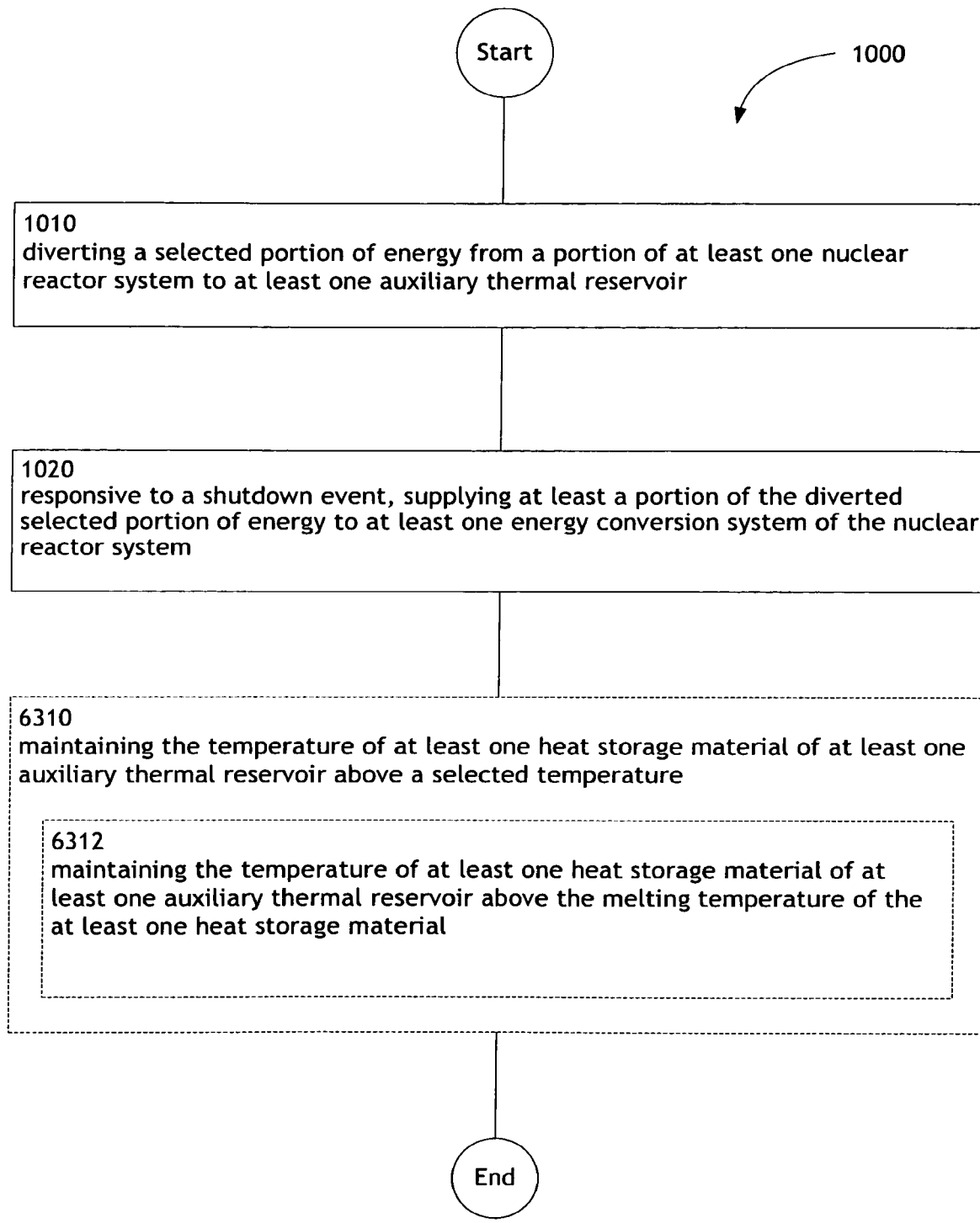

FIG. 63 illustrates an operational flow 6500 representing example operations related to the thermal storage and utilization of a selected portion of nuclear reactor generated energy. FIG. 63 illustrates an example embodiment where the example operational flow 1000 of FIG. 10 may include at least one additional operation. Additional operations may include an operation 6310, and/or an operation 6312.

After a start operation, a diverting operation 1010, and a supplying operation 1020, the operational flow 6300 moves to a temperature maintenance operation 6310. Operation 6310 illustrates maintaining the temperature of at least one heat storage material of at least one auxiliary thermal reservoir above a selected temperature. For example, as shown in FIG. 4D, the temperature of a heat storage material 116 of an auxiliary thermal reservoir 112 may be maintained with a reservoir temperature control system 454 (e.g., thermostat).

The operation 6312 illustrates maintaining the temperature of at least one heat storage material of at least one auxiliary thermal reservoir above the melting temperature of the at least one heat storage material. For example, as shown in FIG. 4D, the temperature of a heat storage material 116 of an auxiliary thermal reservoir 122 may be maintained with a reservoir temperature control system 454 above a specified temperature, such as the melting temperature of the heat storage material 116.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A method, comprising:
   providing a first portion of energy from at least one nuclear reactor of a nuclear reactor system to at least one energy conversion system;
   diverting a selected portion of energy from the at least one nuclear reactor to at least one auxiliary thermal reservoir, the selected portion of energy exceeding operational demand of the at least one energy conversion system; and
   storing the diverted selected portion of energy in the at least one auxiliary thermal reservoir in the form of a phase change in at least one heat storage material of the at least one auxiliary thermal reservoir.

2. The method of claim 1, further comprising responsive to a signal regarding a shutdown event, supplying at least a portion of the diverted selected portion of energy to the at least one energy conversion system.

3. The method of claim 1, wherein the diverting the selected portion of energy from the portion of the at least one nuclear reactor is performed while operating the nuclear reactor at operating temperature.

4. The method of claim 1, further comprising:
   determining that energy production by the at least one energy conversion system exceeds current grid demand;
   converting excess electrical power to thermal energy; and
   storing the thermal energy in the at least one auxiliary thermal reservoir in the form of a temperature change or a phase change in the at least one heat storage material of the at least one auxiliary thermal reservoir.

5. The method of claim 1, further comprising providing at least a portion of the diverted selected portion of energy in the at least one auxiliary thermal reservoir to the at least one energy conversion system when the diverted selected portion of energy does not exceed operational demand of the at least one energy conversion system.

6. The method of claim 1, further comprising supplementing the at least one auxiliary thermal reservoir with an additional portion of energy from at least one additional energy source.

7. The method of claim 6, wherein supplementing the at least one auxiliary thermal reservoir with an additional portion of energy from at least one additional energy source comprises increasing a temperature of the heat storage material.

8. The method of claim 1, wherein the diverting the selected portion of energy from the at least one nuclear reactor comprises responsive to at least one condition, diverting the selected portion of energy from the at least one nuclear reactor to the at least one thermal reservoir.

9. The method of claim 8, wherein the responsive to at least one condition, diverting the selected portion of energy from the at least one nuclear reactor to the at least one auxiliary thermal reservoir comprises in response to a determination of excess capacity of the at least one nuclear reactor system, diverting the selected portion of energy from the at least one nuclear reactor to the at least one auxiliary thermal reservoir.

10. The method of claim 8, wherein the responsive to at least one condition, diverting the selected portion of energy from the at least one nuclear reactor to the at least one auxiliary thermal reservoir comprises in response to at least one reservoir operation system of the at least one auxiliary thermal reservoir, diverting the selected portion of energy from the at least one nuclear reactor to the at least one auxiliary thermal reservoir.

11. The method of claim 8, wherein the responsive to at least one condition, diverting the selected portion of energy from the at least one nuclear reactor to the at least one auxiliary thermal reservoir comprises in response to at least one signal from an operation system of the at least one reservoir of the at least one auxiliary thermal reservoir, diverting the selected portion of energy from the portion of the at least one nuclear reactor to the at least one auxiliary thermal reservoir.

12. The method of claim 1, wherein the diverting the selection portion of energy from the at least one nuclear reactor to the at least one auxiliary thermal reservoir is in response to a signal from a reservoir operation system of the auxiliary thermal reservoir.

13. The method of claim 1, wherein the operational demand of the at least one nuclear reactor is reduced in response to a signal from the at least one energy conversion system.

* * * * *